US012539684B2

(12) United States Patent
Langen

(10) Patent No.: US 12,539,684 B2
(45) Date of Patent: Feb. 3, 2026

(54) METHOD AND APPARATUS FOR FORMING CONTAINERS

(71) Applicant: H. J. Paul Langen, Brampton (CA)

(72) Inventor: H. J. Paul Langen, Brampton (CA)

( * ) Notice: Subject to any disclaimer, the term of this patent is extended or adjusted under 35 U.S.C. 154(b) by 80 days.

(21) Appl. No.: 18/244,803

(22) Filed: Sep. 11, 2023

(65) Prior Publication Data

US 2023/0415441 A1 Dec. 28, 2023

Related U.S. Application Data

(63) Continuation of application No. 16/853,471, filed on Apr. 20, 2020, now Pat. No. 11,772,352.

(51) Int. Cl.

| | |
|---|---|
| ***B31B 50/28*** | (2017.01) |
| ***B31B 50/64*** | (2017.01) |
| *B31B 50/00* | (2017.01) |
| *B31B 50/04* | (2017.01) |
| *B31B 50/06* | (2017.01) |
| *B31B 100/00* | (2017.01) |
| *B31B 120/10* | (2017.01) |
| *B31B 120/30* | (2017.01) |

(52) U.S. Cl.

CPC .............. *B31B 50/28* (2017.08); *B31B 50/64* (2017.08); *B31B 50/006* (2017.08); *B31B 50/042* (2017.08); *B31B 50/062* (2017.08); *B31B 2100/002* (2017.08); *B31B 2120/10* (2017.08); *B31B 2120/302* (2017.08)

(58) Field of Classification Search

CPC ......... B31B 50/06; B31B 50/26; B31B 50/28; B31B 50/62; B31B 50/64; B31B 2100/00; B31B 2120/302

USPC ................................ 493/129, 154, 167, 175

See application file for complete search history.

(56) References Cited

U.S. PATENT DOCUMENTS

| | | | |
|---|---|---|---|
| 1,359,772 | A | 11/1920 | Weckbaugh |
| 2,942,530 | A | 6/1960 | Bodendoerfer |
| 3,134,307 | A | 5/1964 | Loeser |

(Continued)

FOREIGN PATENT DOCUMENTS

| | | | |
|---|---|---|---|
| CA | 2347777 | C | 7/2009 |
| CA | 2885801 | A1 | 4/2014 |

(Continued)

OTHER PUBLICATIONS

International Search Report issued by the Canadian Intellectual Property Office on Feb. 8, 2019 in connection with International Patent Application No. PCT/CA2018/051525, 5 pages.

(Continued)

*Primary Examiner* — Jacob A Smith

(57) ABSTRACT

A method and apparatus are disclosed for forming containers. The containers may be cans, including composite cans. The apparatus may include a cylindrical mandrel and a blank may be formed into a cylindrical tube around the mandrel. Rotational apparatuses may engage portions of a blank that may be in a flat configuration and may rotate the portions around the outward cylindrical surface of the mandrel. Free edges of the tubular blank may be sealed by a sealing strip that may be T-shaped in cross section. A cup may be installed in an end opening, such as a bottom end, of the cylindrical tube. The cup may be sealed in the end opening by a seaming process using a seaming apparatus.

9 Claims, 98 Drawing Sheets

(56) References Cited

U.S. PATENT DOCUMENTS

| | | | |
|---|---|---|---|
| 3,461,642 | A | 8/1969 | Langen et al. |
| 3,556,887 | A | 1/1971 | Adcock et al. |
| 3,837,961 | A | 9/1974 | Vouillemin |
| 3,990,210 | A | 11/1976 | McDonough et al. |
| 4,060,443 | A | 11/1977 | Balla |
| 4,164,171 | A | 8/1979 | Myers et al. |
| 4,194,440 | A | 3/1980 | Gorig |
| 4,349,400 | A | 9/1982 | Gilden |
| 4,452,596 | A | 6/1984 | Clauss et al. |
| 4,490,130 | A | 12/1984 | Konzal et al. |
| 4,637,199 | A | 1/1987 | Steck et al. |
| 5,120,292 | A | 6/1992 | Ueda et al. |
| 5,324,249 | A | 6/1994 | Konzal |
| 5,393,291 | A | 2/1995 | Wingerter |
| 5,593,375 | A | 1/1997 | Franci |
| 5,772,568 | A | 6/1998 | Chen |
| 5,889,263 | A | 3/1999 | Andersson |
| 5,992,489 | A | 11/1999 | Busse |
| 6,872,459 | B1 | 3/2005 | Frisk et al. |
| 6,913,568 | B2 | 7/2005 | Frank et al. |
| 7,425,246 | B2 | 9/2008 | Urscheler |
| 10,035,321 | B2 | 7/2018 | Stahlecker et al. |
| 11,745,457 | B2 | 9/2023 | Langen |
| 11,772,352 | B2 | 10/2023 | Langen |
| 11,780,199 | B2 | 10/2023 | Langen |
| 2001/0002677 | A1 | 6/2001 | Grabher |
| 2006/0124719 | A1 | 6/2006 | Mannlein |
| 2009/0298662 | A1 | 12/2009 | Maatta et al. |
| 2010/0012712 | A1 | 1/2010 | Swoboda et al. |
| 2010/0044423 | A1 | 2/2010 | Graham et al. |
| 2010/0263333 | A1 | 10/2010 | Langen |
| 2014/0150965 | A1 | 6/2014 | Larsson |
| 2014/0215973 | A1 | 8/2014 | Hagelqvist et al. |
| 2014/0287901 | A1 | 9/2014 | Hagelqvist |
| 2015/0031517 | A1 | 1/2015 | Cavazza et al. |
| 2015/0329267 | A1 | 11/2015 | Holka et al. |
| 2015/0367589 | A1* | 12/2015 | Graham .................. B31B 50/00 493/141 |
| 2017/0348939 | A1 | 12/2017 | Langen |
| 2018/0086019 | A1 | 3/2018 | Langen |
| 2018/0215497 | A1* | 8/2018 | Messerschmid .......... B31C 7/06 |
| 2018/0370666 | A1* | 12/2018 | Garza ..................... B65B 11/54 |

FOREIGN PATENT DOCUMENTS

| | | | |
|---|---|---|---|
| CA | 2765489 | C | 11/2017 |
| EP | 0074343 | B1 | 9/1986 |
| EP | 0541233 | A1 | 5/1993 |
| EP | 2527265 | A1 | 11/2012 |
| EP | 2049325 | B1 | 12/2012 |
| EP | 2608955 | B1 | 1/2017 |
| WO | 00/32482 | A1 | 6/2000 |
| WO | 2010/028485 | A1 | 3/2010 |

OTHER PUBLICATIONS

Written Opinion of the International Searching Authority issued by the Canadian Intellectual Property Office on Feb. 8, 2019 in connection with International Patent Application No. PCT/CA2018/051525, 7 pages.

Kit L. Yam, The Wiley Encyclopedia of Packaging Technology, 3rd Edition, United States: John Wiley & Sons, Inc., Sep. 1, 2009, pp. 181-189, online: https://onlinelibrary.wiley.com/doi/pdf/10.1002/9780470541395.ch3.

Non-Final Office Action dated Mar. 16, 2022, mailed in the related U.S. Appl. No. 16/853,471.

Final Office Action dated Sep. 17, 2020, mailed in connection with U.S. Appl. No. 15/612,858.

Final Office Action dated Jul. 25, 2022, issued in connection with U.S. Appl. No. 15/829,901.

International Preliminary Report on Patentability issued on Jun. 2, 2020, in the corresponding International Patent Application No. PCT/CA2018/051525, 8 pages.

Non-Final Office Action dated Mar. 23, 2021, issued in connection with U.S. Appl. No. 15/612,858.

International Search Report dated Jan. 5, 2010, issued in the related PCT International Patent Application No. PCT/CA2009/001249, 3 pages.

* cited by examiner

METHOD AND APPARATUS FOR FORMING CONTAINERS

CROSS-REFERENCE TO RELATED APPLICATION

This application is a continuation of U.S. patent application Ser. No. 16/853,471 filed on Apr. 20, 2020, (and published as US patent application publication no. US 2021/0323259 A1 on Oct. 21, 2021) the entire contents of which are hereby incorporated herein by reference.

FIELD

The present invention relates generally to methods and systems for forming containers, including cans, including composite cans.

BACKGROUND

Containers are used to package many different kinds of items. One form of container used in the packaging industry is a carton. Cartons come in many different configurations and are made from a wide variety of materials. A related type of container used in the packaging industry is referred to as a case and is typically used for shipping items/products or cartons containing items/products. In the present document, the term "case" is used to refer to cartons, boxes, cases and other similar types of containers.

Cases come in many different configurations and are made from a wide variety of materials. Many cases are foldable and are formed from a flattened piece of material of a specific configuration (commonly called a case blank). Cases may be made from an assortment of foldable materials, including cardboard, paperboard, plastic materials, composite materials, and the like and possibly even combinations thereof.

Other types of cases that may be employed to hold items are composite cans and paper material-based cans, such as cans formed from a single layer or multi-layer of cardboard/paperboard. Such cans may be used to hold food products or other sensitive products and may provide an inner holding cavity that is relatively impermeable to gases and/or liquids when being used to store such products.

Composite cans may be rigid or semi-rigid cans and may be formed using in a continuous form-and-seal type process combining multiple reels of materials which may be formed into a multi-layer composite web. The web of interconnected layers of materials may be shaped around a mandrel and the overlapping longitudinal edges sealed with an adhesive to form a tubular side wall. An insider liner material may be heat sealed at the inside of the side wall to provide a relatively high level moisture/liquid barrier. The inside liner materials may for example be made from an aluminium foil, a suitable plastic film, or both. The bottom component of a composite can may be made from a wide variety of materials such as a metal, a composite material or a suitable hard plastic material. A top lid may also be provided and may be made from a suitable material such as a strong injection molded plastic. Seals, such as heat seals, may be provided between the bottom and the side wall, and the top lid and the side wall.

Composite cans may be formed with sidewalls of a variety of materials and in a variety of shapes such as for example, generally round, square, rectangular or oval. It is known to form such sidewalls for composite cans by form-and-seal processes that may utilize a plurality of reels of feed materials which are combined together. The bottom end of a composite can is generally formed of a metal material but could be another material or combination of materials, including the same materials from which the sidewall is formed. Known techniques can be used to seal such a bottom to the sidewall. The top may be another material such as a heavy injection-molded plastic that may be heat sealed to the upper edge of the sidewall.

Similarly, paper based cans, such as cardboard/paperboard cans, may also be used to hold items such as for example food and other sensitive items. Paper based cans may be rigid/semi-rigid containers that may also be formed from three separate parts/components. The first part may be a side wall that may be formed from a "flat blank". The base substrate material for the side wall may be a suitably strong, paper based material such as paperboard/cardboard. A paperboard/cardboard substrate may have interconnected to it one or more additional layers of other materials.

An example of a paperboard can is the CEKACAN™ system which may provide an inner cavity with a relatively high level of impermeability to gases (eg. air) and liquids. In addition to a paperboard substrate, the CEKACAN system may use a polyolefin laminate inner layer (such as polyethylene), and an intermediate conducting metal layer (eg. an aluminium foil layer) interconnected to and positioned between the inner layer and the paperboard substrate. Methods of application of the polyolefin layer to the aluminium foil layer include: extrusion, co-extrusion, extrusion-lamination, or adhesion-lamination. In some embodiments the three separate layers may be laminated together.

Each multi-layer sidewall blank for a CEKACAN may be foldable and/or bendable from a flat configuration into a tubular side wall configuration that may be sealed at or proximate longitudinal edges. The portions of the polyolefin laminate inner layer at the longitudinal edges may be utilized to assist in creating the longitudinal seal.

To form a CEKACAN paperboard can, the blank may be wrapped around a mandrel and butt-sealed (i.e. not overlapped) through the application of a foil-laminated tape, which may be induction sealed to the two abutting longitudinal edges of the blank. Typically, high frequency electrical current can be induced within the a metal foil tape which then heats up and melts the polyolefin layer on the sidewall causing it to be able to bond to the aluminium foil tape and causes the polyolefin layer at the abutting edges melt to create a longitudinal seal. As such there are no discontinuous joints. However, there have been difficulties in effectively and efficiently forming the tubular shape of the side wall around a mandrel and in creating a suitable longitudinal seal on the side wall. Also the machinery used to form a CEKACAN is complex and expensive.

A paperboard may also include a separate base component and a separate lid/top component. The lid/top component may include more than one sub-components.

The material used for sealing the side wall to the base may also be used to seal the base component and top/lid component to the side wall. Similarly, high frequency electrical current can be induced to flow within the aluminium foil of the side wall which then heats up and melts the polyolefin inner layer causing it to be able to bond to another material or the same material. In this way, surface of the base and/or lid components which are brought into contact with the inner polyolefin layer may become bonded to the base/lid component and provide a seal. However, there are challenges in efficiently and effectively forming gas and/or liquid seals between the inner side wall and the base and lid components.

It is therefore also desirable to provide improved composite and paperboard cans, and methods and apparatuses for forming the same.

SUMMARY

In accordance with one aspect of the present invention, there is provided a method for forming a cylindrical container from a re-configurable blank that is supported in a first generally flat configuration with a first wall surface and an opposite second wall surface; wherein said method comprises: positioning a blank support device proximate said first wall surface of said blank while said blank is in said first configuration, said blank support device having a generally cylindrical outward facing surface; engaging said first wall surface of said blank and rotating a first portion of said blank, around a first portion of the outward facing surface of said blank support device, such that said first portion of said blank wraps around a first quarter surface area of the generally cylindrical outward facing surface of the blank support device; engaging the first wall surface and rotating a second portion of said blank around a second portion of the outward facing surface of said blank support such that said section portion of said blank wraps around a second quarter surface area of the generally cylindrical outward facing surface of said blank support device, said first and second quarter surface areas of the generally cylindrical outward facing surface of said blank support device being adjacent to each other; rotating a part of said first portion of the blank around a third quarter surface area of the generally cylindrical outward facing surface of said blank support device, said second and third quarter surface areas of the generally cylindrical outward facing surface of said blank support device being adjacent to each other; rotating a part of said second portion of the blank around a fourth quarter surface area of the generally cylindrical outward facing surface of said blank support device, said third and fourth quarter surface areas of the generally cylindrical outward facing surface of said blank support device being adjacent to each other; to thereby form a blank that has a generally cylindrical tubular side wall configuration for said container around the generally cylindrical outward facing surface of said blank support device; wherein said first wall surface of said blank forms an inner surface of said blank when said blank is in said generally cylindrical tubular side wall configuration around said blank support device.

According to another aspect there is provided a method for forming a cylindrical container from a re-configurable blank comprising: forming a cylindrical tubular side wall around a mandrel with a single vertical sealed joint; Installing a cup into an end opening of said cylindrical tubular side wall with a seaming apparatus to form a circumferential seamed sealed joint.

According to another aspect there is provided a method for forming a container from a re-configurable blank comprising: (a) forming a tubular side wall by wrapping first and second portions of a blank around a mandrel; (b) after (a), forming a vertical sealed joint between two free edges of said first and second portions of said blank by providing a sealing strip that is interconnected to both said first and second portions; and wherein said sealing strip has a generally T-shape in cross section and comprises a first top portion that bonds to inner surfaces of first and second portions of said blank and across a joint between the first and second portions of the blank, and said sealing strip comprises a base portion that is received between and bonds the opposing edge faces of said first and second portions of said blank.

According to another aspect there is provided a method for forming a container from a re-configurable blank comprising: (a) positioning part of an outward facing surface of a blank support device proximate a first surface of said blank while said blank is in a first orientation; (b) rotating a first portion of said blank with a rotating sub-system in a clockwise direction around a first semi-cylindrical portion of an outward facing surface of said blank support device; (c) rotating a second portion of said blank with said rotating sub-system in a counterclockwise direction around a second semi-cylindrical portion of said outward facing surface of said blank support device; wherein a generally cylindrical tubular side wall configuration is formed around said outward surface of said blank support device.

According to another aspect there is provided a system for forming a container from a re-configurable blank, said system comprising: a blank support device having a generally cylindrical outward facing surface, said blank support device being positioned such that in operation said blank support device is located proximate said blank while said blank is in a first generally flat configuration; a rotating sub-system operable to: engage a first wall surface of said blank and rotate a first portion of said blank around a first portion of a first facing surface of said blank support device, such that said first portion of said blank wraps around a first quarter surface area of the generally cylindrical outward facing surface of the blank support device; engage the first wall surface and rotate a second portion of said blank around a second portion of the first outward facing surface of said blank support such that said section portion of said blank wraps around a second quarter surface area of the generally cylindrical outward facing surface of said blank support device, said first and second quarter surface areas of the generally cylindrical outward facing surface of said blank support device being adjacent to each other; rotate a part of said first portion of the blank around a third quarter surface area of the generally cylindrical outward facing surface of said blank support device, said second and third quarter surface areas of the generally cylindrical outward facing surface of said blank support device being adjacent to each other; rotate a part of said second portion of the blank around a fourth quarter surface area of the generally cylindrical outward facing surface of said blank support device, said third and fourth quarter surface areas of the generally cylindrical outward facing surface of said blank support device being adjacent to each other; to thereby form a blank that has a generally cylindrical tubular side wall configuration around the generally cylindrical outward facing surface of said blank support device; wherein said first wall surface of said blank forms an inner surface of said blank when said blank is in said generally cylindrical tubular side wall configuration around said blank support device.

According to other aspects, there is provided a system for forming a container from a re-configurable blank, said system comprising: (a) a blank support device having a generally cylindrical outward facing surface, said blank support device being positioned such that during operation, said outward facing surface of said blank support device is located proximate said blank while said blank is in a first configuration; (b) a rotating sub-system operable to rotate said blank around the outward facing surface of said blank support device to form a generally cylindrical tubular side wall configuration around said outward surface of said blank support device; (c) a bottom forming subsystem and a blank support movement subsystem; wherein in operation, after said blank is formed into said generally cylindrical tubular side wall configuration by said rotating sub-system, said blank support movement subsystem is operable to move said blank on said case blank support device to a bottom forming station, where said bottom forming subsystem is located, and said bottom forming sub-system is operable for forming a bottom portion of said container by installing a circular bottom cup in a circular bottom opening of said tubular side wall configuration of said blank.

According to other aspects, there is provided a system for forming a cylindrical container from a re-configurable blank comprising: An apparatus operable for forming a cylindrical tubular side wall around a mandrel with a single vertical sealed joint; An apparatus operable for locating a bottom cup into a bottom opening of said cylindrical tubular side wall; and a seaming apparatus operable to form a circumferential seamed sealed joint between a circumferential edge region of said bottom cup and a circumferential lower edge region of said cylindrical tubular side wall.

According to other aspects, there is provided a system for forming a container from a re-configurable blank comprising: an apparatus operable for forming a tubular side wall around a mandrel with a single vertical sealed joint at opposed vertical free edges of said blank; an apparatus operable to place a vertically extending sealing strip that extends across and between said joint to form a seal, wherein said sealing strip has a generally T-shape in cross section and comprises a first top portion that bonds to inner surfaces of the opposed free edges of said blank and across said joint and said sealing strip comprises a base portion that is received between and bonds opposing edge faces of said free edges of said blank.

According to other aspects, there is provided as blank for a can comprising a generally cylindrical tubular side wall having a single vertical joint at opposed vertical free edges of said blank; wherein said opposed vertical free edges of said blank are interconnected by a vertically extending sealing strip that extends across said joint; and wherein said sealing strip has a generally T-shape in cross section and comprises a first top portion that bonds to inner surfaces of the opposed free edges of said blank and across said joint and said sealing strip comprises a base portion that is received between and bonds opposing edge faces of said free edges of said blank.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
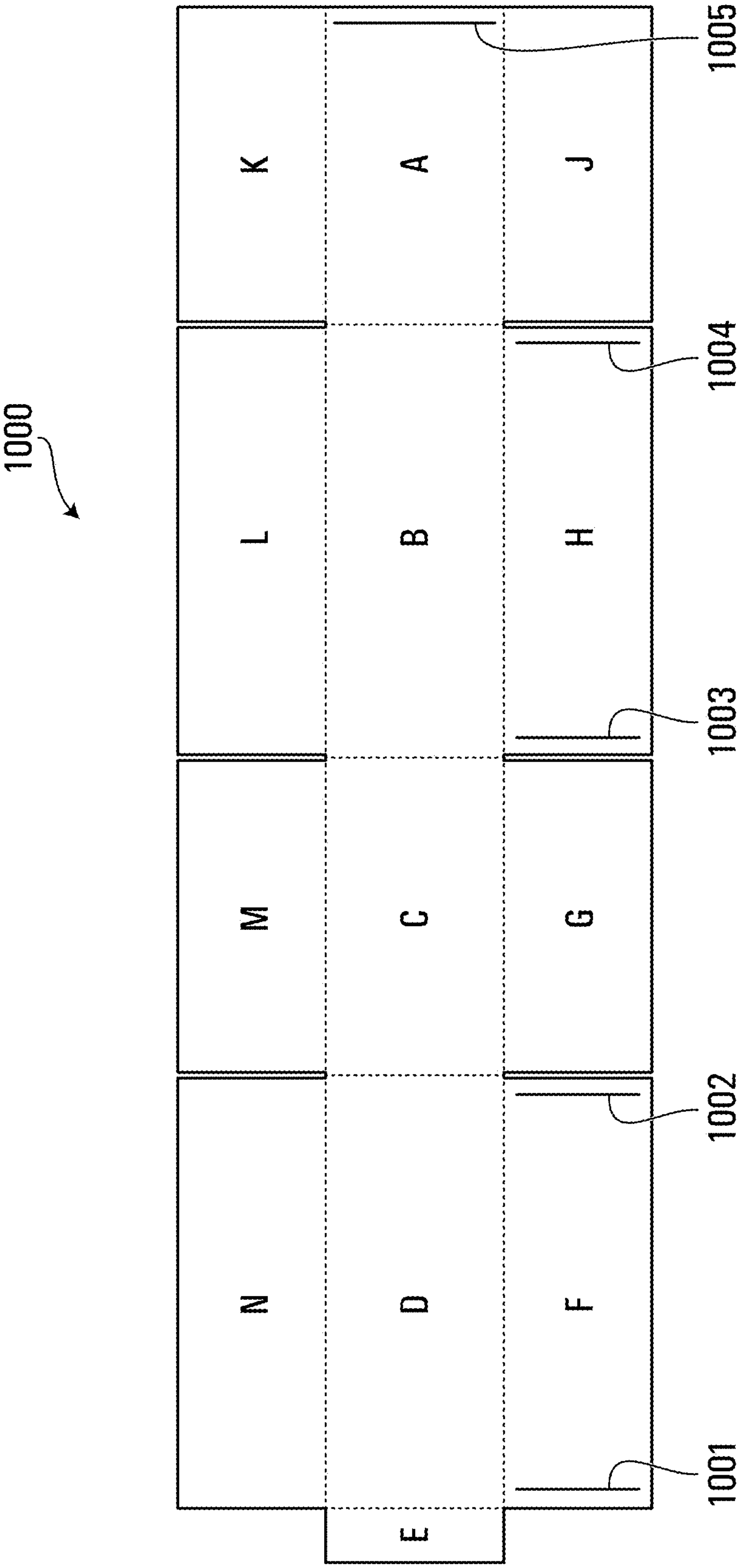
FIG. 1 is a top plan view of an example RSC blank.

With reference to FIG. 1, a flat case blank 1000, such as a case blank that is suitable to form an RSC case is shown. A case blank as contemplated herein may be made from a material and/or be formed in a way that is flexible so that it may be oriented and configured from a generally flat shape to a generally tubular shape positioned around the outer surface of a blank support device referred to herein as a blank support device, as will be described hereinafter. The case blank may thereafter be reconfigured to form a case with an opening to receive one or more items. For example, a case blank 1000 may have minor side wall panels A and C and major side wall panels B and D. Minor side wall panel A may be located adjacent to and joined at a vertical side edge along a fold line (all fold lines shown in broken lines in FIG. 1) to a vertical side edge of major side wall panel B. Major side wall panel B may be located adjacent to and joined at an opposite vertical side edge along a fold line to a vertical side edge of minor side wall panel C. Minor side wall panel C may be located adjacent to and joined at an opposite vertical side edge along a fold line to a side edge of major side wall panel D. A side sealing panel E may also be provided adjacent and joined along a fold line to an opposite vertical side edge to major side wall panel D.

Case blank 1000 may also have lower minor panels J and G and lower major panels H and F, joined at transverse side edges along fold lines, to respective minor side wall panels A and C and major side wall panels B and D. Case blank 1000 may also have upper minor panels K and M and upper major panels L and N, joined at opposite transverse side edges along fold lines, to respective minor side wall panels A and C and major side wall panels B and D. However, in other embodiments, case blanks having other panel configurations can be formed into cases ready to be loaded using the methods and apparatuses disclosed hereinafter.

As indicated, the panels may be fixedly connected to and/or integrally formed with, adjacent panels by/along predetermined fold lines. These fold lines may be formed by a weakened area of material and/or the formation of a crease with a crease forming apparatus. The effect of the fold line is such that when one panel such as for example panel C is bent relative to an adjacent panel D, the panels C and D will tend to be pivoted relative to each other along the common fold line.

As will be described hereinafter, the major and minor side wall panels A, B, C and D, and the lower major and minor panels F, G, H and J, may be folded and sealed to form a desired open top case configuration that can be delivered to a case discharge conveyor. The sealing of specific panels together can in various embodiments be made with any suitable connection mechanism (such as for example with application of an adhesive or in some alternate embodiments, a mechanical connection such as for example is provided in so-called "click-lock" case blanks) so as to interconnect panel surfaces, to join or otherwise interconnect, panels to adjacent panels, to hold the case in its desired configuration.

Case blanks 1000 may be made of any suitable material(s) configured and adapted to permit the required folding/bending/displacement of the material to reach the desired configuration yet also meet the particular structural requirements for holding one or more items. Examples of suitable materials are cardboard or creased corrugated fiber board. It should be noted that the blank may be formed of a material which itself is rigid or semi-rigid, and not per se easily foldable but which is divided into separate panels separated by creases or hinge type mechanisms so that the carton can be formed.

Figure 2A:
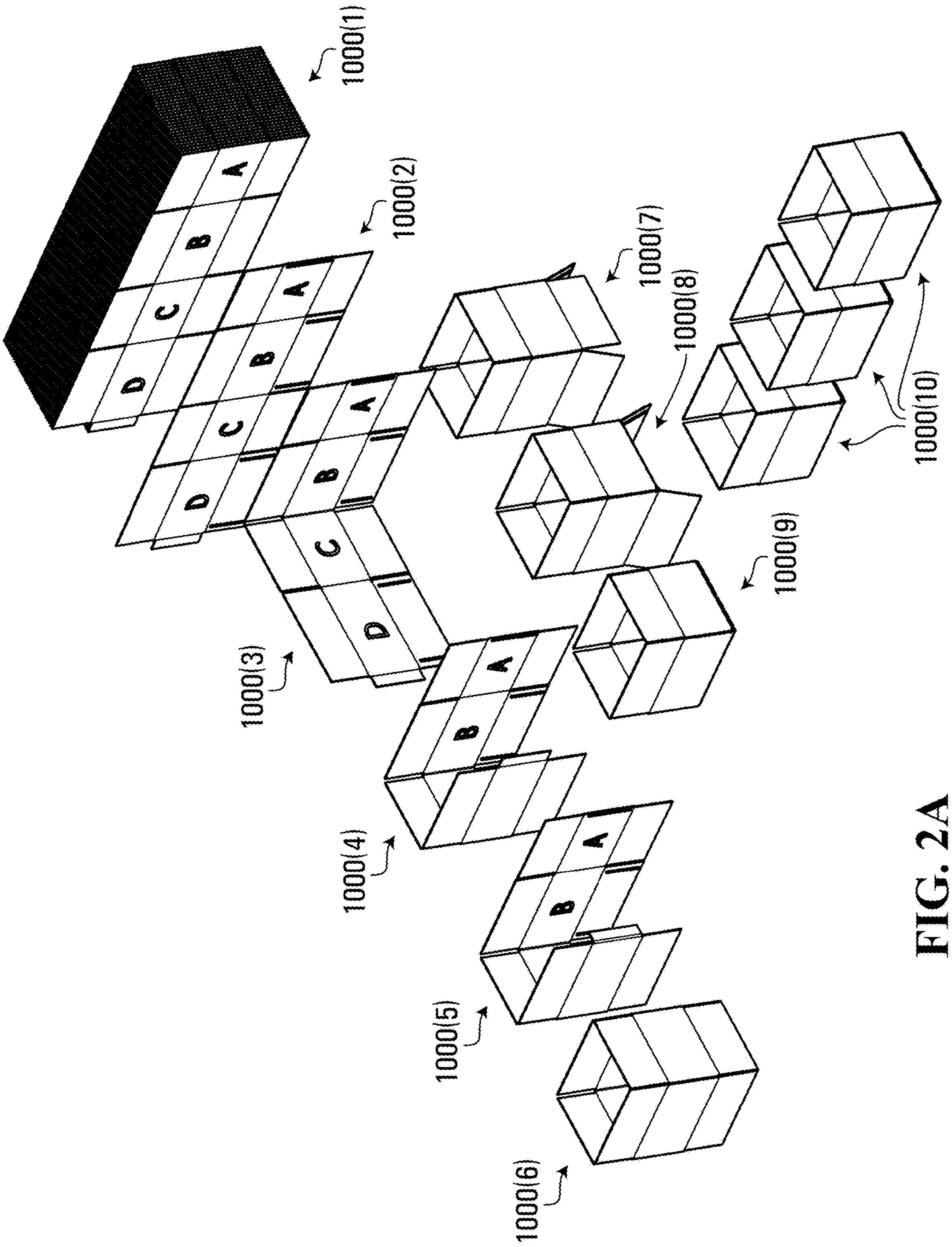
FIG. 2A is schematic view of an example method of forming a case from a case blank, such as the blank of FIG. 1.
Figure 2B:
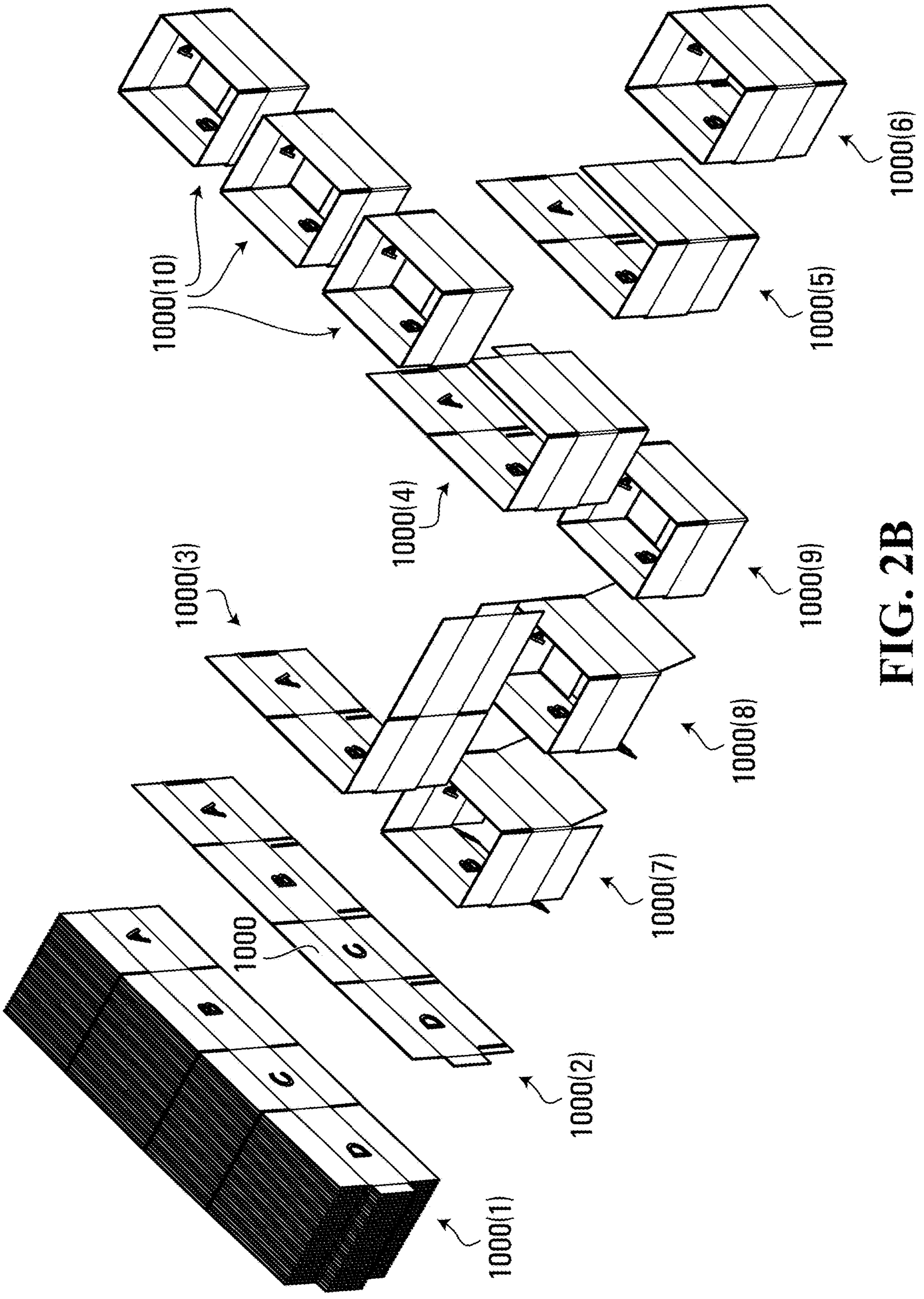
FIG. 2B is another schematic view of the method of FIG. 2A.

With reference now to FIGS. 2A and 2B, an example sequence of steps 1000(1) to 1000(10) are shown of folding and sealing a flat RSC blank 1000 to from an open top RSC case that is suitable for top loading of items/other cases.

A plurality of case blanks may be presented 1000(1) in a stacked arrangement with the blanks each configured in a generally flat and planar configuration. A particular individual case blank 1000 may be identified at/selected from the front of the stack of blanks for processing 1000(2). In a first folding step 1000(3) side wall panel C along with its respective adjacent upper and lower minor panels M and G along with major side wall panel D and its respective adjacent upper and lower major panels N and F, along with sealing panel E, can all be rotated together from the orientation shown at 1000(2), 90 degrees in a counter clockwise direction about the vertically oriented fold line between side wall panels B and C, to the configuration as shown at 1000(3). In the next folding step 1000(4), side wall panel D and its respective adjacent upper and lower major panels N and F, and sealing panel E, are all rotated together counter clockwise 90 degrees about the vertically oriented fold line between side wall panels D and C, to the configuration shown in FIGS. 2A and 2B at 1000(4).

In the next folding step 1000(5), sealing panel E is rotated counter clockwise 90 degrees about the vertically oriented fold line between sealing panel E and side wall panel D to the configuration shown at 1000(5). In the next folding step, minor side wall panel A and its respective adjacent upper and lower minor panels K and J, are all rotated together clockwise 90 degrees about the vertically oriented fold line between side wall panels A and B, to the configuration shown in FIGS. 2A and 2B at 1000(6), and wherein an upper surface of sealing panel E engages with part of the lower surface of side wall panel A. Adhesive or other connection mechanism may be provided, such as adhesive line 1005 (see FIG. 1), for example between opposing surfaces of sealing panel E and side wall panel A, such that sealing panel E may engage and become permanently connected to minor side wall panel A. The result at the end of this step, as depicted at 1000(6), case blank 1000 is formed into a generally rectangular shaped tube. While not shown in FIGS. 2A and 2B, folding steps from case blank orientations depicted at 1000(3) to 1000(6) may be carried out in such manner the panels are wrapped about a centrally positioned blank support device, as is described hereinafter.

The remaining steps to configurations shown from 1000 (7) to 1000(10) as illustrated in FIGS. 2A and 2B represent a sequence of steps that may be utilized to close and seal the lower major and minor panels, F, H and G, J respectively to close and seal the bottom of the case blank 1000 to form an RSC case with an open top.

In the next step, as depicted at 1000(7), the tubular shaped case blank 1000 may be moved vertically downwards to a second vertical location, at which the lower major panels F and H may be rotated outwards, about their respective horizontally oriented fold lines with respective major side panels D and B. The amount of rotation is sufficient to ensure that there will be no interference with the subsequent inward rotation of lower minor panels G and J and no contact is made with adhesive that may be on an inward surfaces of lower major panels F and H, such as respective adhesive lines 1001, 1002 and 1003, 1004 (FIG. 1). By way of example only, the amount of outward rotation of lower minor panels G and J from vertical planar alignment with their respective adjacent lower major side wall panels D and B may be about 45 degrees.

In the next step, as depicted at 1000(8), lower minor panels G and J are rotated inwardly, preferably about 90 degrees, about their respective horizontally oriented fold lines with respective major side wall panels C and A.

In the next step, as depicted at 1000(9), lower major panels F and H may be rotated inwards, about their respective horizontally oriented fold lines with respective major side panels D and B. The amount of rotation is sufficient to ensure that there will be contact between inner surfaces of lower major panels of lower major panels F and H and the outer surfaces of lower minor panels G and J.

Adhesive or other connection mechanism may be provided on the inner surfaces of lower major panels F and H so that these panels engage with, and become fixedly connected to the outward adjacent surfaces of lower minor panels G and J. For example, adhesive lines 1001, 1002, and 1003, 1004 (FIG. 1) may be on the inward surfaces of lower major panels F and H and may make contact with the outward surfaces of lower minor panels G and J and provide for a fixed connection.

The result at the end of step, as depicted at 1000(9), case blank 1000 is formed into a generally cuboid shaped, open top case.

In the final step, as depicted at 1000(10), case blank 1000 may be moved away to another location, and may be subsequently filled with one or more items/other cases and thereafter the upper major panels N and L, may be folded about 90 degrees along with upper minor panels M and K, to close and seal the completed case.

Figure 3:
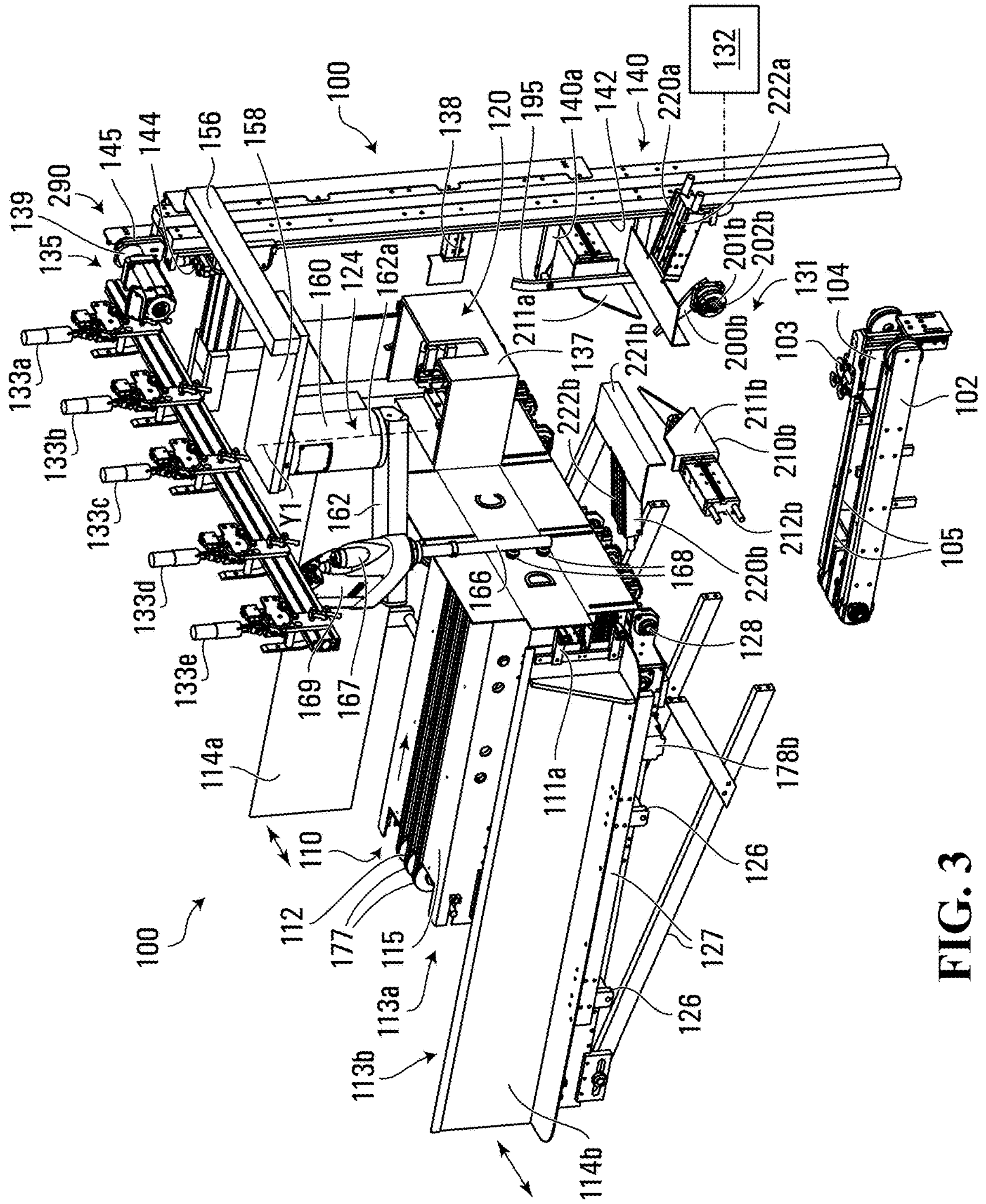
FIG. 3 is a is a top, left front perspective view of a case forming system in a first operational position.
Figure 4:
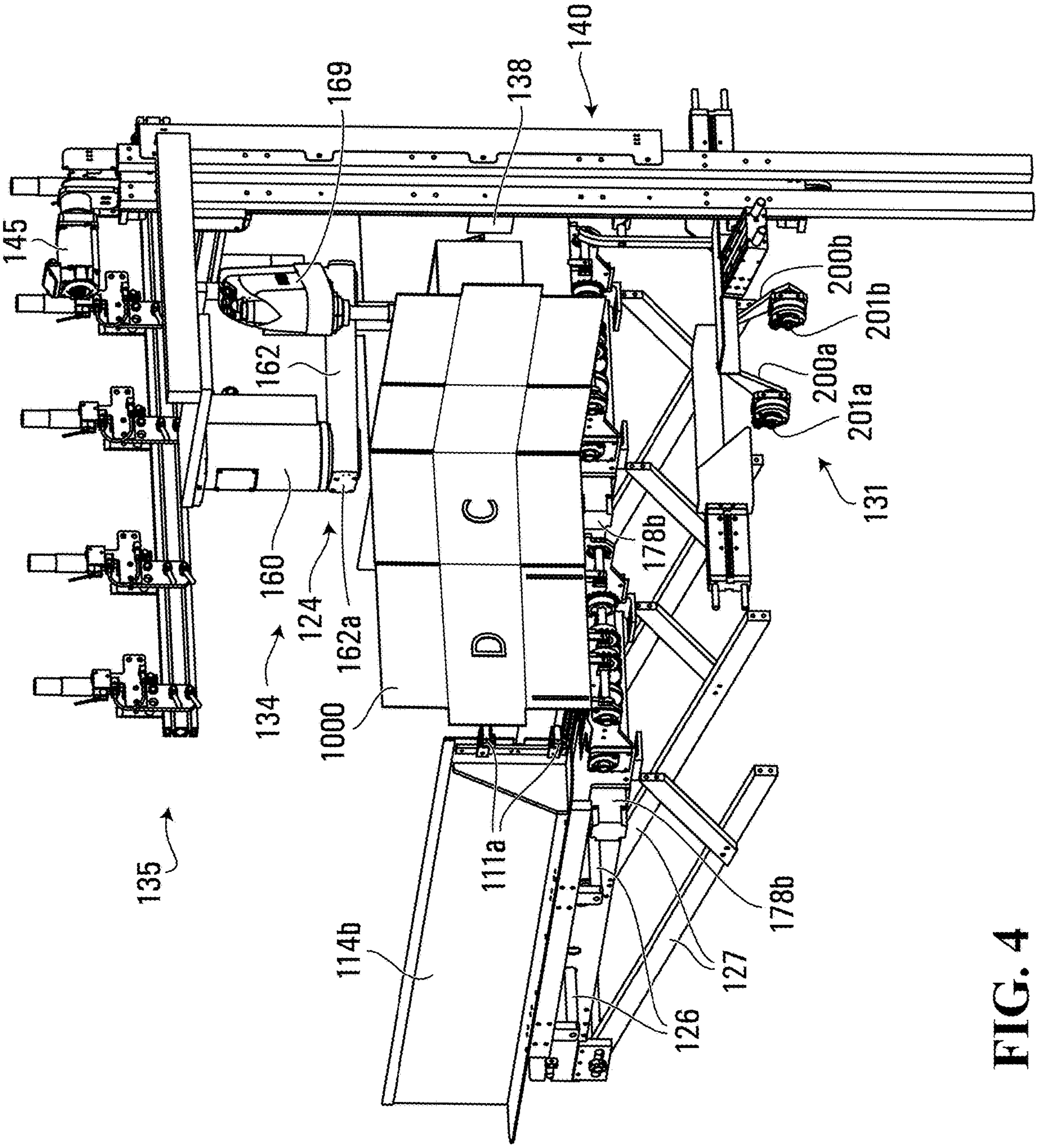
FIG. 4 is a lower, left front perspective view of the case forming system of FIG. 2, in a second operational position.
Figure 5:
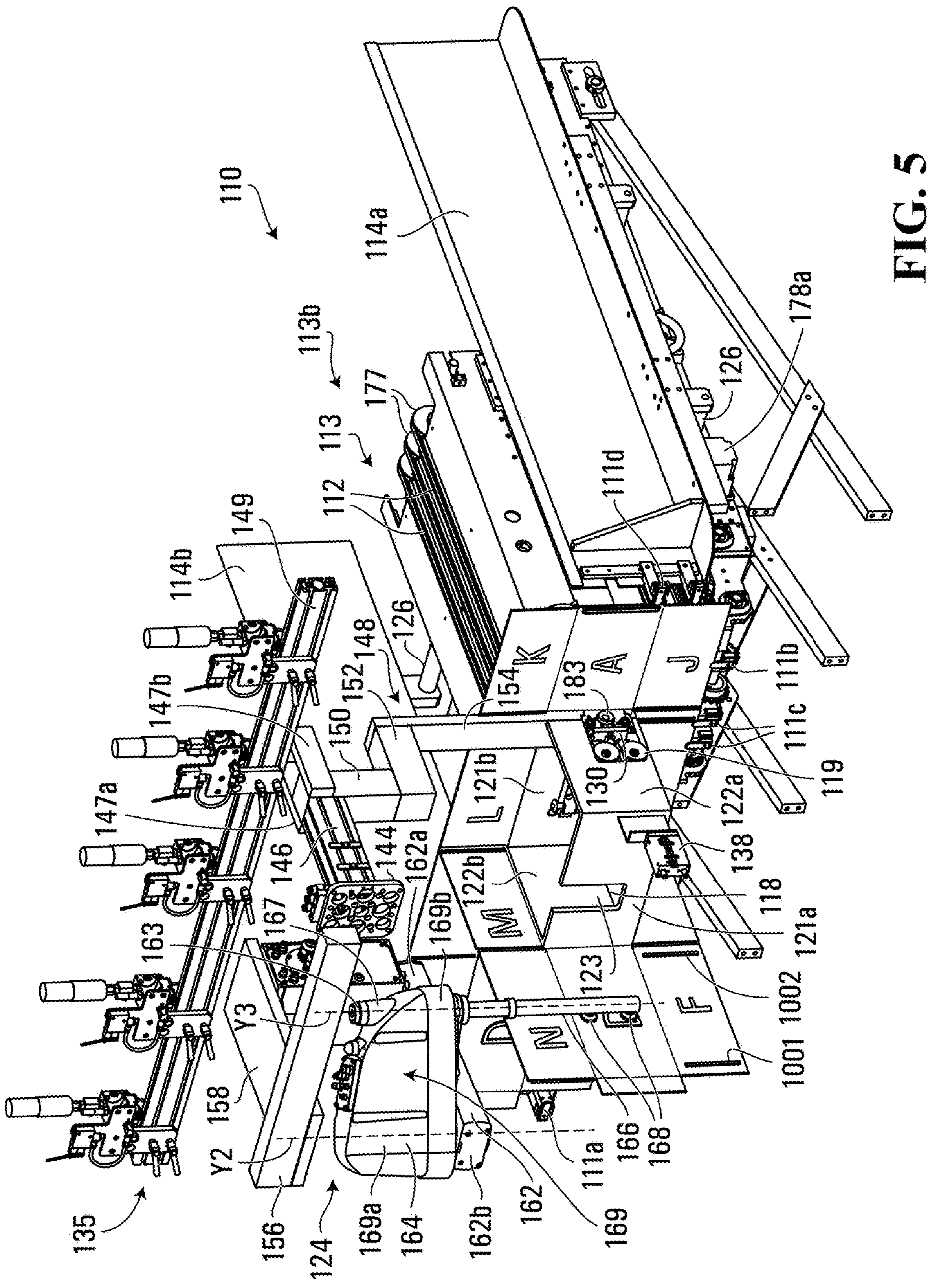
FIG. 5 is an upper, right front perspective view of the system of FIG. 2 in the second operational position of FIG. 4, but with some components omitted for simplicity.

With reference now to FIGS. 3-5, in overview, a case forming system 100 may include a magazine 110 adapted to hold a plurality of case blanks 1000 (only one or two case blanks 1000 are shown for clarity in FIGS. 3-5) in a substantially flat orientation such as is shown in FIGS. 2A and 2B. System 100 may also include a case blank support apparatus (also referred to herein as a mandrel apparatus) 120 and a panel rotating sub-system 134 (designated in FIG. 4). As will become evident from the description that follows, panel rotating sub-system 134 may be configured in some example embodiments of the system to engage a blank on an outward facing surface of the blank as the bank is held in the magazine 100 and rotate the blank 1000 around a case blank support device 137 of case blank support apparatus 120 in such a manner that the blank surface that is engaged becomes an inner surface of a tubular shaped and formed case blank.

Panel rotating sub-system 134 may utilize one or more panel rotating apparatuses in order to rotate one or more panels of a blank such as blank 1000 relative to each other. For example, panel rotating apparatus 134 may include a first panel rotating apparatus 124. Panel rotating sub-system may also include a second panel folding apparatus 130, and may also include a third panel rotating apparatus 131. Panel rotating sub-system 134 may also include a fourth panel rotating apparatus 138. Case forming system 100 may also include an adhesive applicator apparatus 135, a support frame 140 and a vertical mandrel movement apparatus 136 (designated generally in FIG. 8).

Figure 5A:
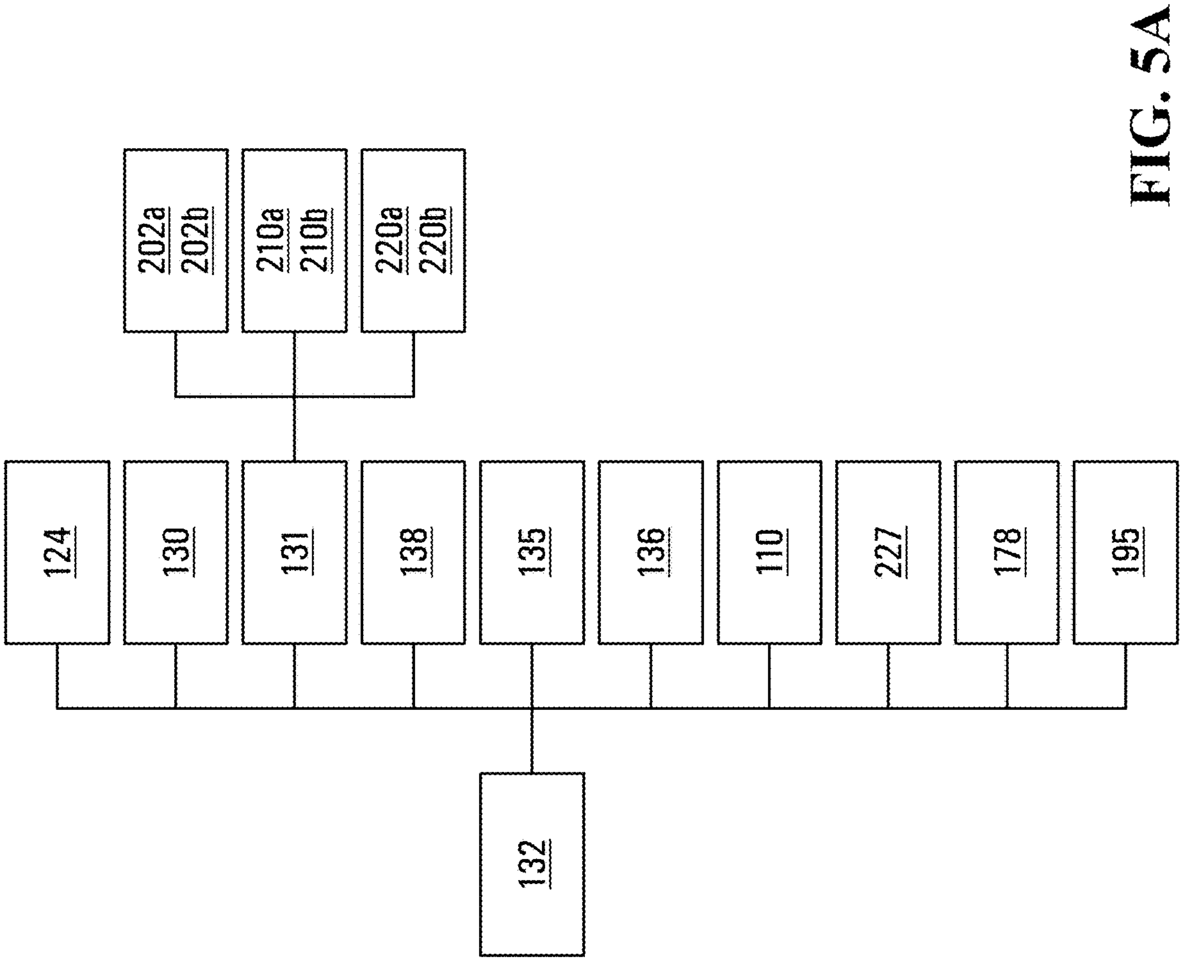
FIG. 5A is a schematic diagram of a control system for the system of FIG. 4.

The operation of the components of carton forming system 100 may be controlled by a controller such as a programmable logic controller ("PLC") 132 (such as for example as shown schematically in FIGS. 3 and 5A). PLC 132 may be in communication with and control all the components of system 100, in a manner such as is depicted schematically in FIG. 5A and may also control other components associated therewith such as conveyor 102. PLC 132 may for example be a model from the Compact Logix PLC family made by Allen-Bradley. Additionally PLC 132 may include a Human-Machine-Interface (HMI) such as the Allen Bradley Panelview 700 plus colour touch screen graphic workstation so that the operation of system 100 can be monitored, started, operated, controlled, stopped, modified for different mandrel/case blank configurations, by an operator using a touch screen panel.

A generally vertically oriented support frame 140 may support vertical blank support device apparatus (mandrel movement apparatus) 136 for vertical upward and downwards movement. It should be noted however, that while system 100 is generally oriented for vertical movement of the mandrel movement apparatus 136, other orientations can be utilized in other embodiments.

Mandrel movement apparatus 136 may include a generally vertically oriented linear rail 142 (FIG. 8) which may support for sliding upward and downward sliding vertical movement a carriage block 144 (FIG. 5). It should be noted that in FIGS. 5, 6 and 7, for simplicity, support frame 140 and linear rail 142 have been omitted. The movement of carriage block 144 on linear rail 142 may be driven by a drive belt (not shown) interconnected to carriage block 144 and supported by vertical support frame 140. The drive belt (not shown) may be interconnected to, and driven by, a servo drive motor 145, mounted at an upper end portion of vertical support frame 140. An encoder (not shown) may be associated with servo drive motor 145 and the encoder and servo drive motor 145 may be in communication with PLC 132. In this way, PLC 132 on receiving signals from the encoder may be able to monitor and control the vertical position of carriage block 144 (and the components interconnected thereto) by appropriately controlling and operating servo motor 145.

Figure 10:
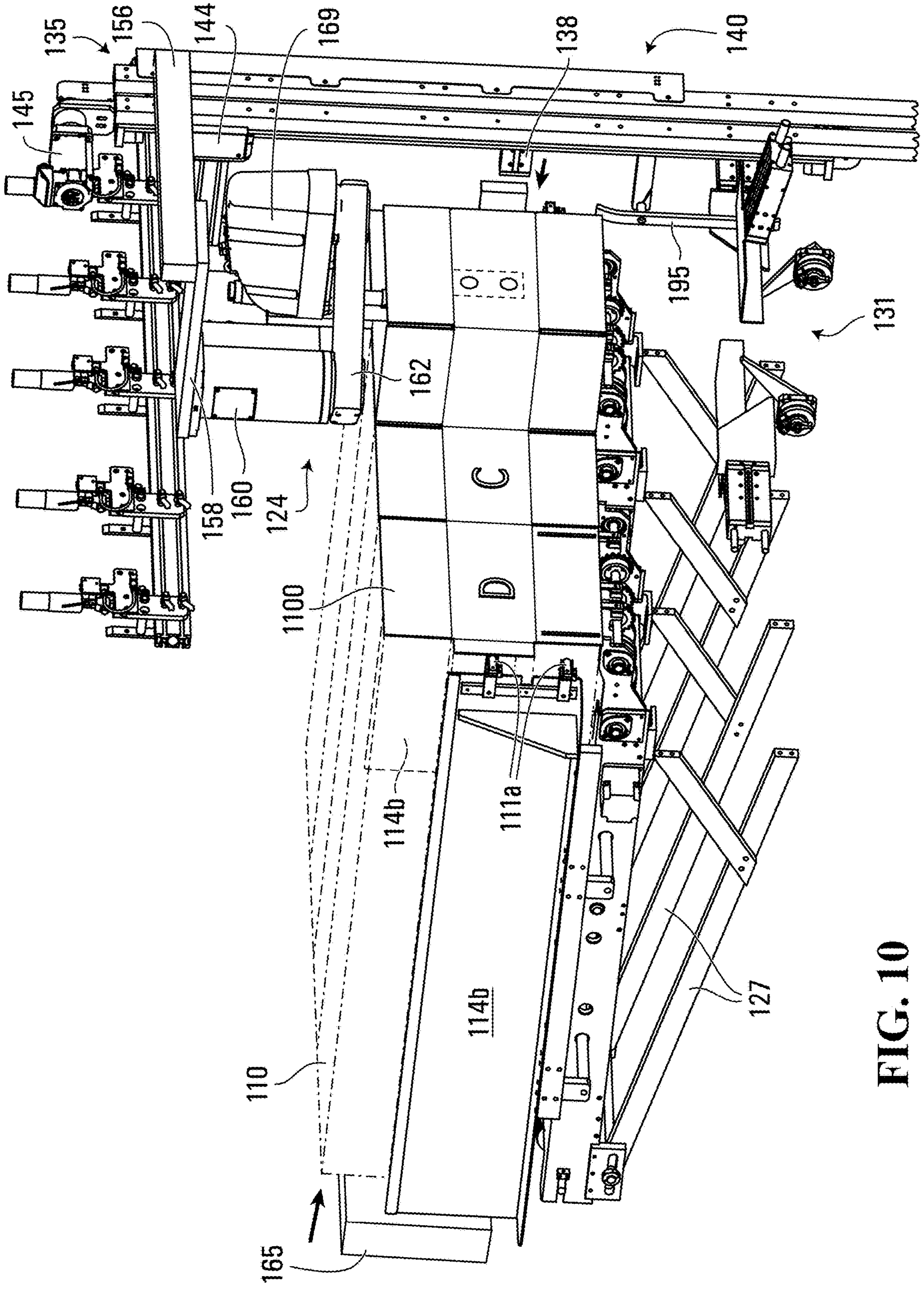
FIG. 10 is an upper, left front perspective view of the system of FIG. 2 in the fourth operational position.

Magazine 110 may be configured to hold a plurality of case blanks 1000 in a stacked, vertically and transversely oriented, flat configuration on their bottom edges (see FIG. 10). Many different types and./or constructions of a suitable magazine 110 might be employed in system 100. Magazine 100 may be configured to hold a plurality of case blanks 1000 that may be held in a longitudinally extending, stacked arrangement. Magazine 110 is adapted to present an outward facing surface of a plurality of case blanks 1000, individually in turn. Magazine 110 may comprise a large number of case blanks 1000 held in a generally vertically and transversely oriented, longitudinally extending, case blank stack by side walls 114*a*, 114*b* (FIG. 3). In this configuration where case blanks 1000 are individually and selectively retrieved in series from the front of a stack of generally flat blanks, the stack of case blanks 1000 in the magazine can be moved forward by longitudinally oriented conveyors 113*a*, 113*b* each having a first set of longitudinally oriented conveyor belts 112 driven by a motor which is also controlled by PLC 132. The purpose of moving the stack of blanks 1000 forward is so that the outward facing surface of major panel B, of the most forward case blank 1000 in the stack, is positioned and held close to or against an outer generally adjacent surface of the mandrel 137. This enables first panel rotating apparatus 124 (FIG. 3) and second panel rotating apparatus 130 (FIG. 5), to be able to engage the other exposed outward facing surfaces of panels of the forward most case blank 1000 in the stack held in magazine 110, as described further hereinafter. Additionally, a back pressure device 165 (only shown schematically in FIGS. 8 and 10) may be provided that can apply a back pressure against the case blank stack in a longitudinal direction toward the front of the magazine, of a magnitude and direction sufficient to keep the stack upright and prevent it from falling longitudinally backwards as the case blank stack on conveyors 113*a*, 113*b* is indexed longitudinally forward to maintain the next case blank 1100 at the front of the stack securely in a pick-up position.

Selected panels of the forward most blank may be pulled away from holding clips associated with magazine 110 by first panel rotating apparatus 124 and second panel rotating apparatus 130 from retention by magazine 110 then rotated (wrapped) around mandrel 137 of mandrel apparatus 120. As case blanks 1000 are taken from magazine 110 and formed, PLC 132 may cause the conveyor 112 of magazine 110 to move the entire stack forward sequentially so that the most forward case blank 1000 has its the outward facing surface of major panel B positioned against or very close to adjacent outer rear vertically and transversely oriented surface of mandrel 137. A sensor (not shown) in communication with PLC 132 may be provided to monitor the level of case blanks 1000 in magazine 110 during operation of case forming system 110. Magazine 110 can be loaded with additional flat case blanks 1000 at the rear of the magazine.

Magazine 110 may have a magazine frame generally designated 127. Magazine 110 may include a conveyor system to move flat case blanks sequentially to a pick-up position. A wide variety of conveyor systems or other case blank movement systems may be employed. By way of example, conveyor system may include a pair of spaced conveyors 113*a*, 113*b* mounted to frame 127, each conveyor 113*a*, 113*b* having a generally horizontal floor plate 115. Conveyors 113*a*, 113*b*, may be longitudinally spaced from each other, and be oriented generally longitudinally, and generally parallel to each other. Each conveyor 113*a*, 113*b*, may be operated to move longitudinally together to move case blanks 1100 in a stack of blanks forward in the magazine, while being maintained in a generally transverse and vertical orientation.

Figure 8:
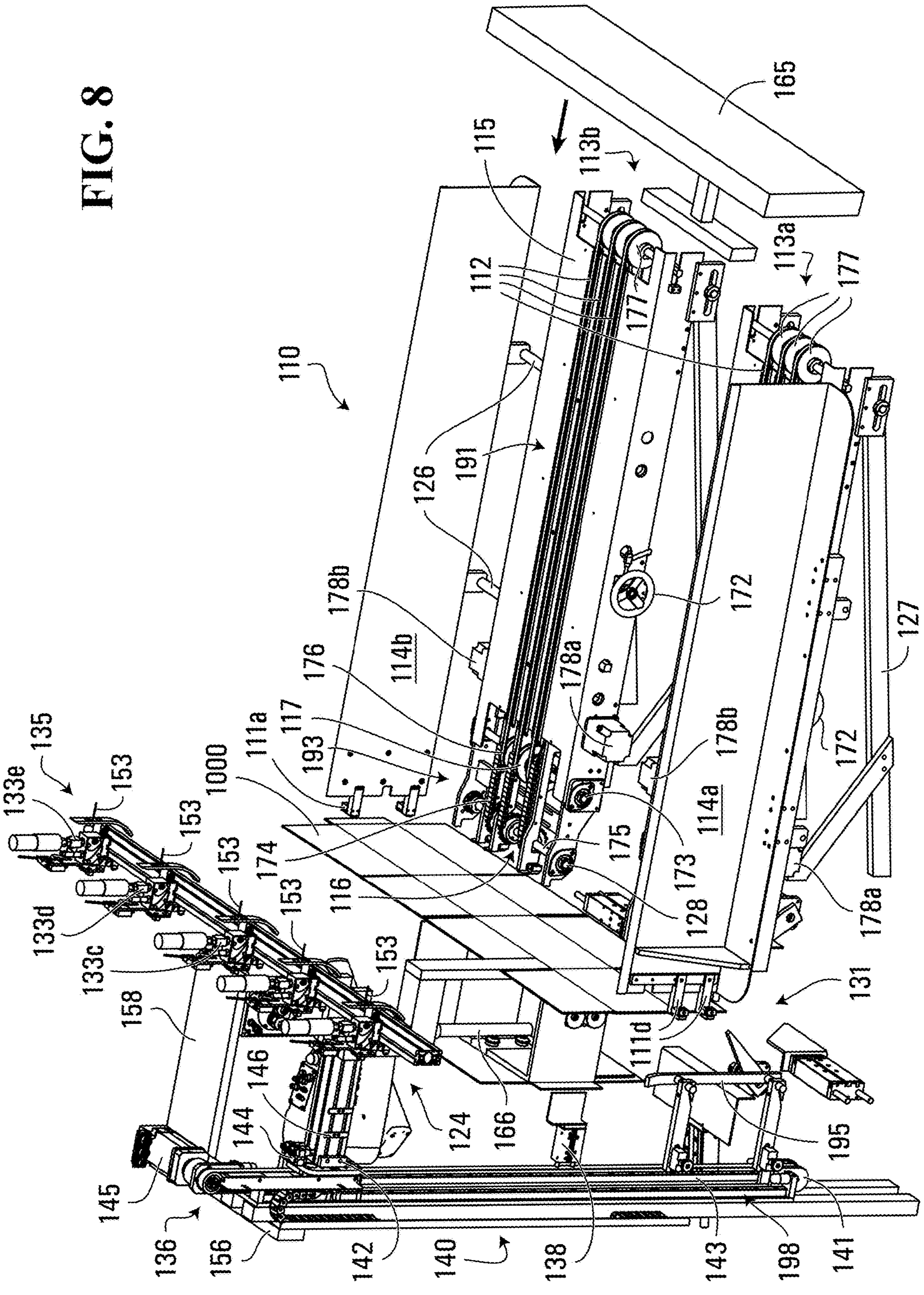
FIG. 8 is an upper, right rear perspective view of the system of FIG. 2 in the third operational position.
Figure 19:
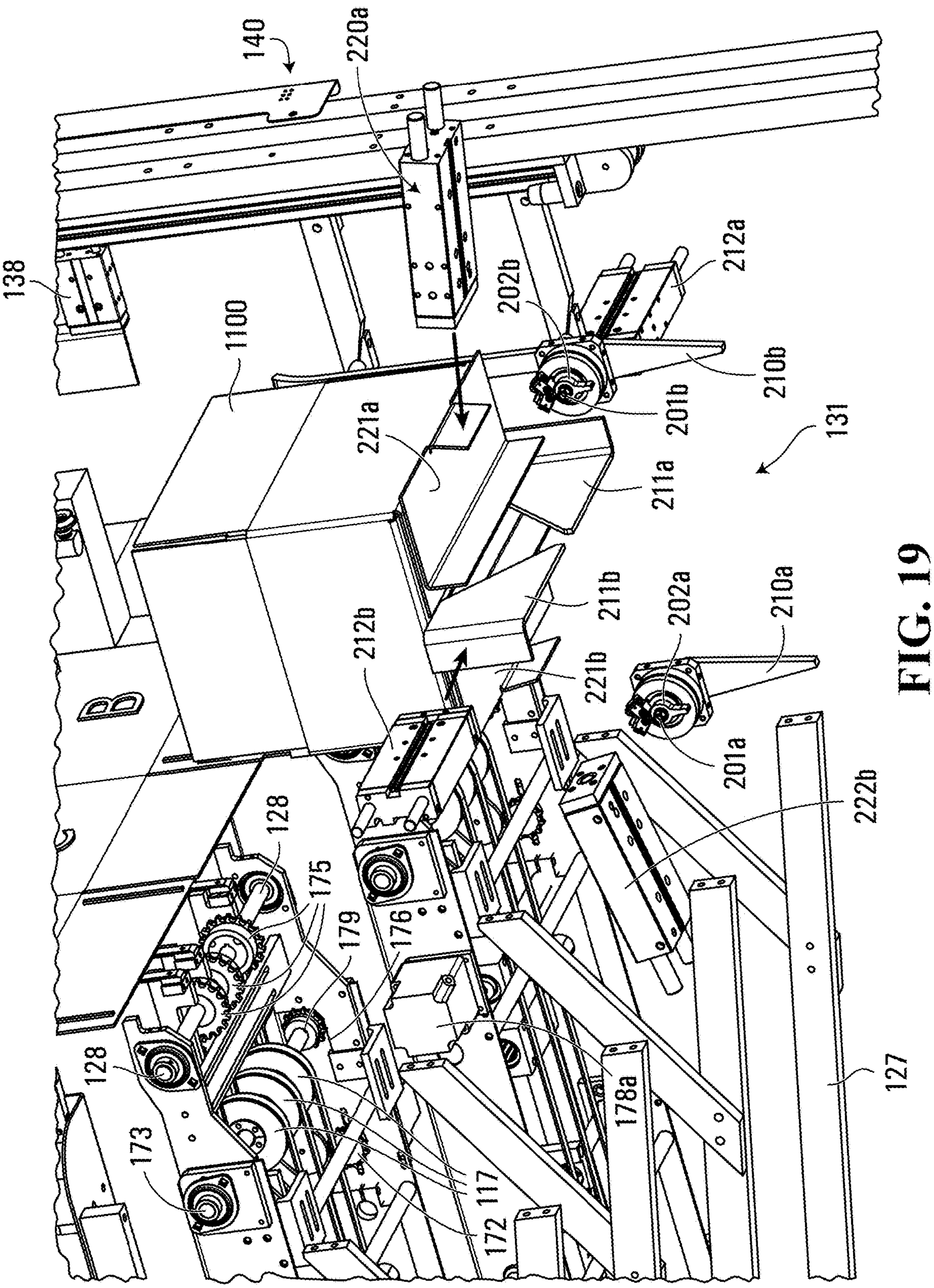
FIG. 19 is an enlarged view of portion of the system as shown in FIG. 18, in the eighth operational position.

Each conveyor 113*a*, 113*b*, may in some embodiments be divided into a rear conveyor portion 191 (FIG. 8) and a forward conveyor portion 193 (FIG. 8). Rear conveyor portion 191 may have a plurality of continuous conveyor belts 112. Continuous belts 112 may be oriented longitudinally parallel to each other and be supported for longitudinal movement at opposite ends by opposed sets of drive pulleys 117 and idler wheels 177. Belts 112 of the rear portions of each conveyor 113*a*, 113*b* may be driven by drive pulleys 117 (FIGS. 8 and 19). Drive pulleys 117 may be interconnected to a drive motor 178*b* (that may be a DC motor operated by PLC 132) through a drive mechanism comprising drive gears 172 (FIG. 19) and drive chains 176 (only partially shown in FIG. 19) connected to driven wheels 179 that are fixed to drive shaft 173. Thus drive shaft 173 may be driven by drive motor 178*b* that is in communication with, and controlled by PLC 132. An encoder may be provided to monitor and control the position of the drive belts 112.

Each forward conveyor portion 193 (FIG. 8) of conveyors 113*a*, 113*b* may utilize conveyor chains 174 which may also move/intermittently index blanks to the pick-up position of the magazine as described herein. A similar drive mechanism as the rear conveyor portions 191 may be provided for forward conveyor portion 193 on each conveyor. For example a motor 178*a* such as a DC motor in communication with PLC 132 may be inter connected to driven wheels 175 (FIG. 19) which may be fixedly attached to drive shaft 128. Driven wheels 175 may be inter-connected with driven conveyor chains 174 (FIG. 8) which are supported also at opposite end by wheels. Thus by controlled operation of motor 178*a*, conveyor chains 174 may move blanks supported thereon and transferred from rear conveyor portion 191, to the pick-up position on front conveyor portion 193.

Blanks 1000 in the stack supported on belts 112 in conveyors 113*a*, 113*b*, may be moved forward by belts 112 and then be transferred to conveyor chains 174. Conveyor chains 174 may move together longitudinally to move a forward group of blanks into the pick-up position. A back pressure device 165 (shown only schematically in FIG. 8) may be provided to keep a low level of pressure acting in a forward direction on the rear of the stack of case blanks (see FIG. 10). This can prevent some or all of the blanks in the stack from falling backwards as they are indexed forward.

Electronic sensors (not shown) in communication with PLC 132 may be positioned to monitor the stack of blanks and ensure that a blank 1000 at the front of the stack of blanks is properly positioned at the pick-up position.

Conveyor belts 112 and conveyor chains 174 of both conveyors 113*a*, 113*b* may be oriented longitudinally and parallel to each other and the belts of each conveyor 113*a*, 113*b* may be synchronized to move intermittently together at the same speed driven by drive motors 178*a*, 178*b*. The top run portions of conveyor belts 112 of conveyors 113*a*, 113*b* may be supported on the upper surface of floor plates 115 of magazine 110 and the bottom edges of the case blanks 1000 in the stack of case blanks may rest on top of the upper runs of the drive belts 112. Similarly conveyor chains 174 may be oriented longitudinally and parallel to each other and may be synchronized to move intermittently together at the same speed driven by drive motor 178*a*. The top run portions of conveyor belts 112 of conveyors 113*a*, 113*b* may be supported on the upper surface of floor plates 115 of magazine 110 and the bottom edges of the case blanks 1000 in the stack of case blanks may rest on top of the upper runs of the drive belts 112.

Conveyors 113*a*, 113*b* may thus be operable to move a vertically and transversely oriented stack of flat case blanks 1000 sequentially longitudinally forward under the control of PLC 132, so that single case blanks 1000 may be sequentially placed in the pick-up position to be retrieved in series from the stack for processing by first panel rotating apparatus 124.

The stack of case blanks 1000 may be supported at vertically oriented side edges by longitudinally and vertically oriented side wall plates 114*a*, 114*b* that may be spaced apart from each other and oriented generally parallel to each other. One or both of side wall plates 114*a*, 114*b* may be mounted on transversely oriented and movable rods 126 that are supported on magazine frame 127. Actuation of rods 126 may be made by any suitable mechanism such as by way of example only, servo drive motors with appropriate drive shafts and gear mechanisms or a hand operated gear and crank shaft mechanism. Side wall plates 114*a*, 114*b* serve to guide the case blanks within magazine 110 and can be accurately adjusted to be in close proximity to or contact with the particular case blank size that is being handled at a particular time. This adjustability of the relative transverse spacing of side walls 114*a*, 114 allows for case blanks of different configurations to be easily held in magazine 110 for processing as described herein.

Clip mechanisms 111*a-d* (FIGS. 4 and 5) may be provided to releasably hold each case blank 1000 that is at the front of the stack within magazine 110, and thus hold the stack in place. When first panel rotating mechanism 124 and second panel rotating mechanism 130 selectively engage panels D/F and A respectively, as described hereinafter, clip mechanisms 111*a* (FIG. 4), and 111*b* (FIG. 5) and 111*d* allow for the engaged panels E/D/F/N and A/K/J of the front case blanks 1000 in the stack to be pulled away from the same corresponding panels on the case blank immediately behind the front case blank in the stack held in the magazine. Also, clip mechanisms 111*c* (FIG. 5) will hold panels H, B and L, in magazine 110 while the other panels are being wrapped around the mandrel 137, but will then allow for the release of panels H, B and L to allow the remaining portion of case blank 1000 to be removed from being held by magazine and moved vertically downward once the case blank 1000 at the front of the stack is engaged by second panel rotating apparatus 130 and mandrel 137 moves vertically downwards, all as described further hereinafter.

First panel rotating apparatus 124 may be one of numerous types of robotic systems, but a particularly useful and efficient type of robotic system that may be employed is a Selective Compliance Assembly Robot Arm (referred to as a "SCARA") device. By way of example, first panel rotating apparatus 124 may be a SCARA robot made by Epson Robots, Motoman or Fanuc. First panel rotating apparatus 124 may be capable of intermittent motion, as will be evident from this description.

With particular reference to FIGS. 3-6, first panel rotating apparatus 124 may be secured to a fixed, longitudinally oriented robot support member 158 proximate a first end thereof. An opposite end of longitudinal robot support member 158 may be secured to an end portion of a fixed, transversely oriented robot support member 156. The opposite end portion of transverse robot support member 156 may be fixedly mounted to vertical support frame 140.

First panel rotating apparatus 124 may include a first rotational drive unit 160 having one upper end fixedly mounted to longitudinal robot support member 158. Extending from an opposite lower end of first rotation drive unit 160 is a first rotational drive that may comprise a drive shaft (not shown) that is operable for rotation clockwise and anti-clockwise about a first vertical axis of rotation Y1 (FIG. 3). The drive shaft of first rotation drive unit 160 is operably connected to a first end portion 162*a* (FIG. 4) of a first articulating arm 162. Thus, when rotational drive unit 160, under the control of PLC 132, causes the drive shaft of first rotation drive unit 160 to rotate, first articulating arm 162 is able to pivot clockwise or anti-clockwise relative to the drive shaft about vertical axis Y1, depending upon the direction of rotation of the drive shaft.

A second rotational drive unit 169 may be mounted at or proximate a second opposite end portion 162*b* (FIG. 5) of articulating arm 162. Rotational drive unit 169 may include a second rotational drive 164 (FIG. 5) that has a drive shaft (not shown) that is operable for rotation clockwise and anti-clockwise about a second vertical axis of rotation Y2 (FIG. 5) under the control of PLC 132. The drive shaft of rotational drive 164 may be located proximate a first end portion 169*a* of rotational drive unit 169. The drive shaft of rotational drive 164 is fixedly connected to opposite end portion 162*b* of first articulating arm 162.

When rotational drive unit 169, under the control of PLC 132, causes the drive shaft of rotational drive 164 to rotate relative to rotational drive unit 169 about axis Y2 (FIG. 5), and thus rotational drive 164 along with rotational drive unit 169 can rotate clockwise and anti-clockwise relative to first articulating arm 162 about the drive shaft of rotational drive 164 and thus about vertical axis Y2.

Rotational drive unit 169 may also have an opposite end portion 169*b* at which may be another vertical drive shaft 163 (FIG. 5) which is operable for clockwise and counter-clockwise rotation by a third rotational drive 167, under the control of PLC 132, about vertical axis Y3. Mounted to drive shaft 163 of second rotational drive 164 is an end effector rod 166 formed in a generally tubular cylinder and having suction cups 168.

Air suction cups 168 may be interconnected through hoses passing through cavities in end effector 166, second rotational drive 164, articulating arm 162, first rotational drive 160 and robot support members 158, 156 and vertical support frame 140 to a source of vacuum by providing for an air channel through the aforesaid components. The supply of vacuum to suction cups 168 may be provided by a pressurized air distribution unit generally designated 227 (FIG. 5A). Air distribution unit 227 may include a plurality of valves that may be operated by PLC 132 and may also include local vacuum generator apparatuses that may be in close proximity to, or integrated as part of, suction cups 168. In other embodiments, a vacuum pump mounted externally may generate vacuum externally and then vacuum can be supplied through the aforementioned air channels. If local vacuum generators are utilized, pressurized air may be delivered from an external source through air distribution unit 227 to the vacuum generators. The local vacuum generators may then convert the pressurized air to vacuum that can then be delivered to suction cups 168.

Figure 6:
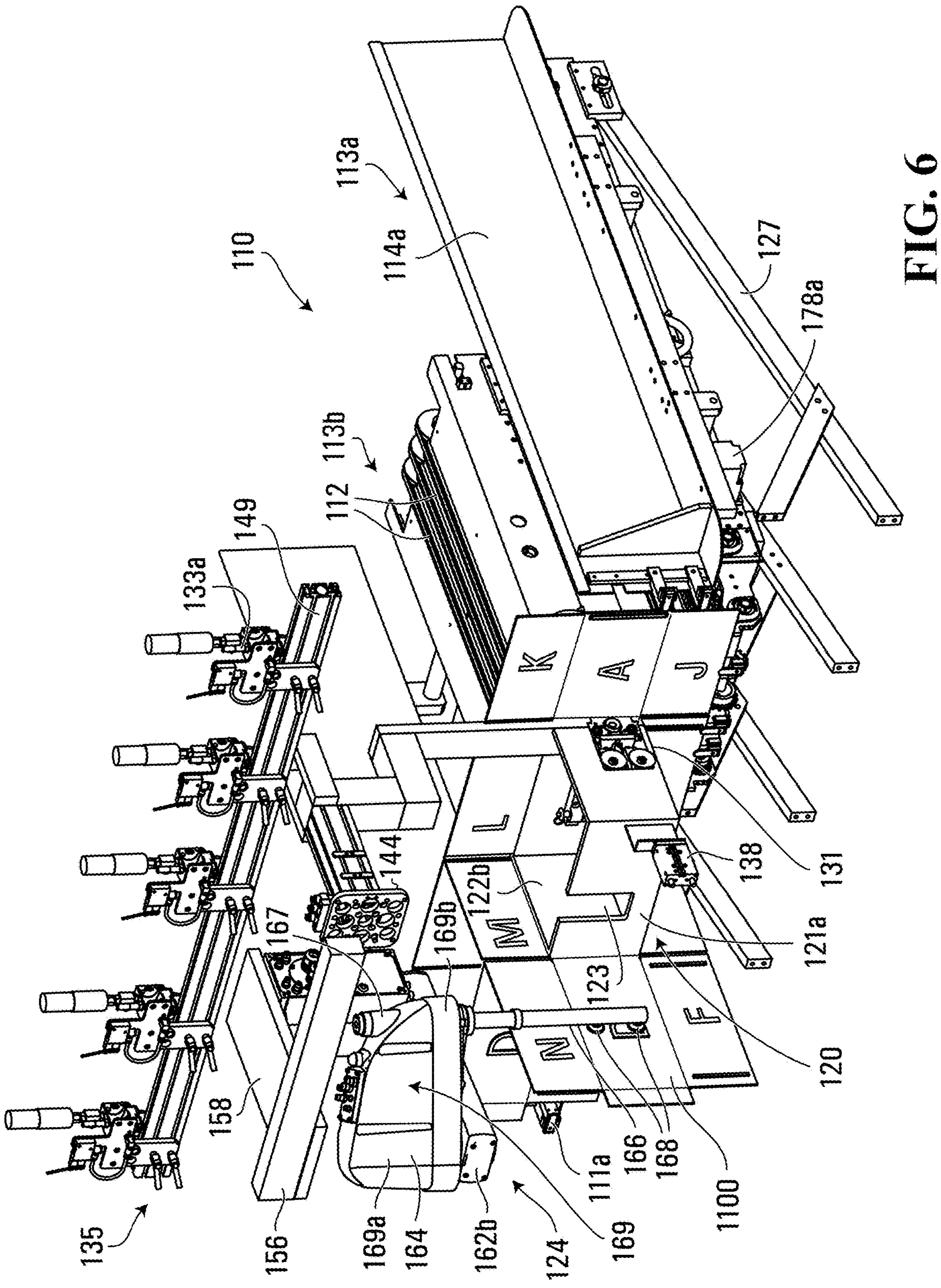
FIG. 6 is a view of the system of FIG. 4 similar to FIG. 5.
Figure 7:
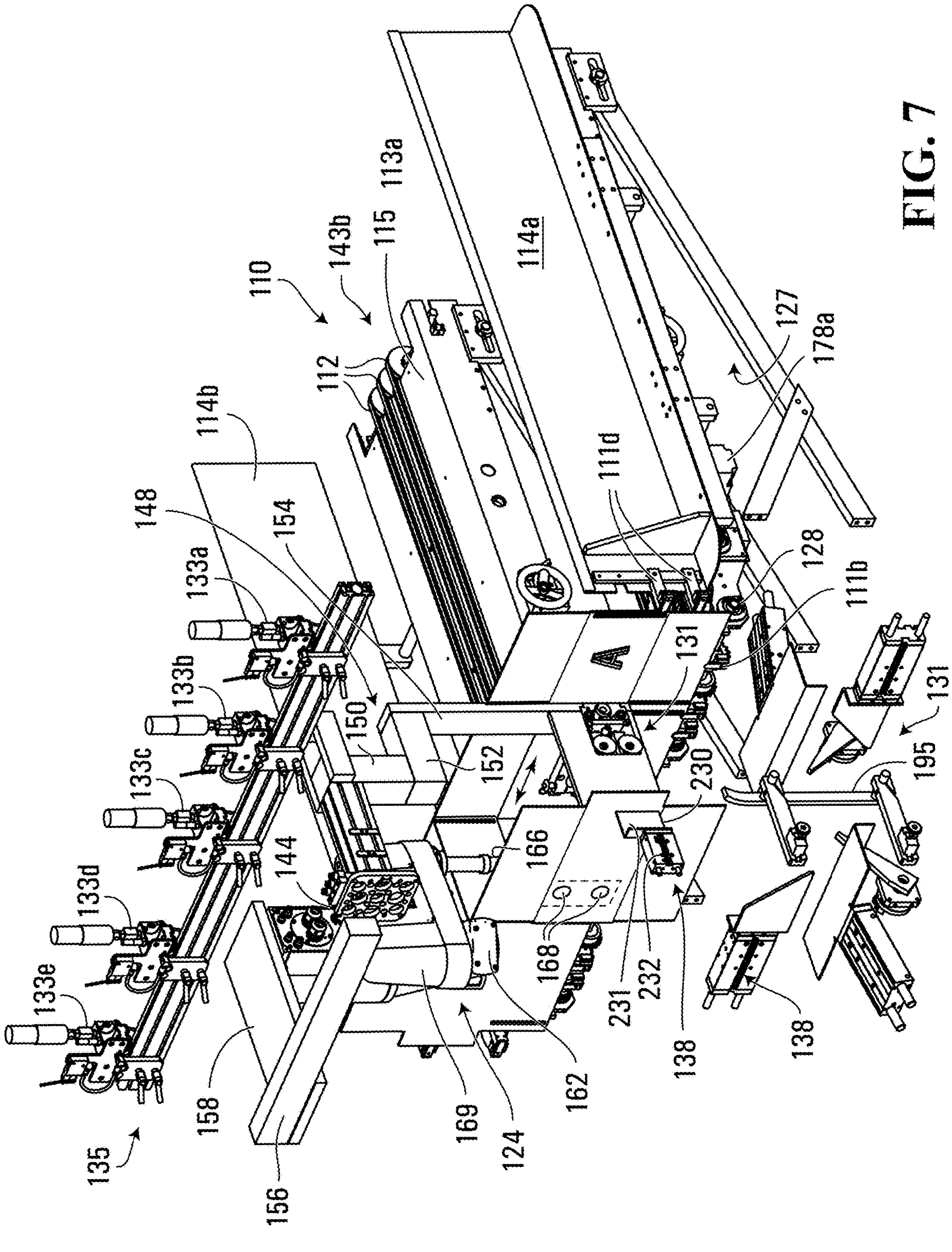
FIG. 7 is an upper, right front perspective view of the system of FIG. 2 in a third operational position, but also with some components omitted for simplicity.

The air suction force that may be developed at the outer surfaces of suction cups 168 will be sufficient so that when activated they can engage and hold panel D, and rotate panels D (along with panels F, N, E and M, C and G) of a case blank 1000 from (i) the position shown in FIG. 3 to (ii) the position shown in FIGS. 5 and 6, and thereafter (iii) to the position shown in FIGS. 7 and 8 and then (iv) after releasing a first engaged blank 1000, eventually return to the position shown in FIG. 3 to engage a next case blank 1000 positioned at the pick-up position in magazine 110. The vacuum generated at suctions cups 168 can be activated and de-activated by PLC 132 through operation of air distribution unit 227.

First rotating apparatus 124 may be readily adjustable for different types/configurations of mandrel apparatuses 120, including mandrels 137, for forming different types/configurations of case blanks 1000 into cases by suitable programming of PLC 132 appropriately to provide for appropriate movements of the suctions cups 168 through movement of the first rotational drive 160 and second rotational drive 164 and third rotational drive 167. Thus by an interchange of mandrel 137 to provide for alternate configurations of the mandrel side wall and bottom walls, PLC 132 and its operation of first rotating apparatus 124 may be appropriately programmed and thus different sized and configurations of blanks may be processed.

Mandrel apparatus 120 may have several components including a mandrel 137 (FIG. 3) and a mandrel support apparatus generally designated 148 (FIGS. 5 and 7). Mandrel 137 may be easily removable from mandrel support apparatus 148, so that a mandrel of one configuration may be easily replaced with a mandrel of another configuration. With particular reference to FIGS. 5-6 and FIGS. 23-25, mandrel 137 may comprise a pair of opposed, spaced, vertically and transversely oriented, spaced, major side walls 121*a*, 121*b* interconnected with a pair of opposed, spaced, vertically and longitudinally oriented, spaced, minor side walls 122*a*, 122*b*. A generally horizontally and transversely oriented bottom wall 118 is interconnected to major and minor side walls 121*a*, 121*b*, 122, 122*b* to form a generally cuboid, open top, box shape. Mandrel 12 may be generally configured in a variety of different sizes and shapes, each selected for the particular type of case blank 1000 that are to be formed into cases.

The dimensions of the outer surfaces of mandrel 137 may be selected so that the specific case blank 1000 that it is desired to fold has, during the forming process, fold lines that are located substantially at or along the four corner vertical side edges and the four corner horizontal bottom edges of mandrel 137. Such a selection may improve the performance of case forming system 100 in creating a formed case that is ready for loading with items. Mandrel 137, and surrounding components in system 100, may be configured to permit for the easy interchange of mandrels 137 so that case forming system 100 can be readily adapted to forming differently sized/shaped cases from differently configured case blanks 1000.

Front mandrel side wall 121*a* may be provided with a vertical slot 123 that may be configured to permit part of end effector 166 and suction cups 168 to move from the position shown in FIGS. 5 and 6, and pass through slot 123 to the position shown in FIGS. 7 and 8. By allowing the end effector 166 to pass through vertical slot 123, end effector 166 and suction cups 168 may engage the outer surface of the major side panel D of case blank 1000 when it is held in magazine 110 and then may wrap the case blank around the mandrel 137 such that the surface being held becomes an inner surface of the tubular formed case blank and major side panel D may be held substantially flat against the outside surface of major side wall 121*a* of mandrel 137, as shown.

Figure 23:
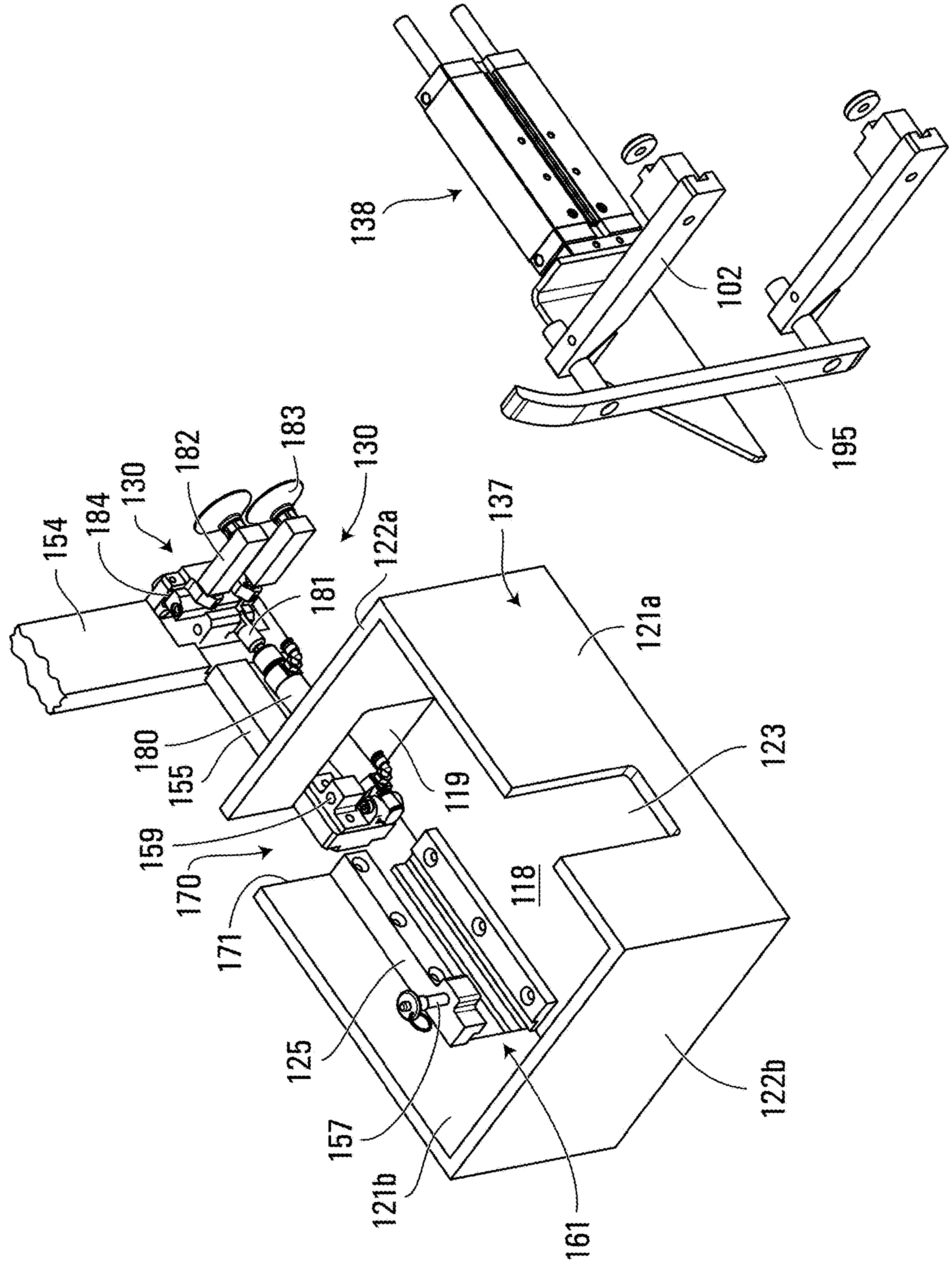
FIG. 23 is a perspective view of some components of the system of FIG. 2 shown in isolation.
Figure 24:
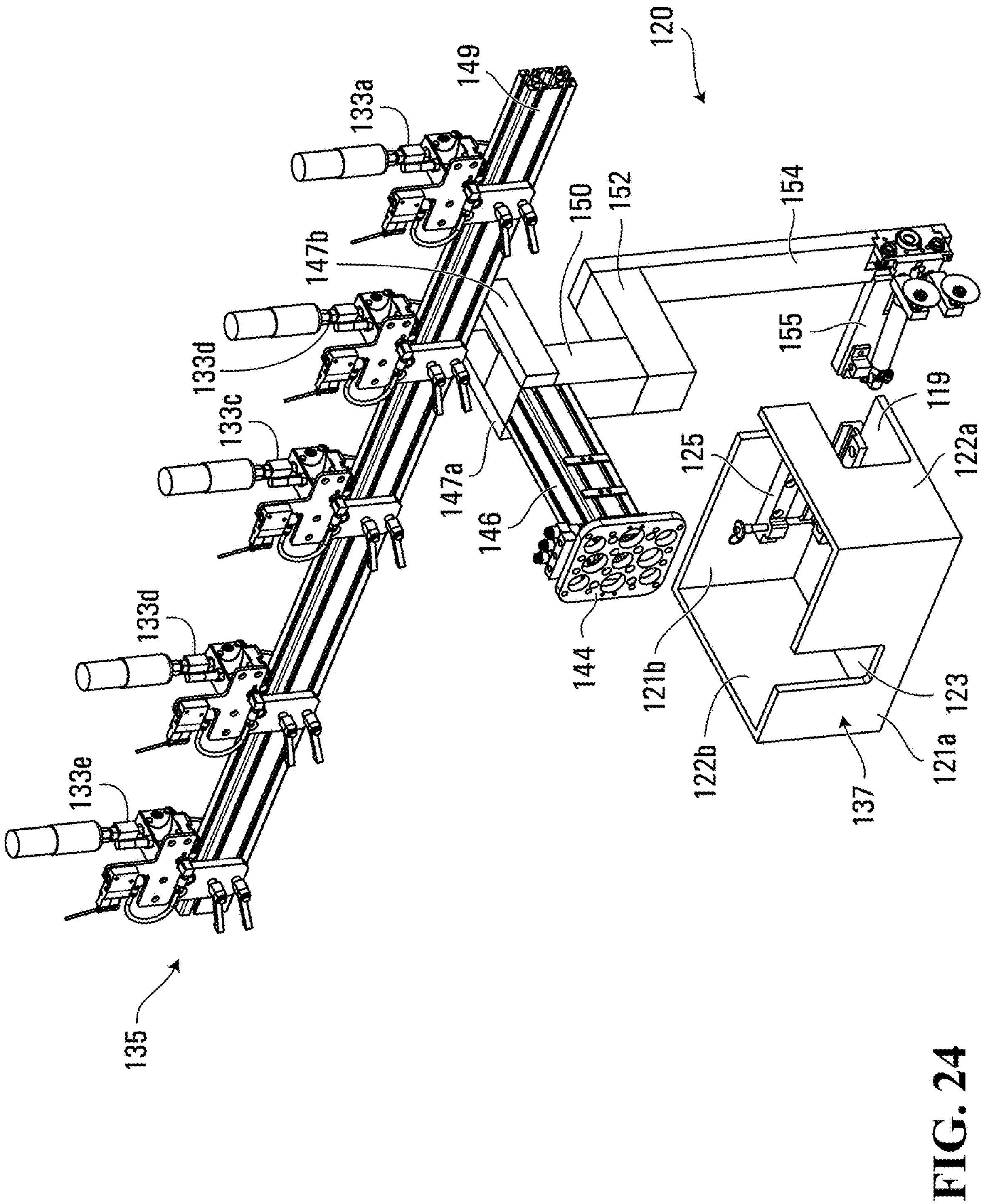
FIG. 24 is a perspective view of some other combination of components of the system of FIG. 2 shown in isolation.
Figure 25:
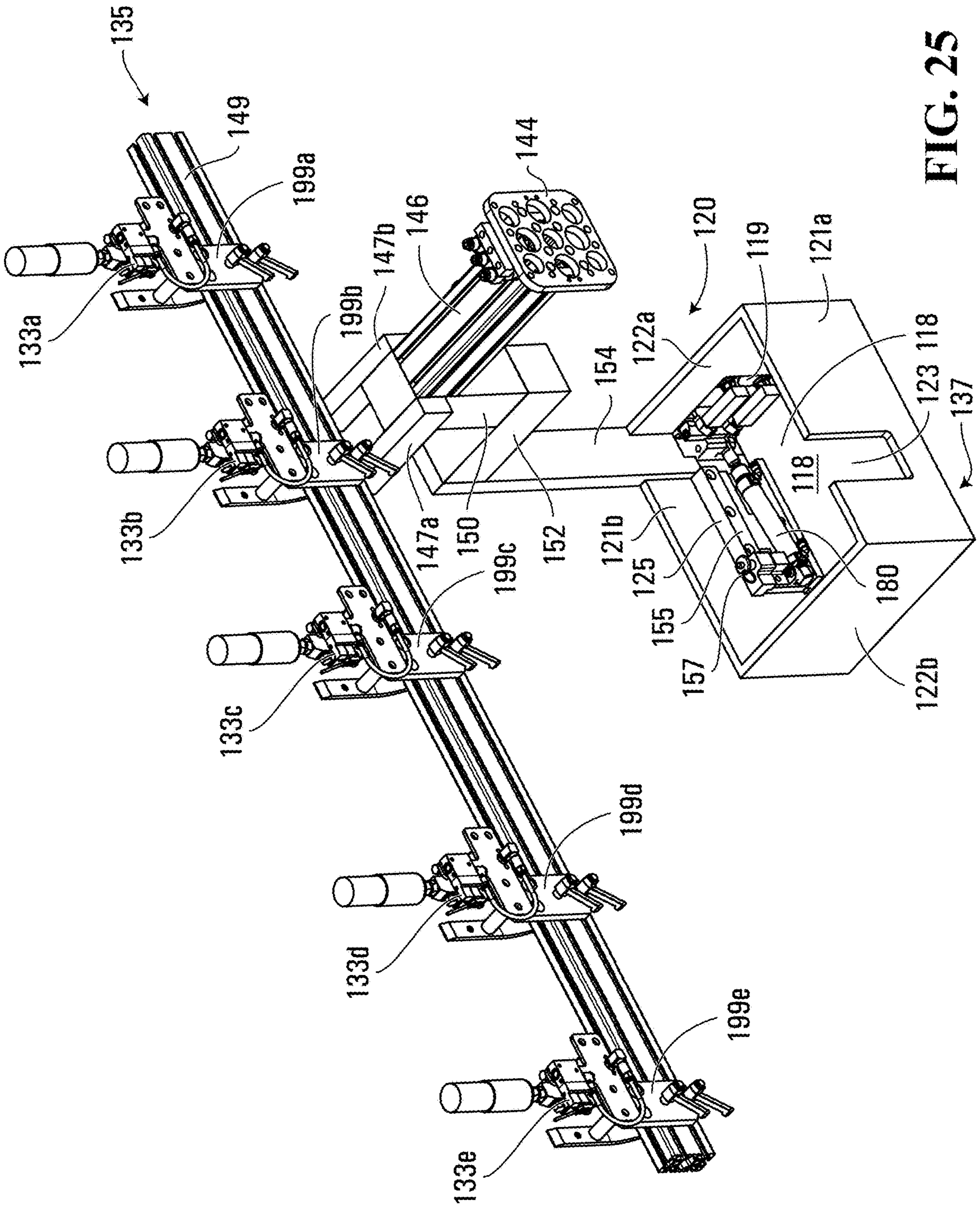
FIG. 25 is another perspective view of some combination of components of the system of FIG. 2 shown in isolation.

With particular reference to FIGS. 23-25, rear mandrel side wall 121*b* may not extend transversely the full length of bottom wall 118 and may have a vertical end edge 171 that defines an opening 170. Mounted to an inward surface of rear side wall 121*b* may be a releasable mandrel mounting bracket unit 125. Mandrel mounting unit 125 may be configured to releasably connect a transversely extending mandrel mounting plate 155 to mandrel rear side wall 121*b*, such as having mounting plate 155 be received into slot 161 in mounting bracket unit 125, with the plate being releasably held in the slot by a screw of the mounting bracket unit being removably receivable in a threaded aperture 159 of the mounting plate 155. It will be noted that by simple transverse movement of mandrel 137 relative to mounting plate 155 one mandrel 137 may be replaced by another mandrel 137 of a different configuration.

Horizontally and vertically oriented mounting plate 155 can be fixedly connected to an end of vertical mandrel support member 154. A lower portion of mandrel support member 154 may also serves to complete the rear side wall of mandrel 137, when mandrel mounting plate 155 is received into mounting bracket unit 125.

Mounted to an inner surface of mandrel mounting plate 155 is second panel rotating apparatus 130. With particular reference to FIGS. 23 and 24, second panel rotating apparatus 130 may include a double acting pneumatic cylinder device 180 which may for example be one of several different types made by Festo.

Pneumatic cylinder 180 may be supplied with pressurized air controlled by valves (not shown) operated by PLC 132. Pneumatic cylinder 180 may have a piston arm 181 that has an end pivotally connected to a suction cup arm 182. Suction cup arm 182 may be provided with suction cups 183. Air suction cups 183 may be interconnected through hoses passing through cavities (not shown) in suction cup support arm 182, first vertical support member 154, longitudinally oriented mandrel support member 152, second vertical mandrel support member 150 and longitudinally oriented and carriage support arm 146 and carriage 144 to a source of vacuum by providing for one or more air channels carrying pressurized air through the aforesaid components. The supply vacuum to suction cups 183 may be controlled by pressurized air distribution unit generally designated 227 (FIG. 5A). Air distribution unit 227 may include a plurality of valves that may be operated by PLC 132 and may also include local vacuum generator apparatuses that may be in close proximity to, or integrate as part of, suction cups 168. In other embodiments, a vacuum pump may generate vacuum externally and then vacuum can be supplied through the aforementioned air channels. If local vacuum generators are utilized in close proximity to vacuum cups 183, pressurized air may be delivered from an external source through air distribution unit 227 to the vacuum generators. The local vacuum generators will then convert the pressurized air to vacuum that can then be delivered to suction cups 183.

Figure 11:
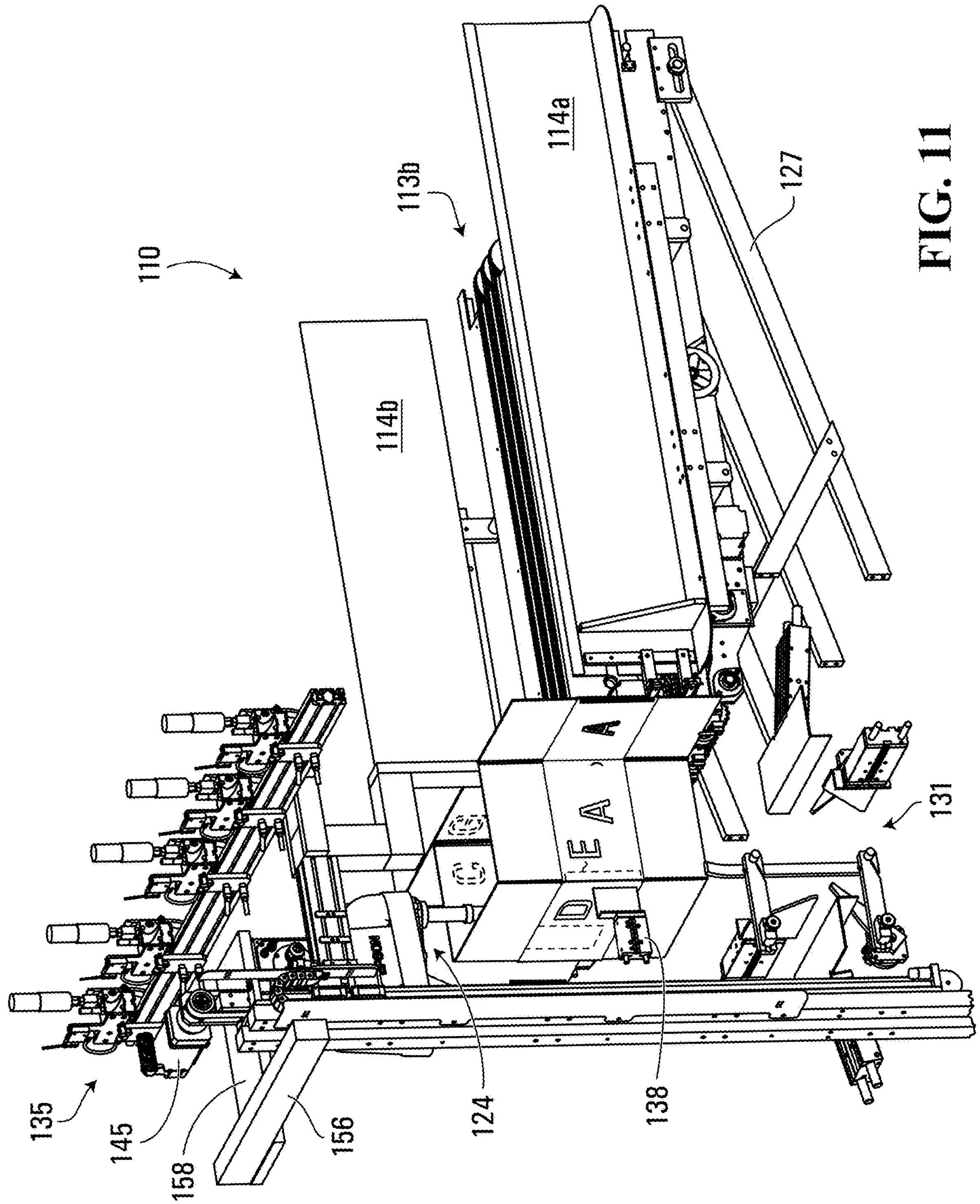
FIG. 11 is an upper, right front perspective view of the system of FIG. 2 in a fifth operational position.

The air suction force that may be developed at the outer surfaces of suction cups 183 will be sufficient so that when activated they can engage and hold panel A, and rotate panels K, A and J of a case blank 1000 past clip mechanisms 111*b* and 111*d*, from the position shown in FIGS. 5-9 to initially the positon shown in FIG. 11, and then, once the case blank 1000 is released, eventually return to the position shown in FIG. 5. The vacuum generated at suctions cups 183 can be activated and de-activated by PLC 132 through operation of unit 227.

When PLC 132 causes pneumatic cylinder 180 to extend piston arm 181, such cup arm 182 with suction cups 183 can rotate about a pivot device 184 through a longitudinally and vertically extending opening 119 in mandrel side wall 122*a* (see for example FIG. 9) and can then suction cups 183 can engage an outward facing surface of a panel A of case blank 1000.

It may be appreciated that the end effector 166 engages an outward facing surface of a case blank 1000 held in a pick-up position in the magazine 110. However, by allowing end effector 166 with suction cups 168 to pass into a recess in the wall, and in this embodiment shown, through vertical slot 123 in mandrel 137, and allowing suction cup arm 182 to pass through opening 119 in mandrel 137, and then move their respective suction cups to appropriate positions at least partially within the respective slot 123 and opening 119, enables the first panel rotating apparatus 124 and second panel rotating apparatus 130 to in effect wrap the case blank around the outer surfaces of 122*a*-122*d* of mandrel 127 by engaging only what become the inward facing vertical surfaces of the tubular case blank formed from case blank 1000 (ie. the case blank 1000 is wrapped around the mandrel by engaging what become inward facing surfaces of the tubular shaped case blank 1000.

Horizontally and vertically oriented mounting plate 155 may be fixedly connected at an outer end to a lower end portion of vertical mandrel support member 154. An opposite, upper end of vertical mandrel support member 154 may be fixedly connected to a first end of a longitudinally oriented mandrel support member 152. An opposite second end of longitudinally oriented mandrel support member 152 may be fixedly connected to a first end of a second vertical mandrel support member 150. A second opposite end of second vertical mandrel support member 150 is fixedly attached to a first end of longitudinally oriented and extending carriage arm 146. Proximate the connection location of mandrel support member 150 and carriage arm 146 may be mounted to opposite outer surfaces of vertical mandrel support member 150, a pair of spaced and opposed, longitudinally oriented support blocks 147*a*, 147*b* (see FIG. 25).

Mandrel side wall 121*b*, with its mounting plate 125 can facilitate the support of mandrel 137 on mandrel support frame 148 that includes mounting block plate 155, first vertical support member 154, longitudinally oriented mandrel support member 152, second vertical mandrel support member 150 with longitudinally oriented support blocks 147*a*, 147*b*, and carriage arm 146.

With reference to FIGS. 5 and 24, as noted above, vertical mandrel support member 150 is fixedly attached at is upper end portion to a first end portion of longitudinally oriented and extending carriage arm 146. The opposite end portion of longitudinally oriented and extending carriage arm 146 is fixedly connected to carriage block 144. Carriage block 144 is attached for sliding vertical upward and downward movement on a vertically oriented linear rail 142. Linear rail 142 may for example be a linear rail device of many types made by Bosch Rexroth AG, and provides a vertical movement apparatus 136 for mandrel apparatus 120 and the mandrel supporting members.

Linear rail 142 may be mounted to vertical support frame 140. Linear rail 142 may have a carriage drive mechanism 198 (FIGS. 8 and 2) which is operable under the control of PLC 132 to move the carriage 144 and thus also mandrel 137 vertically upwards and downwards within a range of movement as required for completing the case forming operations described herein.

First vertical support member 154, longitudinally oriented mandrel support member 152, second vertical mandrel support member 150 and longitudinally oriented and carriage support arm 146 and carriage 144 may be appropriately configured to permit electrical and communication cables and pressurized air/vacuum air hoses to pass through from an upper end to a lower end where operational components of mandrel apparatus 120 are located. In this way, electrical power/communication cable and air hoses can deliver power, electrical signals and pressurized air/vacuum to the mandrel 137 and second panel rotating apparatus 130 which is mounted on mandrel 137.

It will also be appreciated that in first panel rotation apparatus 124 and second panel rotating apparatus 130, suction cups are used to apply a force to hold and move panels of a case blank 1000. However alternative engagement mechanisms to suction cups could be employed in other embodiments to engage, hold and rotate panels of case blanks 1000.

Figure 20:
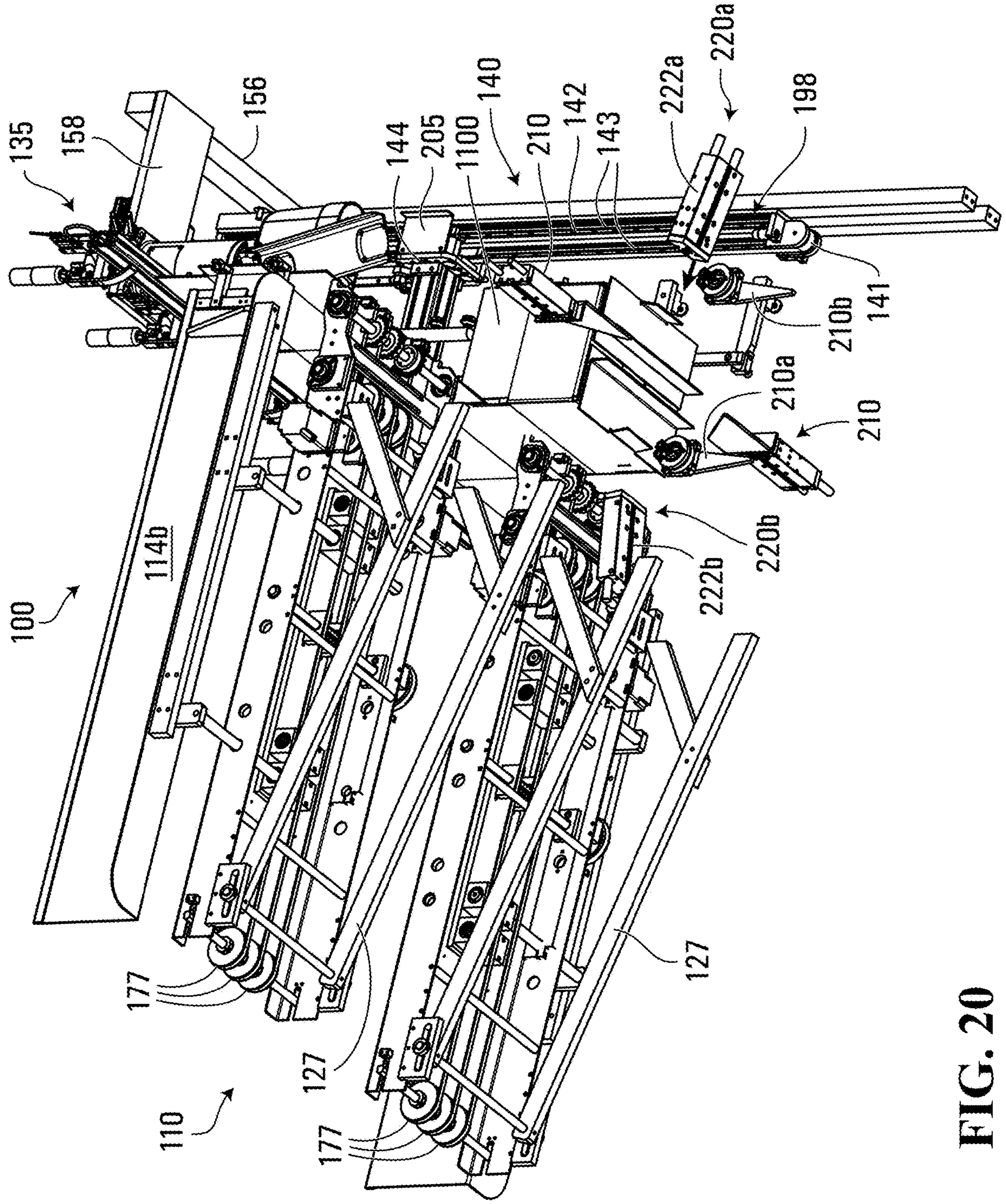
FIG. 20 is a lower, left rear perspective view of the system of FIG. 2 in the eighth operational position.
Figure 21:
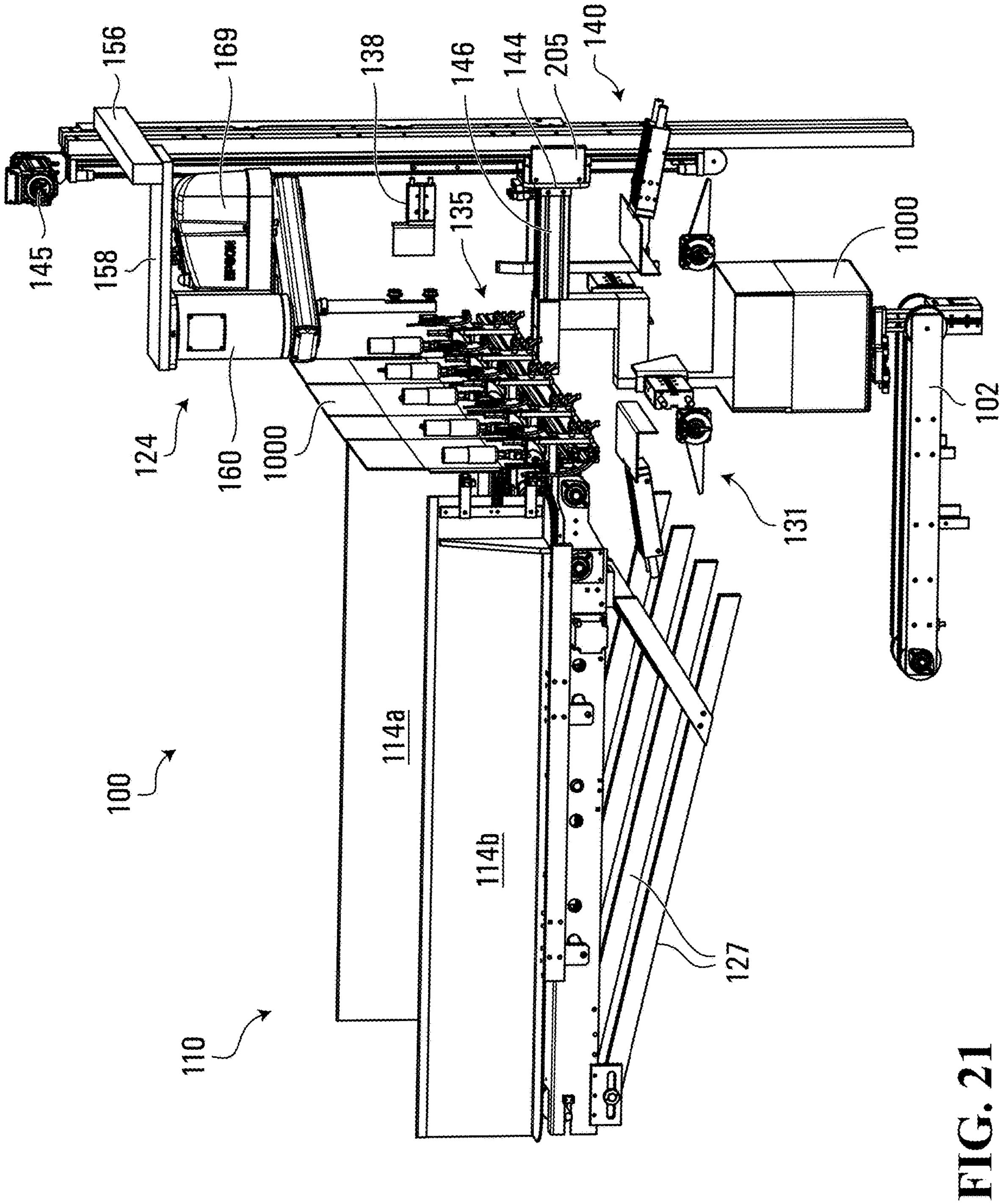
FIG. 21 is an upper, left side perspective view of the system of FIG. 2 in a ninth operational position.

With particular reference now to FIGS. 8 and 20, linear rail 142 may include carriage drive mechanism 198 that is operable to drive carriage 144 vertically upwards and downwards on line rail 142. Carriage drive mechanism 198 may include a continuous vertically oriented drive belt 143 that extends between an idler wheel 141 and a drive wheel 139. Drive wheel 139 may be driven in both rotational directions and at varying speeds by the drive shaft of a servo drive motor 145. The operation of drive motor 145 may be controlled by PLC 132 in combination with a position sensing apparatus such as an encoder (not shown) associated with drive motor 145 so that PLC 132 can determine when and how to operate drive motor 145 to appropriately position the drive belts 143*a*, 143*b* and thus move carriage 144 upwards and downwards, consequently also moving mandrel 137 and adhesive applicators 133*a-e* upwards and downwards. Drive motor 145 may be mounted at an upper end portion of support frame 140. Carriage 144 may be interconnected to drive belt 143 with a connection mechanism that may include opposed side connector plates 205 (FIGS. 20 and 21).

Figure 9:
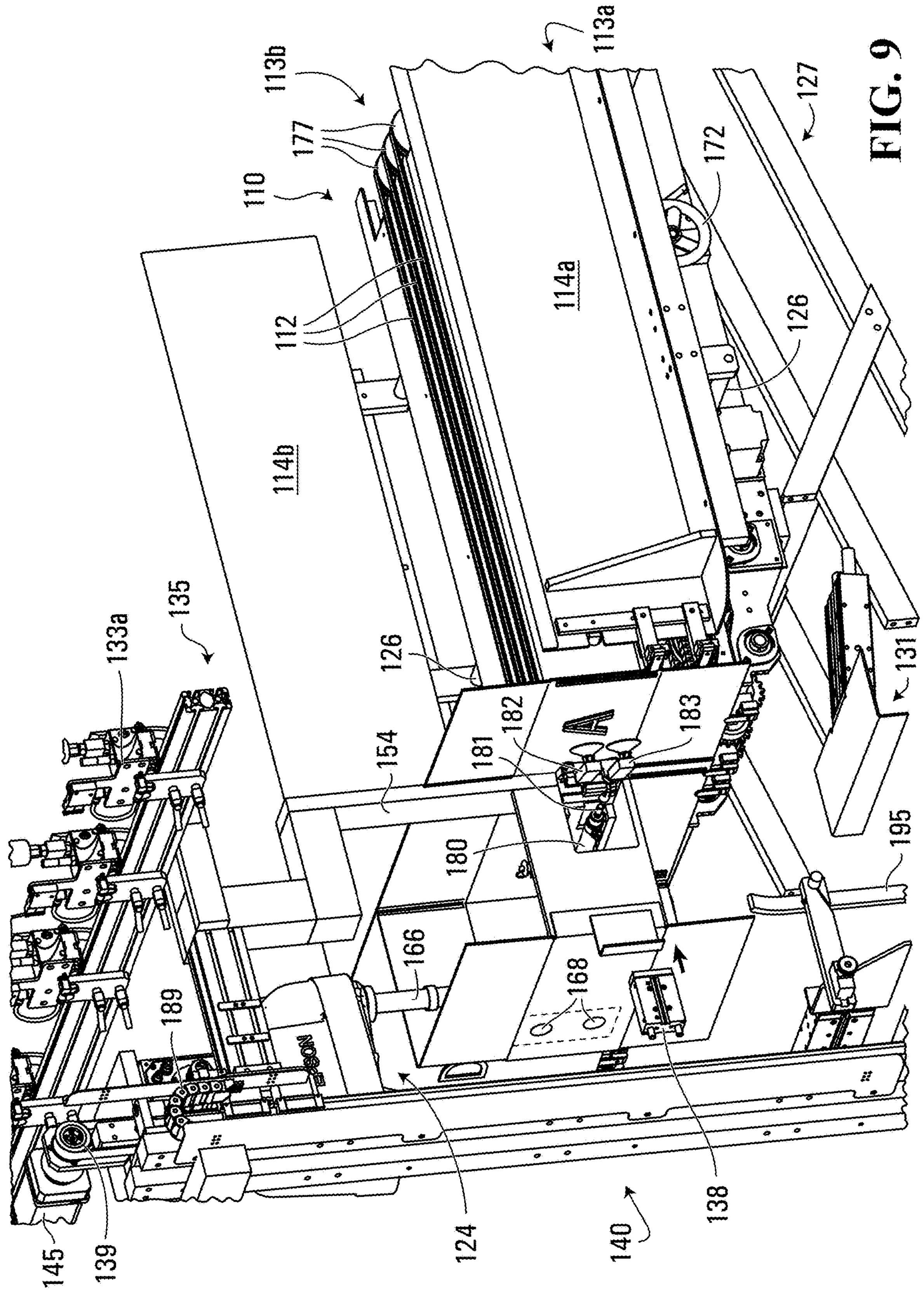
FIG. 9 is an upper, right front perspective view of the system of FIG. 2 in a fourth operational position.

Also associated with vertical moving apparatus 136 may be a caterpillar device 189 (FIG. 9). Caterpillar 189 has a hollow cavity extending along its length. Within the cavity of caterpillar 189 hoses carrying pressurized air/vacuum and electrical/communication wires can be housed. Caterpillar 189 allows such hoses and wires to move vertically as the mandrel support components and thus mandrel 137 are moved vertically by vertical moving apparatus 136. The hoses and wires may extend from external sources to enter at an inlet of caterpillar 189 mounted to vertical support frame 140 and emerging at an outlet on carriage arm 146. Upon leaving the outlet of caterpillar 189, the hoses and wires may pass into the internal cavity of carriage arm 146 (see FIG. 9). An example of a suitable caterpillar device that could be employed is the E-Chain Cable Carrier System made by Igus Inc.

Also mounted for vertical upwards and downwards movement with mandrel apparatus 120 is an adhesive applicator apparatus 135. Adhesive applicator apparatus 135 may include a transversely oriented support beam 149 to which may be mounted a plurality of adhesive applicators 133*a* to 133*e* (FIG. 3). Adhesive applicators 133*a-e* may be provided with nozzles 153 (FIG. 8) Individual adhesive applicators 133*a* to 133*e* can be appropriately positioned transversely along support beam 149 such that adhesive applicators 133*a-e* can provide a suitable adhesive pattern to the outward facing surface of a case blank 1000 and certain panels thereof, held at the front of magazine 110 in the pick-up position. The operation of each adhesive applicator 133*a-e* may be controlled by PLC 132 by for example suitable wire connections that pass through caterpillar 189 and other components of mandrel apparatus 120. Applicators 133*a-e* can apply a suitable adhesive to various panel surfaces of a bank 1000 held in magazine 110 so that when the panels are folded as described herein, the panels and flaps can be held in the desired carton configuration.

An example of a suitable adhesive applicator apparatus 135 that can be employed is the model ProBlue 4 hot melt application system made by Nordson Inc. which includes adhesive tank, nozzles/guns and hoses as well as solid state temperature control for the tank, guns and hoses. The operation of adhesive applicator apparatus 134 may be monitored and controlled by PLC 132.

Various types of adhesives may be employed in case forming system 100. A particular class of adhesives that may be suitable are adhesives in the class of “Hot Melt Adhesives” (referred to as a “HMA”). HMAs may be a thermoplastic adhesive/glue which may be heated in an applicator such as applicators 133*a-e* by respective heating elements and then expelled from the applicators while hot and tacky onto surfaces which are to be adhered to other surfaces. Depending upon the particular formulation of the HMA selected, the adhesive may for example remain tacky and capable of bonding two surfaces together for, from perhaps a second or a few seconds, to up to a minute or more. In case forming system 110, an HMA may be applied to the outward facing surfaces of panels of a blank 100 (such as shown in FIG. 1) while held in magazine 100 by applicators 133*a-e*, to form adhesive lines such as adhesive lines 1001, 1002, 1003, 1004 and 1005.

One particular type of HMAs are pressure sensitive HMAs which may remain tacky and capable to bonding two surfaces together until pressure is applied to the HMA, such as when the HMA is compressed between two surfaces of two panels of a blank 1000 as the two panels are brought together. Such pressure sensitive HMAs may remain tacky and capable of bonding two surfaces together for a long period of time, and potentially for an infinite amount of time, until pressure is applied to the HMA.

An example of a suitable adhesive that could be employed on a case blank 1000 made of cardboard is Cool-Lok adhesive made by Nacan Products Limited or a suitable pressure sensitive HMA made by Henkel Corporation.

Adhesive applicators 133*a-e* can for example be positioned transversely along support beam 149, and their operation controlled by PLC 132 to provide apply a suitable adhesive to various panel surfaces, such as vertical adhesive lines 1001, 1002 on lower major panel F, vertical adhesive lines 1003, 1004 on lower major panel H and adhesive line 1005 on minor side wall panel A (FIG. 1). This can be done as the adhesive applicators 133*a-e* are moving upwardly on support beam 149 during an upward stroke of the mandrel apparatus 120 including mandrel 137.

The transverse positions of adhesive applicators 133*a-e* may be individually selected and adjusted by use of a releasable adjustment mechanisms 199*a-e* which releasably secures the applicators 133*a-e* to support beam 149, at positions suitable dependent upon which particular type/configuration of case blank 1000 that is being processed (see for example FIG. 25). This adjustable positioning of adhesive applicators 133*a-e* is another part of the features of case forming system 100 that enables case forming system 100 to be easily modified when changing over from handling one type/configuration of case blank to another type/configuration of case blank.

Applicator support beam 149 may be fixedly mounted to support blocks 147*a*, 147*b* (FIG. 5) and thus applicator support beam 149 and adhesive applicators 133*a-e* may move and stroke vertically upwards and downwards along with carriage 144 and mandrel movement apparatus 136 within a range of intermittent movement as required for completing the case forming operations and process described herein. It will be appreciated that by interconnecting adhesive applicator apparatus 135, including applicator support beam 149 carrying adhesive applicators 133*a-e*, to the carriage 144, the adhesive applicator apparatus 135 may be moved in reciprocating motion vertically upwards and downwards in space with the mandrel apparatus 120 and mandrel 137. Both portions of adhesive applicator apparatus 135 and at least portions of mandrel apparatus 120 will occupy some of the same spatial region in the vicinity of the front of the magazine 110 and the pick-up location of case blanks 1000 located in the magazine 110 at the front of the stack. This enables the adhesive applicator apparatus 135 to apply adhesive to the outward facing surface of the blank at the pick-up position during upward vertical movement, while the case blank 1000 at the front of the stack is being held in the magazine, and prior to the mandrel apparatus 120 being brought into an engagement position with the case blank being located at the pick-up location.

The next component of system 100 to be described in detail is third panel rotating apparatus 131 which is configured to cause the appropriate lower panels F, G, H, J (FIG. 1) to be folded and sealed to provide a closed bottom and thus form an open top case configuration that is suitable for delivery to a case conveyor 102 (FIG. 3). Third panel rotating apparatus 131 is operable (a) to rotate outwards lower major panels F and H about their respective fold lines with respective major side panels D and B. The amount of rotation is sufficient to ensure that there will be no interference with the subsequent inward rotation of lower minor panels G and J and no contact is made with adhesive that may be on an inward surfaces of lower major panels F and H, such as respective adhesive lines 1001, 1002 and 1003, 1004 (FIG. 1). In an example embodiment the amount of outward rotation of lower minor panels G and J from vertical planar alignment with their respective adjacent lower major side wall panels D and B, may be about 45 degrees from the vertical.

Third panel rotating apparatus 131 may also be operable to (b) rotate lower minor panels G and J inwardly, preferably about 90 degrees to a generally horizontal orientation, about their respective fold lines with respective major side wall panels C and A; and (c) rotate lower major panels F and H inwards, about their respective fold lines with respective major side panels D and B, an amount of rotation is sufficient to ensure that there will be contact between inner surfaces of lower major panels of lower major panels F and H and the outer surfaces of lower minor panels G and J. Third panel rotating apparatus 131 may also be operable to apply compression to lower major panels F and H against the bottom wall 188 of mandrel 137 to ensure that a fixed adhesive connection is formed between inner surfaces of lower major panels of lower major panels F and H and the outer surfaces of lower minor panels G and J.

Figure 13:
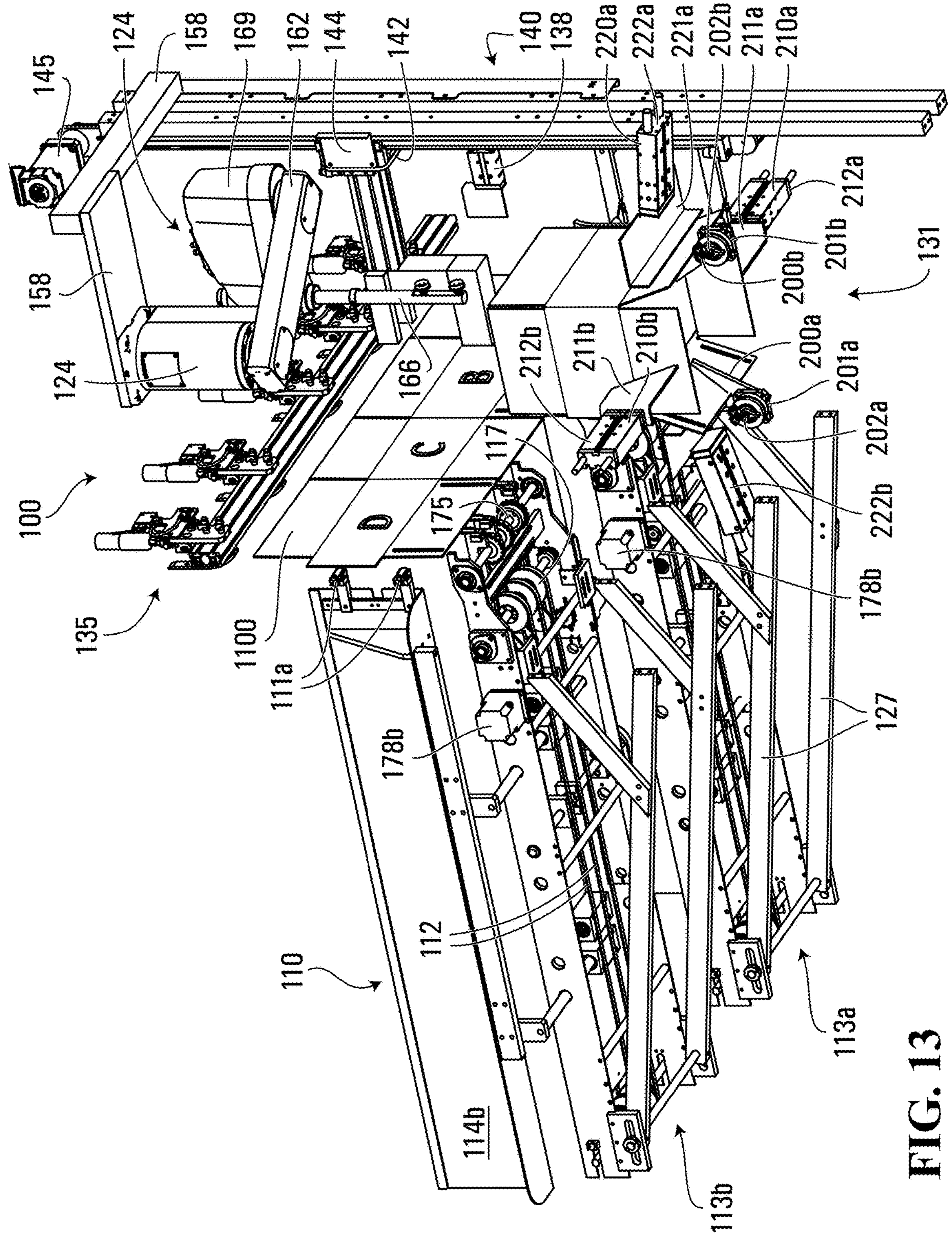
FIG. 13 is an lower, left front perspective view of the system of FIG. 2 in a sixth operational position.
Figure 14:
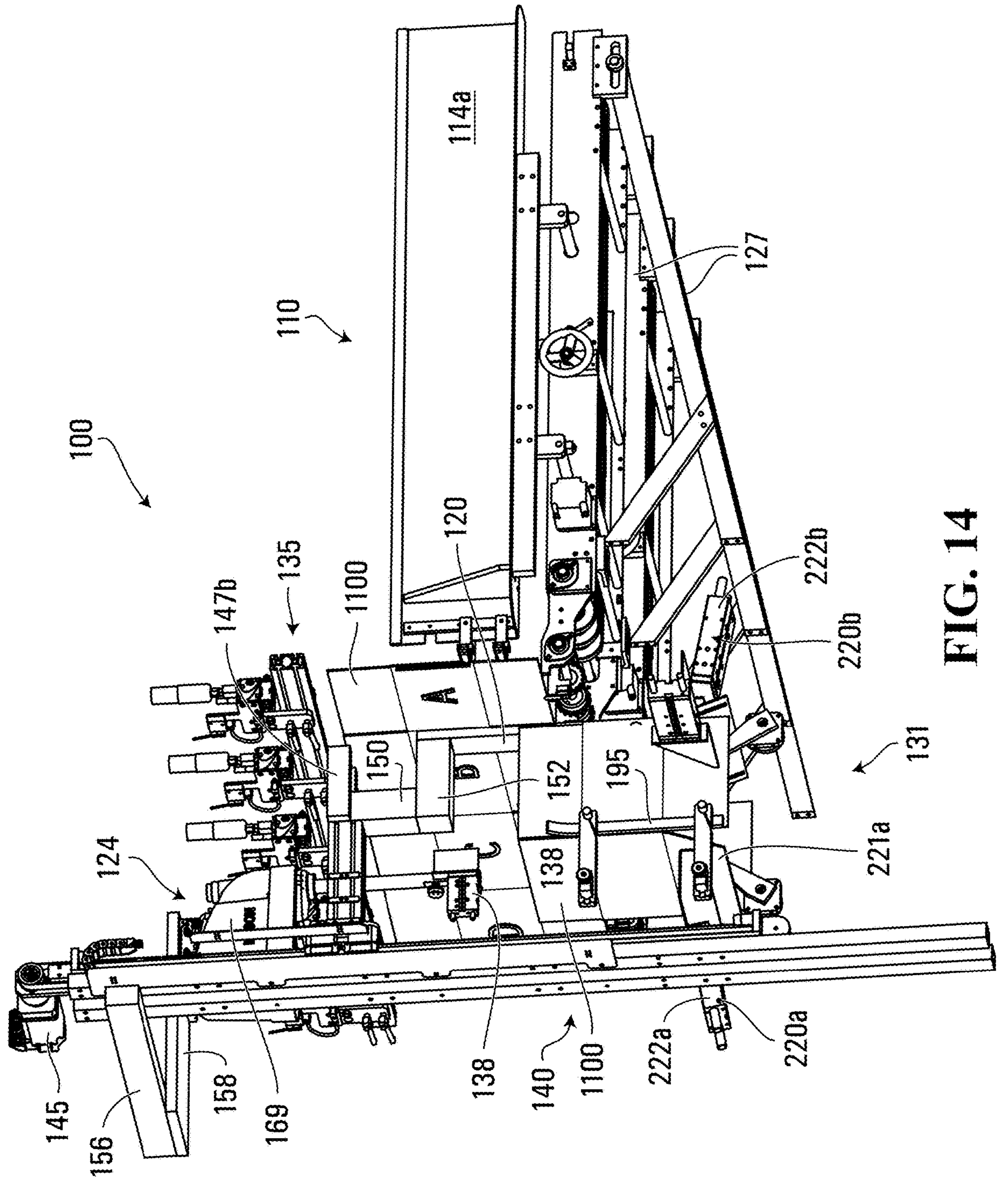
FIG. 14 is a lower, right front perspective view of the system of FIG. 2 in a the sixth operational position.
Figure 15:
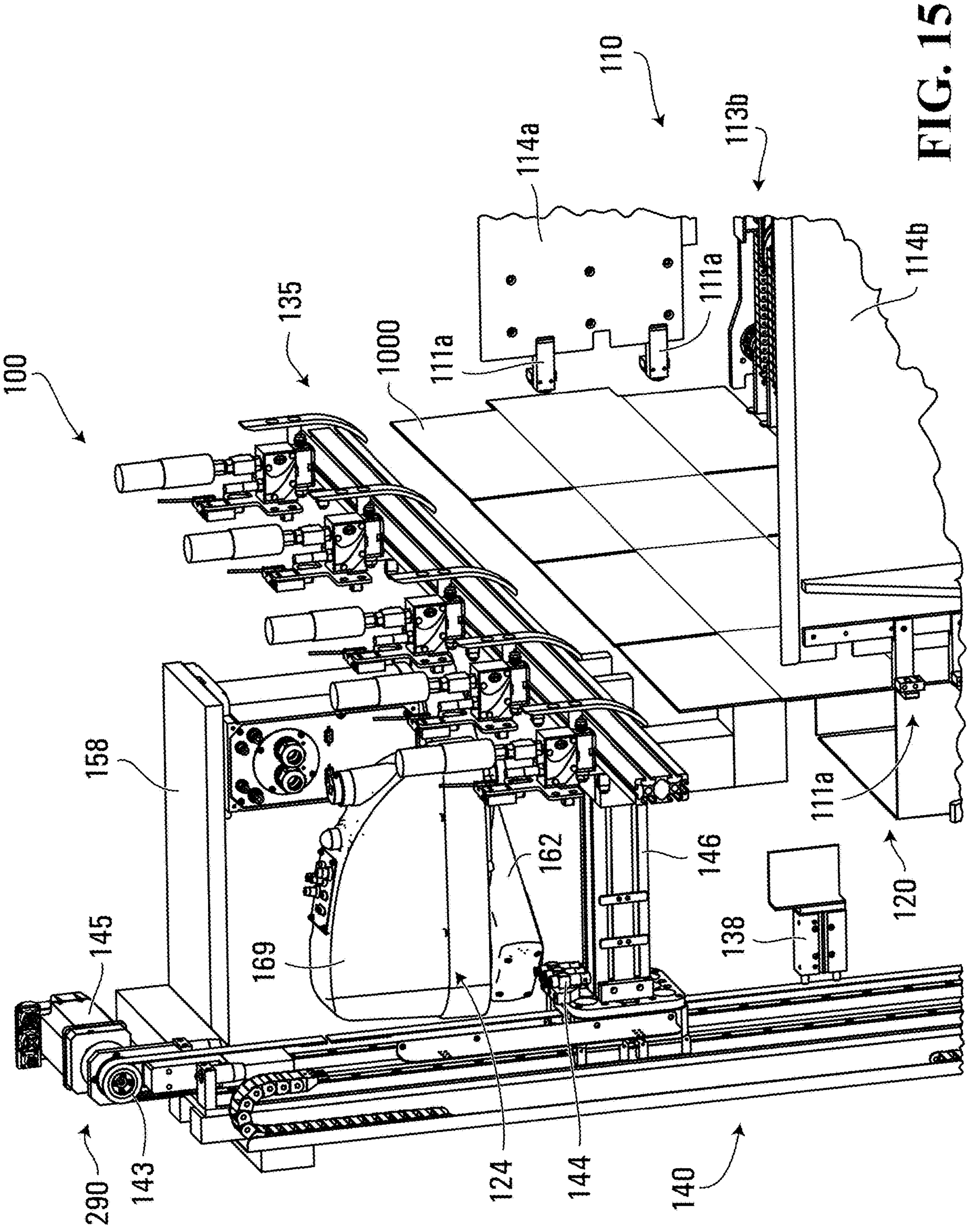
FIG. 15 is an upper, right front perspective view of an upper portion of the system of FIG. 2 in the sixth operational position.

With particular reference to FIGS. 13 and 14, third panel rotating apparatus 131 may include opposed longitudinally oriented pivoting fingers 200*a*, 200*b*, that may pivot within a desired range outwards and inwards about respective pivots 201*a*, 201*b* about transversely oriented pivot axes. The pivoting movement of fingers 200*a*, 200*b* may be caused by actuator motors 202*a*, 202*b* controlled in operation by PLC 132.

Operation of fingers 200*a*, 200*b* can rotate outwards lower major panels F and H about their respective fold lines with respective major side panels D and B.

Third panel rotating apparatus 131 may also include opposed transversely oriented plough devices 210*a*, 210*b*, that have plough plates 211*a*, 211*b* that may be moved transversely in intermittent, reciprocating movement by actuating double acting pneumatic cylinders 212*a*, 212*a*, with movable piston arms, within a desired range outwards and inwards. The transverse movement of plough devices 210*a*, 210*b* may be controlled by valves in air distribution unit 227 (not shown) that selectively deliver pressurized air through hoses (not shown) to double acting pneumatic cylinders 212*a*, 212*b*, under the control of PLC 132.

Third panel rotating apparatus 131 may also include opposed longitudinally oriented plough devices 220*a*, 220*b*, that have plough plates 221*a*, 221*b* that may be moved transversely in intermittent, reciprocating movement by double acting pneumatic cylinders 222*a*, 222*a*, with movable piston arms, within a desired range outwards and inwards. The transverse reciprocating intermittent movement of plough devices 220*a*, 220*b* may be controlled by valves (not shown) that selectively deliver pressurized air through hoses (not shown) to pneumatic cylinders 222*a*, 222*b*, that may be supplied by pressurized air controlled by valves in air distribution unit 227, under the control of PLC 132.

The aforementioned components of third panel rotating apparatus 131 may be mounted to a frame (not shown for simplicity). In some embodiments, the horizontal longitudinal/transverse positions and possibly also their vertical positions may be adjustable on the frame to enable the components of third panel rotating apparatus 131 to accommodate different sized/configured mandrel apparatuses 120 and corresponding different size and configuration of case blanks and their lower panels F, G, H, J. The adjustment may be made by hand or by servo motors operating moving support components under control of PLC 132. However, it is preferred if third panel rotating apparatus is configured so that it can accommodate the processing of several different size/configurations of mandrels and case blanks without having to adjust the positions of their components, to be more easily able to facilitate change-over from one mandrel/case blank size and configuration to another.

The next component of system 100 to be described in detail is fourth panel rotating apparatus 138. Fourth panel rotating apparatus 138 can co-operate with first panel operating apparatus 134 and second panel operating apparatus 130 to form a tubular shaped blank. Fourth panel rotating apparatus 138 is operable to rotate inwards 90 degrees, sealing panel E of case blank 1000 relative to major side wall panel D, from the position shown in FIG. 7 to the position shown in FIG. 9. Fourth panel rotating apparatus 138 may be mounted to a supporting frame component (not shown) and include a plough device 230 having plough plate 231 that may be moved longitudinally in intermittent, reciprocating movement by a double acting pneumatic cylinder 232, with a movable piston arm, within a desired range outwards and inwards. The longitudinal reciprocating intermittent movement of plough device 220 may be controlled by valves (not shown) in air distribution unit 227 that deliver pressurized air through hoses (not shown) to pneumatic cylinder 232 under the control of PLC 132.

Pneumatic cylinders 211*a*, 212*b*, 222*a*, 222*b*, and 232 may each be a conventional pneumatic reciprocating cylinder with piston arms that are operable to move in a reciprocal movement between fully extended positions and fully retracted position. This reciprocating motion can be achieved in known ways such as for example, by using a double acting cylinder, which can for example, channel compressed air to two different chambers which in turn provides interchanging forward and backward acting forces on the piston arms of the cylinders. Pneumatic cylinders 211*a*, 212*b*, 222*a*, 222*b*, and 232 may for example be one of many different types made by Festo.

Compressed air may be delivered to pneumatic cylinders 211*a*, 212*b*, 222*a*, 222*b*, and 232 by hoses (not shown) in communication with a source of pressurized air through air distribution unit 227. To channel the compressed air appropriately, valves (not shown) in distribution unit 227 (FIG. 5) can be driven between open and closed positions by solenoids responsive to signals from PLC 132. The valves could be located proximate the pneumatic cylinders 211*a*, 212*b*, 222*a*, 222*b*, and 232 or be disposed elsewhere. Electrical communication lines carrying signals to and from PLC 132 could also be provided to operate the valves.

It should also be noted that during the downward vertical movement of a case blank 1000 secured to mandrel 137, a compression rail 195 supported on part 140*a* of vertical support frame 140 (FIG. 3) is configured and positioned to apply pressure to the panels A and E pushing against the outward surface of side wall 122*a* of mandrel 137, to ensure appropriate sealing of panels A and E with the adhesive.

In some embodiments, the longitudinal/transverse position and possibly also the vertical position of compression rail 195 may be adjustable on the frame 140 to enable the components of third panel rotating apparatus 131 to accommodate different sized/configured mandrel apparatuses 120 and corresponding different size and configuration of case blanks and their lower panels F, G, H, J. The adjustment may be made by hand or by servo motors operating moving support components under control of PLC 132.

Figure 22:
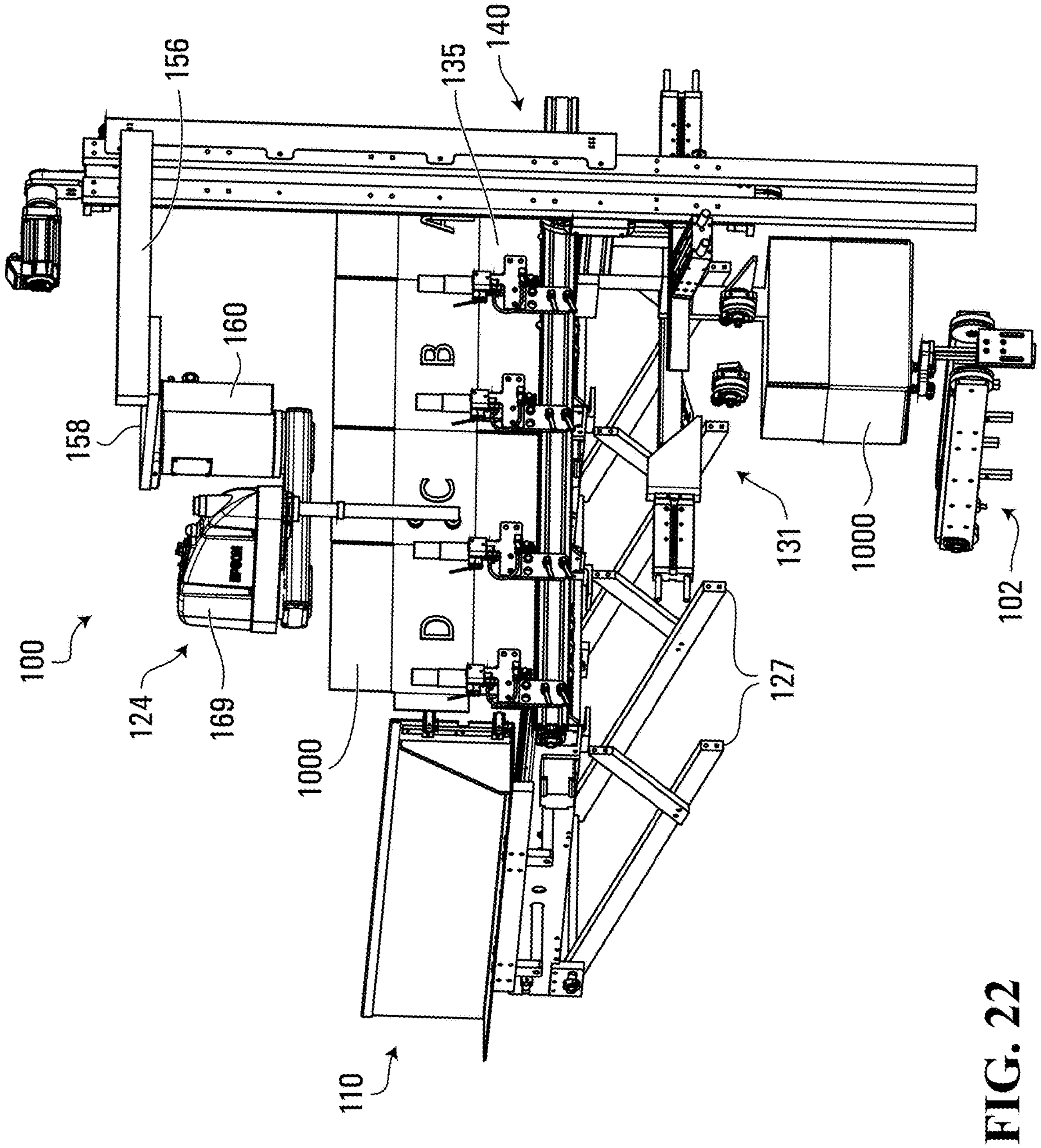
FIG. 22 is an upper, left front perspective view of the system of FIG. 2 in a ninth operational position.

With reference to FIGS. 3, 21 and 22, case discharge conveyor 102 (for simplicity not shown in the other Figures) may be provided with spaced continuous conveyor belts 105 driven in a conventional manner by a drive motor under control of PLC 132 and configured to support and move open topped cases formed from case blanks 1000 by case forming system 100. A lift platform 104 may have upward facing suction cups 103. Lift platform 104 may be employed to assist in "handing off" a formed case from mandrel 137 to case conveyor 102. The lift platform 104 may be vertically movable upwards and downwards and along with suction cups 103 and corresponding suction cup valves (not shown) be controlled by valves and PLC 132. Lift platform 104 may move suctions cups 103 to engage and hold the blank (which has become a formed case) in position during disengagement of the mandrel 137 from the formed case. Then lift platform 104 may be lowered to position the formed case onto the case conveyor for discharge for filling, packing and top sealing. Suction cups 103 may be deactivated allowing case conveyor 102 to move the formed case from case forming system 100.

Various components of system 100 such as mandrel apparatus 120 including mandrel 137 and the various support members 155, 154, 152 and 150; first, second, third and fourth panel rotating apparatuses; robot support members 156 and 158; and support frame 140, may all be made of any suitable materials such as for example aluminium or steel.

Also a least some of the various components of system 100 mandrel support members 155, 154, 152 and 150 may be integrally formed or interconnected to each other by known techniques. For example if the components are made of a suitable metal or plastic, welding techniques can be employed. Also, the use of screws and/or nut and bolts may be employed.

The operation of system 100 will now be described in detail. A plurality of case blanks 1000 may be presented in a vertically and transversely oriented stacked arrangement and held in magazine 110. Magazine 110 may be operated such that the front generally vertically and transversely oriented surface of panel B of the forward-most blank 1000 will be at a pick-up location that will be just in contact with, or be a very short distance spaced from (e.g. within ¼ inch), the inward surface of rear wall 121*b* of mandrel 137 when the mandrel is appropriately vertically positioned.

The start position of mandrel 137 will typically be a vertically downward position, where the adhesive ejection nozzles 153 (FIG. 8) of adhesive applicators 133*a-e* are also below the level of the bottom edge of case blank 1000 held in magazine 110). Then, under control of PLC 132, vertical movement apparatus 136 can cause mandrel apparatus 120 with adhesive applicator apparatus 135 connected thereto, to move vertically upwards an appropriate amount at an appropriate velocity. In doing so, ejection nozzles 153 of adhesive applicators 133*a-e* can be operated by PLC 132 over a suitable range of upward movement, to apply adhesive to respective panels A, H and F. PLC 132 is able to activate adhesive applicators 133*a-e* at a suitable vertical location because of signals received from the encoder associated with servo drive motor 145. Adhesive applicators 133*a-e* will then apply adhesive lines 1001, 1002, 1003, 1004 and 1005 as shown in FIG. 1, to the outward facing surface of the front case blank 1000 in magazine 110, while the front case blank is in the pick-up position.

Next, under control of PLC 132, magazine 110 and first panel rotating apparatus 124 may co-operate so that suction cups 168 engage and hold the outward facing surface of major side wall panel D, and pull panels N, D and F from clip mechanism 111*a*, while clip mechanisms 111*c* holding panels G/C/M and J, B/L in the pick-up position in the magazine, and clip mechanisms 111*b*, 111*d* hold panels J/A/K also in the pick-up positon in the magazine.

First panel rotating apparatus 124 can then start to rotate major side wall panel D along with panels E, N, F and also pull panels M, C and G from retaining clips 111*c* to also rotate them, 90 degrees in a counter clockwise direction about the vertical fold line between side wall panels B and C, to the configuration shown in FIG. 5, where minor side wall panel C is held against the outer surface of mandrel side wall 122*b* (see also step 1000(3) in FIGS. 2A and 2B).

In the next folding step, PLC 132 causes first panel rotating apparatus 124 to rotate side wall panel D and its respective adjacent upper and lower major panels N and F, and connected sealing panel E, together counter clockwise 90 degrees about the vertical fold line between side wall panels D and C, to the configuration shown in FIG. 7, where major side wall panel D is held against the outer surface of mandrel side wall 121*a*, as end effector 166 with suction cups 168 pass through slot 123 (see also step 1000(4) in FIGS. 2A and 2B).

In the next folding step, PLC 132 causes plough plate 231 of fourth panel rotating apparatus 138 to extend causing sealing panel E to be rotated counter clockwise 90 degrees about the vertical fold line between sealing panel E and side wall panel D to the configuration shown in FIG. 9 (see also step 1000(5) in FIGS. 2A and 2B).

In the next folding step, PLC 132 causes second panel rotating apparatus 130 to be activated by activating pneumatic cylinder 180 to extend piston arm 181 so that suction cups 183 can engage and hold the outward facing surface of side wall panel A. PLC 132 can then cause pneumatic cylinder 180 to retract piston arm 181, causing suction cup arm 182 to rotate about its pivot 184, thus causing side wall panel A, along with and its respective adjacent upper and lower minor panels K and J, to be all rotated together clockwise 90 degrees about the fold line between side wall panels A and B, to the configuration shown in FIG. 11. But as panel A is approaching the position shown in FIG. 11, where a large portion of minor side wall panel A is held against the outer surface of mandrel side wall 122*a*, PLC 132 causes plough plate 231 of fourth panel rotating apparatus 138 to retract allowing an outward facing surface of sealing panel E to engage with an edge portion of the inward facing surface of minor side wall panel A, and wherein the surface of sealing panel E becomes connected to side wall panel A as a result of adhesive line 1005 bonding the two panels together. Thus sealing panel E in combination with adhesive line 1005 provides a connection mechanism for connecting the free vertical side edge portions of blank 1000. However, in other example embodiments, other connection mechanisms may be provided to connect the free vertical side edge portions to secure the blank in a generally tubular configuration.

Figure 12:
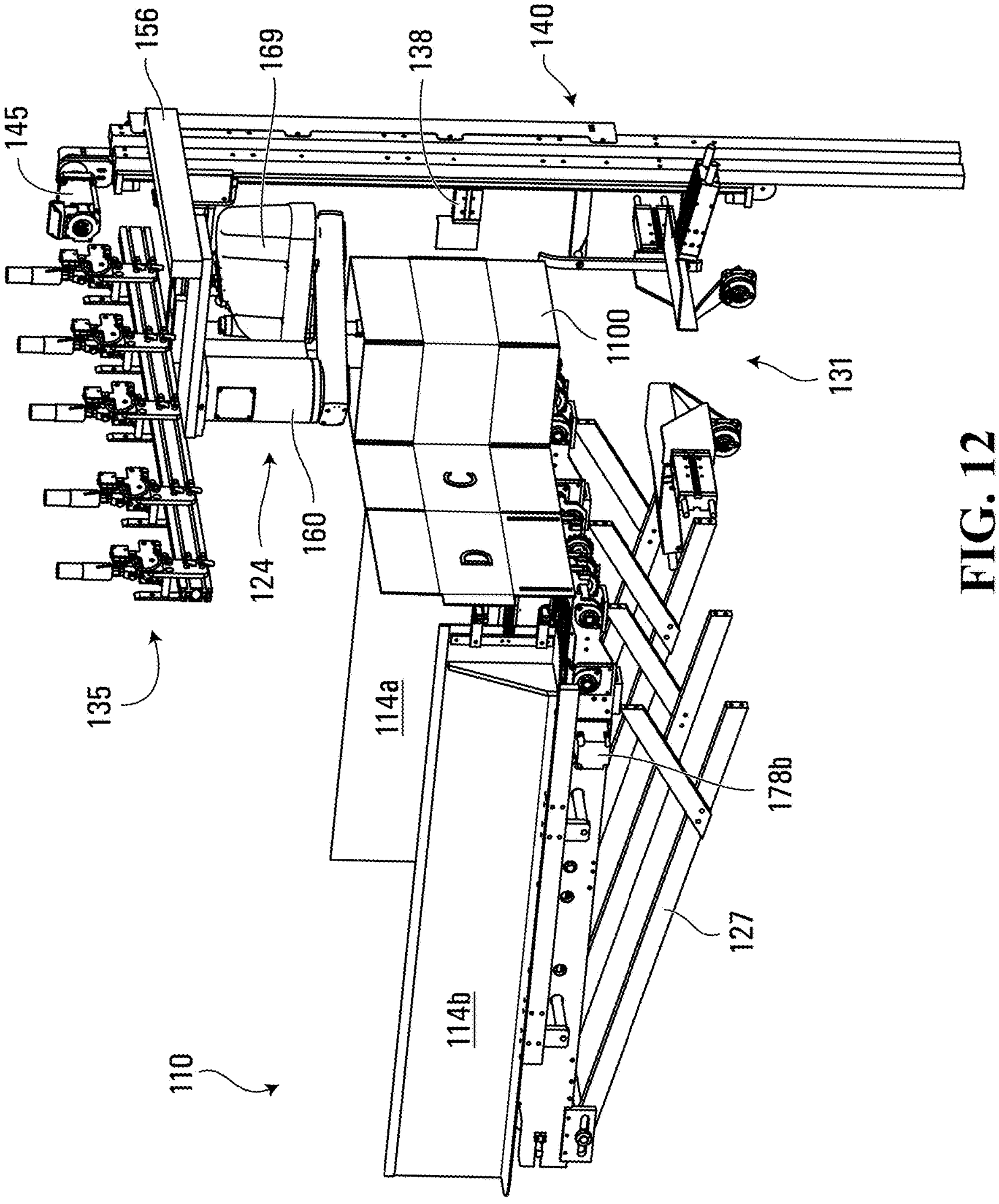
FIG. 12 is an upper, left front perspective view of the system of FIG. 2 in the fifth operational position.

The result at the end of this step is that blank 1000 is formed into a generally rectangular tubular shape, such that panels A-E have been wrapped about a centrally positioned mandrel 137 as shown in FIG. 12 (see also step 1000(6) in FIGS. 2A and 2B). The case blank 1000 is being held on the mandrel by suction cups 183 of second rotating apparatus 130 and suction cups 168 on end effector 168 which are engaged on what have become the inner surfaces of the tubular shaped case blank. The result is a very efficient sequence of movements to extract a flatly configured blank held in magazine 110 and form it into a tubular shaped blank.

The remaining steps carried out by case forming system 100 as illustrated in FIGS. 13 to 23 show a sequence of steps that may be utilized to close and seal the lower major and minor panels F, H, and G, J to close and seal the bottom of the case blank 1000 to form an RSC case with an open top and deposit the formed case onto case discharge conveyor 102. However, alternate bottom panel closing systems may be employed in other embodiments.

In the next step of carton forming system 100 as disclosed, PLC 132 de-activates suction cups 168 so that only suction cups 183 hold case blank 1000 on mandrel 137. Thereafter, PLC 132 will activate vertical mandrel movement apparatus 136 and in particular servo motor 145 to move carriage 144 and thus mandrel 137 vertically downward with case blank 1000 secured thereto, to a lower panel folding and sealing position shown in FIG. 13 (see also step 1000(7) in FIGS. 2A and 2B). Clip mechanisms 111*c* (FIG. 5) holding panels H, B and L, in magazine 110 will allow for the release of panels H, B and L to allow the remaining portion of case blank 1000 to be removed from being held by magazine 110 and moved vertically downward once the case blank 1000 at the front of the stack is engaged by second panel rotating apparatus 130 and mandrel 137 moves vertically downwards. Additionally, PLC 132 will cause the suction force at suction cups 168 on effector 166 of first rotating panel apparatus 124 to be curtailed, thus allowing the case blank 1000 formed around mandrel 137 to move vertically away from suction cups 168. The tubular formed case blank 1000 may be held in contact for movement with mandrel 137 by surface friction forces between the blank and the exterior surface of mandrel 137 and by the operation of suction force exerted by suction cups 183 of second panel folding apparatus 130.

At the vertical position of mandrel 137 shown in FIG. 13, PLC 132 activates motors 202*a*, 202*b* to rotate fingers 200*a*, 200*b* outwards, so that they engage respective lower major panels F and H may be rotated outwards, about their respective fold lines with respective major side panels D and B. The amount of rotation is sufficient to ensure that there will be no interference with the subsequent inward rotation of lower minor panels G and J and no contact is made with adhesive that is on inward surfaces of lower major panels F and H, such as respective adhesive lines 1001, 1002 and 1003, 1004 (FIG. 1).

Figure 16:
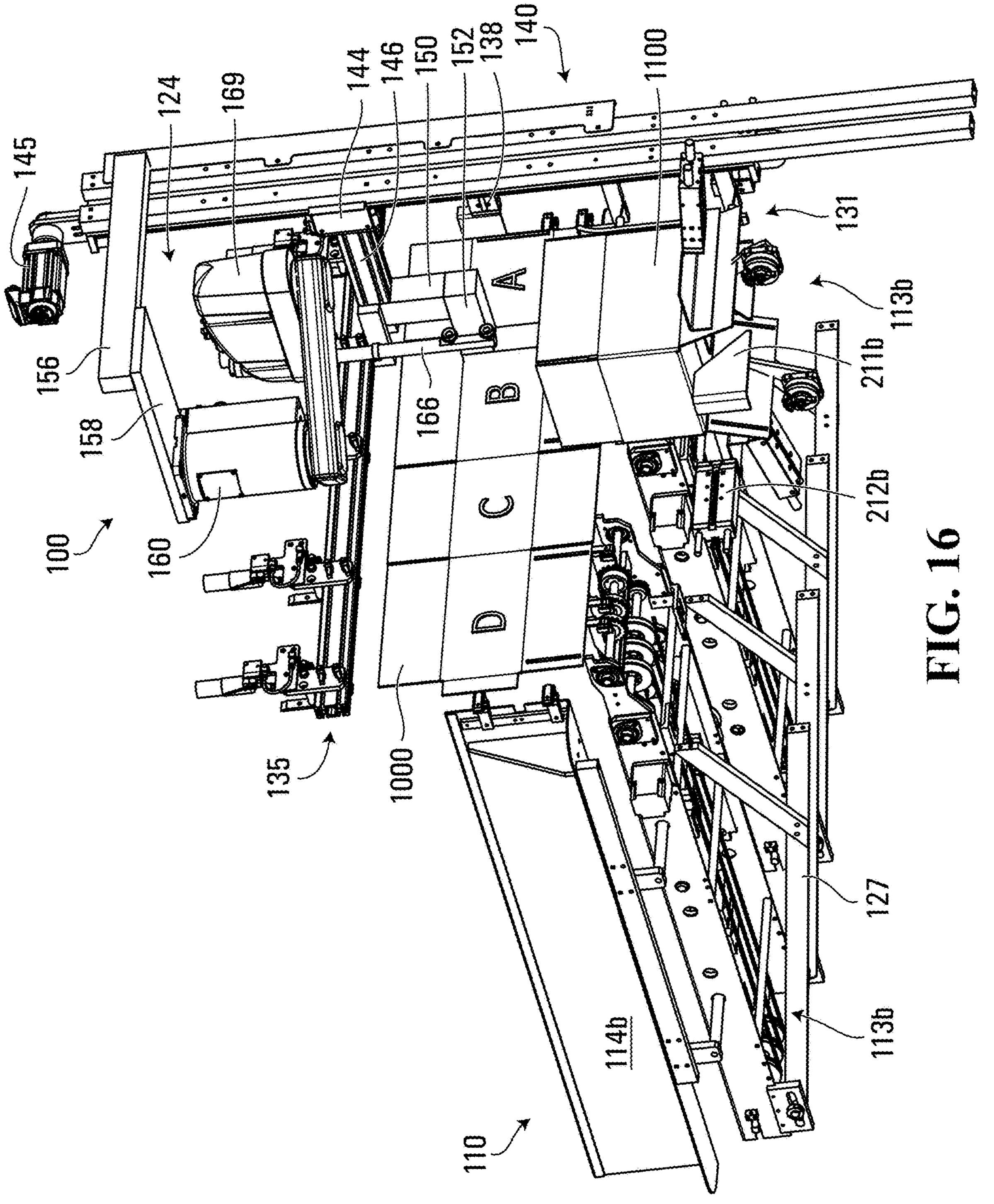
FIG. 16 is an lower, left front perspective view of the system of FIG. 2 in a seventh operational position.
Figure 17:
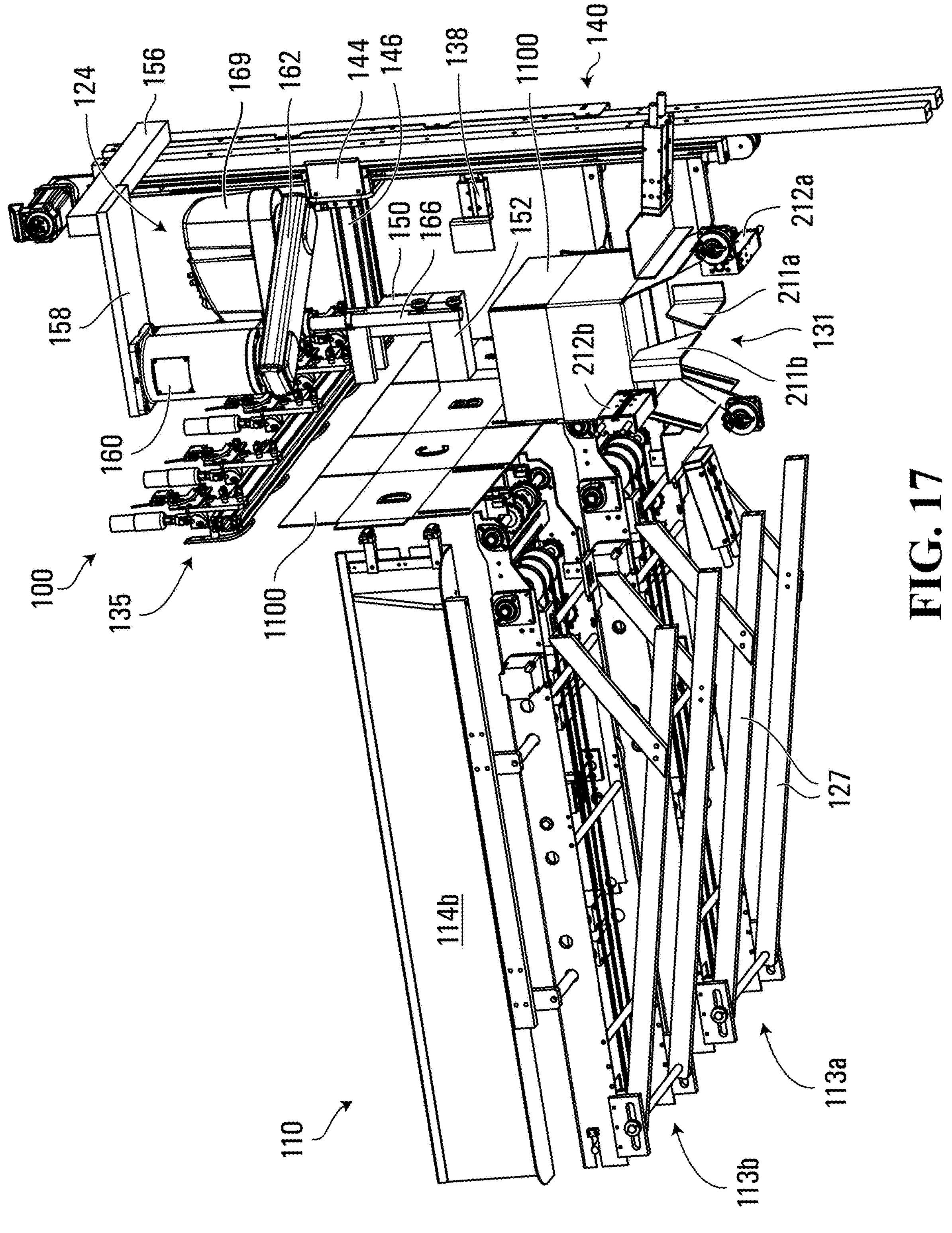
FIG. 17 is a lower, left side perspective view of the system of FIG. 2 in the seventh operational position.

Next, with reference to FIGS. 16 and 17, PLC 132 activates pneumatic cylinders 212*a*, 212*b* to cause plough plates 211*a*, 211*b* to be extended transversely inwards to rotate lower minor panels G and J respectively inwards, preferably about 90 degrees, about their respective fold lines with respective major side wall panels C and A.

Figure 18:
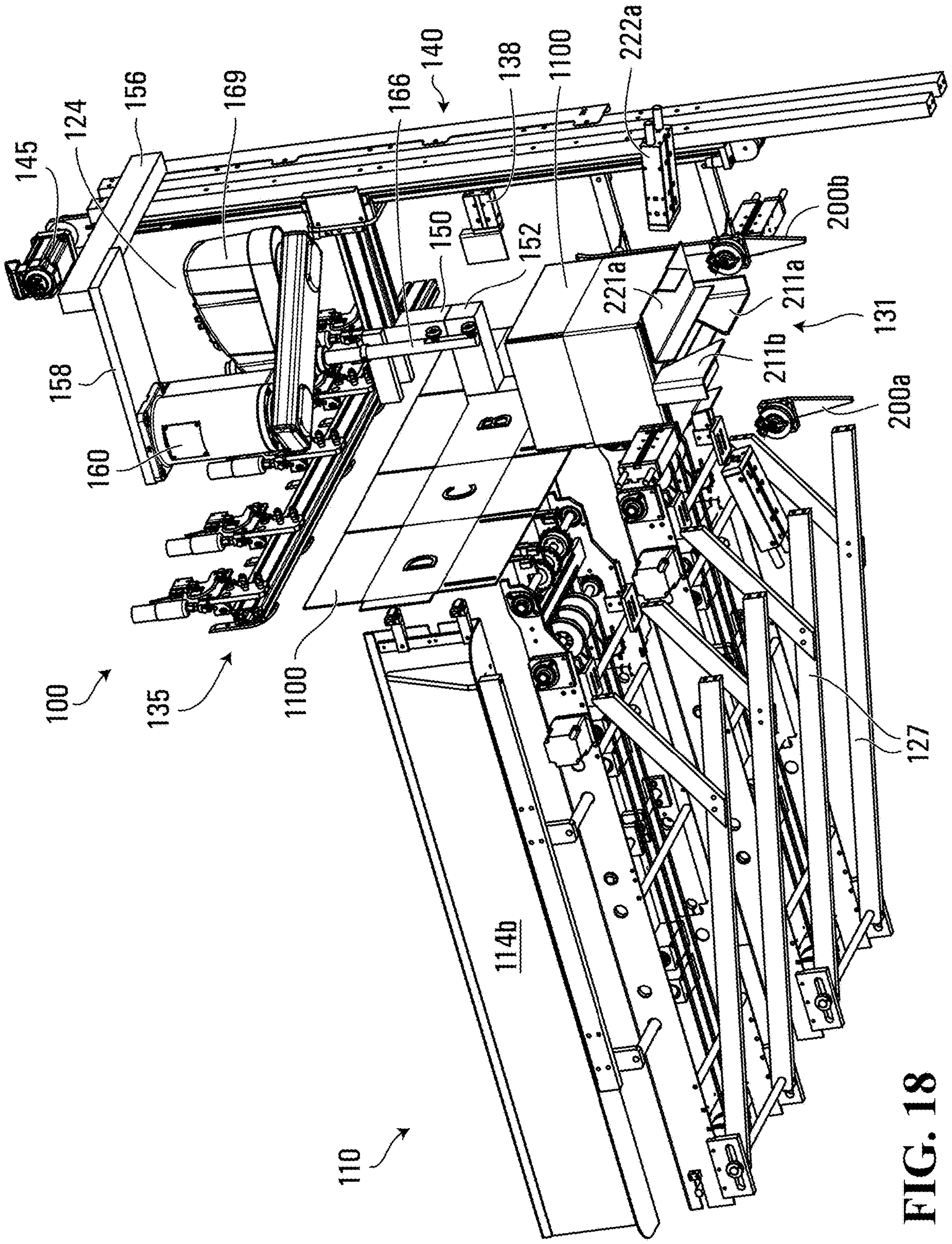
FIG. 18 is a lower, left front perspective view of the system of FIG. 2 in an eighth operational position.

Next with reference to FIG. 18, PLC 132 activates motors 202*a*, 202*b* to rotate fingers 200*a*, 200*b* inwards it a vertically downward position, so that they no longer engage with lower major panels F and H, so that lower major panels F and H may be rotated inwards, about their respective fold lines with respective major side panels D and B. The amount of rotation of fingers 200*a*, 200*b* is sufficient to ensure that there will be no interference with the subsequent inward rotation of lower major panels F and H.

Also as shown in FIG. 18 and in FIG. 19, next PLC 132 will cause pneumatic cylinders 222*a*, 222*b* to be operated to cause plough plates 221*a*, 221*b* to be extended transversely inwards to rotate lower major panels F and H respectively inwards, preferably about 90 degrees, about their respective fold lines with respective major side wall panels D and B. The amount of rotation is sufficient to ensure that there will be contact between inner surfaces of lower major panels of lower major panels F and H and the outer surfaces of lower minor panels G and J such that the lines of adhesive 1001, 1002 on the inward surface of panel F, and lines of adhesive 1003, 1004 on inward surface of panel H will cause panels F to fixedly connect with both panels G and J, and cause panel H to fixedly connect with both panels G and J such that blank 1000 is formed into a generally rectangular shaped, open top case (see also step 1000(9) in FIGS. 2A and 2B). There is a sufficient gap present between lower major panels F and H when they are rotated to permit the plough plates 211*a*, 211*b* to remain in position to hold panels J and G in a suitable orientation for engagement with panels F and H.

Next with reference to FIG. 20, PLC 132 activates pneumatic cylinders 212*a*, 212*b* to cause plough plates 211*a*, 211*b* to retract transversely outwards. Next PLC 132 activates activating cylinder 222*a*, 222*b* to cause plough plates 221*a*, 221*b* to be retracted transversely outwards as shown in FIG. 21.

Lift platform 104 may be operated along with upward facing suction cups 103 to assist in "handing off" a formed case from mandrel 137 to case conveyor 102. The lift platform 104 may be vertically movable upwards and along with suction cups 103 and corresponding suction cup valves (not shown) be controlled by valves and PLC 132 may be operated to engage the bottom of the case. PLC 132 may also cause suction cups 183 to be deactivated, thus releasing the case from engagement with mandrel 137. Mandrel 137 may then be moved upwards back to the start position. Lift platform 104 may move suctions cups 103 to engage and hold the blank (which has become a formed case) in position during disengagement of the mandrel 137 from the formed case. Then lift platform 104 may be lowered to position the formed case onto the case conveyor for discharge for filling, packing and top sealing. Suction cups 103 may then be deactivated allowing case conveyor 102 to move the formed case from case forming system 100.

The formed, open top case, may be moved away to another location, and may subsequently be filled with one or more items/other cases and thereafter the upper major panels N and L, may be folded along with upper minor panels M and K, to close and seal the completed case.

The foregoing cycle can be repeated multiple times to form multiple cases. It is anticipated that cartons may be formed at a rate of in the range of about 10 to about 50 cases per minute depending on the overall dimensions of the case and the size of the machine but other rates of operation are also possible and contemplated. In general, the smaller the case blank that is being processed, the faster will be the case forming rates.

As discussed above, when it is desired to change the type/configuration of case to be formed, using a different type/configuration of case blank 1000, case forming system 100 can be quite easily modified. For example, one mandrel 137 can be replaced by a differently configured mandrel. PLC 132 may be pre-programmed to make adjustments to the operation of other components in particular to the operation of the first, third and fourth panel rotating apparatuses and the position of compression rail 195. Additionally, it may in some circumstances be necessary to adjust the positioning and movements of some components of third panel rotating apparatus 131 such as fingers 200*a*, 200*b*; plough devices 210*a*, 210*b*, and their plough plates 211*a*, 211*b*; and plough devices 220*a*, 220*b*, and their plough plates 221*a*, 221*b*.

Many variations of the embodiments described above are possible. For example, now with reference to FIG. 26 another alternate form of case blank 2000 that may be configured and formed in any similar way to case blank 1000, except that case blank 2000 has panel E adjoined to the outer edge of minor side wall panel A, instead of to major side wall panel D. Also, a line adhesive 2005 is formed on a surface of panel D instead of on sealing panel E.

Figure 27:
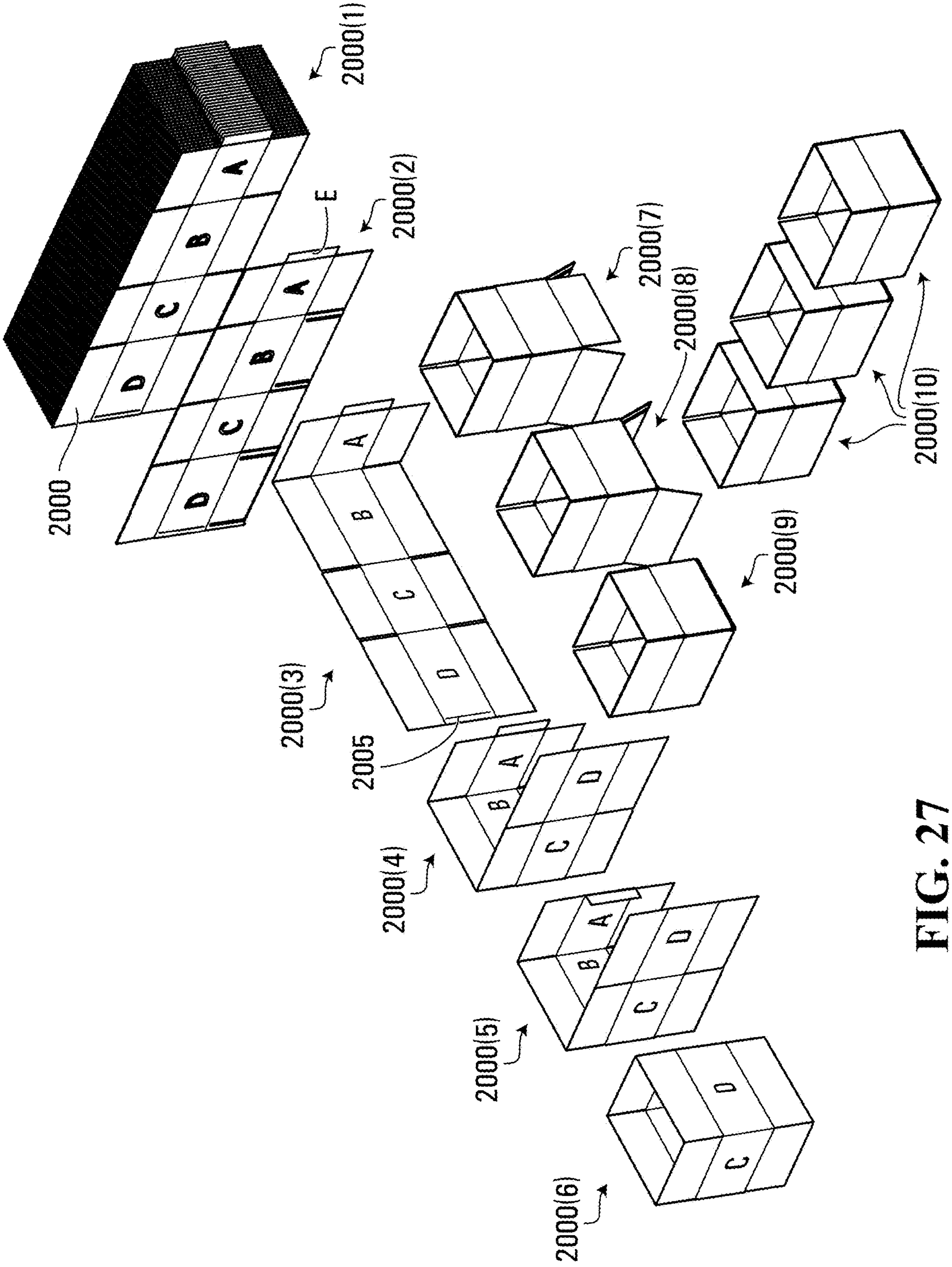
FIG. 27 is schematic view of an alternate example method of forming a case from a case blank.

With reference now to FIG. 27, an example sequence of steps 2000(1) to 2000(10) are shown of folding and sealing a flat blank 2000 to from an open top case that is suitable for top loading of items/other cases.

A plurality of case blanks 2000 may be presented in a stacked arrangement with the blanks each configured in a generally flat and planar configuration [step 2000(1)]. A particular individual case blank 2000 may be identified at/selected from the front of the stack of blanks for processing [step 2000(2)]. In a first folding step 2000(3) side wall panel B along with its respective adjacent upper and lower minor panels L and H, along with minor side wall panel C and its respective adjacent upper and lower minor panels M and G, along with major side wall panel D and its respective adjacent upper and lower major panels N and F, can all be rotated from the orientation shown at 2000(2), so that panel B is rotated 90 degrees in a counter clockwise direction about the vertically oriented fold line between side wall panels A and B, to the configuration as shown at step 2000(3). In the next folding step 2000(4), minor side wall panel C and its respective adjacent upper and lower minor panels M and G, along with major side wall panel D and its respective adjacent upper and lower major panels N and F, are all rotated counter clockwise so that panel C is rotated 90 degrees about the vertically oriented fold line between side wall panels B and C, to the configuration shown in FIG. 27 at step 2000(4).

In folding step 2000(5), sealing panel E is rotated clockwise 90 degrees about the vertically oriented fold line between panel E and panel A. This step can be done in any time prior to the next step 2000(6). In the next step 2000(6) major side wall panel D and its respective adjacent upper and lower major panels N and F are rotated counter clockwise 90 degrees about the vertically oriented fold line between side wall panel C and side wall panel D to the configuration shown at 2000(5). In this folding step the adhesive line 2005 on the inner surface of panel D will engage with the outward facing surface of sealing panel E such that sealing panel E may engage and become permanently connected to major side wall panel D. The result at the end of this step, as depicted at 2000(6), case blank 2000 is formed into a generally rectangular shaped tube. While not shown in FIG. 27, folding steps from case blank orientations depicted at 2000(3) to 2000(6) may be carried out in such manner the panels are wrapped about a centrally positioned mandrel, as is described hereinafter.

The remaining steps to configurations shown from 2000 (7) to 2000(10) may be substantially the same as the steps 1000(7) to 1000(10) as illustrated in FIGS. 2A and 2B and represent a sequence of steps that may be utilized to close and seal the lower major and minor panels, F, H and G, J respectively to close and seal the bottom of the case blank 2000 to form an RSC case with an open top.

Now with reference to FIGS. 28-32, a case system 2100 is disclosed which may be substantially the same as case forming system 100 except as varied as shown in schematic illustrations in FIGS. 28-32 with reference to the following description. In overview, a first panel rotating apparatus 2134 is positioned relative to a stack of blanks (stack not shown) like blanks 2000 held in a magazine 2110 (like magazine 110), with the mandrel 2137 when positioned at a pick-up positon to pick-up the front blank in the stack, being located transversely and vertically in front of panel A of case blank 2000. In this way, first panel rotating apparatus 2134 is able to wrap each of panels B, C and D around corresponding side walls of mandrel 2137, and engage with sealing panel E, which may be rotated clockwise 90 degrees about the vertical fold line with panel E. Thus by use of just a first panel rotating system 2134 and a second panel rotating apparatus 2138, a generally flat case blank 2000 held in magazine 2100 can be formed into a tubular shaped blank around mandrel 2137. Thereafter bottom panels can be closed with another panel rotating apparatus which may be like third panel rotating apparatus 131, as described above in relation to system 100, to form an open top, case from case blank 2000. In some other embodiments only a single panel rotating apparatus may be required to wrap the blank around a mandrel.

Figure 26:
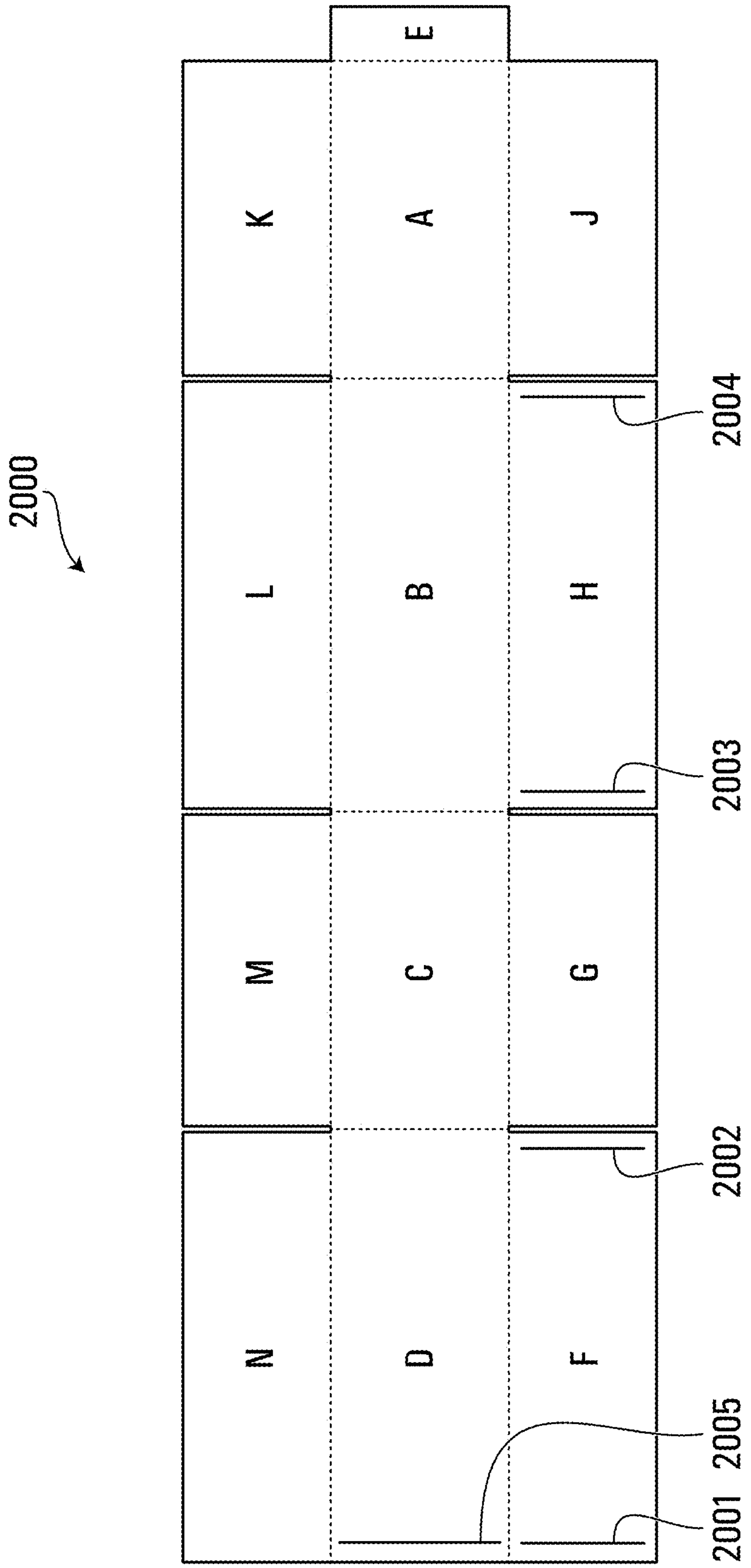
FIG. 26 is a top plan view of an alternate blank.
Figure 28:
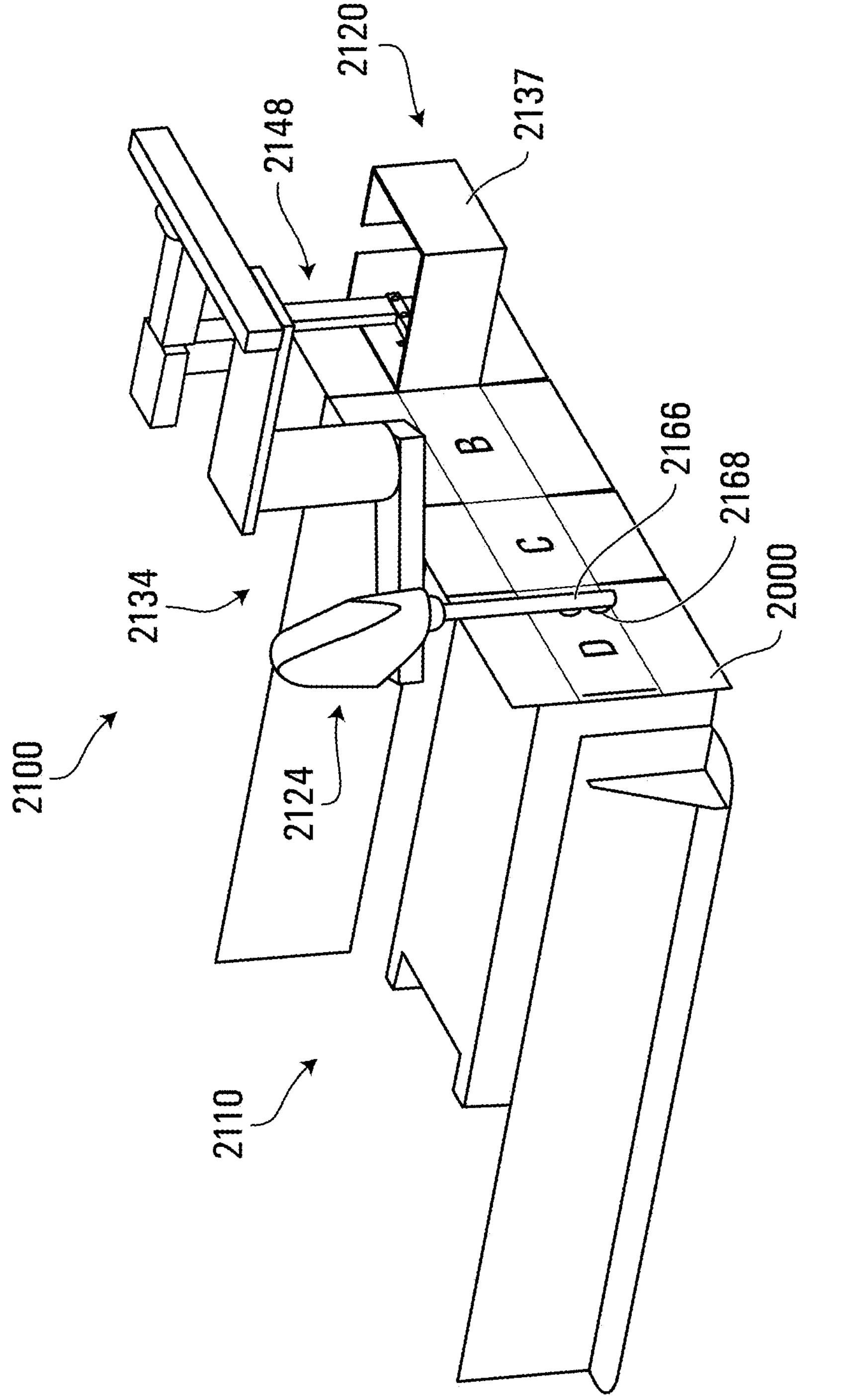
FIG. 28 is an upper, left front perspective schematic view of an alternate case forming system in a first operational position.
Figure 29:
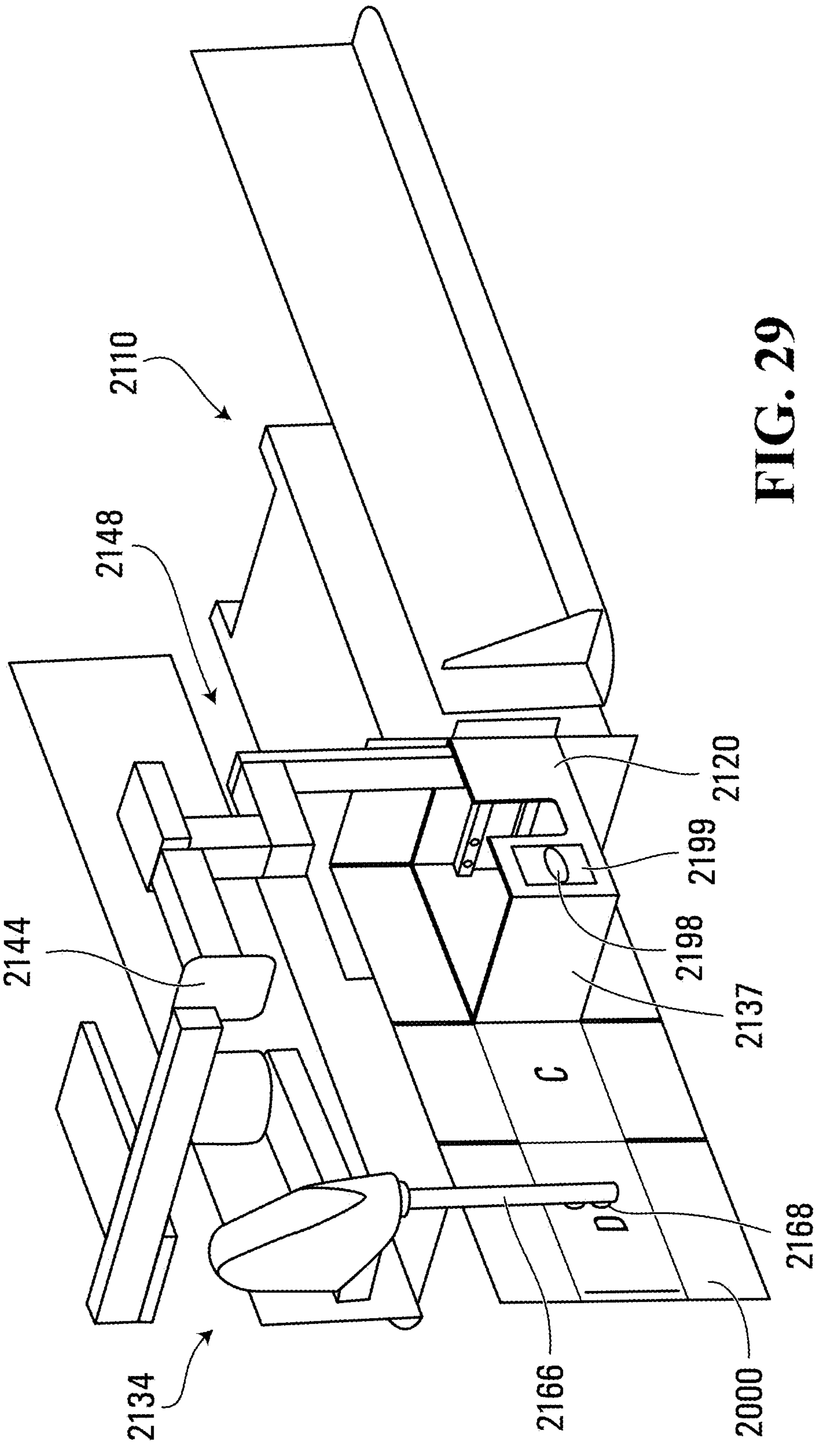
FIG. 29 is an upper, right front perspective view of the case forming system of FIG. 28, in a second operational position.

System 2100 may include a magazine 2110 like magazine 110 adapted to hold a plurality of case blanks 2000 in a substantially flat orientation such as is shown in FIG. 28 (only one case blank 2000 is shown for clarity). Case blanks 2000 may generally be like blanks 1000, except with respect to an alternative positioning of sealing panel E, as shown in FIG. 26. System 2000 may also include a mandrel apparatus 2120 (including a mandrel 2137) and a panel rotating sub-system 2134 (designated in FIG. 4).

Panel rotating sub-system 2134 may include a first panel rotating apparatus 2124 which may be generally like panel rotating apparatus 124. A controller (not shown) like PLC 132 may be programmed to provide a different sequence of movement for first panel rotating apparatus 2124 compared to the sequence of movement of first panel rotating apparatus 124 described above in system 100. Panel rotating sub-system 2134 may also include a second panel folding apparatus 2138 that is like panel folding apparatus 138, but arranged and oriented to move in a longitudinally opposite direction to panel folding apparatus 138, so it can fold panel E in a clockwise direction 90 degrees relative to panel A of blank 2000, as described further hereinafter. System 2100 may also include a third panel rotating apparatus (not shown) that may function like third panel rotating apparatus 131, to close the lower panels F, G, H and J, in a manner similar to that described above.

Case forming system 2100 may also include a mandrel apparatus 2120 similar to mandrel apparatus 120 with a mandrel 2137, and an adhesive applicator apparatus 2135 (only shown in FIG. 32 for simplicity) that may be substantially the same as adhesive applicator apparatus 135 and include adhesive applicators 2133*a-e* with nozzles that are mounted on transversely oriented support beam 2149. Mandrel apparatus 2120 may be interconnected to adhesive applicator apparatus 2135 and operable for vertical up and down movement together, like that described above in case forming system 100. Case forming system 2100 may also include a vertical support frame and a vertical mandrel movement apparatus also like those described above in relation to case forming system 100. The operation of the components of carton forming system 2100 may be controlled by a controller like PLC 132.

A generally vertically oriented support frame (not shown) that may be like support frame 140, may support a vertical mandrel movement apparatus (also not shown) like mandrel movement apparatus 136. Mandrel movement apparatus may include a generally vertically oriented linear rail (not shown) like linear rail 142 but which may support for sliding upward and downward sliding vertical movement a carriage block 2144 (FIG. 29) which may be like carriage block 144. The movement of carriage block 2144 on linear rail may vertically aligned with panel A of a case blank 2000 held in magazine 2110 and may be driven by a drive belt (not shown) interconnected to carriage block 144 and supported by vertical support frame, like with case forming system 100.

Figure 32:
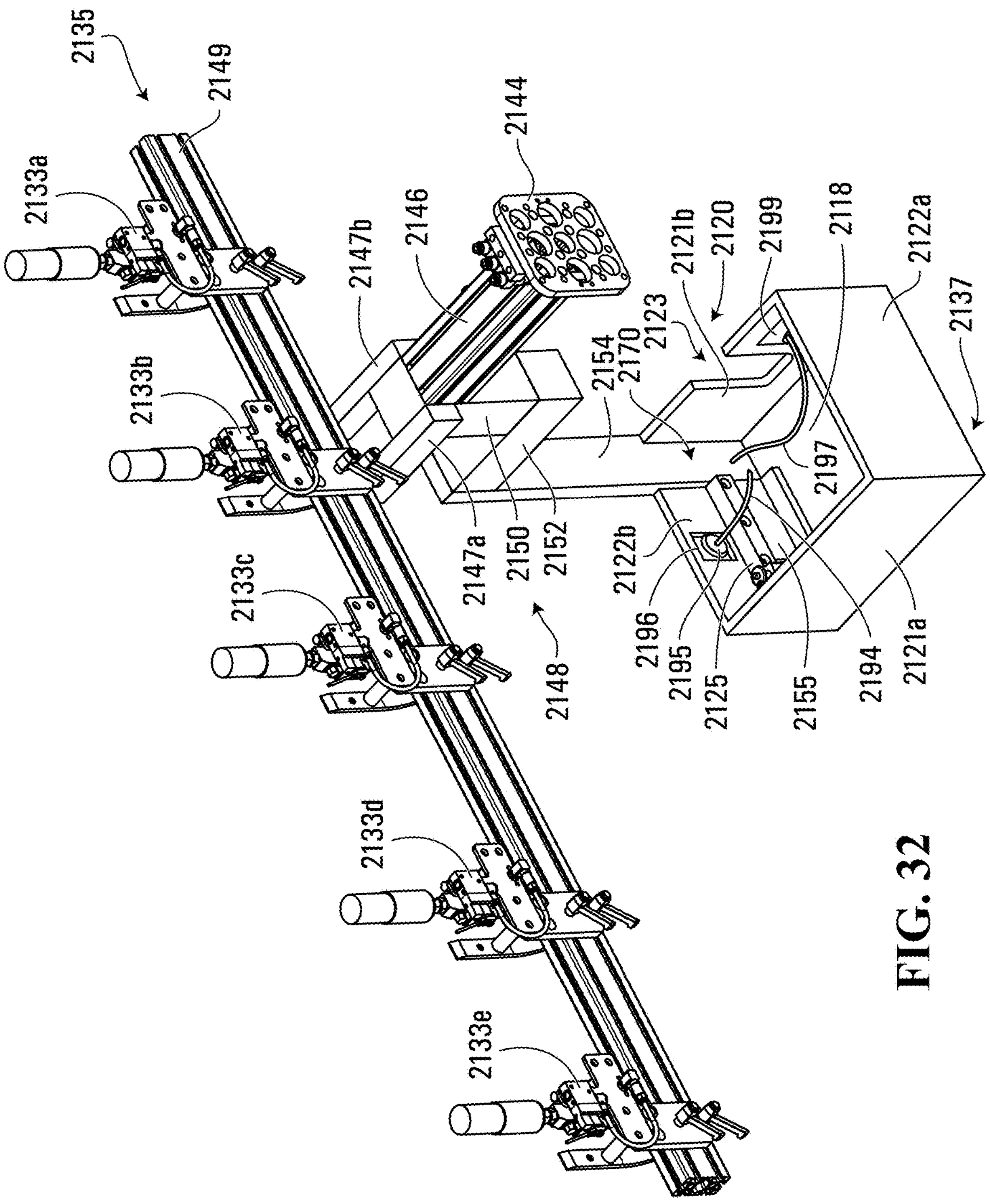
FIG. 32 is an upper, perspective view of some components of the case forming system of FIG. 28 shown in isolation.

With reference to FIG. 32, mandrel apparatus 2120 may have several components including a mandrel 2137 and a mandrel support apparatus generally designated 148. Mandrel 2137 may be easily removable from mandrel support apparatus 2148, so that a mandrel of one configuration may be easily replaced with a mandrel of another configuration. Mandrel 2137 may comprise a pair of opposed, spaced, vertically and transversely oriented, spaced, major side walls 2121*a*, 2121*b* interconnected with a pair of opposed, spaced, vertically and longitudinally oriented, spaced minor side walls 122*a*, 122*b*. A generally horizontally and transversely oriented bottom wall 2118 is interconnected to major and minor side walls 2121*a*, 2121*b*, 2122, 2122*b* to form a generally cuboid, open top, box shape. Mandrel 12 may be generally configured in a variety of different sizes and shapes, each selected for the particular type of case blank 2000 that are to be formed into cases.

The dimensions of the outer surfaces of mandrel 2137 may be selected so that the specific case blank 2000 that it is desired to fold has, during the forming process, fold lines that are located substantially at or along the four corner vertical side edges and the four corner horizontal bottom edges of mandrel 2137. Mandrel 2137, and surrounding components in system 2100, may be configured to permit for the easy interchange of mandrels 2137 so that case forming system 2100 can be readily adapted to forming differently sized/shaped cases from differently configured case blanks 2000.

Figure 31:
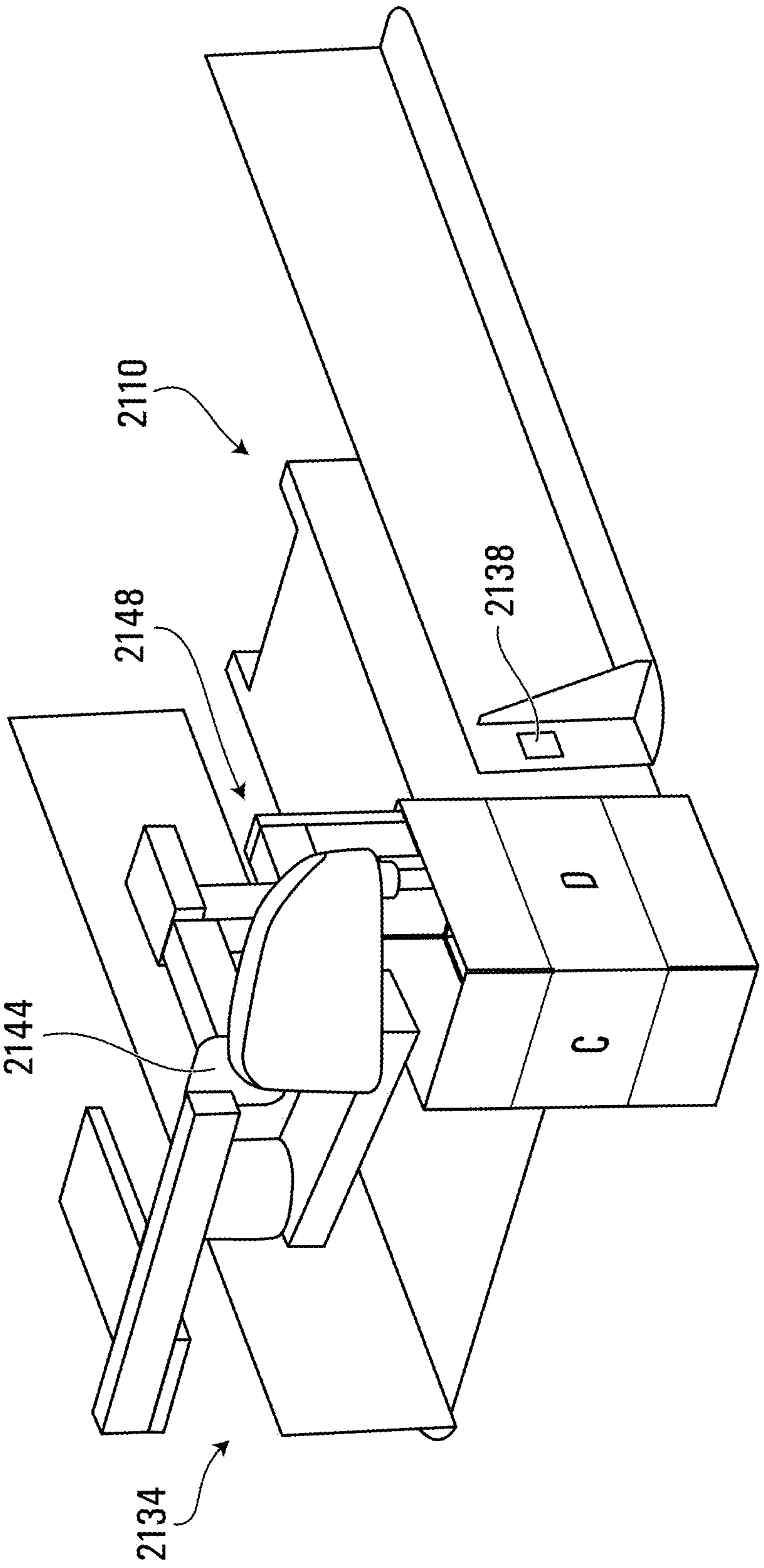
FIG. 31 is an upper, right front perspective view of the case forming system of FIG. 28, in a fourth operational position.

Mandrel side wall 2121*b* may be provided with a vertical slot 2123 that may be configured to permit part of end effector 2166 and suction cups 2168 to move from the position shown in FIG. 28, and pass through slot 2123 to the position shown in FIG. 31. By allowing the end effector 2166 to pass through vertical slot 2123, major side panel D of case blank 1000 may be held substantially flat against the outside surface of major side wall 2121*b* of mandrel 2137.

Mandrel side wall 2122*b* may not extend transversely the full length of bottom wall 2118 and may have a vertical end edge that defines a slot 2170. Mounted to an inward surface of rear side wall 2122*b* may be a releasable mandrel mounting bracket unit 2125. Mandrel mounting unit 2125 may be configured to releasably connect a transversely extending mandrel mounting plate 2155 to mandrel rear side wall 2122*b*, such as having mounting plate 2155 be received into a slot in mounting bracket unit 125, with the plate being releasably held in the slot by a screw of the mounting bracket unit being removably receivable in a threaded aperture of the mounting plate 2155.

Horizontally and vertically oriented mounting plate 2155 can be fixedly connected to an end of vertical mandrel support member 2154. A lower portion of mandrel support member 2154 may also serves to complete the rear side wall of mandrel 2137, when mandrel mounting plate 2155 is received into mounting bracket unit 2125.

Mounted in an opening 2199 in side wall 2121*b* may be one or more suction cups 2198. In some embodiments, to establish a firm connection between the outer surface mandrel wall 2122*b* and the adjacent surface of panel A of a blank 2000 held in magazine 2110, mounted in an opening 2196 in side wall 2122*b* may also be one or more suctions cups 2195 (FIG. 32). In other embodiments there may be only suction cups on side wall 2122*b* and in some embodiments suction cups may not be required on either wall 2121*b* or 2122*b* or on any other wall. Friction or other forces may be sufficient to hold the tubular shaped blank once formed on the mandrel, during subsequent folding of the lower panels.

Suction cups 2195 and 2198, if present, may be supplied with pressurized air controlled by valves (not shown) operated by the PLC. Air suction cups 2195 and 2198 may be interconnected through hoses 2194 and 2197 respectively passing through cavities (not shown) in vertical support member 2154, longitudinally oriented mandrel support member 2152, second vertical mandrel support member 2150 and longitudinally oriented and carriage support arm 2146 and carriage 2144 to a source of vacuum by providing for one or more air channels carrying pressurized air through the aforesaid components. The supply vacuum to suction cups 2195 and 2198 may be controlled by pressurized air distribution unit which may include a plurality of valves that may be operated by the PLC and may also include local vacuum generator apparatuses that may be in close proximity to, or integrate as part of, suction cups 2195 and 2198. With local vacuum generators utilized in close proximity to suction cups 2198, pressurized air may be delivered from an external source through air distribution unit to the vacuum generators. The local vacuum generators will then convert the pressurized air to vacuum that can then be delivered to suction cups 2195 and 2198.

An air suction force that may be developed at the outer surfaces of suction cups 2195 that is may be sufficient so that when activated they can engage with and hold panel A to mandrel side wall 2122*b*, as the rest of case blank 2000 is wrapped around mandrel 2137. The vacuum generated at suctions cups 2195 can be activated and de-activated by the PLC through operation of distribution unit.

The air suction force that may be developed at the outer surfaces of suction cups 2198 will be sufficient so that when activated they can engage and hold panel D and the rest of case blank 2000 wrapped around mandrel 2137 on the mandrel including during vertical downward movement to close the bottom panels. The vacuum generated at suctions cups 2198 can be activated and de-activated by PLC through operation of distribution unit.

Horizontally and vertically oriented mounting plate 2155 may be fixedly connected at an outer end to a lower end portion of vertical mandrel support member 2154. An opposite, upper end of vertical mandrel support member 2154 may be fixedly connected to a first end of a longitudinally oriented mandrel support member 2152. An opposite second end of longitudinally oriented mandrel support member 2152 may be fixedly connected to a first end of a second vertical mandrel support member 2150. A second opposite end of second vertical mandrel support member 2150 is fixedly attached to a first end of longitudinally oriented and extending carriage arm 2146. Proximate the connection location of mandrel support member 2150 and carriage arm 2146 may be mounted to opposite outer surfaces of vertical mandrel support member 2150, a pair of spaced and opposed, longitudinally oriented support blocks 2147*a*, 2147*b* which can be used to secure adhesive applicator apparatus 2135. Mandrel side wall 2122*b*, with its mounting plate 2125 can facilitate the support of mandrel 2137 on mandrel support frame 2148.

Vertical mandrel support member 2150 can be fixedly attached at is upper end portion to a first end portion of longitudinally oriented and extending carriage arm 2146. The opposite end portion of longitudinally oriented and extending carriage arm 146 is fixedly connected to carriage block 2144. Carriage block 2144 can be attached for sliding vertical upward and downward movement on a vertically oriented linear rail.

First vertical support member 2154, longitudinally oriented mandrel support member 2152, second vertical mandrel support member 2150 and longitudinally oriented and carriage support arm 2146 and carriage 2144 may be appropriately configured to permit electrical and communication cables and pressurized air/vacuum air hoses to pass through from an upper end to a lower end where operational components of mandrel apparatus 2120 are located. In this way, electrical power/communication cable and air hoses can deliver power, electrical signals and pressurized air/vacuum to the mandrel 2137 and second panel rotating apparatus 2130 which is mounted on mandrel 2137.

It will also be appreciated that in first panel rotation apparatus 2124 with suction cups 2198 and 2195, suction cups are used to apply a force to move and hold to mandrel 2137 panels of a case blank 2000.

Just like with mandrel 137 in system 100, the start position of mandrel 2137 in system 2100 will typically be a vertically downward position, where the adhesive ejection nozzles of the adhesive applicators are below the level of the bottom edge of case blank 2000 held in magazine 2110. Then, under control of PLC, the vertical movement apparatus can cause mandrel apparatus 2120 including mandrel 2137 to move vertically upwards. In doing so, ejection nozzles of adhesive applicators can be operated by PLC over a suitable range of upward movement, to apply adhesive to respective panels D, F and H. PLC 132 is able to activate adhesive applicators at a suitable vertical location because signals received from the encoder associated with the servo drive motor. Adhesive applicators will then apply adhesive lines 2001, 2002, 2003, 2004 and 2005 as shown in FIG. 26, to the outward facing surface of the front case blank 2000 in magazine 2110, while the front case blank is in the pick-up position.

Next, under control of the PLC, magazine 2110 and first panel rotating apparatus 2124 may co-operate so that suction cups (not shown) on end effector 2166, engage and hold the outward facing surface of major side wall panel D, and pull panels N/D/F; M/C/G and L/B/H from a clip mechanisms (not shown), while another clip mechanism (not shown) holding panels K/A/J in the pick-up position in the magazine.

First panel rotating apparatus 2124 can then rotate all of major side wall panel D along with panels N/F; M/C/G; and L/B/H, 90 degrees in a counter clockwise direction about the vertical fold line between side wall panels B and A, to the configuration shown in FIG. 29, where major side wall panel B has an inward surface held against the outer surface of mandrel side 2121*a* (see also step 2000(3) in FIG. 27).

Figure 30:
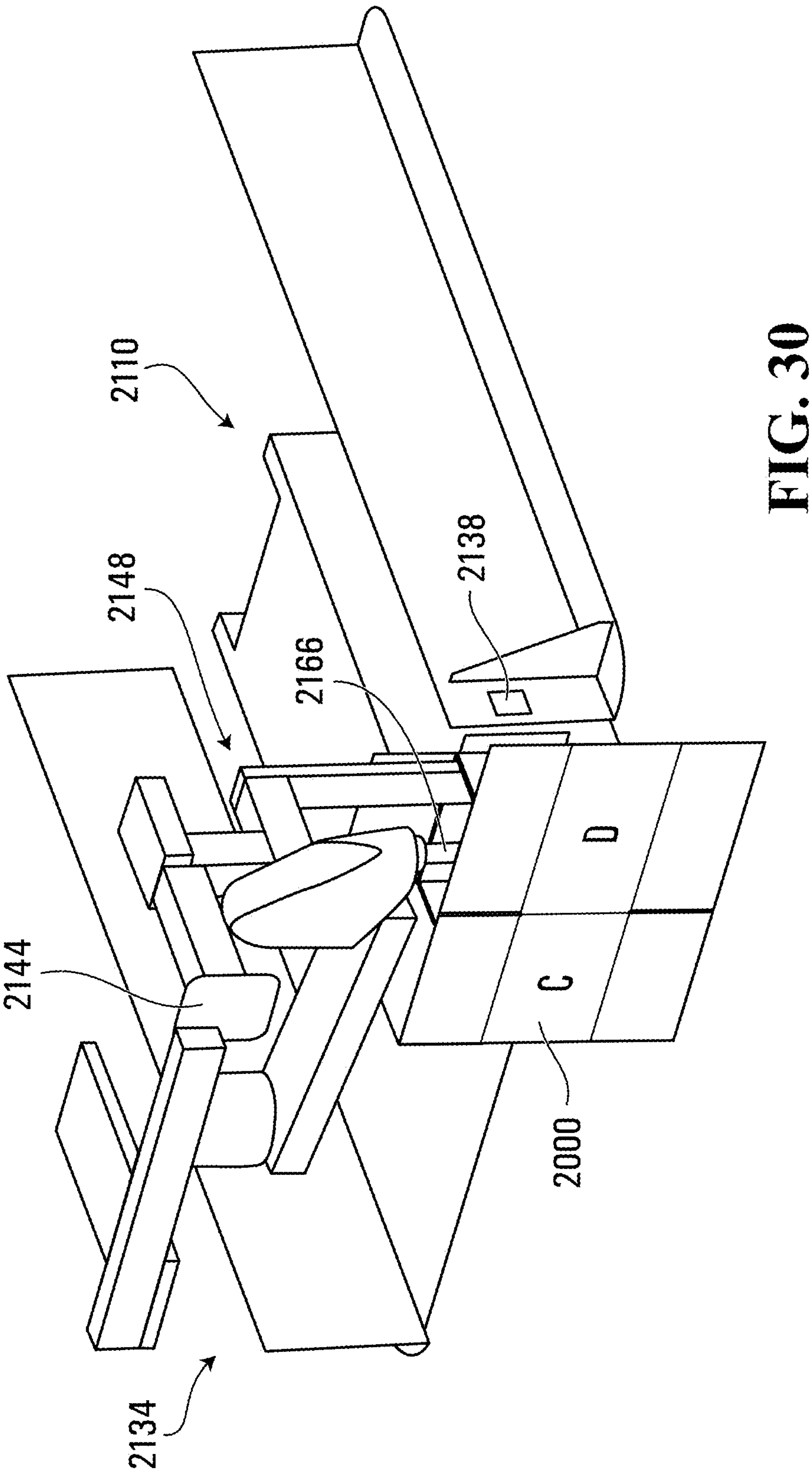
FIG. 30 is an upper, right front perspective view of the case forming system of FIG. 28, in a third operational position.

In the next folding step, PLC causes first panel rotating apparatus 2124 to rotate side wall panel D and its respective adjacent upper and lower major panels N and F, along with panels M/C/G, together, counter clockwise 90 degrees about the vertical fold line between side wall panels C and B, to the configuration shown in FIG. 30, where major side wall panel C has an inward surface held against the outer surface of mandrel side wall 2122*a*, (see also step 2000(4) in FIG. 27).

In the next folding step, PLC causes plough plate of panel rotating apparatus 2138 to extend longitudinally causing sealing panel E to be rotated clockwise 90 degrees about the vertical fold line between sealing panel E and side wall pane A to the configuration (see step 2000(5) in FIG. 27).

In the next folding step, the PLC can cause panel rotating apparatus 2124 to rotate side wall panel D and its respective adjacent upper and lower major panels N and F, counter clockwise 90 degrees about the vertical fold line between side wall panels D and C, to the configuration shown in FIG. 31, where major side wall panel D has an inward surface held against the outer surface of mandrel side wall 2121*b*, (see also step 2000(6) in FIG. 27). In moving to this position, part of end effector 2166 and suction cups 2168 can slide thorough slot 2123 to a position where suction cups are still able to engage with the inward directed surface of panel D of case blank 2000. Also, as panel D is approaching the position shown in FIG. 31, where a large portion of side wall panel D is held against the outer surface of mandrel side wall 2121*b*, PLC can cause the plough plate of panel rotating apparatus 2138 to retract allowing an outward facing surface of sealing panel E to engage with an edge portion of the inward facing surface of side wall panel D, and wherein the surface of sealing panel E becomes connected to side wall panel D as a result of adhesive line D005 bonding the two panels together.

The result at the end of this step is that blank 2000 is formed into a generally rectangular shaped tube, such that panels A-E have been wrapped about a centrally positioned mandrel 2137 as shown in FIG. 31 (see also step 2000(6) in FIG. 26) while being held by panel rotating apparatus 2134 on a surface that will become an interior surface of the tubular shaped blank.

The remaining steps to close and seal the bottom panels F, G, H and J can be carried out by case forming system 2100 in the same manner as case forming system 100 closes and seals the bottom panels of case blank 1000. In carton forming system 2100 the PLC will de-activate suction cups 2168 so that only suction cups 2198 hold case blank 2000 on mandrel 2137 allowing mandrel 2137 with tubular case blank 2000 secured thereto, to be move vertically downwards.

Many other variations of the embodiments described above are possible. By way of example, in some other embodiments, a first panel rotating apparatus like panel rotating apparatuses 124 or 2124 may be employed and configured to on its own engage a suitable case blank and wrap the case blank around a mandrel while holding the case blank on one or more surfaces that will form an interior surface of a tubular shaped case blank. Similarly, there are other embodiments where while a case blank is being held in a magazine with a surface exposed, adhesive is applied to the exposed surface of the blank prior to it being removed from the magazine for folding into a case that is suitable to be loaded.

By way only of another example, in some other embodiments, case blanks that are not used to form substantially cuboid shaped boxes, may be formed with a modified system. For example, the initial rotation of one portion of the blank from a generally flat configuration of the entire blank, may for example be only in the range of from forty-five degrees to ninety degrees onto a correspondingly shaped mandrel Once the first portion has been rotated from the flat configuration to the angled position, the blank is then more readily capable of being engaged by other mechanisms such that a further rotation of other portions of the blank can be carried out wrap the case around the mandrel to form a generally tubular shape. In some applications a mandrel might be employed which has outer surfaces that are not completely at rights angles to each other.

While it is contemplated that system 100 is oriented in a particular mutually orthogonal vertical, transverse and longitudinal frame of reference, systems could, with some other modifications, be provided in other spatial orientations. In such an inverted configuration, a blank could by way of example only, be retrieved from the stack and after being wrapped around a mandrel be moved vertically upwards to close the bottom panels.

Case blanks 1000/2000 may be made of any suitable material(s) configured and adapted to permit the required folding/bending/displacement of the material to reach the desired configuration yet also meet the particular structural requirements for holding one or more items. Examples of suitable materials are cardboard or creased corrugated fiber board. It should be noted that the blank may be formed of a material which itself is rigid or semi-rigid, and not per se easily foldable but which is divided into separate panels separated by creases or hinge type mechanisms so that the carton can be formed.

Figure 33:
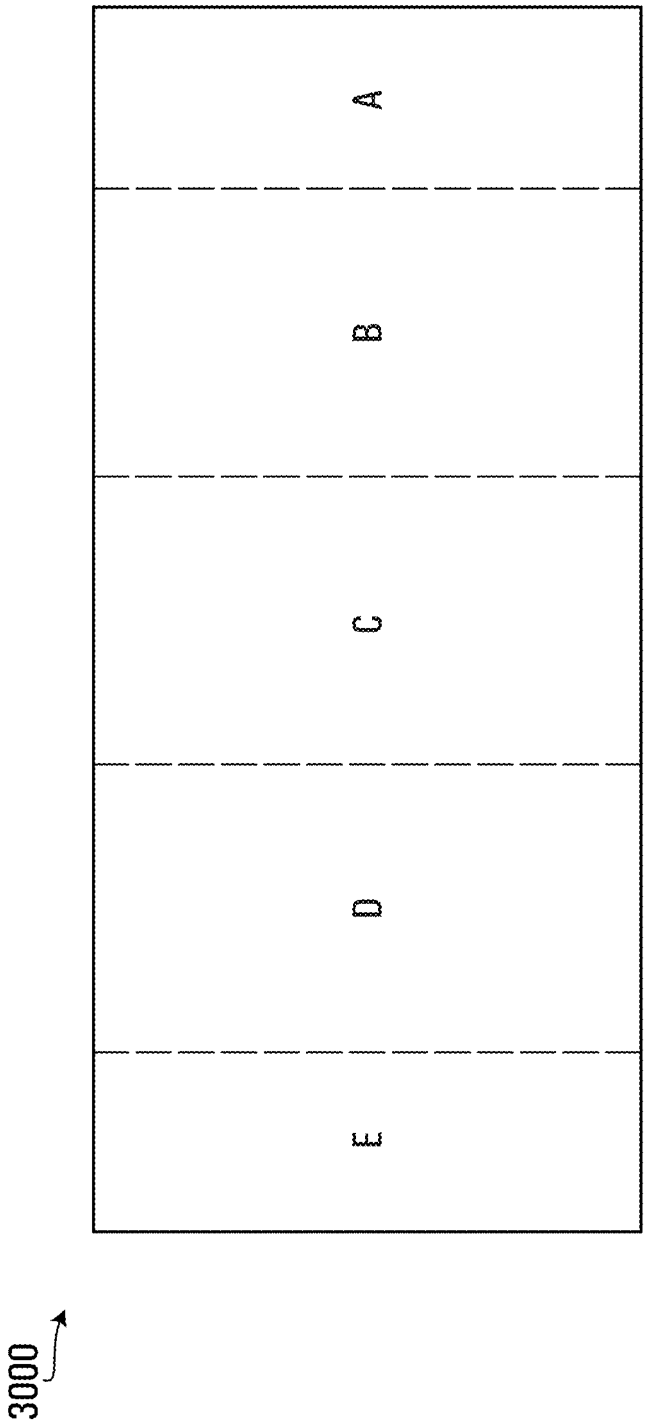
FIG. 33 is a top plan view of an example blank for a can.

With reference now to FIG. 33, a top view of a flat case blank 3000 is illustrated which is suitable to form a sidewall for a paperboard can. Blank 3000 may have a paperboard substrate made from a suitably rigid or semi-rigid paper based material such as paperboard or cardboard. Blank 3000 may also have a polyolefin laminate layer (eg. polyethylene, low-density polyethylene, linear low-density polyethylene, very low-density polyethylene, ultra low-density polyethylene, medium-density polyethylene, high-density polyethylene, ultra high-density polyethylene, ethylene/propylene copolymers, polypropylene, polyisoprene, polybutylene, polybutene, poly-3-methylbutene-1, poly4-methylpentene-1 and polyethylenes comprising ethylene/α-olefin which are copolymers of ethylene with one or more α-olefins such as butene-1, hexene-1, octene-1, or the like) or non-polyolefin laminate inner layer (eg. a polyester resin, a polyamide resin, a polyvinylidene chloride resin, an ethylene-vinyl alcohol copolymer, a polyvinyl chloride resin, an epoxy resin, a polyurethane resin, a polyacrylate resin, a polyacrylonitrile resin and a polycarbonate resin), and an intermediate conducting metal (eg. aluminium) foil layer. The foil layer may be interconnected to, and positioned between the inner layer and the paperboard substrate. Thus, blank 3000 may be a multiple layer blank.

The use of layers of laminated materials comprised of a thermoplastic layer (e.g. polyethylene), a metal foil layer (e.g. aluminium foil), and a paperboard layer in the packaging of food products is well-known. These materials are flexible, and may be gas and moisture resistant, such as for example as disclosed in U.S. Pat. No. 4,637,199 issued Jan. 20, 1987 the entire contents of which is hereby incorporated by reference. Known example methods of producing these laminates include: extrusion coating, roller coating, adhesive bonding, or by pressing the layers together and heating them by an induced radio frequency which causes the thermoplastic to soften and adhere to the other layers (See for example U.S. Pat. No. 3,556,887 issued Jan. 19, 1971 the entire contents of which is hereby incorporated by reference and U.S. Pat. No. 4,060,443 issued Nov. 29, 1977, the entire contents of which is also hereby incorporated by reference).

Blank 3000 may be bendable and/or may be foldable along fold lines from a flat configuration into a tubular side wall configuration that may be sealed at or proximate longitudinal edges, as described below. In top view, blank 3000 when formed into a tubular side wall configuration may, by way of example only, be generally square or rectangular in shape. In other embodiments, blank 3000 may, by way of example, be formed into a tubular shape that is arcuate (eg. circular or oval shaped) in top view.

The portions of the polyolefin laminate inner layer or non-polyolefin laminate inner layer of blank 3000 at the vertical longitudinal edges may be utilized to assist in creating the longitudinal seal.

A case blank 3000 as contemplated herein may be made from a material and/or be formed in a way that is flexible so that it may be re-configured from a generally flat configuration to a generally tubular configuration positioned around the outer surface of a blank support device such as a mandrel, as will be described hereinafter. The case blank 3000 may thereafter be supplemented with a base/bottom component to form a paperboard can with an upper opening to receive one or more items. For example, to form a tubular shaped side wall that is rectangular or square in shape in top view, a blank 3000 may have side wall panels B, C, D and minor side wall panels A and E. Minor side wall panels A and E may have a width that is half the width of sidewall panel C. Panels D and B may have the same width as panel C or a width that is different than the width of panel C.

Fold lines (shown in broken lines) may be provided between adjacent panels A-E. Thus, side wall panel B may be located adjacent to and joined at a vertical side edge along a fold line (all fold lines shown in broken lines in FIG. 33) to a vertical side edge of side wall panel C. Side wall panel C may be located adjacent to and joined at an opposite vertical side edge along a fold line to a vertical side edge of side wall panel D. Side wall panel D may be located adjacent to and joined at an opposite vertical side edge along a fold line to a side edge of minor side wall panel E. Another, opposite side, minor side wall panel A may be may be located adjacent to and joined at an opposite vertical side edge along a fold line to a side edge of side wall panel B. Minor side wall panels A and E may have vertical outer side edge surfaces which as described below, may be brought into abutment with each other and sealed together to provide a continuous longitudinal seal along the abutting panels A and E. The seal may be impermeable to gases and/or liquids.

As indicated, panels A-E may be fixedly connected to and/or integrally formed with, adjacent panels by/along predetermined fold lines. These fold lines may be formed by a weakened area of material and/or the formation of a crease with a crease forming apparatus. The effect of the fold line is such that when one panel such as for example panel A is bent relative to an adjacent panel B, the panels A and B will tend to be pivoted relative to each other along the common fold line.

As will be described hereinafter, the side wall panels A, B, C, D and E, may be folded and sealed to form a tubular configuration that can be then provided with one or more bottom components to provide a sealed and suitably strong bottom. The open top formed paperboard can thereafter be filled with one or more items, and then top sealed with one or more top components such as a top/lid.

Figure 33A:
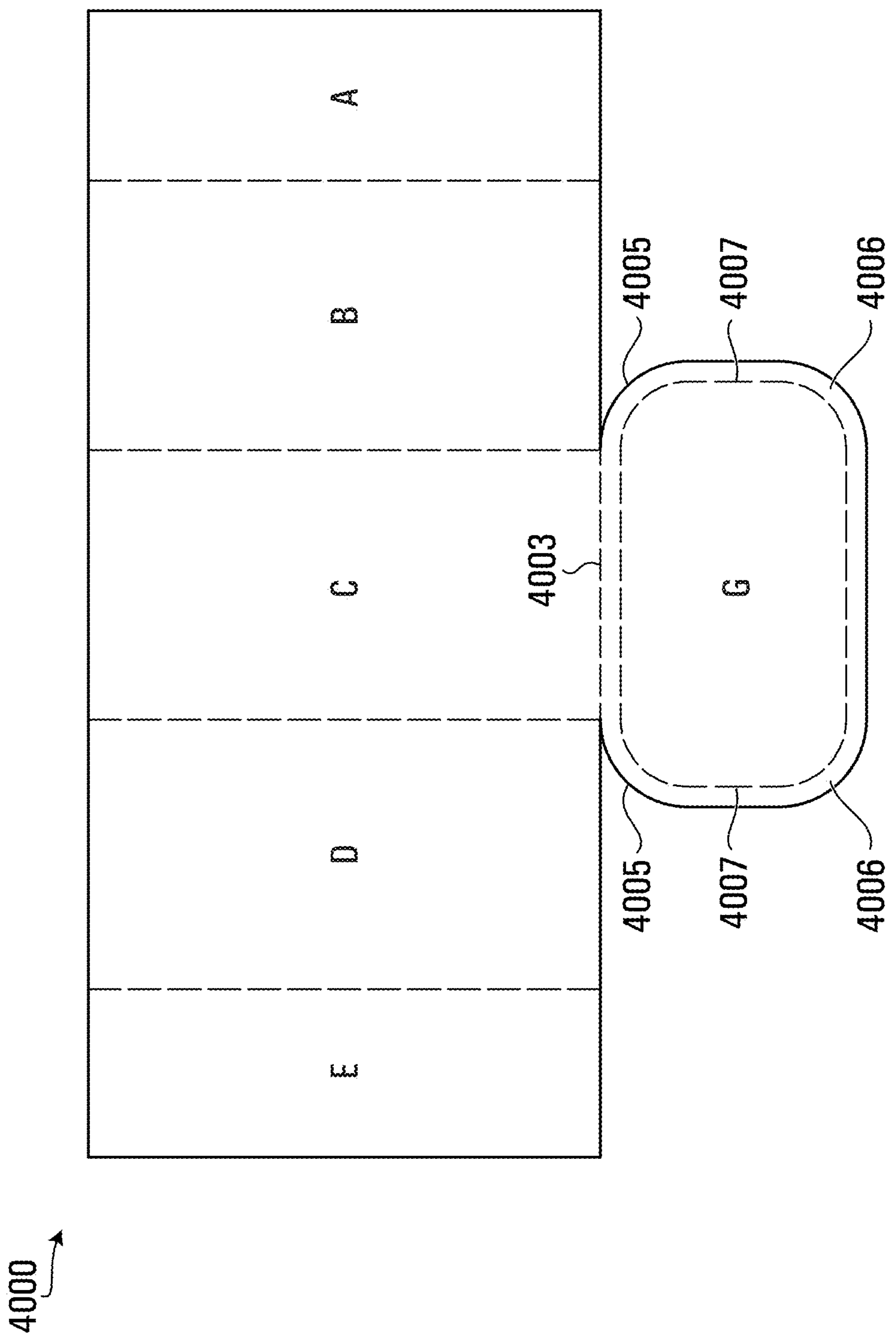
FIG. 33A is a top plan view of an alternate blank for a can.

With reference to FIG. 33A, an alternate flat case blank 4000 to flat case blank 3000, that is also suitable to form a paperboard can, is illustrated. Case blank 4000 may be constructed substantially identically to case blank 3000, but may also include an integrally formed bottom panel G (which provides an opening closure portion) made from the same materials and in the same manner as side wall panels A-E. Panels A-E and G may be formed together and as one continuous, integrally connected unit. Thus, blank Panel G may be integrally connected to side wall panel C along a transverse fold line 4003 at a lower horizontal/transverse edge of panel C. Panel G may also be made of the same multi-layer materials as the remainder of blank 4000 and may be integrally formed therewith. Once the tubular side wall has been formed from panels A-E, panel G may be folded upwards along the lower generally horizontally/transversely oriented fold line 4003 with panel C, to engage with the inward facing surface of the tubular side wall to provide a bottom sealing panel for the paperboard can formed.

Panel G may have an outer perimeter 4005 which is slightly larger than the opening at the bottom of the tubular side wall formed by panels A-E. Panel G may also have a continuous fold line 4007 that generally follows but is spaced inwardly from perimeter 4005. Fold line 4007 and perimeter 4005 define there between, an edge portion 4006 that may be folded at a fold line 4007 downwards and may have an inwardly directed surface portion that provides contact with a lower edge portion of the inner wall surface of the tubular side wall formed by panels A-E. When folded upwards, edge portion 4006 of panel G may engage with lower edge portions of panels A-E to provide a continuous sealed connection between the tubular side wall provided by panels A-E and bottom panel G. This may be accomplished for example by induction heating of the metal foil layer in both the area of edge portion 4006 of panel G and the area of the metal foil layer in lower edge portion of the inner wall of the tubular side wall formed by panels A-E. When those portions are heated and brought into contact with each other, the interfacing surfaces will melt and bond together to form a continuous seal at the bottom of the side wall with panel G.

Figure 33B:
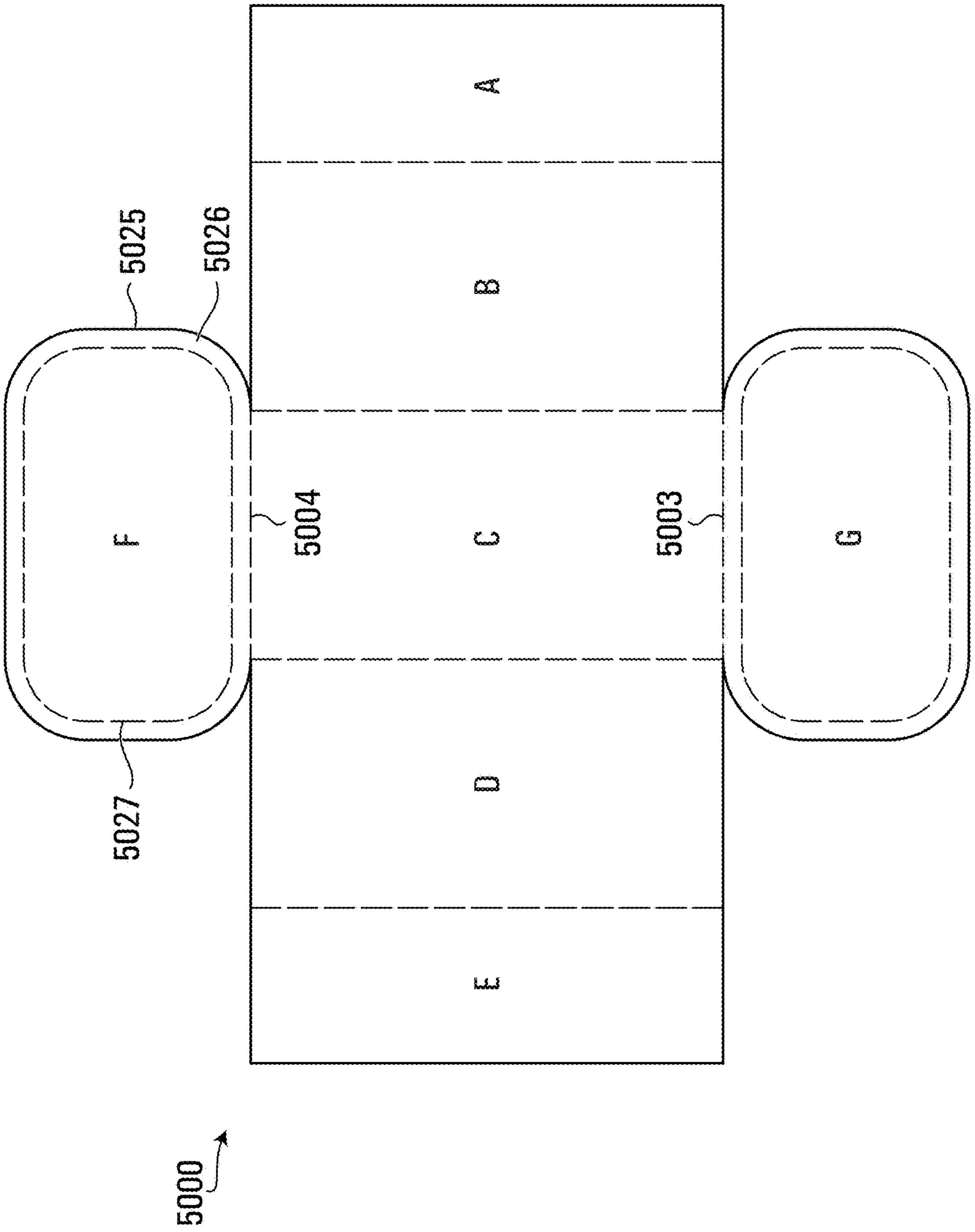
FIG. 33B is a top plan view of another alternate blank for a can.

With reference to FIG. 33B, another alternate flat case blank 5000 to flat case blanks 3000 and 4000, that is also suitable to form a paperboard can, is illustrated. Case blank 5000 may be constructed substantially identically to case blank 4000, with blank 5000 having an integrally formed bottom panel G integrally connected to and extending away from panel C along a fold line 5003. Blank 500 may additionally include an integrally formed top panel F (that may be another opening closure portion) that has is connected to and extends away from side wall panel C along a fold line 5004 at an upper horizontal/transverse edge of panel C. Panel F may also be made of the same multi-layer materials and in the same manner as the rest of blank 5000. Panels A-E, G and F may be formed together and as one continuous, integrally connected unit. Panel F may during formation of a paperboard can, be folded downwards along the generally upper horizontally/transversely oriented fold line 5004. Panel F may have an outer perimeter 4025 which is slightly larger than the opening at the bottom of the tubular side wall formed by panels A-E. Panel F may also have a fold line 5027 that generally follows but is spaced inwardly from perimeter 5025. Fold line 5027 and perimeter 5025 define an edge portion 5026 that may be folded at a fold line 5027 upwards and may have inwardly directed surface portion that provides contact with the inner wall edge portions of the upper end of tubular side wall formed by panels A-E.

Once the tubular side wall from panels A-E has been formed, panel G may folded upwards and sealed as described above. Similarly, once items have been loaded into the open top paperboard can, panel F can be folded downwards, causing the edge portion 4026 of panel F to bend upwards. Edge portion 4026 of panel F may then engage with upper edge portions of panels A-E and be sealed in the same manner as panel G, to provide a continuous upper sealed connection between the side wall provided panels A-E and top panel F. This may also be accomplished for example by induction heating of the metal foil layer in both the area of edge portion 5026 of panel F and the area of the metal foil layer in upper edge portion of the inner wall of the tubular side wall formed by panels A-E. When those portions are heated and brought into contact with each other, the interfacing surfaces will melt and bond together to form a continuous seal at the bottom of the side wall with panel F.

When fully closed and sealed, side wall panels A-E, and panels F and G, may provide an inner cavity of the paperboard can which provides a gas and/or liquid seal between the inner cavity and the external environment.

Figure 33C:
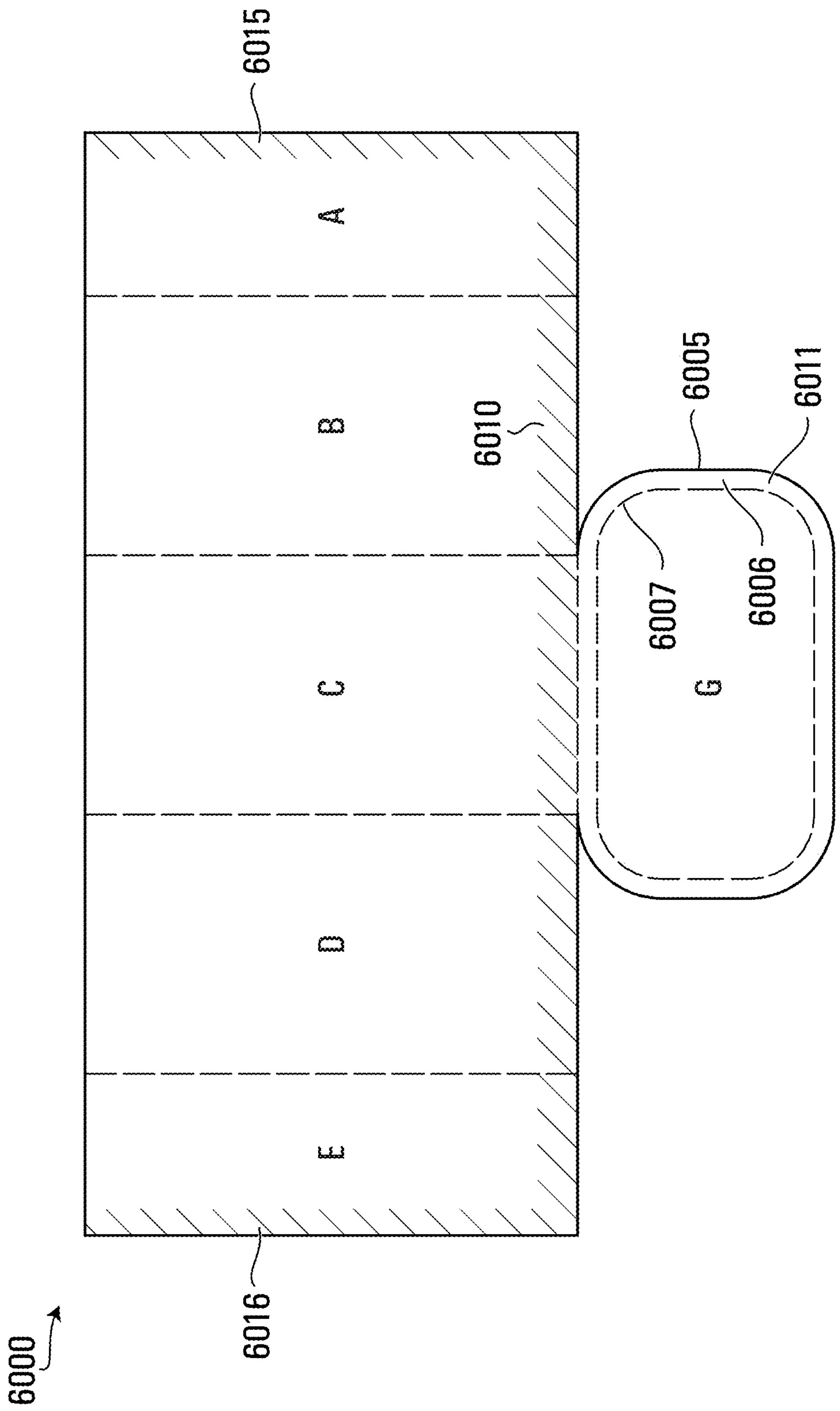
FIG. 33C is a top plan view of another alternate blank for a can.

With reference now to FIG. 33C, a blank 6000 is illustrated which may be substantially identical to blank 4000 as discussed above. Blank 6000 may be formed in substantially the same shape as blank 4000 and may be constructed in substantially the same manner using substantially the same materials as blank 4000. Blank 6000 may, like blank 4000, include a polyolefin laminate inner layer or non-polyolefin laminate inner layer across all of panels A-G. Additionally, pre-applied to specific regions of the polyoelfine or non-polyolefin laminate inner polyolefin may be a pressure sensitive adhesive or cold seal adhesive material. Such materials are known and may comprise a quick-drying, adhesive (for e.g. latex rubber, an acrylic resin, a polyurethane resin, a silicone resin, an acrylonitrile-butadiene or isoprene copolymer resin) that once dried, will create a surface with essentially no tackiness and will only adhere to other surfaces coated with the same adhesive and when placed under pressure. Such a pressure or cold seal adhesive may be capable of being applied to a substrate material at a relatively high rate of production (eg. such as during a paperboard converting process when multiple blanks are being formed) and of drying relatively quickly. As a result, such a cold seal adhesive applied to blanks 6000 enables blanks 6000 to be manufactured at relatively high production rates. Examples of such pressure sensitive adhesives and cold seal adhesives are discussed in *Treatise on Adhesion and Adhesives* Vol. 2, “Materials”, R. I. Patrick, Ed., Marcel Dekker, Inc., N.Y. (1969); Adhesion and Adhesives, Elsevier Publ. Co., Amsterdam, Netherlands (1967); *Handbook of Pressure-Sensitive Adhesive Technology*, Donates Satas, Ed., VanNostrand Reinhold Co., N.Y. (1982); EP 0372756 B1; and U.S. Pat. No. 8,895,656 the entire contents of which are hereby incorporated herein by reference. Suitable cold seal adhesives that may be employed are available from Henkel Corporation.

Like panel G of blanks 4000 and 5000, a lower panel G of blank 6000 may have an outer perimeter 6005 which is slightly larger than the opening at the bottom of the tubular side wall formed by panels A-E. Panel G may also have a fold line 6007 that generally follows but is spaced inwardly from perimeter 6005. Fold line 6007 and perimeter 6005 define an edge portion 6006 there between that may be folded at a fold line 6007 downwards and may have inwardly directed surface portion that provides contact with the inner wall portion of the tubular side wall formed by panels A-E.

A lower transversely extending edge region of the inner polyolefin layer, traversing panels A-E, may be provided with a cold seal adhesive band 6010, the cold seal adhesive band 6010 being applied to the inner polyolefin layer in the blank converting process as referenced above. Panel G may also include a band 6011 of the same cold seal adhesive that which may also be applied during the converting process such that it generally extends co-extensively with edge portion 6006 of panel G, and which may also extend inwardly a short distance beyond fold line 6007.

When panel G is folded upwards, the adhesive band 6011 made be brought into contact with the adhesive band 6010 at the lower edge region of the side wall formed from panels A-E. The corresponding edge regions carrying adhesive bands 6010 and 6011 may be compressed together by suitable mechanical devices thus triggering the bonding effect of the cold seal adhesive. Thus, panel G of blank 6000 may be engaged with lower edge portions of panels A-E to provide a continuous sealed connection between the side wall provided by panels A-E and bottom panel G. By using a cold seal adhesive to create the seal, the complexity associated with providing induction heating or other comparable heating to heat a material to a melting temperature in the specific desired areas, can be avoided.

A cold seal adhesive band 6015 along the free vertical edge of panel A and a cold seal adhesive band 6016 along the opposite free vertical edge of panel E may also be provided. Such cold seal adhesive bands 6015 and 6016 may be employed in conjunction with and attach to a vertical strip of sealing tape covering abutting vertical edges of panels A and E to provide a vertical butt seal.

Figure 33D:
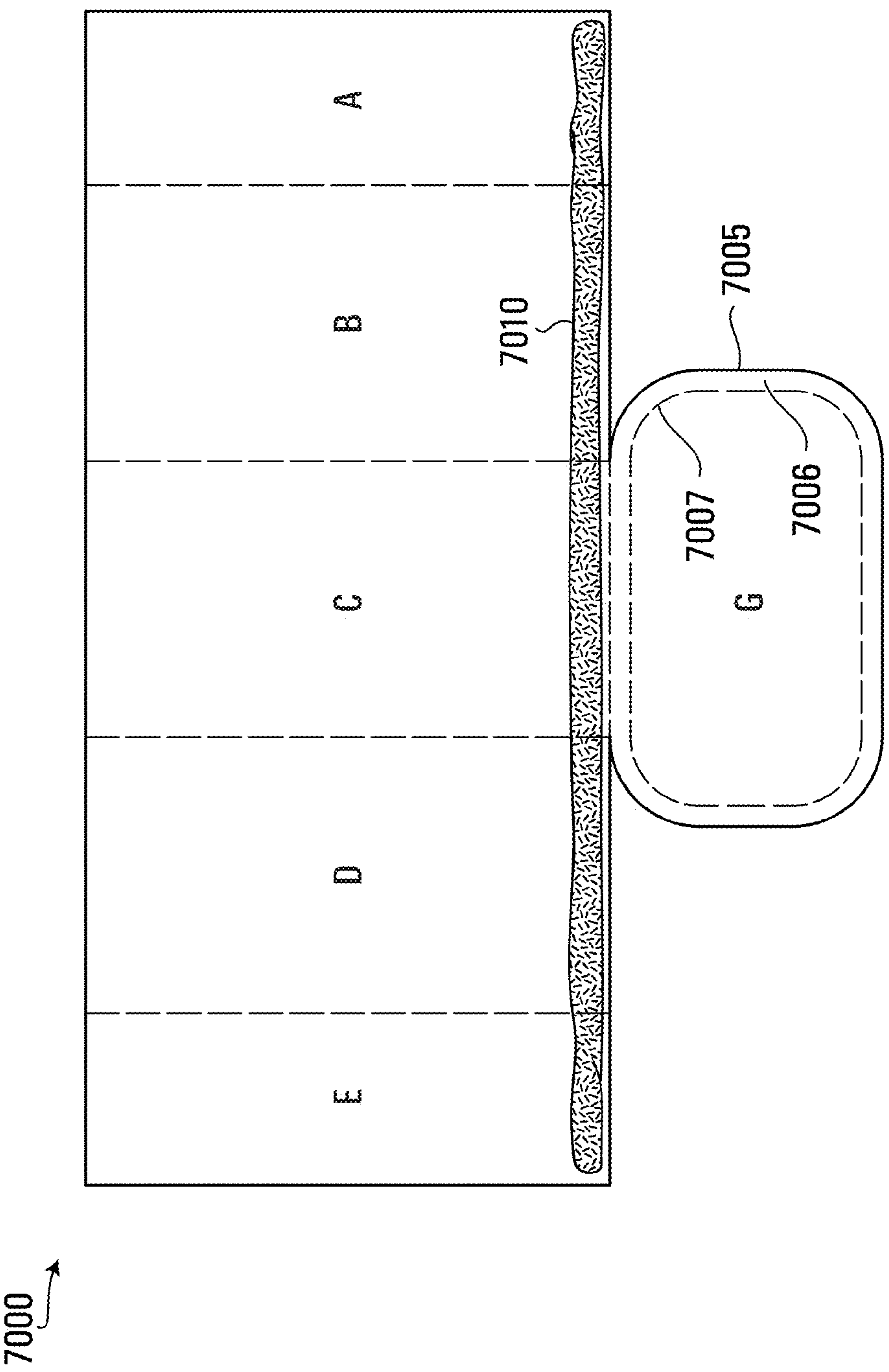
FIG. 33D is a top plan view of another alternate blank for a can.

With reference now to FIG. 33D, another paperboard can blank 7000 is illustrated which may be substantially identical to blanks 4000 and 6000 as discussed above. Blank 7000 may be formed in substantially the same shape as blanks 4000 and 6000 and may be constructed in substantially the same manner using substantially the same materials as blank 4000. Blank 7000 may also include a polyolefin inner layer. However, applied to the inner polyolefin inner layer during the forming of the paperboard may be a hot melt type adhesive material. Alternatively the hot melt type adhesive may be applied to a lower area/thin band of the blank 7000 which does not include a polyolefin layer or the metallic foil layer such that the hot melt adhesive is applied to the paperboard material.

The hot melt adhesive may be applied to the flat blank 7000 while the blank is in a flattened state, such as while it is being held in a magazine. Such hot melt adhesive materials are known and may be capable to adhering to other surfaces such as the edge perimeter region 7006 of panel G.

Like panel G in blanks 4000, 5000 and 6000, panel G of blank 7000 may have an outer perimeter 7005 which is slightly larger than the opening at the bottom of the tubular side wall formed by panels A-E. Panel G may also have a fold line 7007 that generally follows but is spaced inwardly from perimeter 7005. Fold line 7007 and perimeter 7005 define an edge portion 7006 that may be folded at a fold line 7007 downwards and may have inwardly directed surface portion that provides contact with the inner wall portion of the tubular side wall formed by panels A-E. A lower transverse edge region traversing panels A-E may be provided with a hot melt adhesive band 7010, the hot melt adhesive being as referenced above. Hot melt adhesive band 7010 may be applied to the lower edge portion of panel A-E while the blank is held in a blank magazine as discussed below.

When panel G is folded upwards, adhesive band 6010 at the lower edge region of the side wall formed from panels A-E may engage with the facing surface of edge portion 7006 which is bent downward at fold line 7007. Compression may be applied to push together the portion of the tubular side wall carrying the adhesive band 6010 with the interfacing surface of edge portion 7006 of panel G. Thus, panel G may be engaged with lower edge portions of panels A-E to provide a continuous sealed connection between the side wall provided by panels A-E and bottom panel G.

Figure 34:
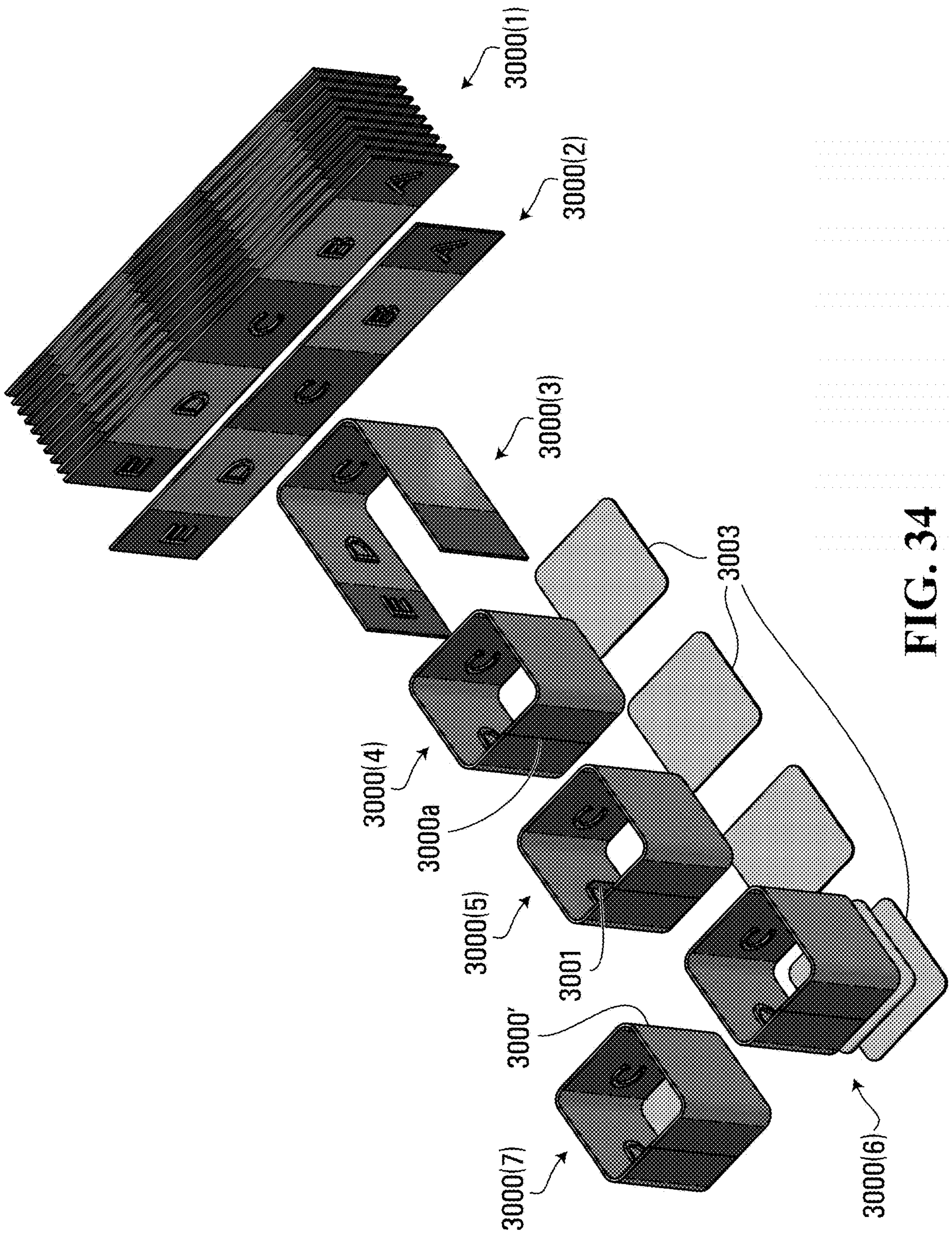
FIG. 34 is schematic view of an example method of forming a can from a can blank, such as the blank of FIG. 33.

With reference now to FIG. 34, an example sequence of steps 3000(1) to 3000(7) are shown of folding and sealing a blank 3000 to form an open top paperboard can that is suitable for top loading of items and thereafter closing with a top component (not shown).

A plurality of case blanks 3000 may be presented 3000(1) in a vertically stacked arrangement with the blanks each configured in a generally flat and planar configuration. A particular individual case blank 3000 may be identified at/selected from the front of the stack of blanks for processing 3000(2). In a first folding step 3000(3), while first portion of blank 3000 (panel C) remains in the initial orientation, side wall panel B along with its connected minor panel A (a second portion of blank 3000) can be rotated together from the orientation shown at 3000(2), 90 degrees in a clockwise direction about the vertically oriented fold line between side wall panels B and C, to the configuration as shown at 3000(3). Also, optionally at substantially the same time as panels A and B are rotated 90 degrees, side wall panel D along with its connected minor panel E (a third portion) can be rotated together from the orientation shown at 3000(2), 90 degrees in a counter-clockwise direction about the vertically oriented fold line between side wall panels D and C, to the configuration as shown at 3000(3).

In the next folding step 3000(4), minor side wall panel A (a part of the second portion) is rotated clockwise 90 degrees about the vertically oriented fold line between side wall panels A and B, to the configuration shown at 3000(4). Also, optionally at substantially the same time as panel A is being rotated 90 degrees relative to panel B, side wall panel E (a part of the third portion) is rotated from the orientation shown at 3000(3), 90 degrees in a counter-clockwise direction about the vertically oriented fold line between side wall panels D and E, to the configuration as shown at 3000(3). At the configuration shown at 3000(4) panels A and E have their vertical longitudinal edges in abutment with each other such that a substantially flat continuous outer surface **3000*a*** is formed across panels A and E.

In the next step 3000(5), the abutting edges of panels A and E are sealed together such as by a strip of sealing tape 3001 that may be activated by an induction sealing device (not shown) which may heat the inner polyolefin layer material of the blank 3000 causing the polyolefin layer at the abutting vertical longitudinal edge regions of panels A and E to heat up and be bonded to the longitudinal strip of sealing tape 3001.

In the next step 3000(6), blank 3000 having been formed into a generally tubular side wall shape, that may now be generally square in top view, may be moved/translated (eg. vertically downwards or upwards) to a bottom forming station.

At step 3000(6) a bottom cup 3003 which may have been delivered to the bottom forming station, may be moved upwards into the bottom opening formed by tubular side wall of panels A-E. Bottom cup 3003 may be made from any suitable material or combination of materials. It may have a top layer surface material that is compatible for bonding with the inner layer of tubular side wall of panels A-E. The outer perimeter of cup 3003 may be slightly larger than the opening at the bottom of the tubular side wall formed by panels A-E. Thus, when cup 3003 is pushed into the opening, an edge perimeter portion of cup 3003 may be folded downwards and may have inwardly directed surface that provide contact with a lower inner wall surface portion of tubular side wall formed from panels A-E. There will thus be surface to surface contact between lower edge surface portion of the inner polyolefin layer of the side wall and the surface of the cup 3003, at the edges thereof. These interfacing surfaces can then be heat activated by for example induction heating to heat the metal foil layer in the bottom region of the side wall, to melt the corresponding inner polyolefin layer and thereby form a seal which may have a high degree of integrity and seal against gases and liquids.

After the bottom portion of blank 3000 has been formed at step 3000(6), blank 3000 may be moved away to another location, and may be subsequently filled with one or more items/other cases and thereafter a top component may be inserted into the top opening of tubular side wall of panels A-E, to close and seal the completed paperboard can.

Figure 35:
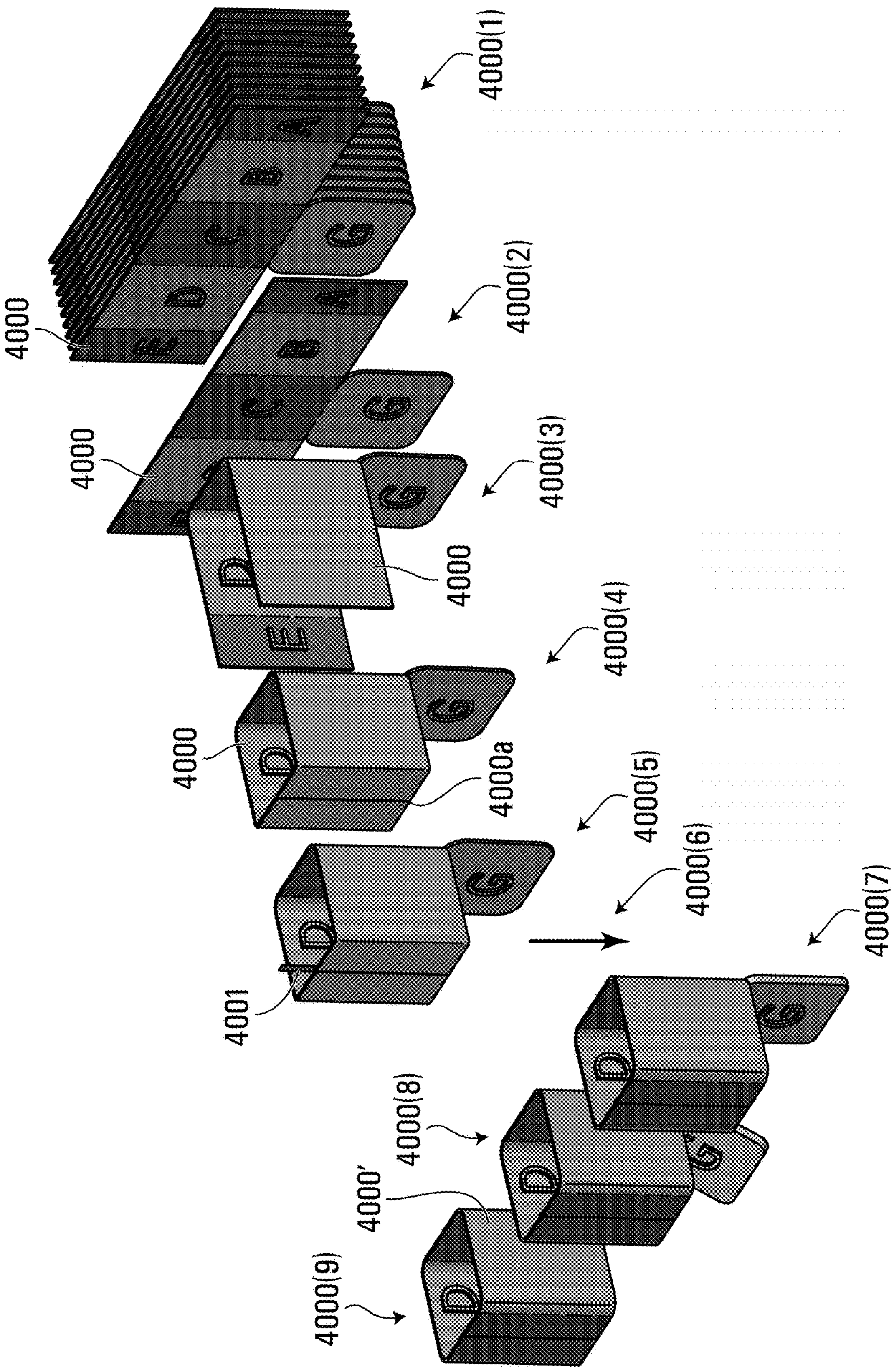
FIG. 35 is schematic view of an example method of forming a can from a can blank, such as the blank of FIG. 33A.

With reference now to FIG. 35, an example sequence of steps 4000(1) to 1000(10) are shown of folding and sealing a flat blank 4000 to form an alternate open top paperboard can that is suitable for top loading of items.

A plurality of case blanks 4000 (as described above) may be presented 4000(1) in a vertically stacked arrangement with the blanks each configured in a generally flat and planar configuration. A particular individual case blank 4000 may be identified at/selected from the front of the stack of blanks for processing 4000(2). In a first folding step 4000(3) side wall panel B along with its connected minor panel A can be rotated together from the orientation shown at 4000(2), 90 degrees in a clockwise direction about the vertically oriented fold line between side wall panels B and C, to the configuration as shown at 4000(3). Also, optionally at substantially the same time as panels A and B are rotated 90 degrees, side wall panel D along with its connected minor panel E can be rotated together from the orientation shown at 4000(2), 90 degrees in a counter-clockwise direction about the vertically oriented fold line between side wall panels D and C, to the configuration as shown at $4000(3).

In the next folding step 4000(4), minor side wall panel A is rotated clockwise 90 degrees about the vertically oriented fold line between side wall panels A and B, to the configuration shown at 4000(4). Also, optionally at substantially the same time as panel A is rotated 90 degrees relative to panel B, side wall panel E is rotated together from the orientation shown at 4000(3), 90 degrees in a counter-clockwise direction about the vertically oriented fold line between side wall panels D and E, to the configuration as shown at $4000(3). At the configuration shown at 4000(4) panels A and E have their vertical longitudinal edges in abutment with each other such that a substantially flat outer surface **4000*a*** is formed across panels A and E.

In the next step 4000(5), the abutting edges of panels A and E are sealed together such as by a strip of sealing tape 4001 that may be activated by an induction sealing apparatus (not shown) which may heat the inner polyolefin layer material of the blank 4000 in the vicinity of the vertical longitudinal edges of panels A and E, causing the polyolefin layer at the abutting longitudinal edge regions of panels A and E to heat up and bond to the longitudinal strip of sealing tape 4001.

In the next step 4000(6), blank 4000 having been formed into a generally tubular shape, that may now be generally square or rectangular in top view, may be moved/translated (eg. vertically downwards or upwards) to a bottom forming station.

From steps 4000(7) to step 4000(8) to step 4000(9), tubular shaped blank 4000 may start to undergo folding upwards of bottom panel G about the fold line with panel C, as it is folded upwards (eg. by a suitable folding apparatus) to an orientation perpendicular to the tubular side wall, and into the opening at the bottom the tubular side wall, formed by panels A to E. As referenced above, the outer perimeter 4005 of panel G may be slightly larger than the opening at the bottom of the tubular side wall formed by panels A-E. Thus, when panel G is pushed into the opening, the edge portion 4006 may be folded at fold line 4007 downwards and may have inwardly directed surface portion that provides contact with the lower inner wall portion of the tubular side wall formed by panels A-E. There will thus be surface to surface contact between lower edge region of the inner polyolefin layer of the side wall and the bottom panel G at the inner polyolefin layer of the edge portion 4006 thereof. These interfacing polyolfen surfaces can then be heat activated by for example induction heating in the vicinity of the interfacing surfaces to heat the metal foil layer therein, to melt the inner layer, to thereby form a continuous seal between the tubular side wall and bottom panel G, which may have a high degree of integrity and seal against both gases and liquids.

Optionally, (and not shown in FIG. 34) a further protective bottom cup or plug portion made from a strong hard plastic material may be vertically inserted into the shallow opening remaining below panel G in side wall formed by panels A-E or may secured around the bottom edge of the tubular side wall and may be secured by for example adhesive.

After the bottom portion of blank 4000 has been formed at step 4000(9), blank 4000 may be moved away to another location, and may be subsequently filled with one or more items/other cases and thereafter a top component may be inserted into the top opening of tubular side wall of panels A-E, to close and seal the completed paperboard can.

The example sequence of steps 4000(1) to 4000(9) described above of folding and sealing a flat blank 4000 to form an open top paperboard can also be used on blank 5000 to form open top paperboard can. However, after the bottom portion of blank 5000 has been formed at step 4000(9), blank 5000 may be moved away to another location, and may be subsequently filled with one or more items/other cases. Thereafter top panel F may be folded 90 degrees at the fold line with panel C (by a suitable folding apparatus) and inserted into the top opening of tubular side wall of panels A-E. As referenced above, the outer perimeter of panel F may be slightly larger than the opening at the top of the tubular side wall formed by panels A-E.

Thus, when panel F is pushed into the top opening, the edge portion 5026 may be folded upwards and may have inwardly directed polyolefin surface that provides contact with the upper edge portion of the inner surface of tubular side wall. There will thus be surface to surface contact between the inner polyolefin layer of the tubular side wall and polyolefin layer of the edge portion of the top panel F, along the interfacing edges thereof. These interfacing surfaces can then be heat activated by for example induction heating to form a seal which may have a high degree of integrity and seal against both gases and liquids.

Blanks 6000 and 7000 may also be formed by a similar process to that depicted in FIG. 35, to form a tubular side wall structure with a closed and sealed blank.

The initial steps 4000(1) to 4000(9) may be the same, however, the steps to seal the bottom panel G to the tubular side wall may be varied to the extent that a cold seal adhesive is used to provide the bottom seal for blank 6000 and a hot melt adhesive is used to provide the bottom seal for blank 7000, as referenced above.

Figure 36:
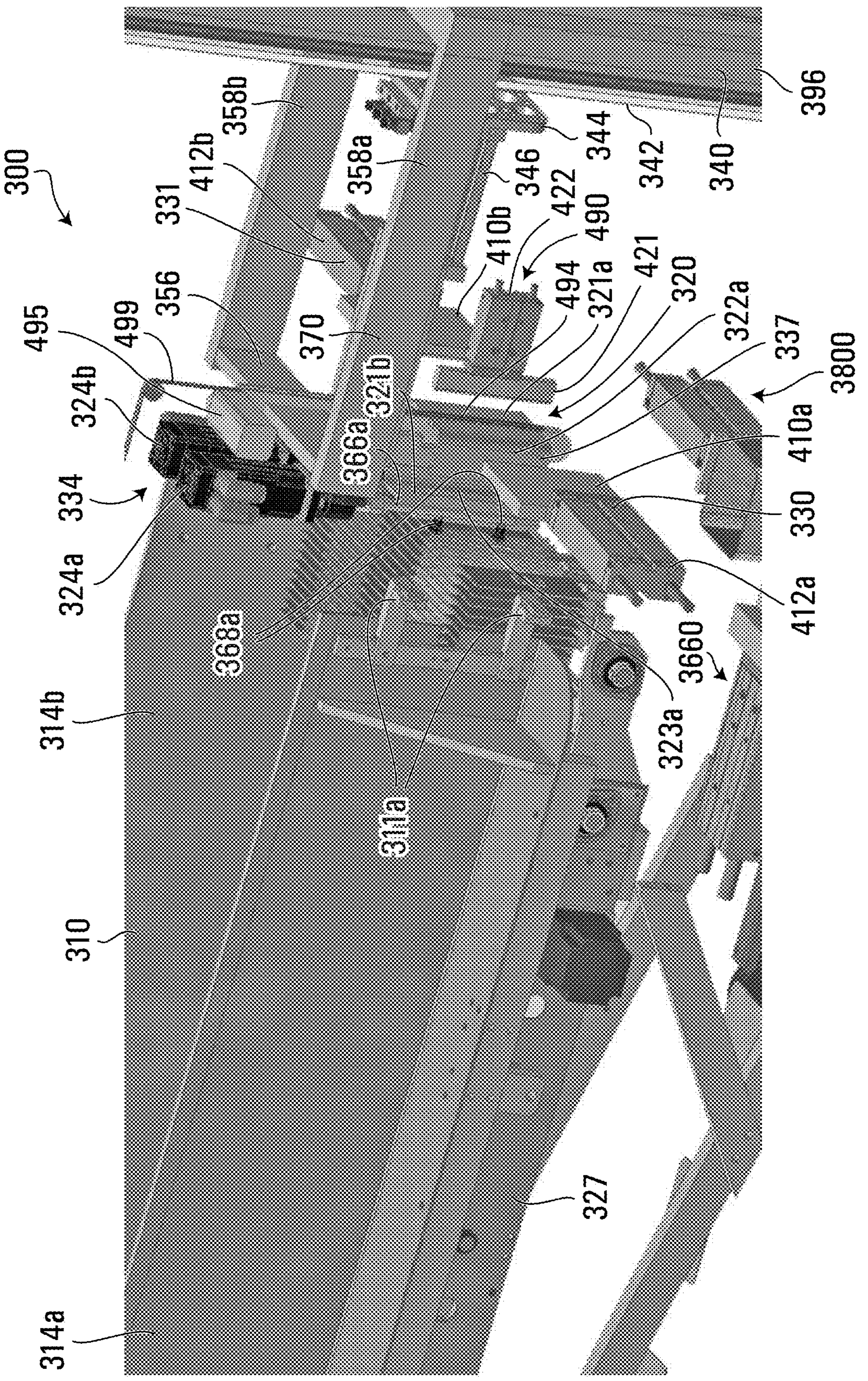
FIG. 36 is an upper, left front side perspective view of part of a can forming system in an operational position.
Figure 37:
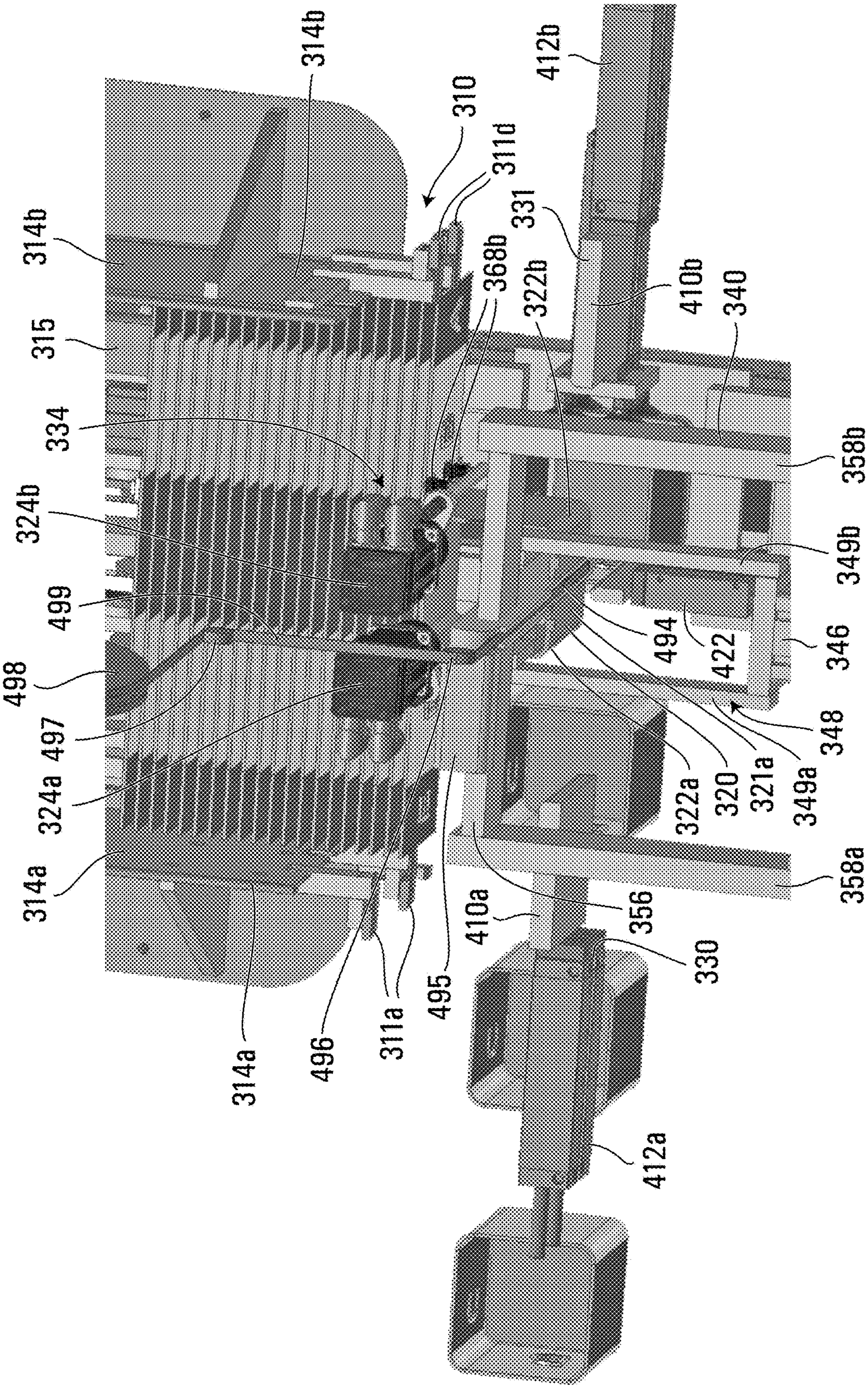
FIG. 37 is an upper, rear perspective view of the can forming system of FIG. 36 in an operational position.

With reference now to FIGS. 36-50, in overview, a can forming system 300 may include a magazine 310 that may be adapted to hold a plurality of can blanks such as paperboard can blanks 3000 in a substantially flat vertical orientation such as is shown in FIGS. 36 and 37. Magazine 310 may be configured to selectively release in series single blanks 3000 from the front of the stack of plurality of blanks. In alternate embodiments, magazine 310 may be configured to hold in such an orientation and selectively release differently configured blanks such as blanks 4000, 5000, 6000 and/or 7000.

With particular reference to FIGS. 36 and 37, system 300 may also include a blank support apparatus (also referred to herein as a mandrel apparatus) 320 and a panel rotating sub-system 334. Panel rotating sub-system 334 may be configured to engage a blank 3000 on at least two transversely spaced apart outward facing panel surfaces of the blank as the blank is held in the magazine 310 and rotate panels of the blank 3000 around a blank support device (referred to herein as a mandrel) 337 of blank support apparatus 320 in such a manner that the blank panel surfaces that are engaged by panel rotating sub-system 334 become inner surfaces of the side wall for a tubular shaped paperboard can 3000' (see FIG. 50).

Panel rotating sub-system 334 may utilize at least two panel rotating apparatuses in order to engage with surfaces of a plurality of panels of a blank 3000 as the blank is held in a generally flat configuration the magazine 310 and rotate those panels (and possibly certain other panels of the same blank 3000 interconnected thereto), relative to each other and relative to one or more other panels which may be initially retained in magazine 310 in the initial position and orientation. For example, panel rotating apparatus 334 may include a first panel rotating apparatus **324*a* and a second panel rotating apparatus 324*b*. Panel rotating apparatus 324*a* may be configured and operable to engage with a facing surface of panel D of a blank 3000 held in magazine 310. Panel rotating apparatus 324*b* may be configured and operable to engage with a facing surface of a panel B of a blank held in magazine 310**.

Panel rotating sub-system 334 may also include a third panel rotating apparatus 330, and a fourth panel rotating apparatus 331 (see FIGS. 36, 36A-C and 37) as described further below. Third panel rotating apparatus 330 may be operable to rotate panel E, 90 degrees in a counter-clockwise direction relative to panel D about the fold line between panels D and E. Similarly, fourth panel rotating apparatus 331 may be operable to rotate panel A, 90 degrees in a clockwise direction relative to panel B about the fold line between panels A and B.

Figure 36A:
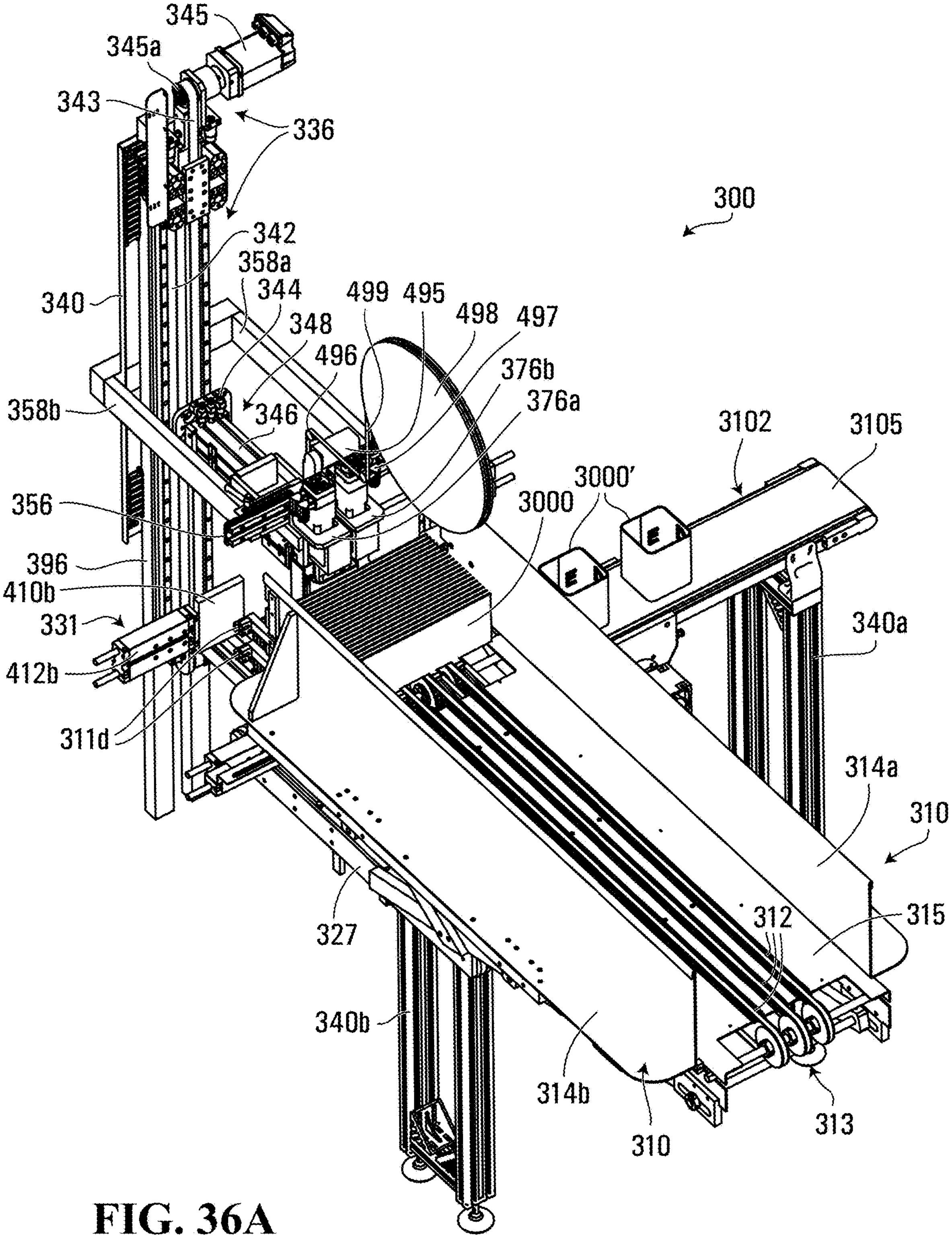
FIG. 36A is an upper, right rear perspective view of the can forming system of FIG. 36 in an operational position.
Figure 36B:
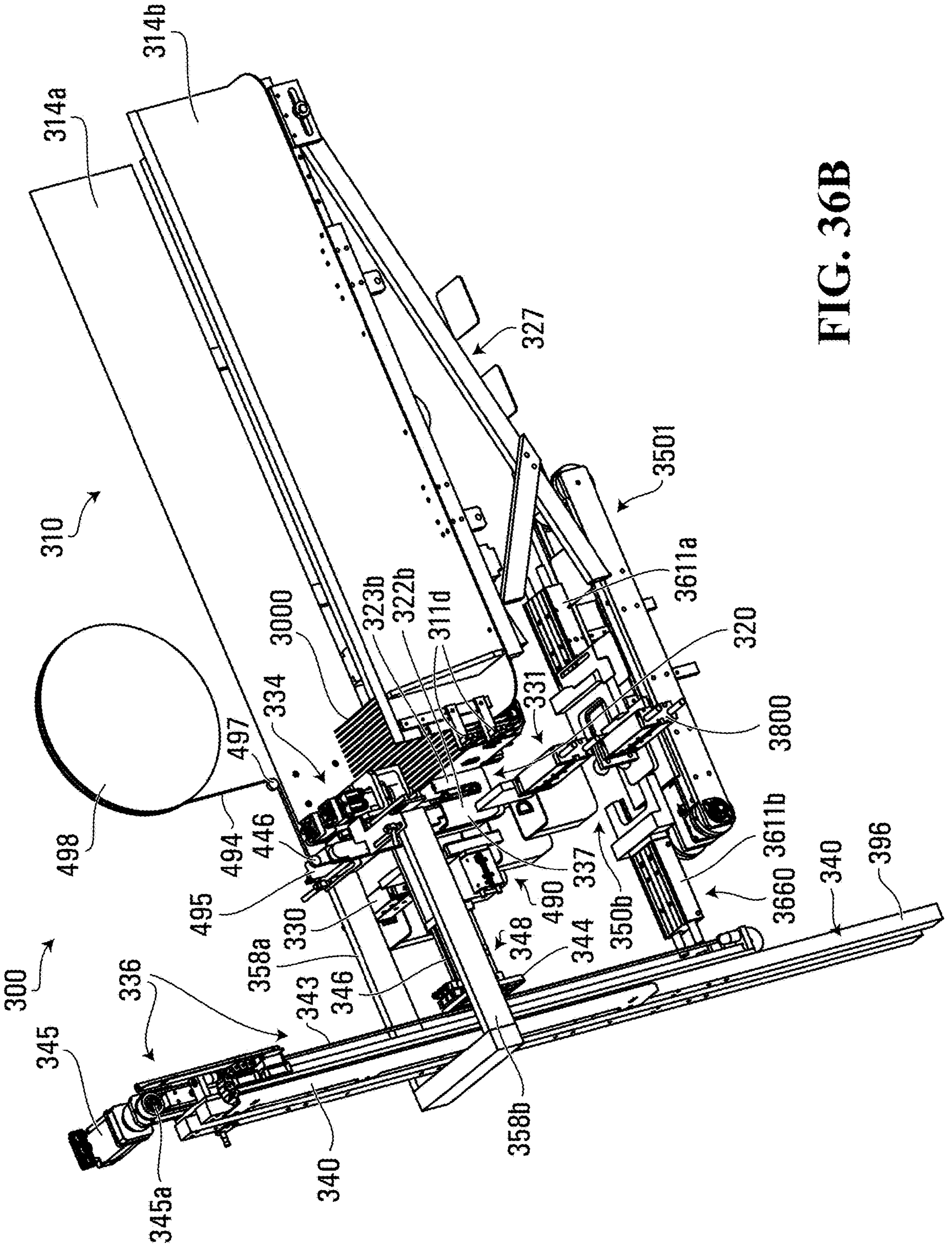
FIG. 36B is an upper, right side perspective view of the can forming system of FIG. 36 in an operational position.

Can forming system 300 may also include a support frame 340 and a vertical mandrel movement apparatus 336 (designated generally in FIGS. 36A and 36B).

Figure 51:
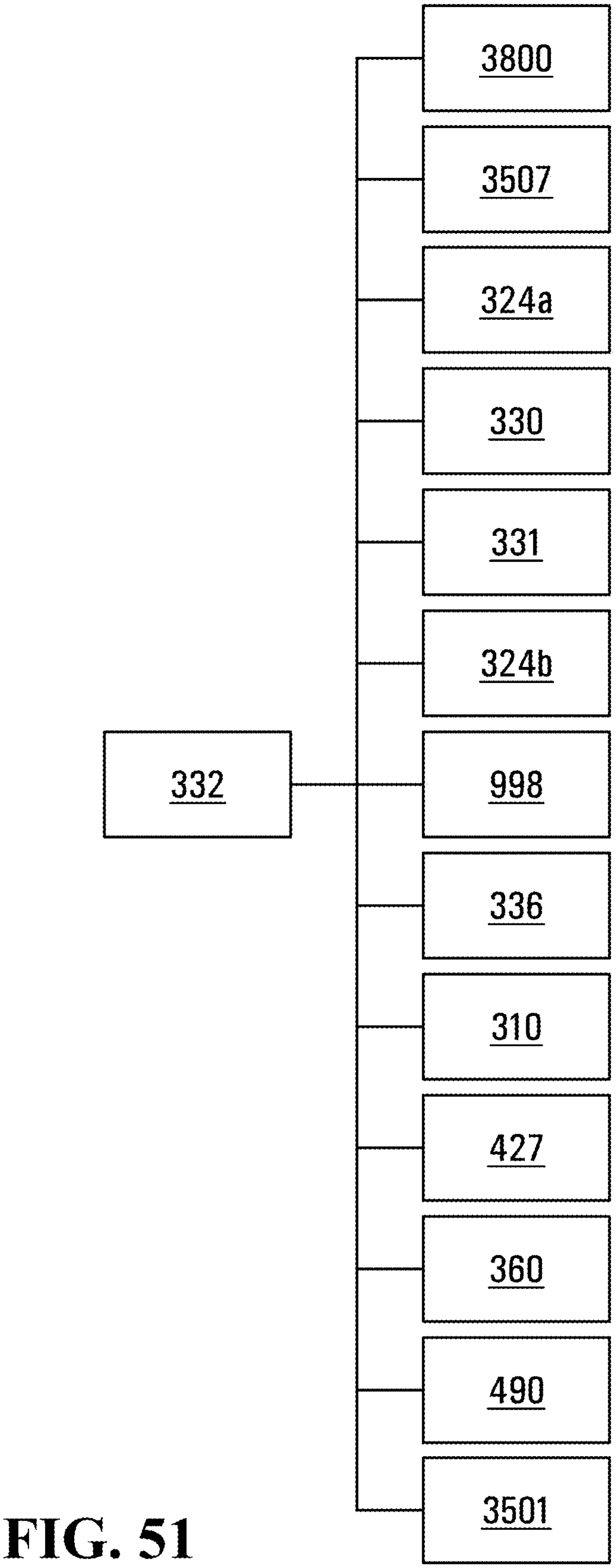
FIG. 51 is a schematic diagram of a control system for the can forming system of FIGS. 36-50.

The operation of the components of carton forming system 300 may be controlled by a controller such as a programmable logic controller ("PLC") 332 which may be configured generally like PLC 132 described above. PLC 332 may be in communication with and control all the components/sub-systems of system 300, in a manner such as is generally depicted schematically in FIG. 51 and may also control other components/sub-systems associated therewith. PLC 332 may also include a Human-Machine-Interface (HMI) such as the Allen Bradley Panelview 700 plus colour touch screen graphic workstation so that the operation of system 300 can be monitored, started, operated, controlled, stopped, modified for different blank configurations, by an operator using a touch screen panel.

Generally vertically oriented support frame 340 may support mandrel movement apparatus 336 to provide for vertical reciprocating upwards and downwards movement of mandrel 337. It should be noted that although system 300 is shown in the Figures as being generally oriented for vertical movement of the mandrel movement apparatus 336, alternative orientations can be utilized in other embodiments.

Mandrel movement apparatus 336 may include a generally vertically oriented linear rail 342 (FIGS. 36A, 36B). Linear rail 342 may support a carriage block 344 for sliding upward and downward sliding vertical movement relative to support frame 340 (FIGS. 36, 36A, 36B and 39). It should be noted that in some of the Figures depicting system 300, for simplicity or clarity, support frame 340 and linear rail 342, and/or some other components, have been omitted.

In a manner similar to system 100 as described above, the movement of carriage block 344 on linear rail 342 may be driven by a continuous drive belt 343 interconnected to carriage block 344, supported on vertical support frame 340. Drive belt 343 may be interconnected to, and driven by, a drive wheel 345*a* of servo drive motor 345, which may be mounted at an upper end portion of vertical support frame 340. An encoder (not shown) may be associated with servo drive motor 345 and the encoder and servo drive motor may be in communication with PLC 332. In this way, PLC 332 on receiving signals from the encoder may be able to monitor and control the vertical position of carriage block 344 (and the components interconnected thereto) by appropriately controlling and operating servo drive motor 345.

Figure 44:
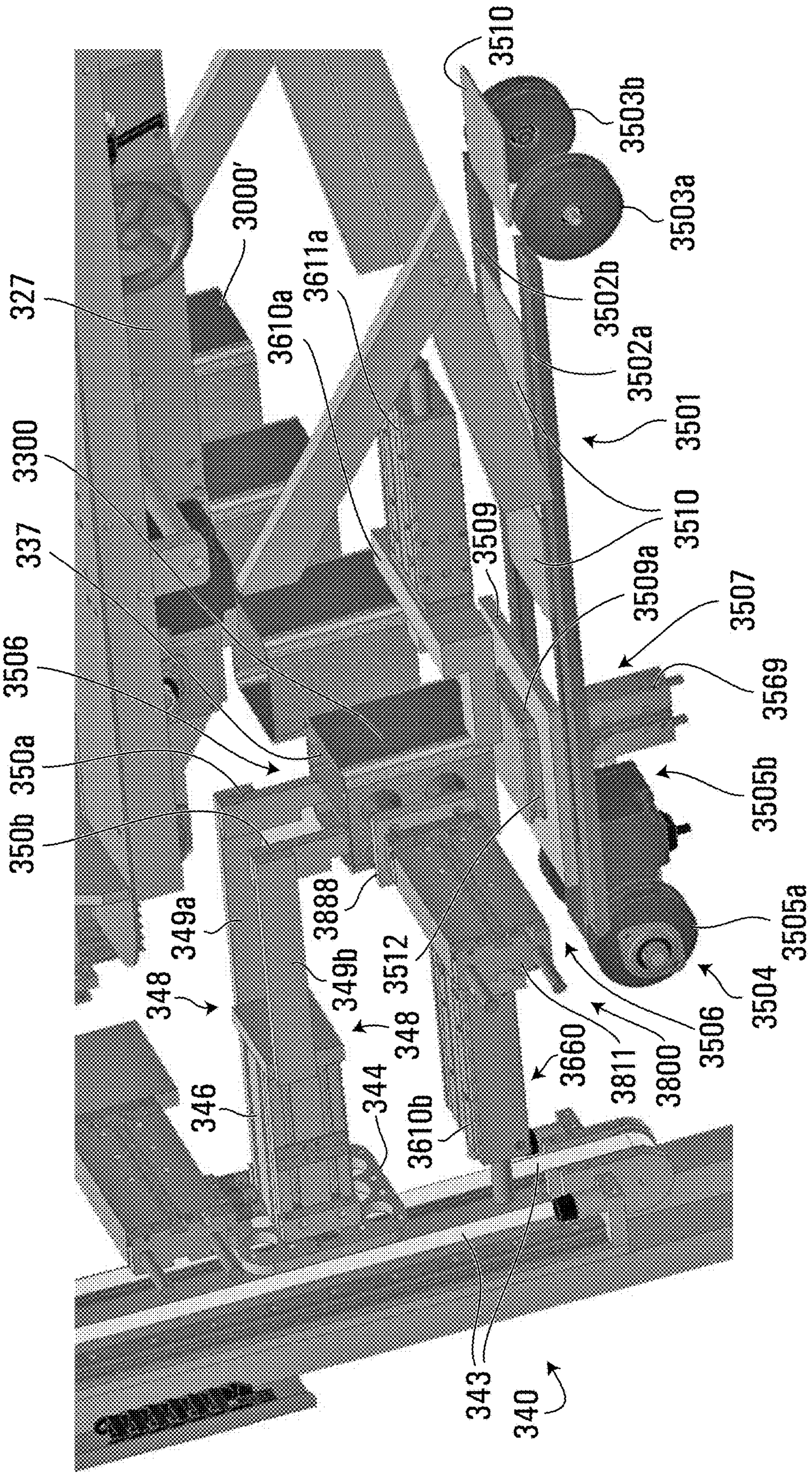
FIG. 44 is a right rear side perspective view of a lower part of the can forming system of FIG. 36 in an operational position.

Carriage block 344 may support and be rigidly connected to a carriage support arm 346 (FIGS. 36A-C, 38 and 39) that may be generally oriented horizontally and longitudinally. The outer end of carriage support arm 346 may be rigidly connected to a mandrel support apparatus generally designated 348 (FIG. 37). Mandrel support apparatus 348 may generally support a mandrel 337 (FIGS. 36 and 44).

Magazine 310 may be configured to hold a plurality of case blanks 3000 in a stacked, vertically and transversely oriented, flat configuration on their bottom edges. Many different types and/or constructions of a suitable magazine 310 might be employed in system 300. Magazine 310 may be configured to hold a plurality of case blanks 3000 that may be held in a longitudinally extending, stacked arrangement. Magazine 310 may be adapted to present an outward facing surface of a plurality of case blanks 3000, individually in turn. Magazine 310 may comprise a large number of case blanks 3000 held in a generally vertically and transversely oriented, longitudinally extending, case blank stack by side walls. In this configuration where case blanks 3000 are individually and selectively retrieved in series from the front of a stack of generally flat blanks, the stack of case blanks 3000 in the magazine can be moved forward by a longitudinally oriented conveyor which may constructed like the conveyor system in the magazine of system 100, as described above.

The purpose of moving the stack of blanks 3000 forward is so that the facing surface of panel C of the most forward case blank 3000 in the stack is positioned and held close to or against an outer generally adjacent surface of a transverse and vertical side wall 321*a* of mandrel 337 (FIG. 36). This enables first panel rotating apparatus 324*a* and second panel rotating apparatus 324*b* to be able to engage other exposed facing surfaces of panels D and B respectively (FIGS. 36 and 37) of the forward most case blank 3000 in the stack held in magazine 110, as described further hereinafter. Additionally, a back pressure device (not shown) may be provided that can apply a back pressure against the case blank stack in a longitudinal direction toward the front of the magazine, of a magnitude and direction sufficient to keep the stack upright and prevent it from falling longitudinally backwards as the case blank stack on conveyors is indexed longitudinally forward to maintain the next case blank 3000 at the front of the stack securely in a pick-up position.

Magazine 310 may be constructed and operate in manner similar to magazine 110 as described above. In overview, magazine 310 may have a magazine frame generally designated 327 (FIGS. 36, 36A and 36B). Magazine 310 may include a conveyor system to move flat case blanks 3000 sequentially to a pick-up position. A wide variety of conveyor systems or other case blank movement systems may be employed. By way of example, conveyor system may include a conveyor 313 (FIG. 36A) mounted to frame 327, and having a generally horizontal floor plate 315. Conveyor 313 may be operated to move longitudinally together to move case blanks 3000 in a stack of blanks forward in the magazine, while being maintained in a generally transverse and vertical orientation.

A motor such as a DC motor in communication with PLC may be inter connected to conveyor belts 312 of conveyor 313 to intermittently move a stack of blanks 3000 forward such that a front positioned blank in the stack is continuously available in a pick-up position.

The stack of case blanks 3000 may be supported at vertically oriented side edges by longitudinally and vertically oriented side wall plates 314*a*, 314*b* that may be spaced apart from each other and oriented generally parallel to each other. One or both of side wall plates 314*a*, 314*b* may be mounted on transversely oriented and movable rods that are supported on magazine frame 327. Actuation of rods may be made by any suitable mechanism such as by way of example only, servo drive motors with appropriate drive shafts and gear mechanisms or a hand operated gear and crank shaft mechanism. Side wall plates 314*a*, 314*b* serve to guide the case blanks 3000 within magazine 310 and can be accurately adjusted to be in close proximity to or contact with the particular case blank size that is being handled at a particular time. This adjustability of the relative transverse spacing of side walls 314*a*, 314*b* allows for case blanks of different widths to be held in magazine 310 for processing as described herein. Other modifications to magazine 310 may be provided to accommodate blanks of different configurations such as the configurations of blanks 4000, 5000, 6000 or 7000. For example, panels E/D may be supported on one side of the blank by one conveyor belt and panels A/B may be supported on an opposite transverse side by another second conveyor belt running in parallel to the first conveyor belt. The first and second conveyor belts may be transversely spaced apart to provide a longitudinal opening to permit the lower panels G to move with the remainder of the blanks.

Selected panels of the forward most blank 3000 may be pulled away from holding clips (not shown) associated with magazine 310 by first panel rotating apparatus 324*a* and second panel rotating apparatus 324*b*, from retention by magazine 310, then rotated (wrapped) at least partially around mandrel 337. As case blanks 3000 are taken from magazine 310 and formed, PLC may cause the conveyor of magazine 310 to move the entire stack forward sequentially so that the most forward case blank 3000 has its the outward facing surface of major panel C positioned against or very close to adjacent outer rear vertically and transversely oriented surface of mandrel 337. A sensor (not shown) in communication PLC 332 may be provided to monitor the level of case blanks 3000 in magazine 310 during operation of can forming system 310. Magazine 310 can be loaded with additional flat case blanks 3000 at the rear of the magazine.

Electronic sensors (not shown) in communication with PLC 332 may be positioned to monitor the stack of blanks and ensure that a blank 3000 at the front of the stack of blanks is properly positioned at the pick-up position.

Clip mechanisms similar to those clip mechanisms 111*a*-111 described above in system 100, including clip mechanisms 311*a* (FIG. 36) and 311*d* (FIGS. 36A and 36B) may be provided to releasably hold each case blank 3000 that is at the front of the stack within magazine 310, and thus hold the stack in place. When first panel rotating mechanism 324*a* and second panel rotating mechanism 324*b* selectively engage panels D and B respectively, as described hereinafter, clip mechanisms allow for the engaged and interconnected panels D/E and A/B of the front blank 3000 in the stack to be pulled away from the same corresponding panels on the blank immediately behind the front blank in the stack held in the magazine. Also, clip mechanisms will hold panel C in magazine 310 while the panels D/E and A/B are being wrapped around the mandrel 337, but will then allow for the release of panel C to allow the remaining portion of case blank 3000 to be removed from being held by magazine 310 and move vertically downward once the case blank 3000 and mandrel 337 to which it is secured moves vertically downwards, as described further hereinafter.

First and second panel rotating apparatuses 324*a*, 324*b* may be one of numerous types of robotic systems but may alternatively be a simple servo driven motors controlled by PLC 332 which includes a generally vertically oriented drive shaft with rotatable members attached thereto. First and second panel rotating apparatuses 324*a*, 324*b* may be capable of intermittent motion to rotate the rotatable members. The rotatable members may carry panel engagement devices.

With particular reference to FIGS. 36, 36A-C, 37 and 39, first panel rotating apparatus 324*a* may be laterally spaced apart from second panel rotating apparatus 324*b* and both may be mounted to a fixed, transversely oriented support member 356. Robot support member 356 may be fixedly supported at opposed ends by, and at first ends of, a pair of transversely spaced, longitudinally oriented robot support member 358*a*, 358*b*. The opposite ends of transversely spaced, longitudinally oriented robot support members 358*a*, 358*b* may be fixedly mounted to vertical support frame 340.

Figure 36C:
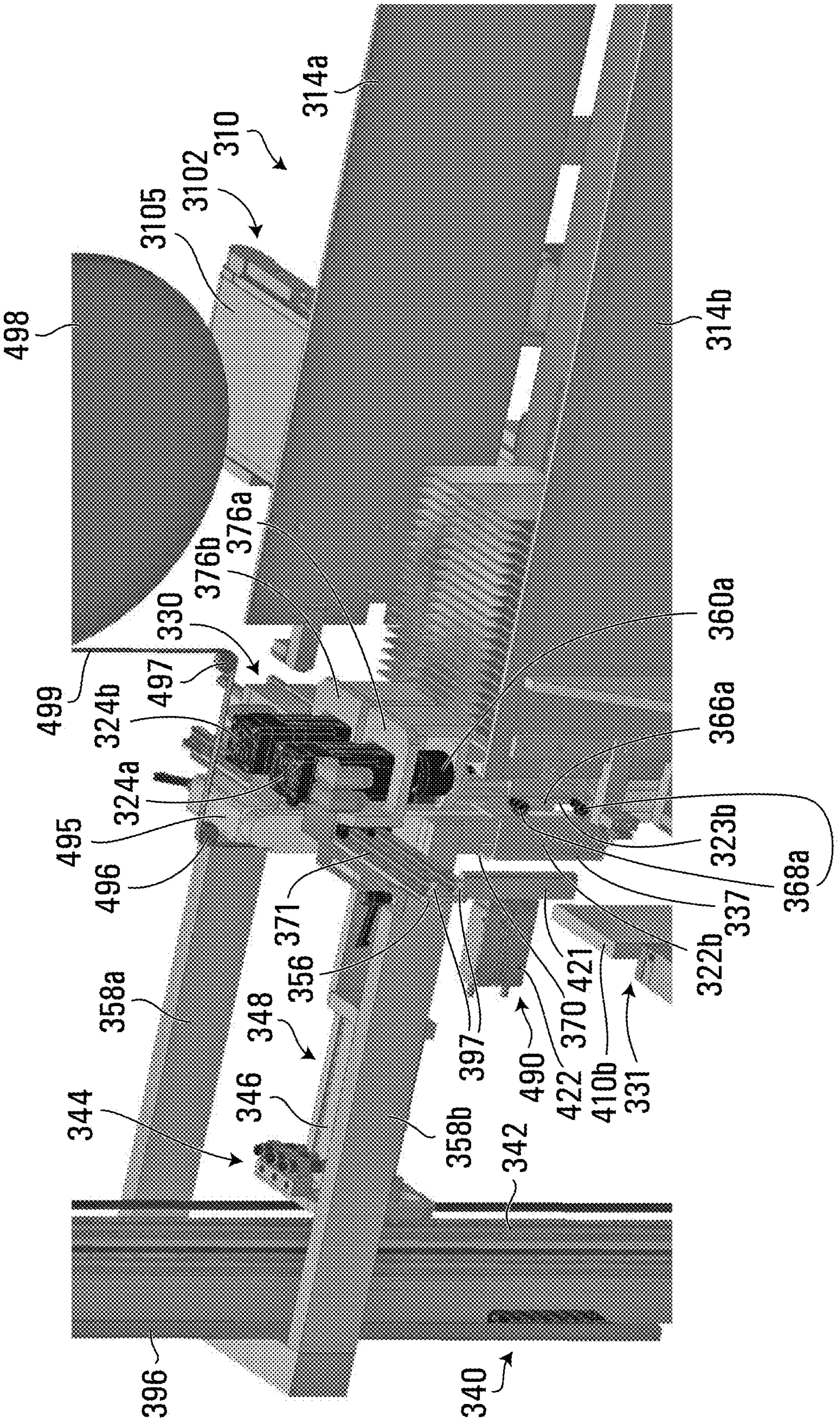
FIG. 36C is an upper, right side perspective view of part of the can forming system of FIG. 36 in another operational position.

With particular reference to FIG. 36C, a transversely oriented linear rail 397 may be mounted to transverse support member 356 that is connected to longitudinal space support members 358*a*, 358*b* and which forms part of support frame 340. Linear rail 397 may engage with rotary bearings provided on complimentary surfaces of first panel rotating apparatuses 324*a*, 324*b*. Thus panel rotating apparatuses 324*a*, 324*b* may be operable for sliding movement along linear rail 397 so that a desired transverse position in relation to blanks 3000 held in magazine 327 can be selected. A transversely extending scale 371 on the top of support member 356 can be useful in moving the rotating apparatuses to the appropriate transverse positions on linear rail 397 that allows for the sequence of operations described hereinafter.

First panel rotating apparatus 324*a* may include a support frame 376*a* which may carry the linear bearings which provide for attachment to and sliding movement relative to linear rail 397. Similarly, second panel rotating apparatus 324*b* may include a support frame 376*b* which may carry the linear bearings which provide for sliding attachment to linear rail 397.

First panel rotating apparatus 324*a* may include a rotational drive unit 360*a* (FIG. 39) that may be supported on support frame 376*a*. Extending from a lower end of rotational drive unit 360*a* is a rotational drive that may comprise a drive shaft that is operable for rotation clockwise and anti-clockwise about a first vertical axis of rotation. The drive shaft and its axis of rotation, may be aligned transversely and longitudinally with, and may be positioned above, an inward corner of mandrel 337. The drive shaft of rotational drive unit 360*a* may be operably connected to a first end portion (FIGS. 38 and 41) of a first articulating arm 362*a*. Thus, when rotational drive unit 360*a*, under the control of PLC, causes the drive shaft of rotational drive unit 360*a* to rotate, first articulating arm 362*a* is able to pivot clockwise or anti-clockwise relative to the drive shaft about a vertical axis, depending upon the direction of rotation of the drive shaft.

Mounted to the opposite end of articulating arm 362*a* of first rotational drive 364*a* is a vertically oriented end effector rod 366*a* (FIG. 41) formed in a generally tubular cylinder and having one or more suction cups 368*a*.

Air suction cups 368*a* may be interconnected through hoses passing through cavities in end effector 366*a*, articulating arm 362*a* and rotational drive 360*a* to a source of vacuum by providing for an air channel through the aforesaid components. The supply of vacuum to suction cups 368*a* may be provided by a pressurized air distribution unit generally designated 427 (see FIG. 51). Air distribution unit 427 may include a plurality of valves that may be operated by PLC 332 and may also include local vacuum generator apparatuses that may be in close proximity to, or integrated as part of, suction cups 368*a*. In other embodiments, a vacuum pump mounted externally may generate vacuum externally and then vacuum can be supplied through the aforementioned air channels. If local vacuum generators are utilized, pressurized air may be delivered from an external source through air distribution unit 427 to the vacuum generators. The local vacuum generators may then convert the pressurized air to vacuum that can then be delivered to suction cups 368*a*.

Figure 38:
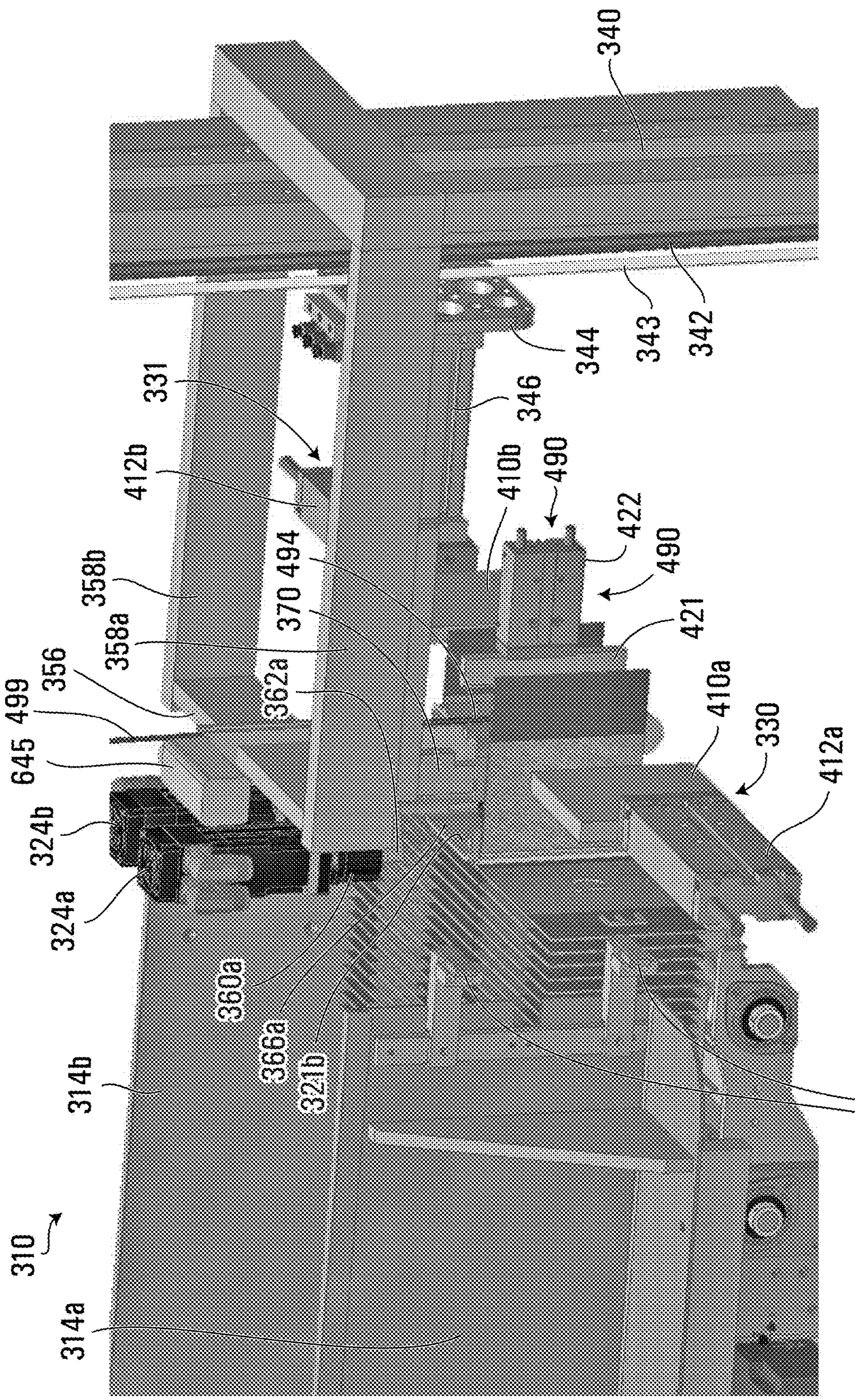
FIG. 38 is an upper left front side perspective view of part of the can forming system of FIG. 36 in another operational position.

The air suction force that may be developed at the outer surfaces of suction cups 368*a* will be sufficient so that when activated by PLC they can engage and hold panel D, and rotate panel D (along with panel E) of a case blank 3000 from (i) the position shown in FIG. 36 to (ii) the position shown in FIG. 38, and then (iii) after releasing a first engaged blank 3000, eventually return to the position shown in FIG. 36 to engage a panel D of the next case blank 3000 positioned at the pick-up position in magazine 310. The vacuum generated at suctions cups 368*a* can be activated and de-activated by PLC through operation of air distribution unit 427.

Second panel rotating apparatus 324*b* may be constructed and configured in generally the same manner as first panel rotating apparatus 324*a*. Second panel rotating apparatus 324*b* may operate in opposite rotational directions to first panel rotating apparatus 324*a*, when engaging and rotating other panels of blank 3000 than the panels engaged and rotated by first panel rotating apparatus 324*a*.

Second panel rotating apparatus 324*b* may include a rotational drive unit 360*b* (FIG. 39) that may be supported on support frame 376*b*. Extending from a lower end of rotational drive unit 360*b* is a rotational drive that may comprise a drive shaft that is operable for rotation clockwise and anti-clockwise about a vertical axis of rotation. The drive shaft and its axis of rotation, may be aligned transversely and longitudinally with, and may be positioned above, an inward corner of mandrel 337, that inward corner being transversely opposite to the corner which the drive shaft of first panel rotating apparatus 324*a* is positioned.

Figure 40:
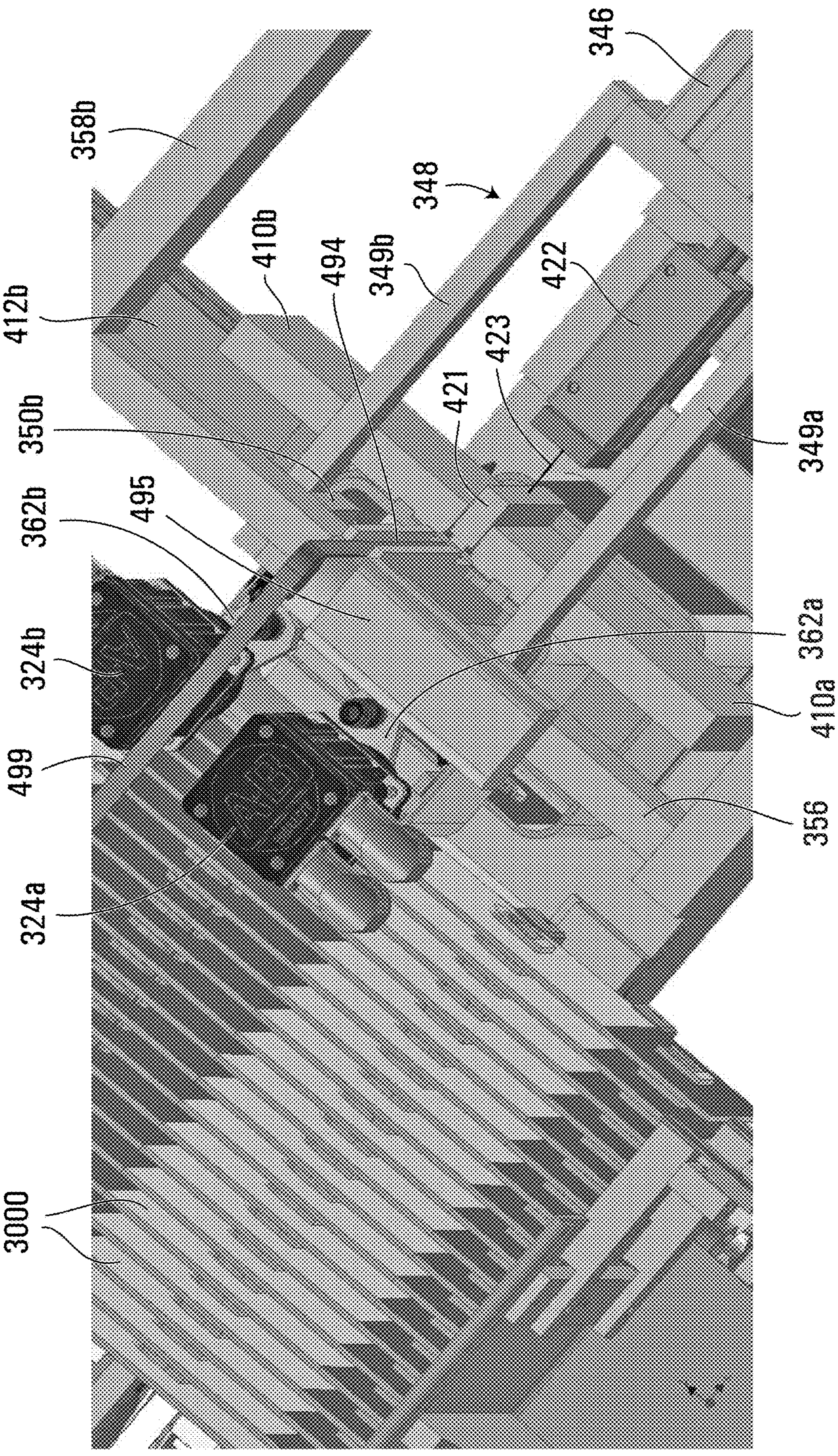
FIG. 40 is an upper left front perspective view of part of the can forming system of FIG. 36 in another operational position.

Extending from an opposite lower end of first rotation drive unit 360*b* is a second rotational drive (that may comprise a drive shaft that is not visible) that is operable for rotation clockwise and anti-clockwise about a second vertical axis of rotation. The drive shaft of second rotational drive unit 360*b* is operably connected to a first end portion (FIGS. 38 and 41) of a corresponding articulating arm 362*b* (FIG. 40). Thus, when rotational drive unit 360*b*, under the control of PLC 332, causes the drive shaft of second rotational drive unit 360*b* to rotate, articulating arm 362*b* is able to pivot clockwise or anti-clockwise relative to the drive shaft about a vertical axis, depending upon the direction of rotation of the drive shaft.

Mounted to the opposite end of articulating arm 362*b* of rotational drive 364*b* is a vertically oriented end effector rod 366*b* (FIG. 41) formed in a generally tubular cylinder and having one or more suction cups 368*b*.

Air suction cups 368*b* may, like air suction cups 368*a*, be interconnected through hoses passing through cavities in end effector 366*b*, articulating arm 362*b* and rotational drive 360*b* to a source of vacuum by providing for an air channel through the aforesaid components. The supply of vacuum to suction cups 368*b* may also be provided by pressurized air distribution unit 427. Air distribution unit 427 may include a plurality of valves that may be operated by PLC 332 and may also include local vacuum generator apparatuses that may be in close proximity to, or integrated as part of, suction cups 368*b*. In other embodiments, a vacuum pump mounted externally may generate vacuum externally and then vacuum can be supplied through the aforementioned air channels. If local vacuum generators are utilized, pressurized air may be delivered from an external source through air distribution unit 427 to the vacuum generators. The local vacuum generators may then convert the pressurized air to vacuum that can then be delivered to suction cups 368*b*.

The air suction force that may be developed at the outer surfaces of suction cups 368*b* will be sufficient so that when activated they can engage and hold panel B, and rotate panel B (along with panel A) of a case blank 3000 from (i) the position shown in FIG. 36 to (ii) the position shown in FIG. 38, and then (iii) after releasing a first engaged blank 3000, eventually return to the position shown in FIG. 36 to engage the next case blank 3000 positioned at the pick-up position in magazine 310. The vacuum generated at suctions cups 368*b*, like suction cups 368*a*, can be activated and deactivated by PLC through operation of air distribution unit 427.

First rotating apparatus 324*a* and second rotating apparatus 324*b*, may be configured to be readily adjustable for different types/configurations of mandrel apparatuses 320, including mandrels 337, for forming different types/configurations of blanks such as blanks 3000 into tubular side wall of paperboard cans, by suitable programming of PLC appropriately to provide for appropriate movements of the suctions cups 368*a*, 368*b*, through movement of the first and second rotational drives 360*a*, 360*b* respectively and by adjustment of first and second rotating apparatuses 324*a*, 324*b* on linear rail 397. For example the articulating arms 362*a*, 362*b* may be interchanged to provide for arms of different lengths. Thus by an interchange of mandrel 337 to provide for alternate configurations of the mandrel side wall, PLC 332 and its operation of first rotating apparatus 324*a* and second rotating apparatus 324*b*, may be appropriately modified and programmed and thus different sized and configurations of blanks may be processed.

Figure 39:
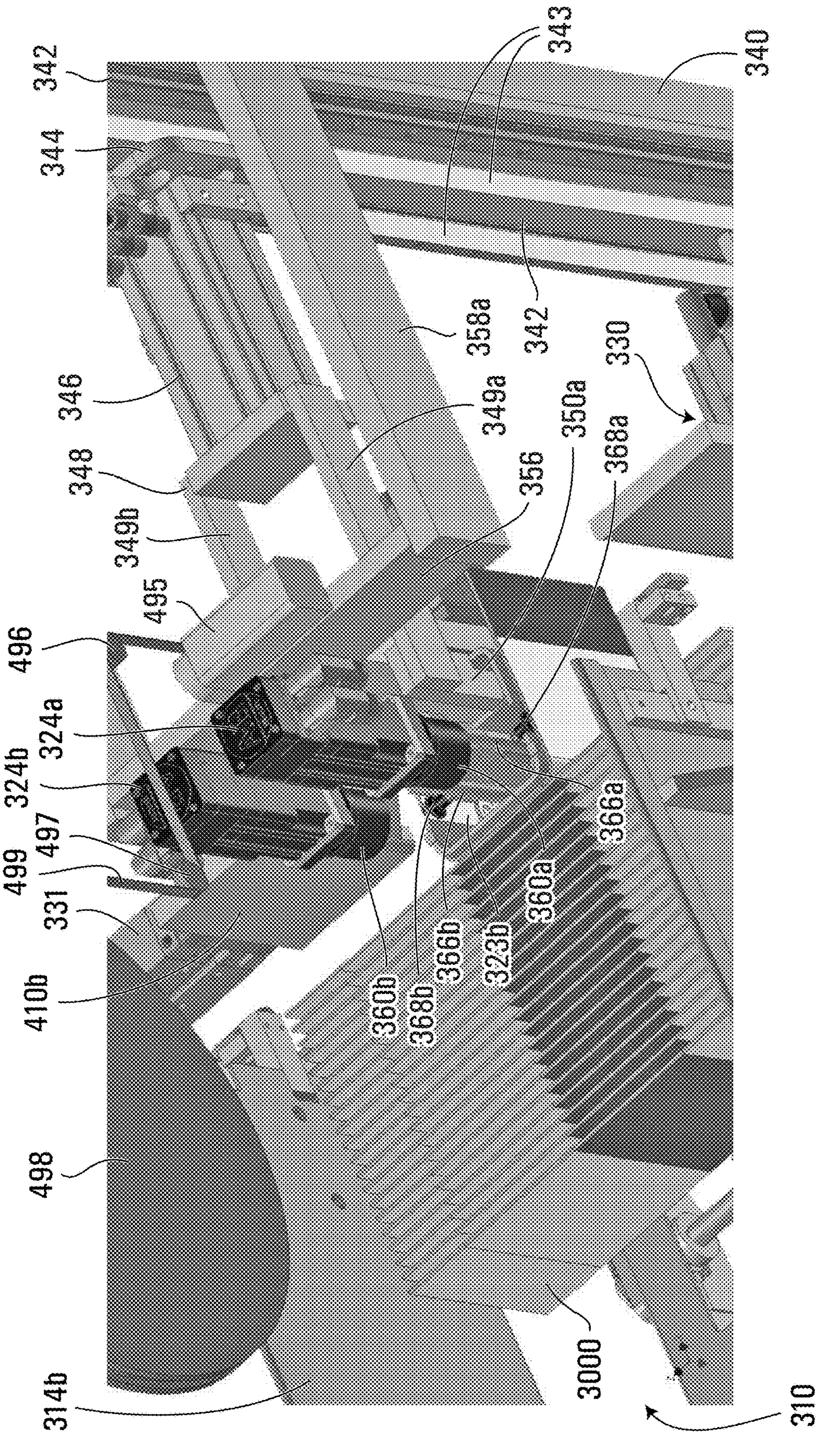
FIG. 39 is an upper left rear perspective view of part of the can forming system of FIG. 36 in the same operational position as FIG. 38.

Mandrel apparatus 320 may have several components including mandrel 337 (FIG. 36) and mandrel support apparatus generally designated 348 (FIG. 39). Mandrel 337 may be easily removable from fixed connection to mandrel support apparatus 348, so that a mandrel of one configuration may be easily replaced with a mandrel of another configuration.

With particular reference to FIGS. 36 and 37, mandrel 337 may comprise a pair of opposed, generally rectangular or square, spaced, vertically and transversely oriented, spaced, side walls 321*a*, 321*b* fixedly interconnected or integrally formed, with a pair of opposed, generally rectangular or square, spaced, vertically and longitudinally oriented, spaced, side walls 322*a*, 322*b*. Side walls 121*a*, 121*b*, 122, 122*b* may be connected/integrally formed to provide a generally cuboid, open top and bottom, square box shape. Alternate, substitutable mandrels 337 may be generally configured in a variety of different sizes and shapes, each selected for the particular type of case blank 3000 to be formed into a paperboard can.

The dimensions of the outer surfaces of mandrel 337 may be selected so that the specific can blank 3000 that it is desired to fold has, during the forming process, vertical fold lines that are located substantially at or along the four corner vertical side edges of mandrel 337. Such a selection may improve the performance of can forming system 300 in creating a formed can that is ready for loading with items. Mandrel 337, and surrounding components in system 300, may be configured to permit for the easy interchange of mandrels 337 so that can forming system 300 can be readily adapted to forming differently sized/shaped cases from differently configured case blanks 3000.

With reference to FIG. 36, left side mandrel side wall 322*a* may be provided with a vertical slot 323*a* that may be configured to permit a lower portion of end effector 366*a* and suction cups 368*a* thereon to move from the position shown in FIG. 36 to pass through slot 323*a* to the position shown in FIGS. 38 and 39. By allowing the end effector 366*a* to pass through vertical slot 323*a*, end effector 366*a*, and in particular suction cups 368*a*, may engage the outer surface of the panel D of blank 3000 when it is held in magazine 310 and bring panel D into face to face relation with the outward facing surface of mandrel side wall 322*a*. The surface of panel D being held by suction cups 368*a* becomes an inner surface of the tubular shaped blank and side panel D may be held substantially flat against the outside surface of side wall 322*a* of mandrel 337, as shown.

Similarly, with reference to FIG. 36C, the transversely opposite, right side mandrel side wall 322*b* may be provided with a similar vertical slot 323*b* that may be configured to permit a lower portion of end effector 366*b*, and suction cups 368*b* thereon, to move from the position shown in FIG. 37 to pass through slot 323*b* to the position shown in FIG. 38. By allowing the end effector 366*b* to pass through vertical slot 323*b*, end effector 366*b*, and in particular suction cups 368*b*, may engage the outer surface of the side panel B of blank 3000 when it is held in magazine 310 and bring panel B into face to face relation with the outward facing surface of side wall 322*b*. The surface of panel B being held by suction cups 368*b* becomes an inner surface of the tubular shaped blank and side panel B may be held substantially flat against the outside surface of major side wall 322*b* of mandrel 337, as shown.

Mandrel 337 may have one or more laterally extending tabs 370 (FIGS. 36 and 36C) at the upper perimeter edge. This ensures that when the mandrel 337 moves vertically downward with a blank 3000 wrapped around it and formed into a tube, the upper edge of the tubular shaped blank with its side wall formed from panels A-E will move vertically downwards with mandrel 337 as the edge of the side wall engages the downward facing surfaces of the tabs 370 such that the tabs 370 exert a downward force on the upper edge of the tubular side wall.

Figure 47:
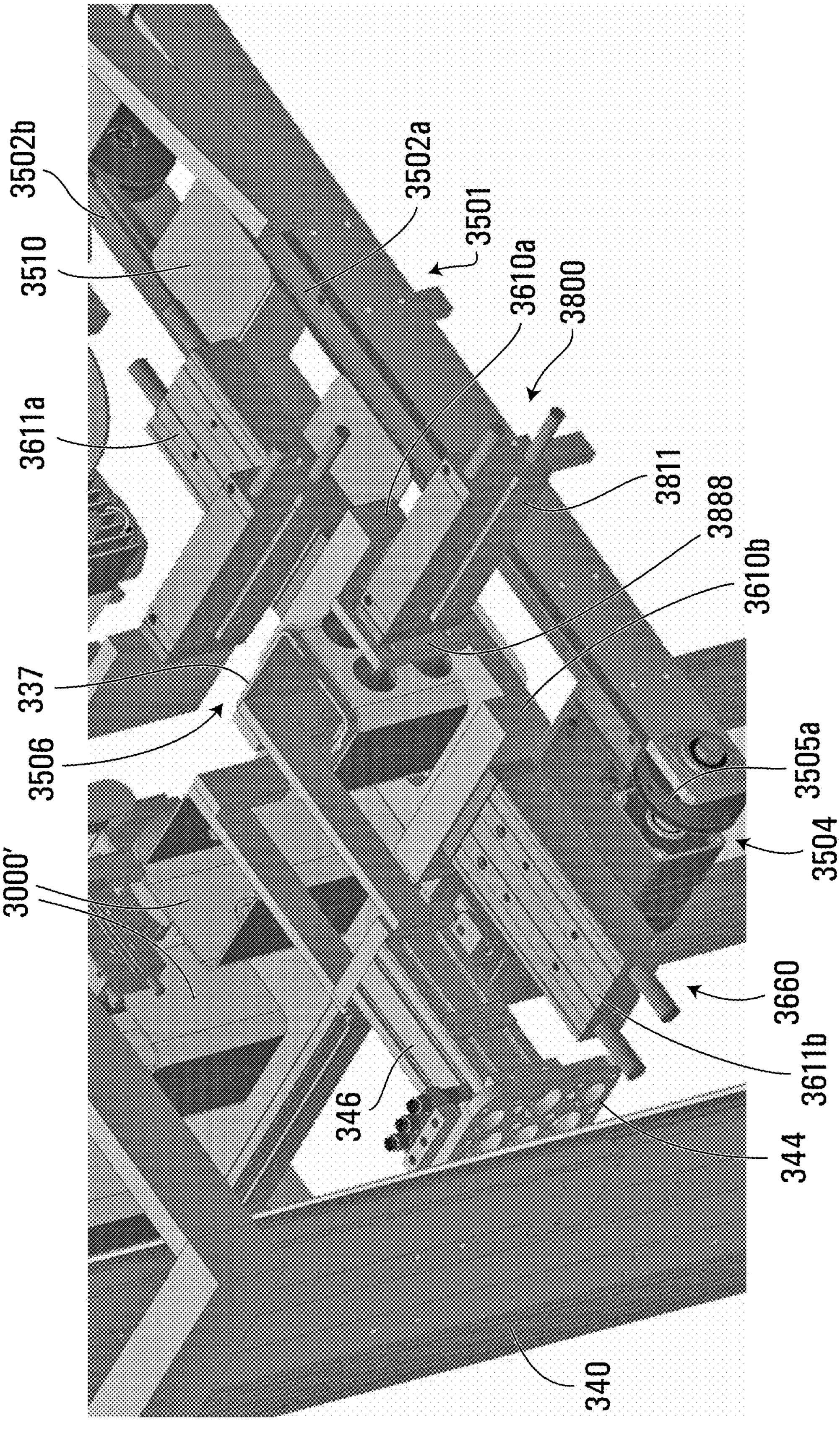
FIG. 47 is an upper right front perspective view of the lower part of the can forming system shown in FIG. 46 in an operational position.
Figure 48:
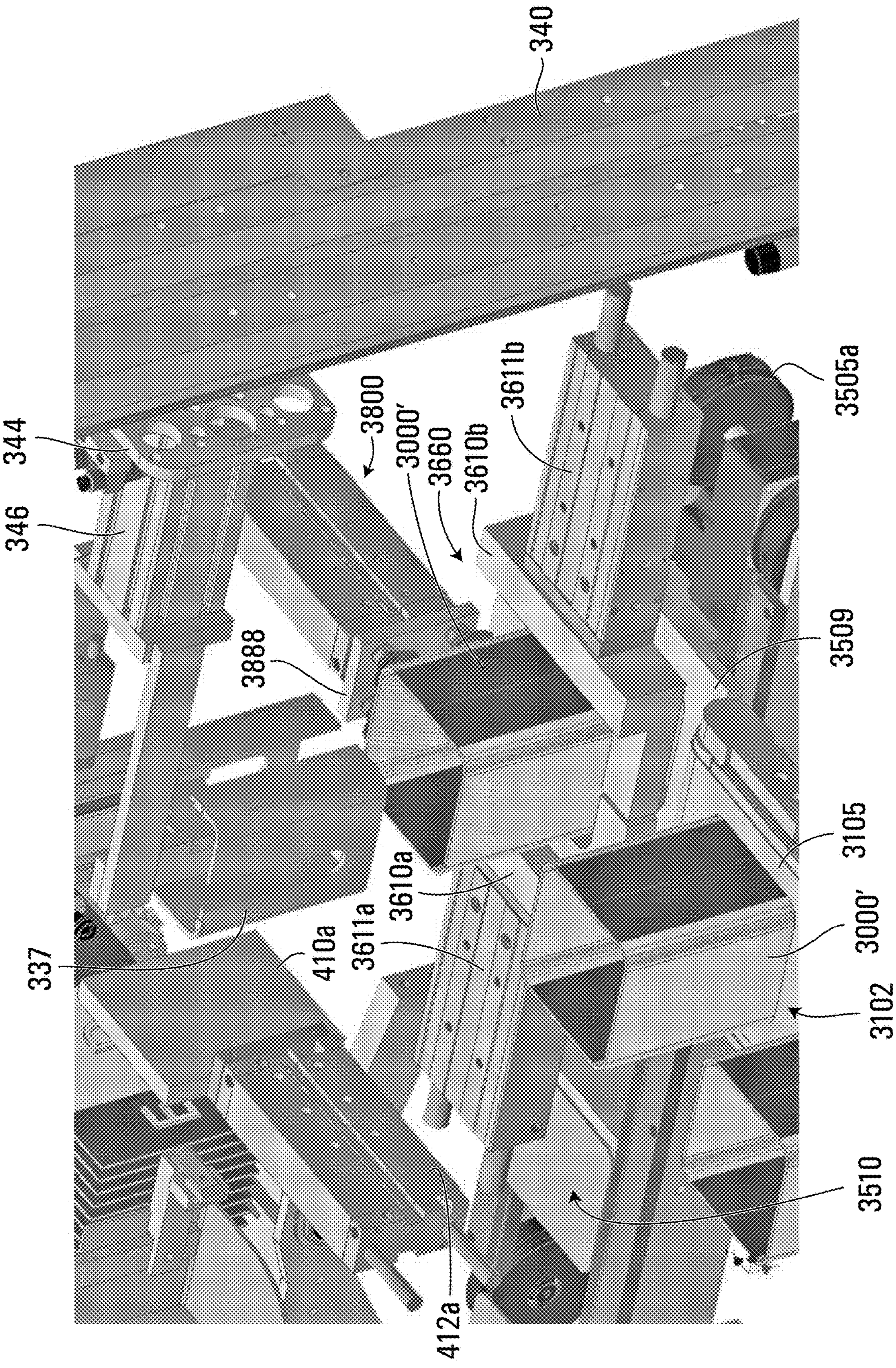
FIG. 48 is an upper left perspective view of the lower part of the can forming system shown in FIG. 47 in an operational position.

Mandrel side walls 321*a*, 321*b*, may be configured to facilitate the support of mandrel 337 on mandrel support apparatus 348. In particular vertical side support members 350*a*, 350*b* (FIGS. 39, 40 and 48) may be connected to a generally U-shaped support frame with side members 349*a*, 349*b* which may be supported at, and fixedly connected to, an outer end of carriage support arm 346. Support arm 349*a* may have secured to a distal end thereof vertical attachment member 350*a*. Similarly, support arm 349*b* may have secured to a distal end thereof vertical attachment member 350*b* (FIGS. 39, 47 and 48). Mandrel 337 may be connected to lower portions of vertical side support members 350*a*, 350*b* with releasable nuts/bolts to permit relatively easy interchange of differently sized/configured mandrels that are suitable for processing differently sized/configured blanks.

With reference to FIGS. 39 and 48, as noted above, mandrel support apparatus 368 is fixedly attached of a first end portion of longitudinally oriented and extending carriage arm 346. The opposite end portion of longitudinally oriented and extending carriage arm 346 is fixedly connected to carriage block 344. Carriage block 344 is attached for sliding vertical upward and downward movement on vertically oriented linear rail 342. Linear rail 342 may for example be a linear rail device of many types made for example by Bosch Rexroth AG and provides a vertical movement apparatus 336 for mandrel 337 and the mandrel supporting apparatus 368.

Linear rail 342 may be mounted to vertical support frame 340. As indicated above, linear rail 342 may have a carriage drive mechanism which is operable under the control of PLC to move the carriage 344 and thus also mandrel 337 vertically upwards and downwards within a range of movement as required for completing the can forming operations described herein.

It will also be appreciated that in first panel rotation apparatus 324*a* and second panel rotating apparatus 324*b*, suction cups 368*a*, 368*b* respectively are used to apply a force to engage and move panels of a blank 3000. However alternative engagement mechanisms to suction cups could be employed in other embodiments to engage and rotate panels of blanks 3000.

Figure 41:
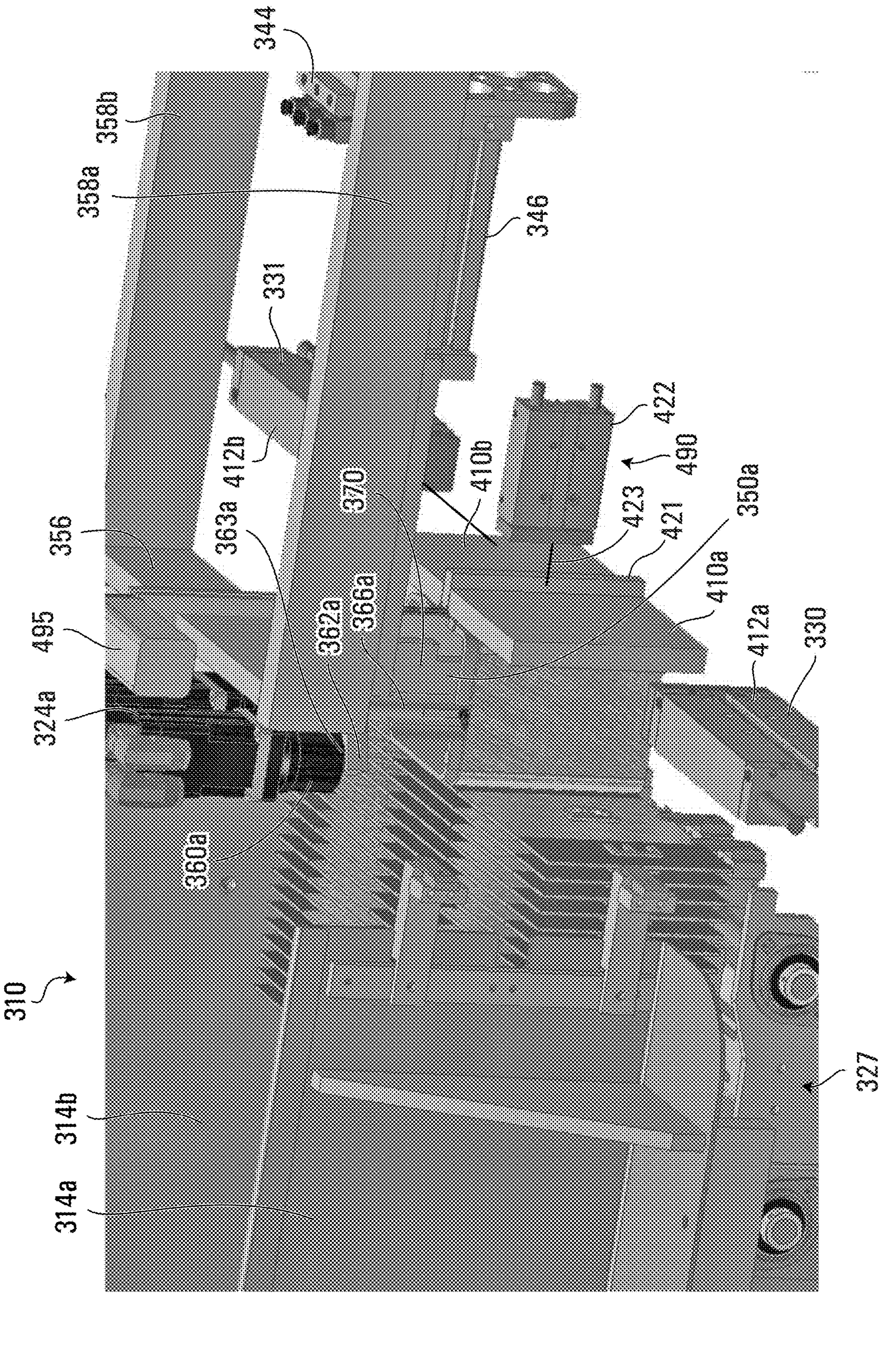
FIG. 41 is an upper left front perspective view of part of the can forming system of FIG. 36 in the same operational position as FIG. 40.

The next components of system 300 to be described in detail are third panel rotating apparatus 330 and fourth panel rotating apparatus 331 (see FIGS. 36 and 37) which are respectively configured to cause panels E and A to be folded 90 degrees relative to panels D and B respectively about their corresponding panel fold lines to complete the wrapping of the panels A-E around the outward facing surfaces of mandrel 337 to form a generally square tubular shape as shown in FIGS. 40 and 41.

Third panel rotating apparatus 330 is operable to rotate panel E counter clockwise 90 degrees about the fold line with panel D. Fourth panel rotating apparatus 331 is operable to rotate panel A clockwise 90 degrees about the fold line with panel B. When panels A and E are so rotated, the vertical longitudinal side edges of the panels come into abutment with each other. Between the inner surface of the panels A and E (when they are rotated relative to panels B and D respectively, and have their vertical edges in abutment with each other) and the outward facing surface of side wall 321*a* of mandrel 337, is provided a strip portion 494 of sealing tape 499 (see FIGS. 36, 36C and 37). In some embodiments, sealing tape 499 may for example be a metalized foil ribbon material such as the same material that is used in the intermediate metallic foil layer in the blank. Sealing tape may be in some embodiments be the same or a similar material to that used in the inner layer of the blank such as a polyolefin layer which will bond to the polyolefin layer on the inner surface of the blank when appropriately heated, or it may be a material comprising a combination of these two materials from the blank, with the polyolefin layer of the sealing tape being in face to face relation with the polyolefin layer of the tubular blank at the abutting edges of the panels A/E of the blank. In other embodiments, a plastic type material bearing a cold seal adhesive may be employed for the sealing tape.

Sealing tape 499 may be wound around and delivered from a reel/spool 498 which feeds sealing tape 499 over wheels 497 and 496 to a sealing tape support bracket device 495. Bracket device 495 may be mounted to transverse support member 356 and may include a vertically oriented guide channel which allows for sealing tape 499 to be delivered to provide a strip portion 494 to be positioned and held in vertical orientation on the outward facing surface of side wall 321*a* of mandrel 337 opposite and spanning the abutting vertical edges of panels A and E.

Third panel rotating apparatus 330 and fourth panel rotating apparatus 331 may each include a respective transversely oriented plough device, 410*a*, 410*b*, each having a plough plate that may be moved transversely in intermittent, reciprocating transverse movement outwards and inwards a desired amount by corresponding actuating double acting pneumatic cylinders 412*a*, 412*b* with movable piston arms that are connected to plough devices 410*a*, 410*b*. The transverse movement of plough devices 410*a*, 410*b* may be controlled by valves in air distribution unit 427 (not shown) that selectively deliver pressurized air through hoses (not shown) to respective double acting pneumatic cylinders 412*a*, 412*b*, under the control of PLC. The plough devices 410*a*, 410*b* may be configured such that the movement of plough plates of plough devices 410*a*, 410*b* may engage and push on panels E and A respectively causing rotating of panels E and A 90 degrees relative to panels D and B respectively about the corresponding panel fold lines.

System 300 may also include a sealing device 490 (FIGS. 36, 36C, 37, 38 and 41) which may also include a vertically oriented sealing jaw (aka sealing bar) 421 that may be moved longitudinally in intermittent, reciprocating movement by double acting pneumatic cylinder 422 with movable piston arm 423 (FIG. 40), within a desired range outwards and inwards. The transverse reciprocating intermittent movement of sealing jaw 421 may be controlled by valves (not shown) that selectively deliver pressurized air through hoses (not shown) to pneumatic cylinder 422 that may be supplied by pressurized air controlled by valves in air distribution unit 427, under the control of PLC 332. With reference to FIG. 40, when piston arm 423 is extended, sealing jaw 421 will be received into a vertical longitudinal gap between the extended vertical edges of plough devices 410*a*, 410*b* and be able to engage the abutting outward faces of the edges of panels A and E.

Heat can be applied to the polyolefin layer in the vertical edge portions of the abutting panels A and E and to the strip portion 494 which includes a metalized foil material, to thereby melt the polyolefin layer in the abutting edge regions. The melted polyolefin material will then bond to sealing strip 494 that is adjacent to and overlaps the vertical edges of abutting panels A and E. For example, heating may be provided sealing jaw 421 which may contain therein electrical heating elements (such as induction heating components that may be powered by electrical current supplied to sealing device 490.

Once strip portion 494 of sealing tape 499, that extends down the entire abutting joint, has bonded to panels A and E, the tubular sidewall shaped for a paperboard can has been formed. As the mandrel 337 is moved vertically downwards by mandrel movement apparatus 336, strip portion 494 of the sealing strip 499 that has been bonded to the abutting vertical edge region of panels A/E will also be moved downwards with the mandrel 337 and he tubular shaped blank 3000. This downward movement will pull down an additional strip portion 494 of sealing tape 499 from reel 498 that will be retained in the guide in bracket device 495, and will be available to be used to seal the vertical abutting edges of panels A/E on the next blank 3000 that will be processed by can forming system 300.

When one sealing strip portion 494 attached to the vertical edge region of abutting panels A and E of a blank 3000 that has been already formed into a tubular shape on mandrel 337, has been moved down sufficiently to provide for the next sealing strip portion 494 to be appropriately positioned in guide device 495, a cutting device (not shown) will be employed to cut the sealing strip portion 494 that is attached to panels A/E of the tubular blank 3000 that has moved downward vertically, at the top vertical edges of abutting panels A and E, so that the sealing strip portion 494 that is attached to that tubular blank 3000 that has moved downward, is detached from the reel of sealing tape 499 being fed from reel 498.

The cutting device may be a scissor style cutting device and its operation may be controlled by PLC 332. The aforementioned components of third panel rotating apparatus 330, fourth panel rotating apparatus 331, and sealing device 490 may be mounted to frame members (not shown for simplicity) of support frame 340. In some embodiments, the horizontal longitudinal/transverse positions and possibly also their vertical positions may be adjustable on the frame to enable the components thereof to accommodate/substitute different sized/configured mandrel apparatuses 320 and corresponding different size and configuration of blanks. The adjustment may be made by hand and/or by servo motors operating moving support components under control of PLC 332.

Pneumatic cylinders 412*a*, 412*b* and 422 may each be a conventional double/two way acting pneumatic reciprocating cylinder with piston arms that are operable to move in a reciprocal movement between fully extended positions and fully retracted positions. Compressed air may be delivered to pneumatic cylinders 412*a*, 412*b*, 422, by hoses (not shown) in communication with a source of pressurized air through air distribution unit 427. To channel the compressed air appropriately, valves (not shown) in distribution unit 427 can be driven between open and closed positions by solenoids responsive to signals from PLC 332. The valves could be located proximate the pneumatic cylinders or be disposed elsewhere. Electrical communication lines carrying signals to and from PLC 332 could also be provided to operate the valves.

It should also be noted that during the downward vertical movement of a case blank 3000 secured to mandrel 337, one or more compression rails (not shown) supported on part of vertical support frame 140 may be configured and positioned to apply pressure to the panels A and E pushing against the outward surface of side wall 121*a* of mandrel 337, to ensure appropriate sealing of panels A and E to the sealing strip portion 494.

Figure 43:
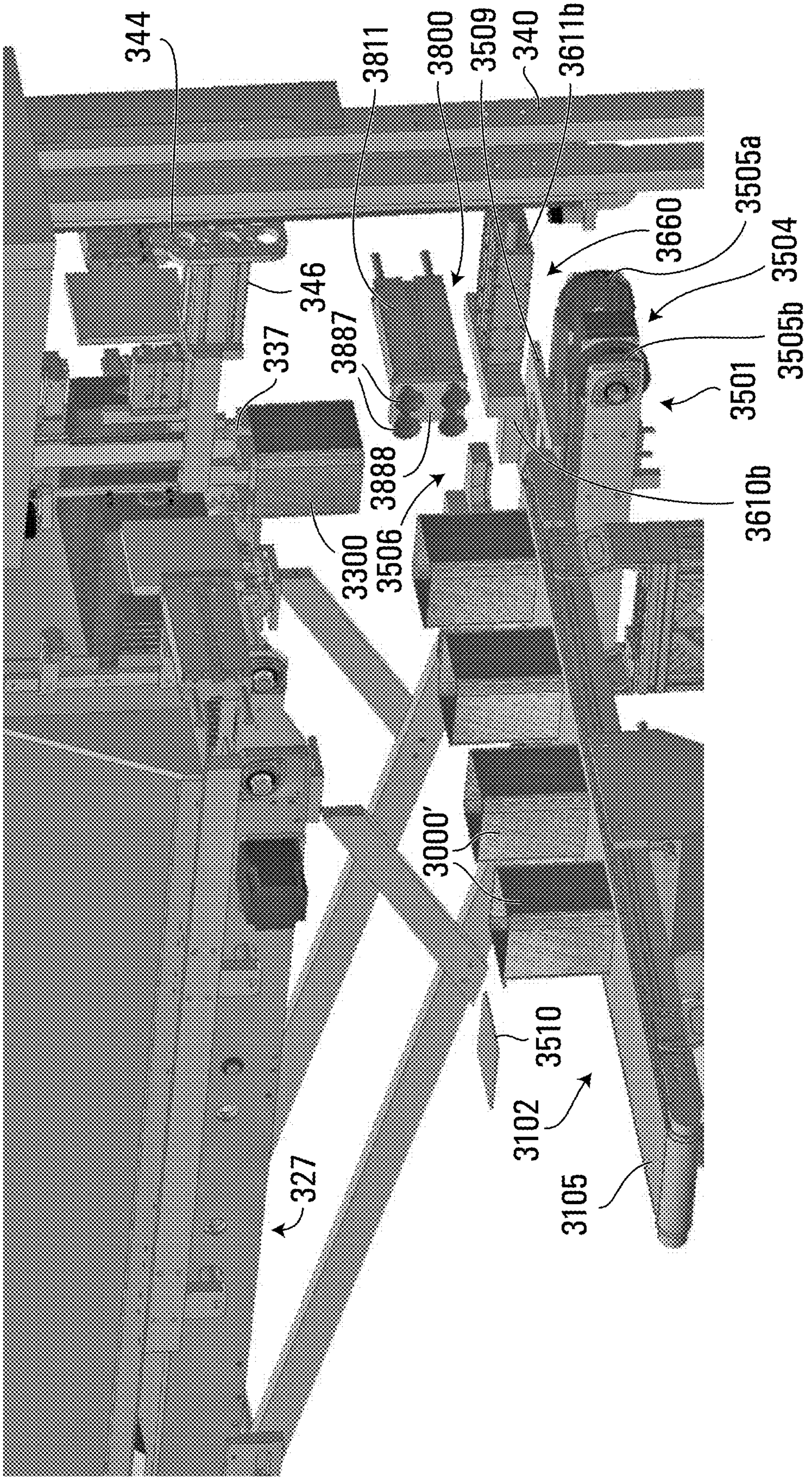
FIG. 43 is a left front side perspective view of part of the can forming system of FIG. 36 in an operational position.

With particular reference now to FIGS. 36A and 43, a can discharge conveyor 3102 (for simplicity not shown in the other Figures) may be provided with a continuous conveyor belt 3105 driven in a conventional manner by a drive motor under control of PLC. Conveyor belt 3105 may be configured with a top run to support and move open topped cans 3000' formed from blanks 3000 by case forming system 300. Can discharge conveyor 3102 may be supported on frame support leg components 340*a*, 340*b* (FIG. 36A) which may be part of frame 340.

With particular reference to FIG. 44, a bottom cup delivery conveyor 3501 which may be under control of PLC 332 may be provided with a pair of spaced apart continuous conveyor belts 3502*a*, 3502*b* driven in a conventional manner by a drive motor 3504 with drive wheels 3505*a*, 3505*b*, under control of PLC and configured to support and deliver a plurality of bottom cups 3510 in series to a bottom forming station generally designated 3506.

With reference to FIGS. 42-46, at bottom forming station 3506 may also be horizontal support and forming plate 3509 having an opening 3509*a* through which a bottom cup 3510 may be moved vertically upwards by a vertical lift mechanism 3507 under control of PLC 332 from cup delivery conveyor 3501 through opening 3509*a*. Vertical lift mechanism 3507 may include a two way acting pneumatic cylinder 3509 with piston arm connected to a lift platform 3510. Pneumatic cylinder 3569 may move lift platform 3510 vertically movable upwards and downwards as pneumatic cylinder 3569 is activated by valves controlled by PLC 332.

When a bottom cup 3510 is transversely and horizontally aligned with opening 3509*a* of plate 3509, vertical lift mechanism 3507 may lift an aligned bottom cup upwards through opening 3509*a*. Depending upon the nature of the construction of bottom cup 3510, the size and configuration of opening 3509*a* may be configured such that plate 3509 functions as a former, in that a perimeter edge portion of the bottom cup 3510 may be bent downwards relative to the remaining body portion of bottom cup 3510 as bottom cup 3510 is pushed through opening 3509*a*. This may provide an edge surface portion of the bottom cup to more easily facilitate bonding with and sealing to the inner wall surface of tubular shaped side wall of blank 3000.

Vertical lift mechanism 3507 may continue lifting bottom cup 3510 and/or vertical movement apparatus 348 of mandrel 337 such that bottom cup 3510 is moved into the lower opening of tubular shaped blank 3000. The bottom edge of mandrel 337 may be located above the lower edge of the tubular shaped side wall of blank 3000 to provide adequate space for bottom cup 3510 to be received into the lower opening of the tubular shaped blank.

With reference to FIGS. 42 to 48, a heating apparatus 3600 under control of PLC 332 is provided which is operable to engage the outer perimeter of tubular shaped blank 3300 that is wrapped around mandrel 337 when the mandrel 337 has positioned the blank 3000 at a bottom forming position at bottom forming station 3506 (as shown in FIGS. 47 and 48). Heating apparatus 3660 may include a first heating fork 3610*a* that is mounted to the piston arm of a double acting pneumatic cylinder 3611*a*. Pneumatic cylinder 3611*a* may move heating fork 3610*a* in reciprocating longitudinal and horizontal movement activated by valves controlled by PLC 332 between an engaged heating position (FIGS. 47 and 48), and a disengaged position.

Heating apparatus 3660 may also include a second heating fork 3610*b* that is mounted to the piston arm of a double acting pneumatic cylinder 3611*b* and is positioned opposite to first heating fork and pneumatic cylinder 3611*a*. Pneumatic cylinder 3611*b* may move heating fork 3610*b* in reciprocating longitudinal and horizontal movement, opposite toe the movement of heating fork 3610*a*, and may also be activated by valves controlled by PLC 332 between an engaged heating position (FIGS. 47 and 48), and a disengaged position.

Heating forks 3610*a*, 3610*b* may incorporate electrical heating elements that are operable to provide sufficient heating of the polyolefin inner layer at the lower perimeter edge of tubular shaped blank 3000 to melt the polyolefin material at the lower edge region and thus create a bond between the edge region of the bottom cup 3510 that is positioned within the tubular opening at the lower edge region of blank 3000. Heating forks 3610*a*, 3610*b* may also apply pressure to the outer surface of the blank 3000 at the lower edge region to press the inner polyolefin layer in that region against a side edge surface of the bottom cap 3510 and thereby create a bottom perimeter seal between the bottom cap 3510 and the tubular side wall blank 3000.

Figure 42:
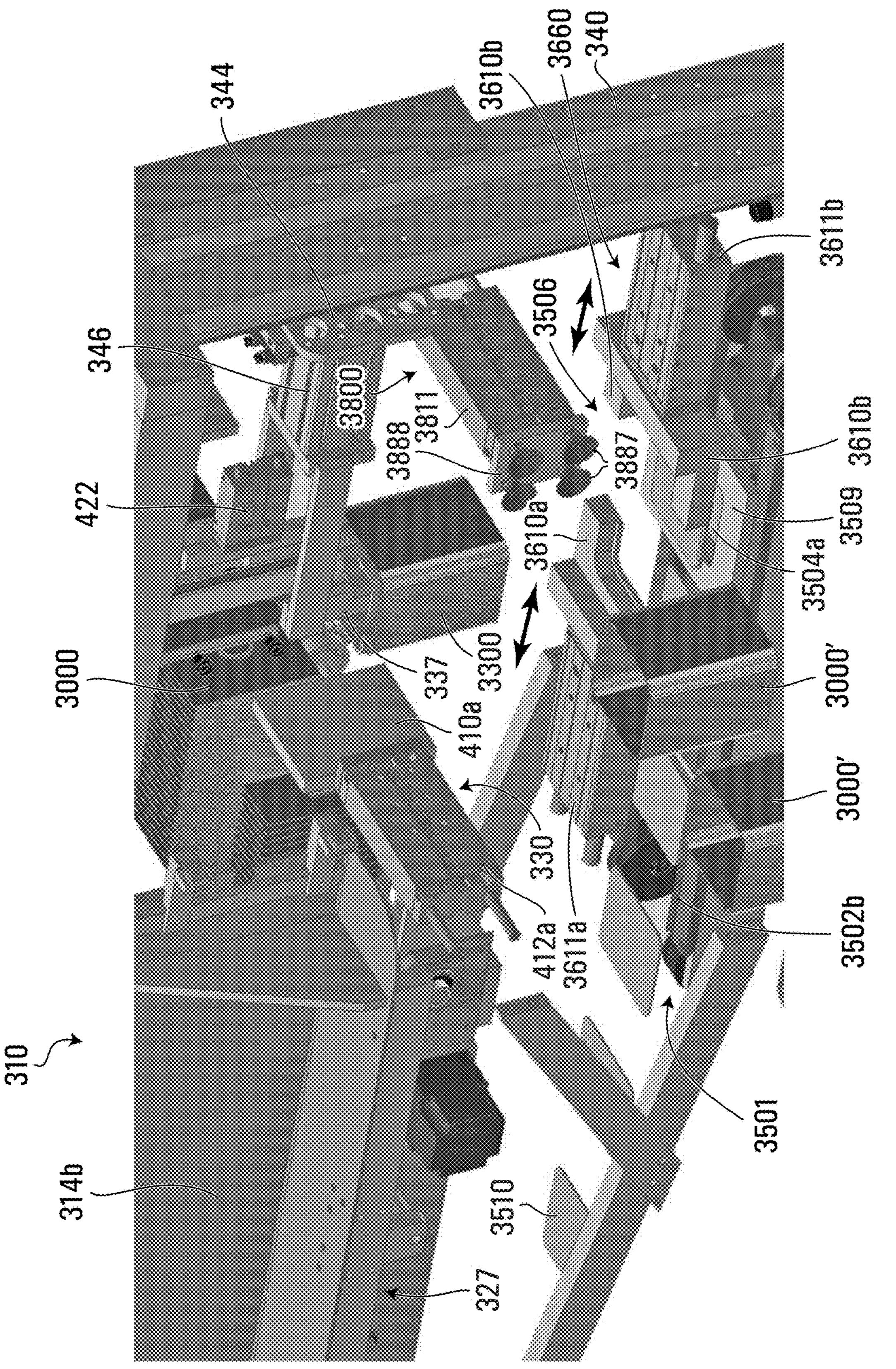
FIG. 42 is an upper, left front side perspective view of part of the can forming system of FIG. 36 in an operational position.
Figure 49:
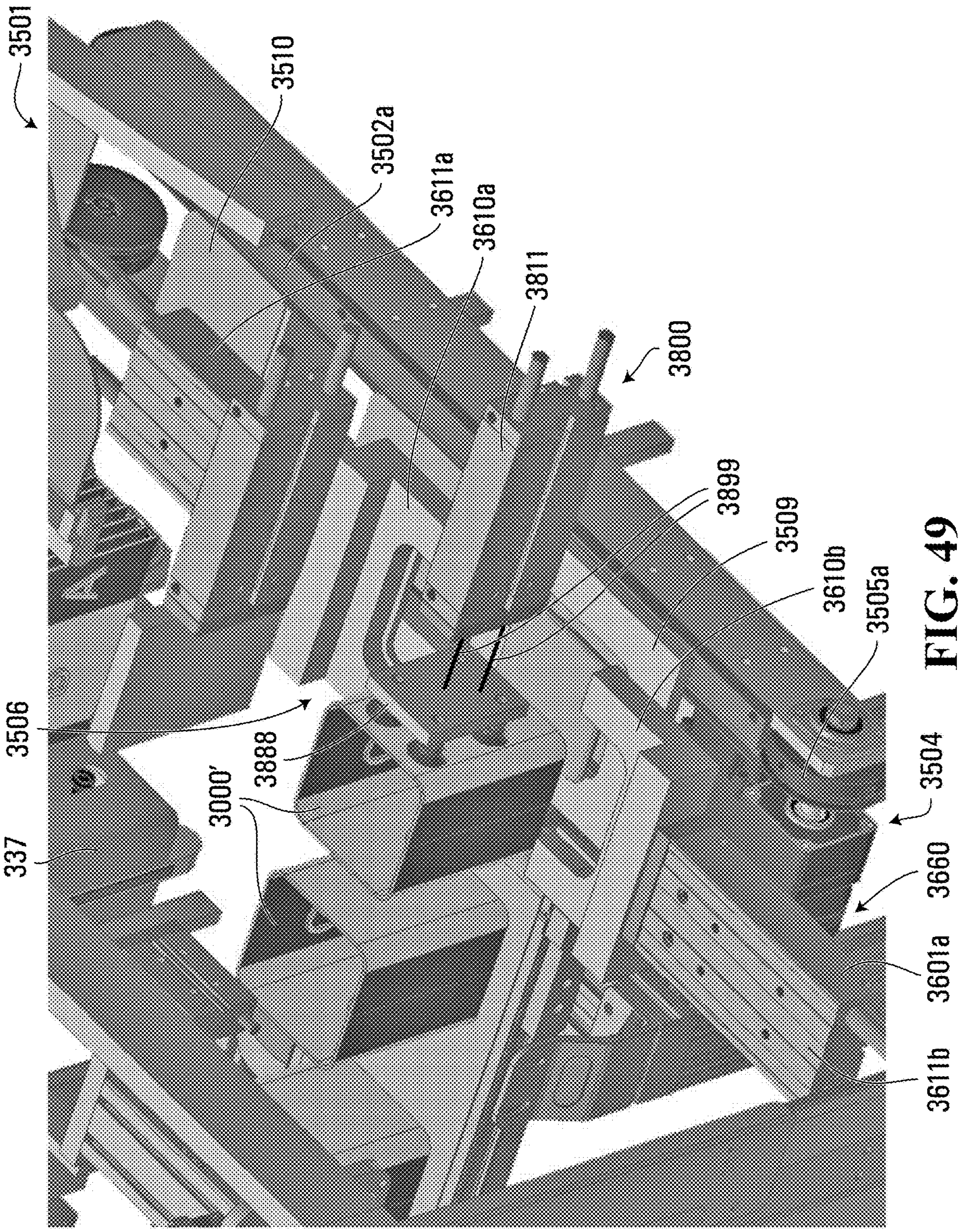
FIG. 49 is an upper right front perspective view of the lower part of the can forming system shown in FIG. 47 in another operational position.

A blank retention and delivery apparatus 3800 under control of PLC 332 may also be provided at bottom forming station 3506. Blank retention and delivery apparatus 3800 may include a double acting pneumatic cylinder 3811 with one or more movable piston arms 3899 (FIG. 49). Mounted to piston arms 3899 may be a suction cup block 3888 which may have mounted thereto a plurality of suction cups 3887 (FIG. 42). Pneumatic cylinder 3811 may move suction cup block 3888 in reciprocating transverse horizontal movement, and may also be activated by valves controlled by PLC 332 between a blank engagement position (FIG. 46), a blank delivery transfer position (FIG. 49) and a disengaged position (FIG. 42). In the engagement position, suction cups 3887 have a suction force that engages a facing surface of blank 3000. This may assist in holding the blank 3000 in a fixed position while a bottom cup 3510 is being installed in the blank 3000. In the engaged position, suction cups 3887 may also hold the blank in a fixed position when mandrel 337 is moved to a vertical position as it is being disengaged from blank 3000, after bottom cup 3510 has been inserted into the blank 3000 (ie. when mandrel 337 is moving from the position in FIG. 47 to the position in FIG. 48).

In the delivery positions, the suction cups 3887 are being moved by piston arms 3899 and block 3888 in a transverse direction toward discharge conveyor 3102 so that the blank 3000 which is now formed into an open top can 3000' with bottom cup 3510 installed, is moved to a delivery transfer position. At the delivery transfer position suction cups 3887 can be deactivated allowing the can 3000' to be deposited onto conveyor belt 3105 such that the can 3000' can be moved for further processing. That further processing will typically include filling the interior space of the can 3000' with one or more items/products and then closing the top, including creating a top seal.

In operation, can forming system 300 is operable to perform the sequence of steps 3000(1) to 3000(7) illustrated in FIG. 34 of folding and sealing a blank 3000 to form an open top paperboard can 3000'. At the beginning of a cycle of operation, magazine 310 which has a plurality of blanks 3000 held therein has a blank 3000 at the front of the magazine in a pick-up position (see FIGS. 36 and 37).

Panel rotating apparatus 324*a* may then be operated by PLC 332 to engage with the facing surface of panel D of the front blank 3000 held in magazine 310 and rotate panels D and E 90 degrees in a counter clockwise direction such that they are in engagement with a surface of side wall 322*a* of mandrel 337 (see FIGS. 38 and 39). Panel rotating apparatus 324*b* may also be operated to engage with a facing surface of a panel B of a blank held in magazine 310 and rotate panels A and B 90 degrees such that they are in engagement with a surface of opposite side wall 322*b* of mandrel 337. Vertical slot 323*a* of left side mandrel side wall 322*a* permits a lower portion of end effector 366*a* and suction cups 368*a* thereon to move from the position shown in FIG. 36 to pass through slot 323*a* to the position shown in FIGS. 38 and 39. By allowing the end effector 366*a* to pass through vertical slot 323*a*, end effector 366*a*, and in particular suction cups 368*a*, may engage the outer surface of the panel D of blank 3000 when it is held in magazine 310 and bring panel D into face to face relation with the outward facing surface of mandrel side wall 322*a*. The surface of panel D being held by suction cups 368*a* becomes an inner surface of the tubular formed blank and side panel D may be held substantially flat against the outside surface of side wall 322*a* of mandrel 337, as shown.

Similarly, vertical slot 323*b* of transversely opposite, right side mandrel side wall 322*b* permits a lower portion of end effector 366*b*, and suction cups 368*b* thereon, to move from the position shown in FIG. 36 to pass through slot 323*b* to the position shown in FIG. 38. By allowing the end effector 366*b* to pass through vertical slot 323*b*, end effector 366*b*, and in particular suction cups 368*b*, may engage the outer surface of the major side panel B of blank 3000 when it is held in magazine 310 and bring panel B into face to face relation with the outward facing surface of side wall 322*b*. The surface of panel B being held by suction cups 368*b* becomes an inner surface of the tubular formed blank and side panel B may be held substantially flat against the outside surface of major side wall 322*b* of mandrel 337, as shown (see FIGS. 38 and 39.

Next, with reference to FIGS. 40 and 41, third panel rotating apparatus 330 may be operated to rotate panel E 90 degrees in a counter-clockwise direction relative to panel D about the fold line between panels D and E. Similarly, fourth panel rotating apparatus 331 may be operated to rotate panel A 90 degrees in a clockwise direction relative to panel B about the fold line between panels A and B. The result is a generally square shaped tubular blank formed generally around the outer surfaces of mandrel 337. Panels A and E are positioned in transverse orientation in parallel to panel C about opposed vertical and transverse oriented surfaces of mandrel 337. When panels A and E are so rotated, the vertical longitudinal edges of the panels come into abutment with each other. Between the inner surface of the panels A and E (when they are rotated relative to panels B and D respectively, and have their vertical edges in abutment with each other) and the outward facing surface of side wall 321*a* of mandrel 337, is strip portion 494 of sealing tape 499 (see FIG. 41).

Next, sealing device 490 (FIG. 41) may be operated such that vertically and longitudinally oriented sealing jaw 421 that may be moved under control of PLC 332 in longitudinally inward direction by double acting pneumatic cylinder 422. With the piston arm 423 extended, sealing jaw 421 is received into a vertical longitudinal gap between the extended vertical edges of plough devices 410*a*, 410*b* and may engage the abutting outward faces of the edges of panels A and E.

Heat can be applied to the polyolefin layer in the vertical edge portions of the abutting panels A and E and the metal foil layer in strip portion 494 to thereby melt the polyolefin layer in the abutting edge regions. The melted polyolefin material will then bond to sealing strip 494 that is adjacent to and overlaps the vertical edges of abutting panels A and E. Once a portion of sealing tape 499 that extends down the entire joint has bonded to panels A and E, the tubular sidewall for the can has been formed.

With reference now to FIGS. 42 and 43, next PLC 332 may operate vertical movement apparatus 336 to move mandrel 337 vertically downwards, with the result that the sealing strip portion 494 of sealing tape 499 which is bonded to panels A/E will also be pulled down with the mandrel 337 and the tubular formed blank 3000. This downward movement will pull down an additional, next strip portion 494 of sealing tape 499 that will be retained in the guide in bracket device 495, and will be available to seal panels A/E on the next blank 3000 that will be processed by can forming system 300.

When a sealing strip portion 494 attached to a blank 3000 formed into a tubular shape on mandrel 337 has been pulled down sufficiently to provide for the next sealing strip 494, the cutting device (not shown) is employed to cut the sealing strip 494 that is attached to panels A/E of the tubular blank 3000 that has moved downward vertically, so that the sealing strip portion 494 attached to that tubular blank 3000 that has moved downward, is detached the rest of the sealing tape 499 being fed from spool 498.

Figure 45:
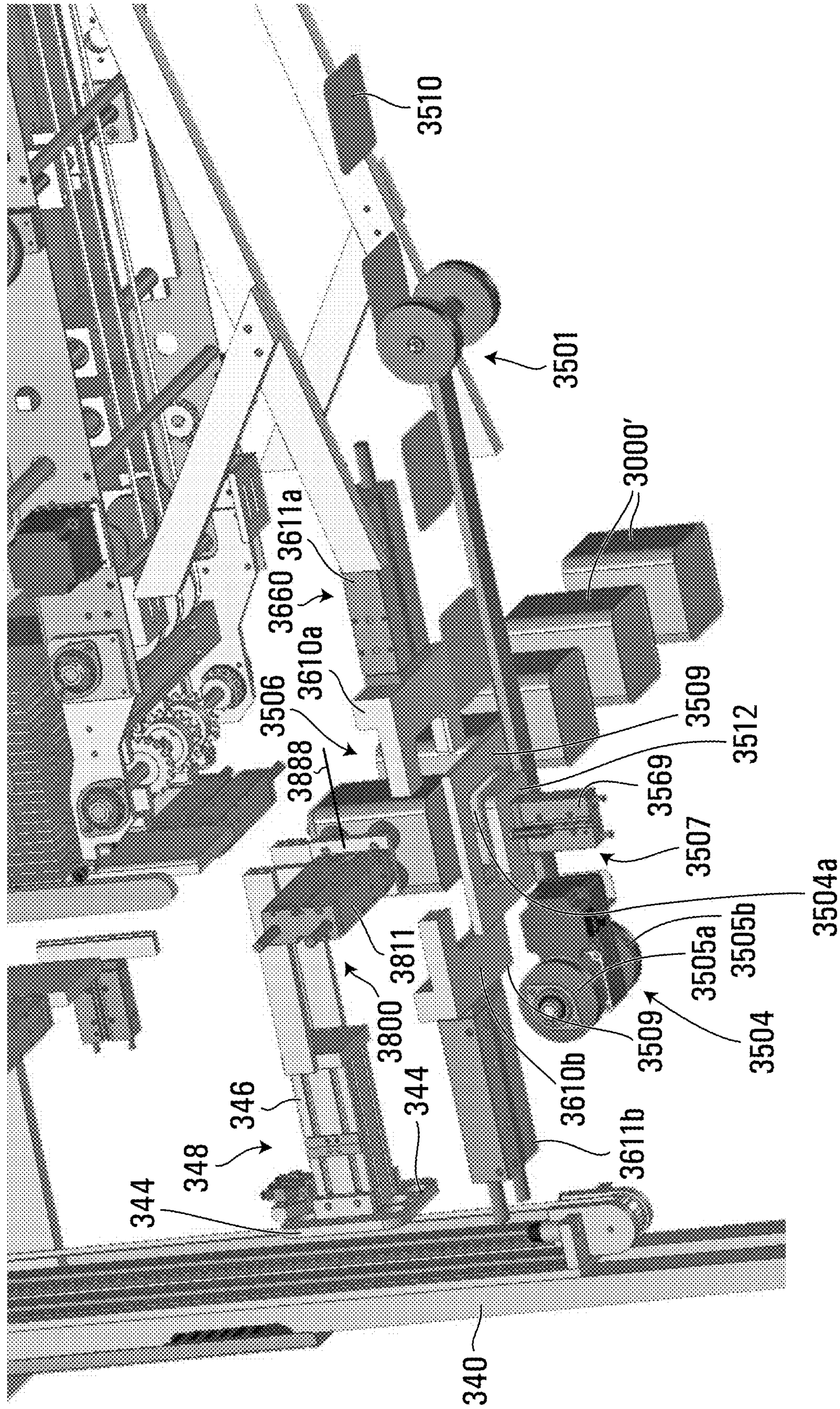
FIG. 45 is a lower right rear side perspective view of the lower part of the can forming system shown in FIG. 44 in an operational position.

Now with reference to FIGS. 44 and 45, PLC 332 continues to operate vertical movement apparatus 336 to move mandrel 337 and the tubular shaped blank 3000 wrapped around it, to the bottom forming station 3506 where a bottom cup 3510 may be installed. With the mandrel 337 moved to the bottom forming position, a bottom cup 3510 may be moved up through opening 3509*a* in forming plate 3509 by vertical lift mechanism 3507. A bottom cup 3510 may be positioned in a lift position having been delivered there by a cup delivery conveyor 3501. Vertical lift mechanism 3507 may continue lifting bottom cup 3510 and/or vertical movement apparatus 348 of mandrel 337 such that bottom cup 3510 is moved into the lower opening of tubular shaped blank 3000 that is held on mandrel 337.

Figure 46:
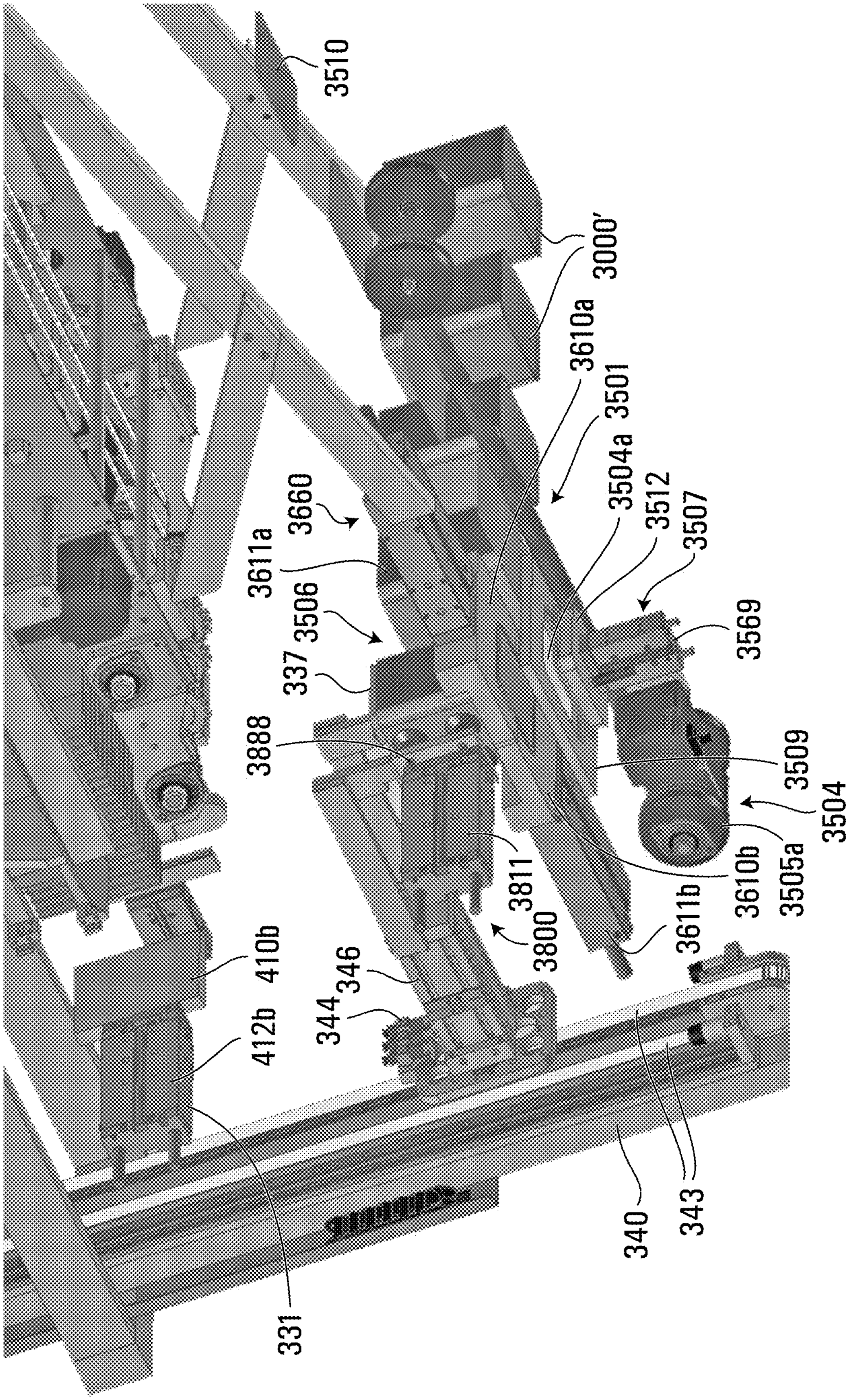
FIG. 46 is a lower right rear perspective view of the lower part of the can forming system shown in FIG. 45 in an operational position.

With reference now to FIGS. 46 to 48, next heating apparatus 3600 is operated by PLC to engage the outer perimeter of tubular shaped blank 3300 that is wrapped around mandrel 337 when the mandrel 337 has positioned the blank at a bottom forming position at bottom forming station 3506, first heating fork 3610*a* and second heating fork 3610*b* are moved to the engaged heating position (FIGS. 46, 47 and 48).

Electrical heating elements of heating forks 3610*a*, 3610*b* may be operated to provide sufficient heating of the polyolefin inner layer and metal foil layer at the lower perimeter edge of tubular shaped blank 3000 to melt the polyolefin material at the lower edge region and thus create a bond between the bottom cap 3510 that is positioned within opening at the lower edge region of blank 3000. Heating forks 3610*a*, 3610*b* may also apply pressure to the outer surface of the blank at the lower edge region to press the inner polyolefin layer in that region against a side edge surface of the bottom cap 3510 and thereby create a bottom perimeter seal around and between the bottom cap 3510 and the tubular side wall of blank 3000.

Blank retention and delivery apparatus 3800 may also be operated such that suction cups 3887 have a suction force that engages a facing surface of blank 3000. This may assist in holding the blank 3000 in a fixed position while a bottom cup 3510 is being installed in the blank 3000.

Next, with suction cups still in the engaged position, suction cups 3887 may also hold the blank in a fixed position while mandrel 337 is moved upwards to disengage from blank 3000 (that has now been formed into an open top can 3000'), after bottom cup 3510 has been inserted into the blank 3000 (ie. when mandrel 337 is moving from the position in FIG. 47 to the position in FIG. 48).

Figure 50:
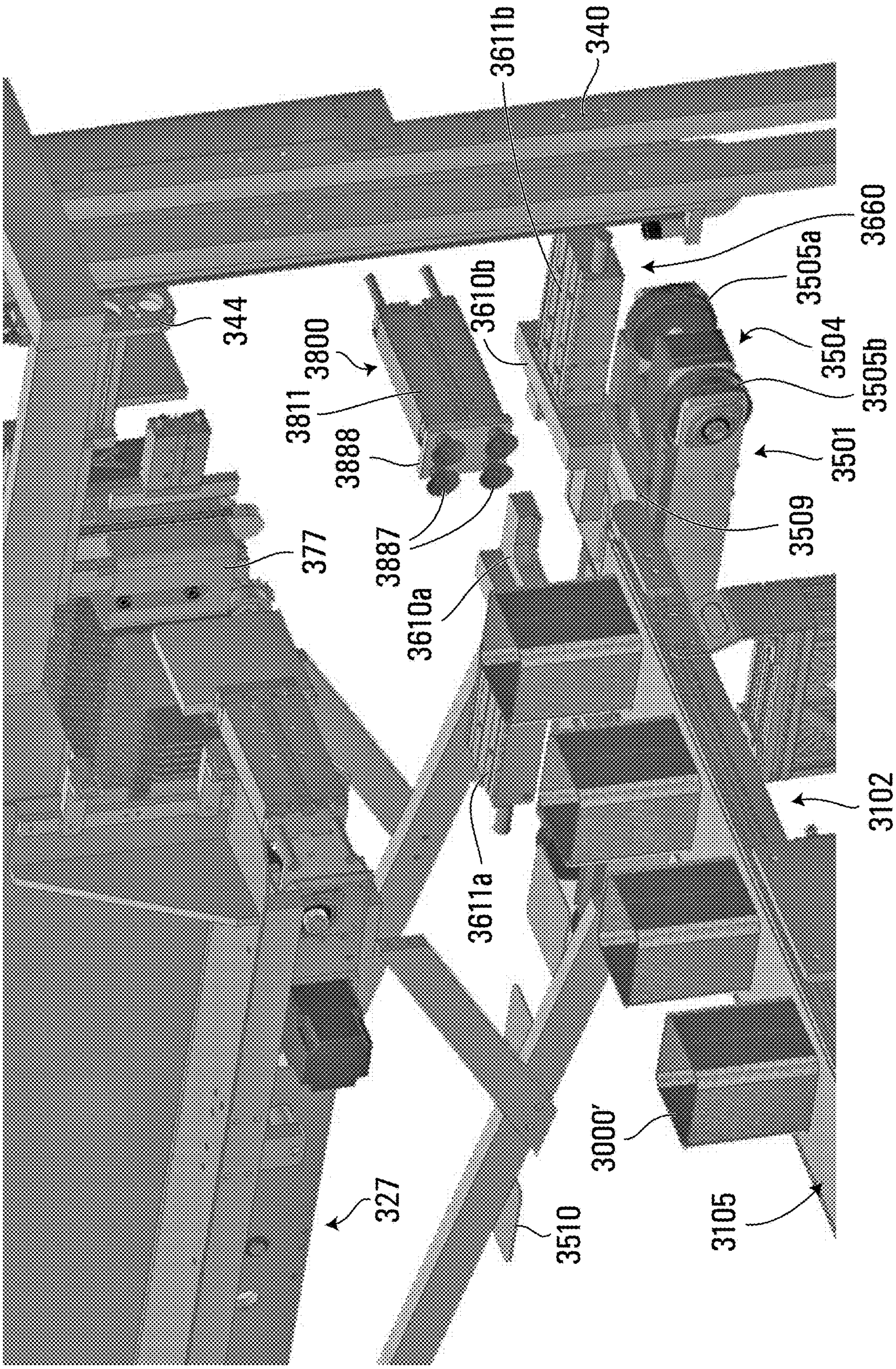
FIG. 50 is an upper left front perspective view of the part of the can forming system of FIG. 36 in an operational position.

With reference next to FIG. 49, heating apparatus 3600 is operated by PLC to disengage from the outer perimeter of tubular shaped blank 3300 such that first heating fork 3610*a* and second heating fork 3610*b* are moved to the disengaged heating position Next and with reference to FIG. 50, under control of PLC 332, suction cups 3887 are moved in a transverse direction toward discharge conveyor 3102 and the can 3000' is moved to a delivery transfer position where the suction cups 3887 can be deactivated by PLC 332 thus allowing the blank to be deposited onto conveyor belt 3105 such that the can 3000' can be moved for further processing.

Mandrel 337 will in the meantime be moved upwards by mandrel movement apparatus 336 under the control of PLC to the blank pick-up engagement position where the next blank 3000 held magazine 327 can be engaged and processed. Thus the foregoing process can be performed on multiple blanks 3000 in series. It is expected that in the range of approximately 20-40 blanks 3000 may be processed per minute with such a can forming system 3000, depending upon the configuration and construction of the blank to be processed.

Can forming system 300 may be modified to process blanks 4000, 5000, 6000 and 7000.

With respect to processing a blank 4000 as shown in FIGS. 33A and 35, to form a bottom closed can 4000', modifications are required to can forming system 3000. Instead of, or possibly in addition to, bottom forming station 3506, another bottom forming station is required that can as shown in step 4000(7) to step 4000(9), rotate panel G 90 degrees upwards into the lower opening of a tubular shaped side wall of blank 4000 and then form a seal between panel G and the interior surface in the lower edge region of blank 4000.

With respect to processing a blank 5000 as shown in FIGS. 33B, in addition to forming a bottom closed can from blank 5000 like can 4000', modifications are required to can forming system 3000 also close the top of the can with panel F. Therefore a top forming station 3506 is required that can rotate panel F 90 degrees downwards into the upper opening of a tubular shaped side wall of blank 5000 and then form a seal between panel F and the interior surface in the upper edge region of blank 4000.

With respect to processing a blank 6000, modifications are also required to can forming system 300. Instead of, or possibly in addition to, bottom forming station 3506, another bottom forming station is required that can rotate panel G 90 degrees upwards into the lower opening of a tubular shaped side wall of blank 4000 and then activate the cold seal adhesive to form a seal between panel G and the interior surface in the lower edge region of blank 6000.

Finally, with respect to processing a blank 7000, modifications are also required to can forming system 300. Instead of, or possibly in addition to, bottom forming station 3506, another bottom forming station is required that can (a) apply the hot melt adhesive to the regions of blank 7000 in the pattern shown in FIG. 33D, and (b) rotate panel G 90 degrees upwards into the lower opening of a tubular shaped side wall of blank 7000 and then cause the hot melt adhesive to form a seal between panel G and the interior surface in the lower edge region of blank 7000.

The step of applying the hot melt adhesive to the blank 7000 in the pattern shown in FIG. 33D may be done while the blank 3000 is being held in an appropriately configured magazine similar to magazine 327. By way of example a hot melt adhesive system 998 (FIG. 51) that may comprise two hot met adhesive guns may be deployed on reciprocating piston arms of pneumatic cylinders (not shown) under control of PLC 332. While the mandrel 337 is in a lowered position away from magazine 327, the opposed adhesive guns may be moved transversely across the face of the next blank 7000 held in the magazine and apply the adhesive to the surface of the panels A-E.

Various components of system 300 such as mandrel apparatus 320 including mandrel 337 and the various support members; first, second, third and fourth panel rotating apparatuses; robot support members and support frame 340, may all be made of any suitable materials such as for example aluminium or steel.

Also a least some of the various components of system 300 may be integrally formed or interconnected to each other by known techniques. For example, if the components are made of a suitable metal or plastic, welding techniques can be employed. Also, the use of screws and/or nut and bolts may be employed.

Figure 52:
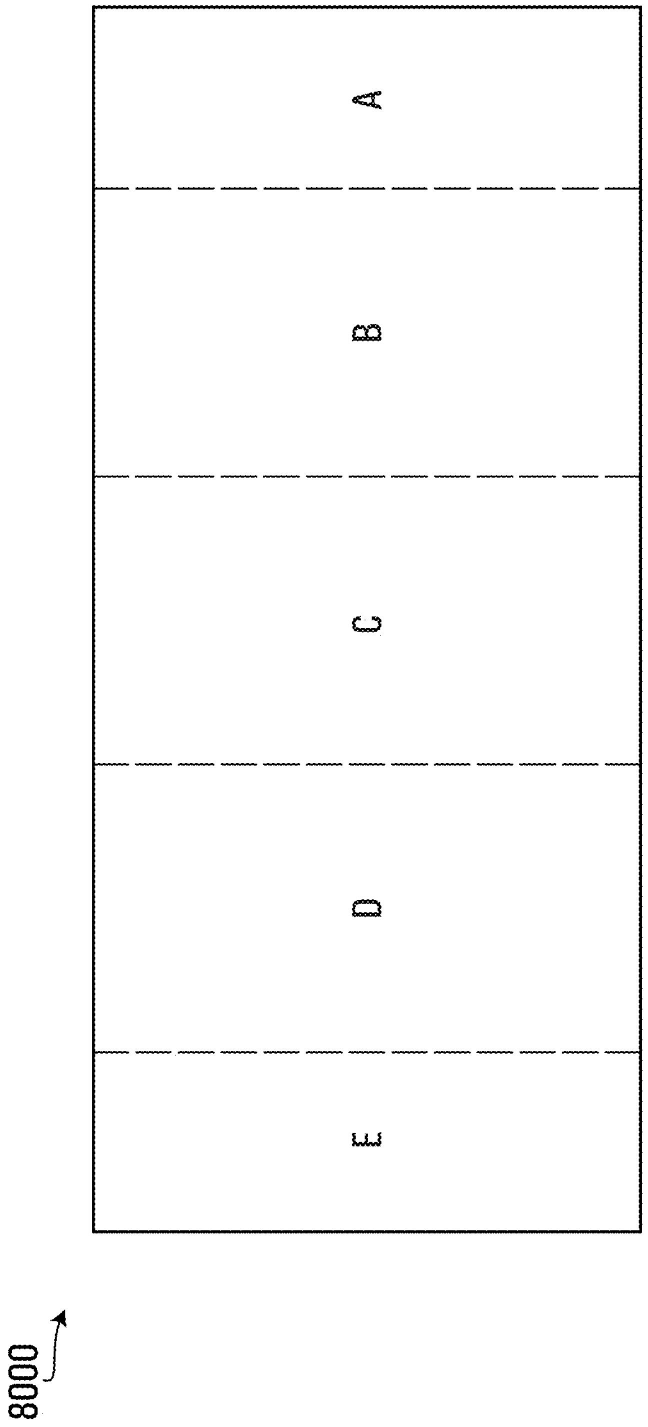
FIG. 52 is a top plan view of an example blank for a can, according to another embodiment.

With reference now to FIG. 52, a top view of a flat blank 8000 is illustrated which may be suitable to form a sidewall for a composite can. Similar to blank 3000, blank 8000 may comprise a substrate made from a rigid or semi-rigid paper-based material, such as paperboard or cardboard. Blank 8000 may also comprise an inner polyolefin laminate layer (for e.g. polyethylene, low-density polyethylene, linear low-density polyethylene, very low-density polyethylene, ultra low-density polyethylene, medium-density polyethylene, high-density polyethylene, ultra high-density polyethylene, ethylene/propylene copolymers, polypropylene, polyisoprene, polybutylene, polybutene, poly-3-methylbutene-1, poly4-methylpentene-1 and polyethylenes comprising ethylene/α-olefin which are copolymers of ethylene with one or more α-olefins, such as butene-1, hexene-1, octene-1 or the like) or non-polyolefin laminate inner layer (for e.g. a polyester resin, a polyamide resin, a polyvinylidene chloride resin, an ethylene-vinyl alcohol copolymer, a polyvinyl chloride resin, an epoxy resin, a polyurethane resin, a polyacrylate resin, a polyacrylonitrile resin and a polycarbonate resin), and an intermediate conducting metal (for e.g. aluminium) foil layer. The foil layer may be interconnected to, and positioned between the inner layer and the paperboard substrate. Thus, blank 8000 may be a multiple layer blank. In other embodiments, the blank 8000 may be made of a wide variety of other types of materials including by way of example only, paperboard or cardboard laminated with a plant-based polymer film to act as a moisture and oxygen barrier with compostable capabilities.

In some embodiments, blank 8000 for the sidewall may comprise a substrate including a metal and in some embodiments the sidewall may be made solely from a metal which can be relatively easily bent around another surface such as the surface of a mandrel. Various kinds of metal may be used in making the metal-based substrate can, depending on the properties desired as well as the economics involved. For most practical purposes, aluminum, magnesium, tin, steel, copper, bronze, brass, low carbon steel sheets, low carbon steel sheets whose surfaces have been plated with a metal such as tin, aluminum, zinc or chromium and low carbon steel sheets whose surfaces have been treated with phosphoric acid or chromic acid electrolytically or non-electrolytically may be used. In some embodiments, the metal may be coated with a known primer.

In some embodiments blank 8000, like blank 3000, may be bendable and/or may be foldable along fold lines from a flat configuration into a tubular side wall configuration which can be sealed at or proximate vertical longitudinal edges and inner facing surfaces as described below. In top view, blank 8000, when formed into a tubular side wall configuration, by way of example only, may be in a shape that is arcuate (for e.g. circular/cylindrical or oval shaped). In other embodiments, blank 8000, by way of example, may be formed into a tubular shape that is generally square or rectangular in top view.

In embodiments, the material when formed into a blank 8000, will only have one vertical seam/joint between two vertical sides. This is an important benefit, including when attaching a lid and bottom cup, such as by a seaming operation, as described below.

Accordingly, blank 8000 as contemplated herein may be made from a material and/or be formed in a way so that it is flexible and may be re-configured from a generally flat configuration to a generally tubular configuration positioned around an outer surface of a blank support device, such as a mandrel, as will be described hereinafter. Blank 8000 may thereafter be supplemented with a bottom end component or cup to form a composite can (or metal can in embodiments where the substrate and top and bottom lids are made only from a metal) with an upper opening to receive one or more items. For example, to form a tubular shaped sidewall that is circular or oval in shape in top plan view, blank 8000 may have a continuous sidewall. In some embodiments the sidewall may be divided by fold lines as described above. In other embodiments the sidewall is not divided by clearly defined vertical fold lines but can still be divided conceptually into portions B, C, D and minor side wall portions A and E as depicted in FIG. 52.

Minor side wall portions A and E may have a width that is less than the width of sidewall portion C. Portions D and B may have the same width as portion C or a width that is different than the width of portion C. Fold lines may or may not be provided between adjacent portions A-E. Portions A-E may be formed from one integral piece of material.

In one embodiment, side wall portion B may be located adjacent to and joined at a vertical side edge along a line (all lines shown in broken lines in FIG. 52 are for ease of reference in describing the folding of blank 8000 and can be fold lines in embodiments where blank 8000 comprises fold lines) to a vertical side edge of side wall portion C. Side wall portion C may be located adjacent to and joined at an opposite vertical side edge along a line to a vertical side edge of side wall portion D. Side wall portion D may be located adjacent to and joined at an opposite vertical side edge along a line to a side edge of minor side wall portion E. Another, opposite side, minor side wall portion A may be located adjacent to and joined at an opposite vertical side edge along a line to a side edge of side wall portion B. Minor side wall portions A and E may have vertical outer side edge surfaces which as described below, may be brought into abutment with each other and sealed together to provide a continuous longitudinal seal along the abutting edge surfaces of portions A and E as well as and an inner horizontal seal along the inner facing surfaces of portions A and E. The outer and inner surfaces where portions A and E are joined to each other may be generally planar/flush with each other. This flush surface assists in securing and sealing a bottom end to the tubular shaped sidewall, as described below.

As will be described hereinafter, the side wall portions A, B, C, D and E, may be reconfigured from a flat configuration to a round vertical tubular configuration and sealed to form a fixed, round/cylindrical, vertical tubular configuration that can then be provided with a bottom component or cup to provide a sealed and suitably strong bottom. The open top formed composite can, which may be subsequently filled with one or more items, may be also be subsequently top sealed with one or more top components, such as a lid.

Figure 53:
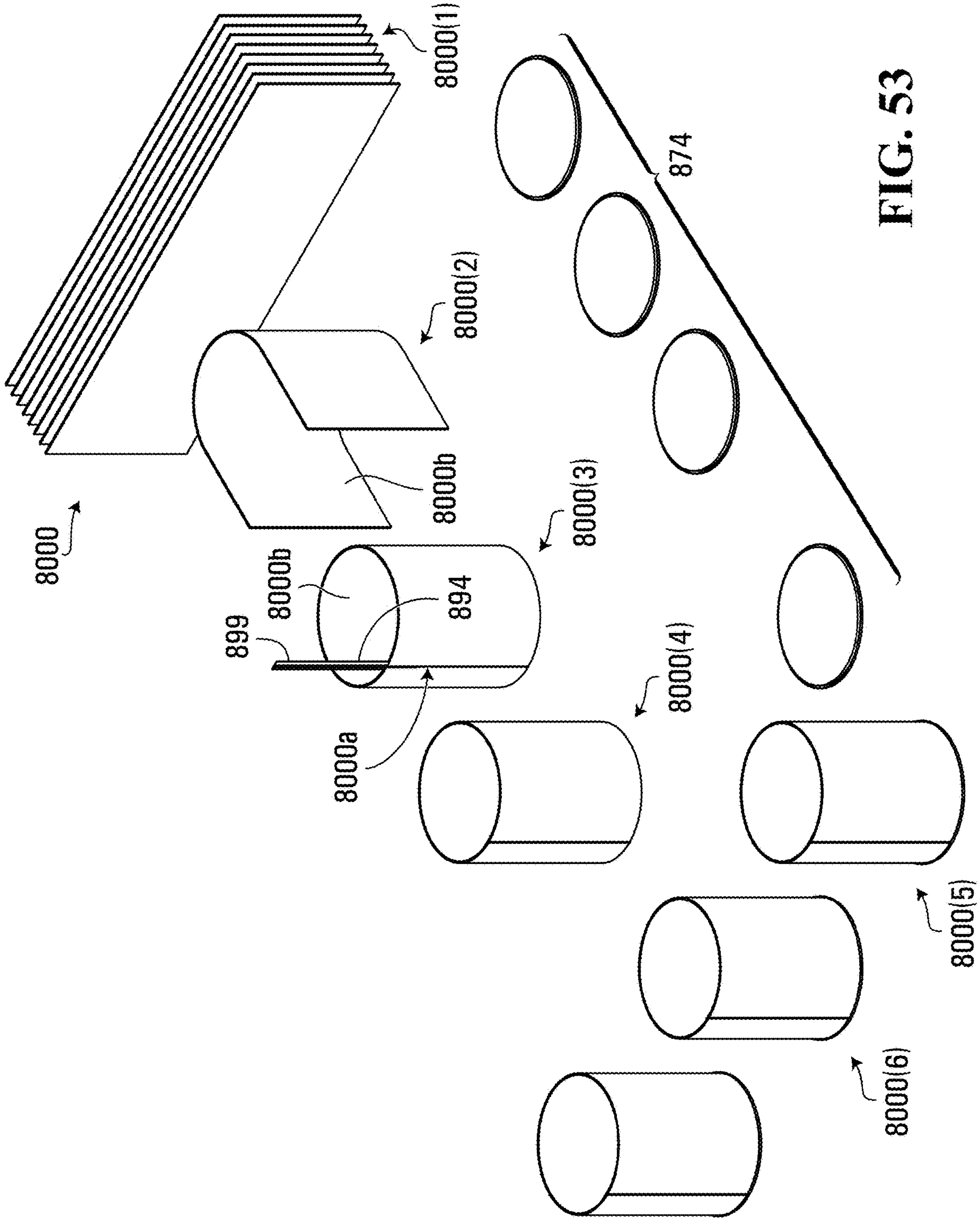
FIG. 53 is schematic view of an example method of forming a can from a can blank, such as the blank of FIG. 52.

With reference now to FIG. 53, an example sequence of steps 8000(1) to 8000(6) are shown for folding/bending and sealing a blank 8000, and adding a bottom component to form an open top composite can that is suitable for top loading of items which can thereafter be closed with a top component (not shown).

A plurality of case blanks 8000 may be presented in step 8000(1) as a vertically stacked arrangement with each blank 8000 configured in a generally flat and planar configuration. A particular individual blank 8000 may be identified at/selected from the front of the stack of blanks for processing. In a first folding step 8000(2), central portion C of blank 8000 may remain in the initial flat orientation—although it may start be transformed into an arcuate shape—while side wall portion B and its connected minor portion A may be rotated together from the orientation shown at 8000(1) in a clockwise direction about the vertically oriented line between side wall portions B and C to the configuration shown at 8000(2). Also, optionally at substantially the same time as portions A and B are being rotated, side wall portion D and its connected minor portion E can be rotated together from the orientation shown at 8000(1) in a counter clockwise direction about the vertically oriented line between side wall portions D and C to the configuration shown at 8000(2).

In the next folding step, minor side wall portion A may be rotated clockwise about the vertically oriented line between side wall portions A and B to the configuration shown at 8000(3). Also, optionally at substantially the same time as portion A is being rotated, side wall portion E can be rotated from the orientation shown at 8000(2) in a counter clockwise direction about the vertically oriented line between side wall portions D and E to the configuration shown at 8000(3). At the configuration shown at 8000(3), portions A and E may have their vertical longitudinal edges either in abutment with or proximate to each other and portions A-E may have been formed into a substantially round/circular tubular shape.

In other embodiments, the portions A/B may be rotated clockwise continuously to form with one part of portion C, one half of a circular tube. Portions D/E may be rotated counter-clockwise continuously to form with other part of portion C, the other half of a circular tube. In the rotations of portions A/B and D/E, portion C will take also take a generally curved shape forming one part of the circular tubular shape for a sidewall.

A longitudinal sealing strip 894 made from a string (also referred to as a ribbon) of sealing material 899, to be further described below, may be situated along and between the vertical longitudinal edges of portions A and E such that a substantially flat continuous outer surface 8000*a* is formed across portions A and E. This type of connection of portions A and E may be particularly advantageous in connection with the attachment of a bottom cup 874 to blank 8000 when formed into a tubular sidewall.

Accordingly, in the next step 8000(4), the vertical longitudinal edges of portions A and E can be butt sealed together by activating the longitudinal sealing strip. The sealing strip 894 may be self-sealing such that when activated such as by heating and/or having pressure applied to it and the adjacent surface material of the portions A/E, the sealing strip 894 may bond to the portions A/E and form a seal therebetween. The sealing strip 894 may be activated by heat sealing (eg. using for example a heat-sealing bar), induction, high frequency vibrations (e.g. using an ultrasonic welding tool) and/or pressure sealing. The activation of the self-sealing material from which the sealing strip may be made, according to some embodiments, may be performed using an activation device to provide heat, pressure, or any ultrasonic emission required to enable a seal.

In the next step 8000(5), blank 8000, having been formed into a generally tubular cylindrical side wall configuration, may optionally have its top end and/or bottom end flared out to assist in the accurate placing and seaming/sealing of the lid to the top opening end and the bottom cup to the bottom opening end. Blank 8000 may then be moved/translated (for e.g. vertically downwards) to a bottom forming station where bottom cup 874, made from any suitable material or combination of materials, such as aluminium, tin, paperboard laminates or plant-based polymers, has been positioned. In some implementations, a circumferential edge region of bottom cup 874 may be pre-formed with a generally U-shaped circumferential channel. The movement/translation of blank 8000 to bottom forming station is such that surface to surface contact between a lower edge surface portion of the side wall of blank 8000 and edge surface of bottom cup 874 at the edges thereof occurs. The outside circumferential edge of the bottom cup 874 may be generally formed (and may be pre-formed) in a generally U-shape, to facilitate the receiving of the bottom edge portion of the sidewall of tubular shaped blank 8000. These interfacing surfaces may then be interconnected such as by being seamed together such as by using a plurality of seaming rollers to form a high integrity seal capable of sealing against gases and liquids.

After the bottom portion of blank 8000 has been formed at step 8000(5), blank 8000 may be moved away from bottom forming station to another location and subsequently filled with one or more items. Thereafter, a top component/lid, may be inserted into and sealed to the top opening of blank 8000 to form the completed composite can.

With reference now to FIGS. 54-66*c*, in overview, can forming system 800 may include a magazine 810. Although only one case blank 8000 is shown for clarity in FIGS. 54 and 55, magazine 810 may be adapted to hold a plurality of blanks in a flat substantially flat vertical and transverse orientation. Magazine 810 may be configured to selectively, serially release single blanks 8000 from the front of the stack of plurality of blanks, in a manner as substantially as described above in other embodiments.

Figure 78:
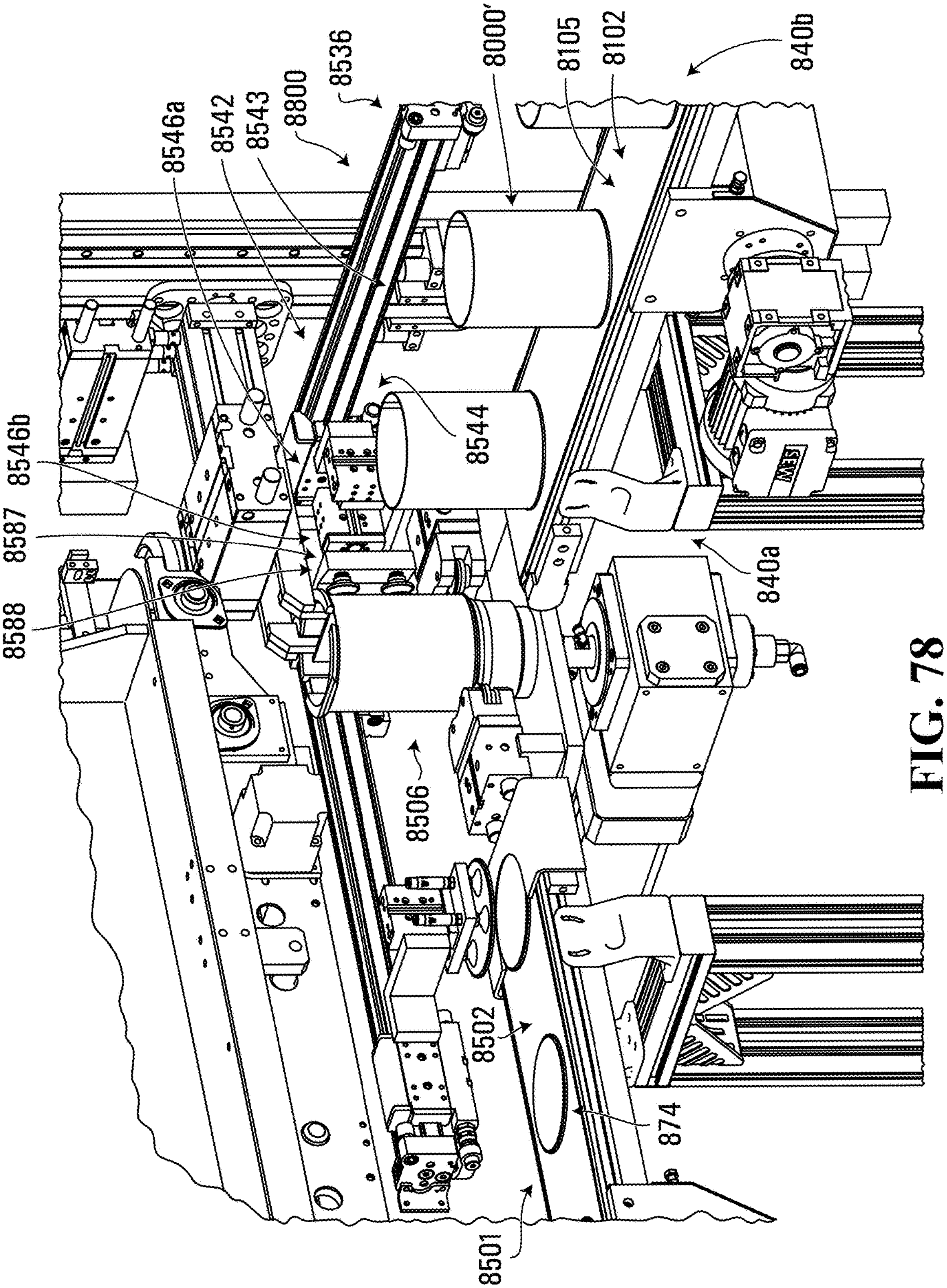
FIG. 78 is a front view of blank retention and delivery apparatus in a second operational position.

With particular reference to FIGS. 54, 55, 56 and 57, can forming system 800 may also include a blank support apparatus (also referred to herein as a mandrel apparatus) 820 and a portion rotating sub-system 834. Portion rotating sub-system 834 may be configured to engage blank 8000 on at least two transversely spaced apart outward facing portion surfaces of blank 8000 as blank 8000 is held in magazine 810, and rotate portions of blank 8000 around a blank support device 837 (also referred to herein as a mandrel) of blank support apparatus 820 in such a manner that the blank surfaces that are engaged by portion rotating sub-system 834 become inner surfaces of the side wall for a tubular shaped composite can 8000' (see FIG. 78).

Portion rotating sub-system 834 may utilize at least two portion rotating apparatuses in order to engage with surfaces of a plurality of portions of blank 8000 as blank 8000 is held in a generally flat configuration in the magazine 810, and rotate those portions (and possibly certain other portions of the same blank 8000 interconnected thereto) relative to each other and relative to one or more other portions which may be initially retained in magazine 810 in the initial position and orientation. For example, portion rotating sub-system 834 may include a first portion rotating apparatus 824*a* and a second portion rotating apparatus 824*b* (see also FIGS. 58*a*, 58*b* and 58*c*). Portion rotating apparatus 824*a* may be configured and operable to engage with a facing surface of portion B of blank 8000 held in magazine 810. Portion rotating apparatus 824*b* may be configured and operable to engage with a facing surface of portion D of blank 8000 held in magazine 810.

Figure 54:
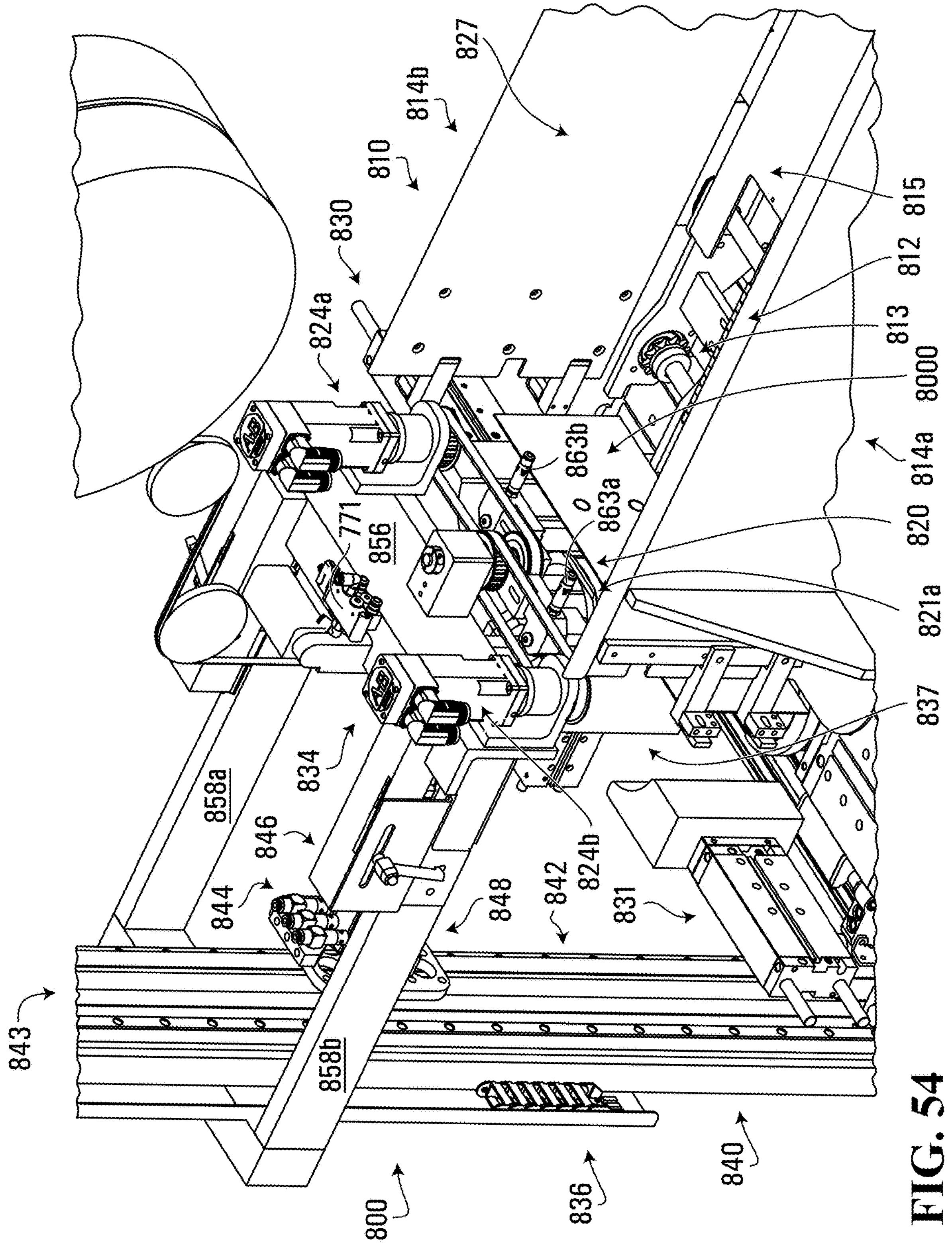
FIG. 54 is an upper, left front side perspective view of part of a can forming system.
Figure 56:
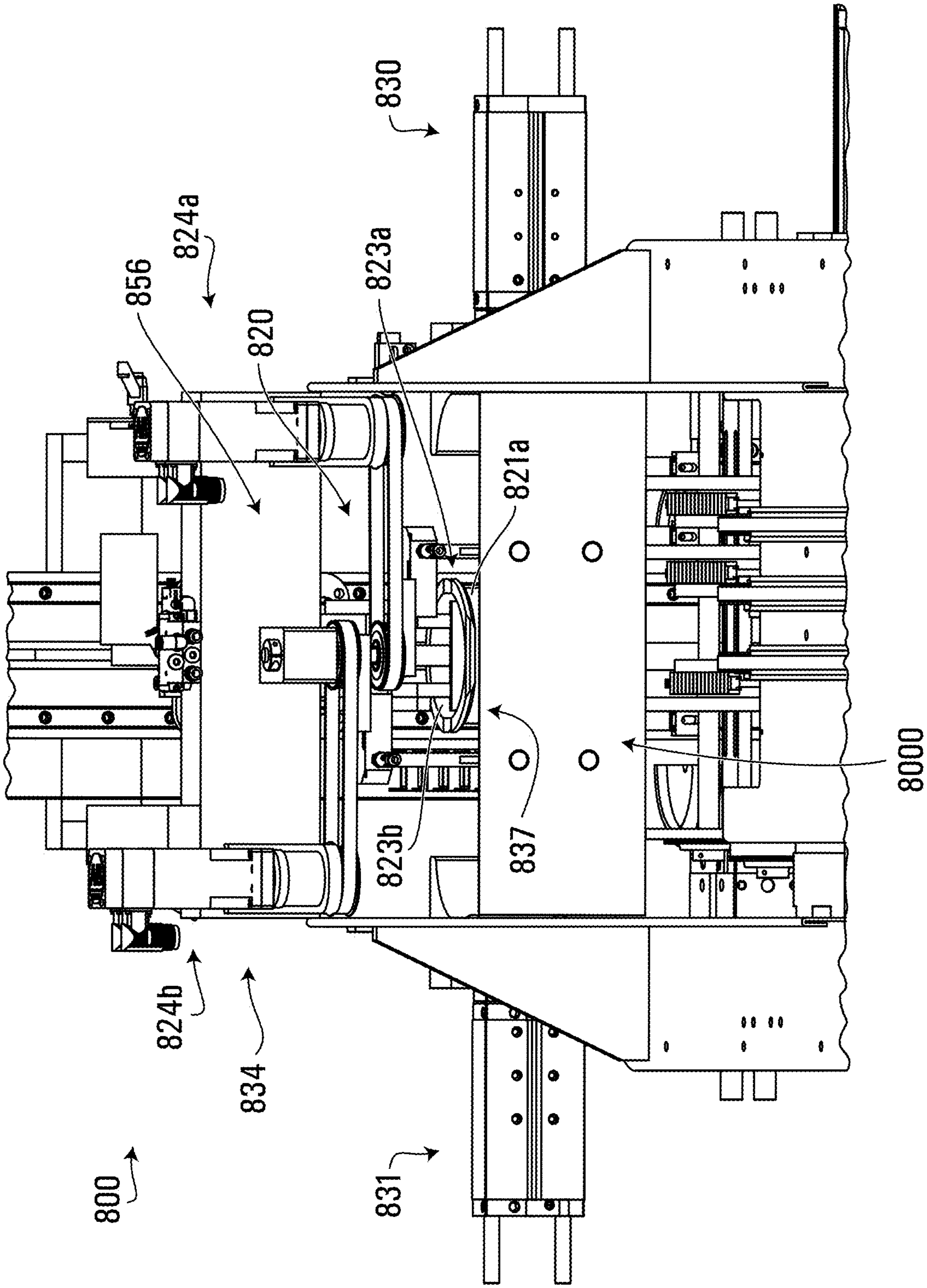
FIG. 56 is an upper, face front side perspective view of part of a can forming system in an operational position.

Portion rotating sub-system 834 may also include a third portion rotating apparatus 830*a* and a fourth portion rotating apparatus 830*b* (see FIGS. 54 and 56). Third portion rotating apparatus 830*a* may be operable to engage a blank portion on an outer surface and rotate portion A in a clockwise direction relative to portion B about the line between portions A and B. Fourth portion rotating apparatus 830*b* may be operable to engage a blank portion on an outer surface and rotate portion E in a counter-clockwise direction relative to D about the line between portions D and E.

Figure 79:
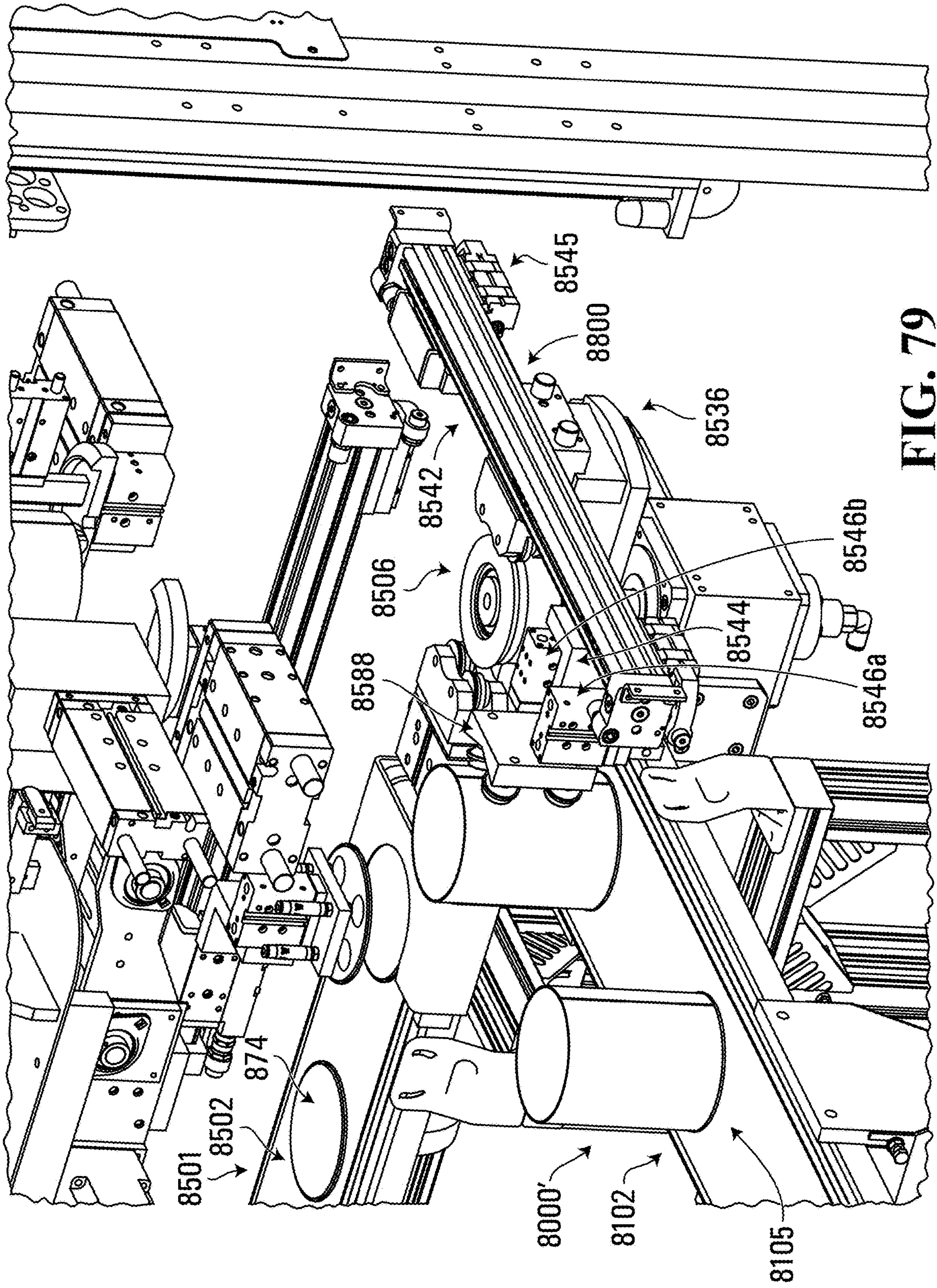
FIG. 79 is a rear view of blank retention and delivery apparatus in the first operational position.

Can forming system 800 may also include a generally vertically oriented support frame 840 which may support vertical blank support device apparatus 836 (mandrel movement apparatus) (see FIG. 54) for vertical upward and downward movement and blank retention and delivery apparatus 8800 (see FIGS. 78 and 79) for horizontal movement. It should be noted however, that while can forming system 800 is generally oriented for vertical movement of the mandrel movement apparatus 836 and horizontal movement of the blank retention and delivery apparatus 8800, other orientations may be utilized in other embodiments.

In addition to the components described above, can forming system 800 may also include a can seaming apparatus 870 (designated generally in FIGS. 66*b*, 66*c*, 67-69*b* and 77). Can seaming apparatus 870 may generally include a seam mandrel 872 adapted and configured to hold a bottom cup 874 and a plurality of seam rollers 876*a*, 876*b*, 877*a*, 877*b* adapted and operable for seaming bottom cup 874 to an open lower end of a sidewall of a cylindrical tubular shaped blank 8000.

The operation of the components of can forming system 800 may be controlled by a controller such as a programmable logic controller ("PLC") 832 which may be configured generally like PLC 132 described above. PLC 832 may communicate with various components including sensors so at to be in communication with and control all of the components/sub-systems of system 800 in a manner such as is generally depicted schematically in FIG. 80, and may also control other components/sub-systems associated therewith. PLC 832 may also include a Human-Machine-Interface (HMI) such as the Allen Bradley Panelview 700 plus color touch screen graphic workstation so that the operation of system 800 can be monitored, started, operated, controlled, stopped, modified for different blank configurations, by an operator using a touch screen panel.

According to some implementations, the first portion rotating apparatus 824*a* and the second portion rotating apparatus 824*b* may be controlled by PLC 832 to operate concurrently and in tandem, such that the engagement with the facing surface of the blank, and movement of the blank, is mirrored and symmetrical. Symmetrical movement between first portion rotating apparatus 824*a* and second portion rotating apparatus 824*b* may minimize any slipping or sliding that could move blank 8000 out of an expected position and may assist such that during the rotation of the first portion rotating apparatus 824*a* and the second portion rotating apparatus 824*b* the blank wraps around semi-cylindrical portion 821*a* or mandrel 837.

According to some example implementations, the rotation of the first portion of a blank 8000 is an opposite rotational direction to the rotation of the second portion of the blank 8000. A time period when the rotating of the first portion of the blank from a flat configuration around a first portion of the surface of the blank support device occurs, may overlap with a time period during which the rotating of the second portion of the blank around a second portion of the outward facing surface of said blank support occurs. The time period of the rotating of the first portion of the blank around a first portion of the outward facing surface of the blank support device may be substantially the same time period of the rotating of the second portion of said blank from the first orientation, around a second portion of the first outward facing surface of the blank support device. The first rotating apparatus 420*a*, and the second rotating apparatus 420*b* may have rotational members that rotate about a common axis of rotation.

As described above, magazine 810 may be configured to hold a plurality of case blanks 8000 in a stacked, vertically and transversely oriented, flat configuration on their bottom edges and adapted to present an outward facing surface of each case blank 8000, individually in turn. Many different types and/or constructions of a suitable magazine 810 might be employed in system 800. Thus, magazine 810 may comprise a large number of case blanks 8000 held in a generally vertically and transversely oriented, longitudinally extending stack by side walls of magazine 810. In this configuration where case blanks 8000 are individually and selectively retrieved in series from the front of a stack of generally flat blanks, the stack of case blanks 8000 in the magazine can be moved forward by a longitudinally oriented conveyor system which may be constructed like the conveyor systems in the magazines of systems 100 and 300 described above.

The purpose of moving the stack of blanks 8000 forward is so that the facing surface of portion C of the most forward case blank 8000 in the stack is positioned and held close to or against an outer generally adjacent surface of a transverse and vertical side wall 821*a* of mandrel 837 (see FIG. 56). This enables first portion rotating apparatus 824*a* and second portion rotating apparatus 824*b* to be able to engage other exposed facing surfaces of for example portions B and D respectively (see FIGS. 55 and 56) of the forward most case blank 8000 in the stack held in magazine 810 as described further hereinafter. Additionally, a back-pressure device (not shown) may be provided that is adapted to apply a back pressure against the stack of blanks 8000 in a longitudinal direction toward the front of magazine 810 of a magnitude and direction sufficient to keep the stack upright.

Magazine 810 may be constructed and operate in a manner similar to magazines 110 and 310 described above. In overview, magazine 810 may have a magazine frame generally designated 827 (see FIG. 55). Magazine 810 may include a conveyor system to move case blanks 8000 sequentially to a pick-up position. A wide variety of conveyor systems or other case blank movement systems may be employed. By way of example, conveyor system may include a conveyor 813 (see FIG. 54) mounted to frame 827, and having a generally horizontal floor plate 815. Conveyor 813 may be operated in such a manner to longitudinally move case blanks 8000 forward in magazine 810 while being maintained in a generally transverse and vertical orientation.

A motor (not shown), such as a DC motor, in communication with PLC 832 may be inter connected to conveyor belts 812 of conveyor 813 to intermittently move a stack of blanks 8000 forward such that a front positioned blank 8000 in the stack of case blanks is continuously available in a pick-up position.

The stack of case blanks may be supported at vertically oriented side edges by longitudinally and vertically oriented side wall plates 814*a*, 814*b* that may be spaced apart from each other and oriented generally parallel to each other. One or both of side wall plates 814*a*, 814*b* may be mounted on transversely oriented and movable rods that are supported on magazine frame 827. Actuation of the rods may be made by any suitable mechanism, such as by way of example only, servo drive motors with appropriate drive shafts and gear mechanisms or a hand operated gear and crank shaft mechanism. Side wall plates 814*a*, 814*b* serve to guide the case blanks 8000 within magazine 810 and can be accurately adjusted to be in close proximity to or in contact with the particular case blank size that is being handled at a particular time. This adjustability of the relative transverse spacing of side walls 814*a*, 814*b* allows for case blanks of different widths to be held in magazine 810 for processing.

Selected portions of the forward most blank 8000 may be pulled away from holding clips (not shown) associated with magazine 810 by first portion rotating apparatus 824*a* and second portion rotating apparatus 824*b*, and therefore from retention by magazine 810, then rotated (wrapped) at least partially around mandrel 837. As case blanks 8000 are taken from magazine 810 and formed, PLC 832 may cause the conveyor 813 of magazine 810 to move the entire stack forward sequentially so that the most forward case blank 8000 has its outward facing surface of major portion C positioned against or very close to adjacent outer rear vertically and transversely oriented surface 821*a* of mandrel 837. A sensor (not shown) in communication with PLC 832 may be provided to monitor the level of case blanks 8000 in magazine 810 during operation of can forming system 800. Magazine 810 can be loaded with additional flat case blanks 8000 at the rear of the magazine as needed.

Magazine 810 may be configured so that its position in a longitudinal direction (or at least the longitudinal pick-up position of the forward most blank 8000 when held in magazine 810) may be altered such that if and when first and second portion rotating apparatuses 824*a*, 824*b* of portion rotating sub-system 834 are moved in a longitudinal direction, as referenced below, the longitudinal position of magazine 810, and/or the forwardmost blank 8000 held therein, may also be adjusted to make sure that the forwardmost blank 8000 held in magazine 810 is a an appropriate pick up location, when the size of the mandrel 837 needs to be changed. Various mechanisms may be employed to be able to adjust the longitudinal position of magazine 810 such as for example mounting the magazine on rails and providing a PLC controlled, double acting hydraulic piston mechanism having pistons to engage portions of the magazine and thus be operable to move the magazine backwards and forwards in a longitudinal direction towards and away from a mandrel on such rails.

Electronic sensors (not shown) in communication with PLC 832 may also be positioned to monitor the stack of blanks and ensure that blank 8000 at the front of the stack of blanks is always properly positioned at the pick-up position.

Clip mechanisms (not shown), similar to clip mechanisms 11*a*-111*d* described above in system 100, may be provided to releasably hold each case blank 8000 that is at the front of the stack within magazine 810, and thus hold the stack in place. When first portion rotating mechanism 824*a* and second portion rotating mechanism 824*b* selectively engage blank portions B and D respectively, as described hereinafter, clip mechanisms allow for the engaged and interconnected portions A/B and D/E of the front blank 8000 in the stack to be pulled away from the same corresponding portions on a blank 8000 immediately behind the front blank 8000 in the stack held in the magazine. Also, clip mechanisms may hold portion C in magazine 810 while the portions A/B and D/E are being wrapped around the mandrel 837, but will then allow for the release of portion C to allow the remaining portion of case blank 8000 to be removed from being held by magazine 810 and the reconfigured to also wrap around the outward facing surface of mandrel 837.

With the blank 8000 released from the magazine it is able to be moved vertically downward once mandrel 837 to which it is secured moves vertically downwards as described further below.

Figure 55:
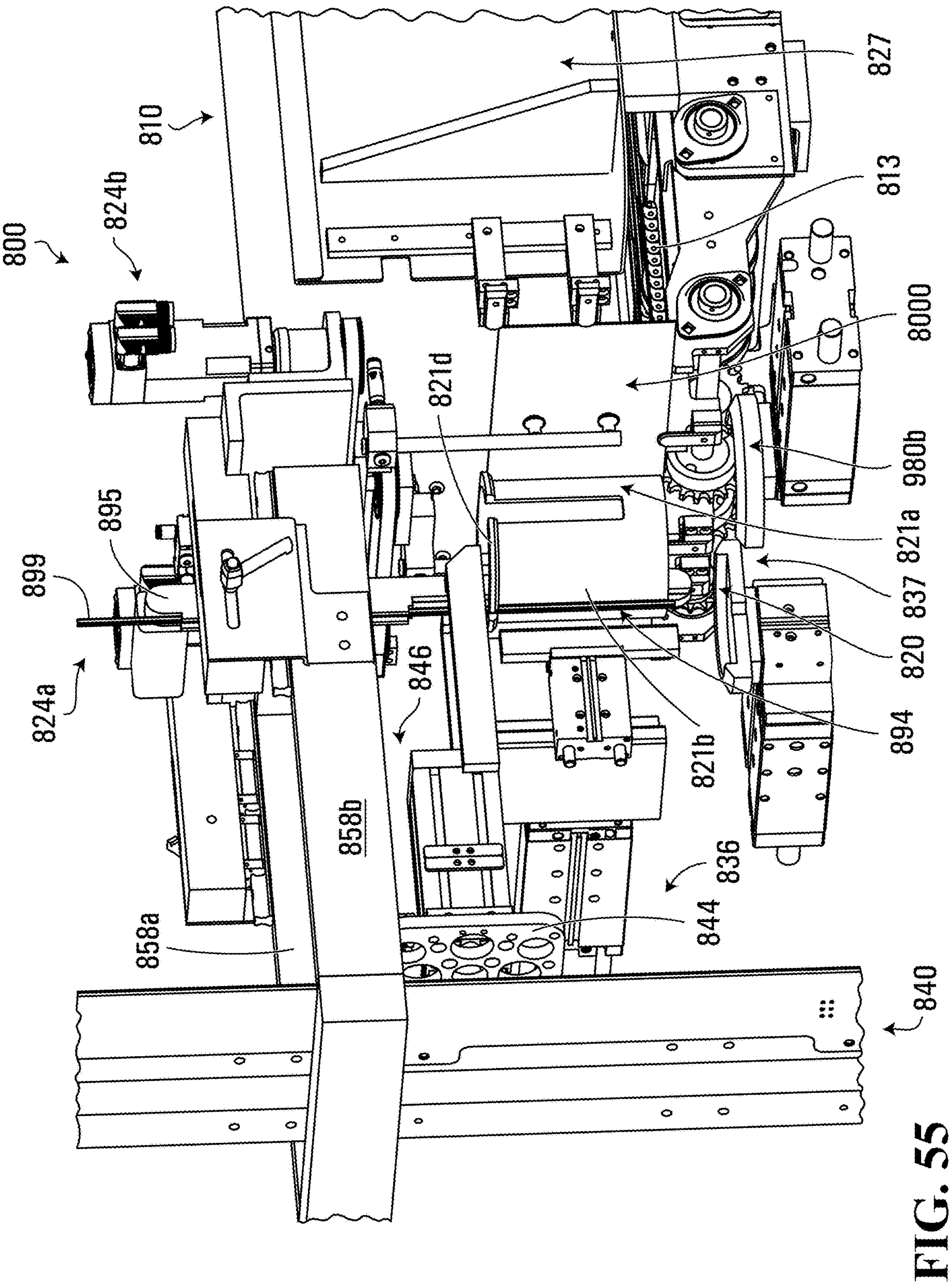
FIG. 55 is a lower, right rear side perspective view of part of a can forming system in an operational position.

With particular reference to FIGS. 54 and 55, vertically oriented support frame 840 may support mandrel movement apparatus 836 to provide for vertical reciprocating upwards and downwards movement of mandrel 837. It should be noted that although system 800 is shown in the Figures as being generally oriented for vertical movement of the mandrel 837, alternative orientations can be utilized in other embodiments.

Mandrel movement apparatus 836 may include a generally vertically oriented linear rail 842. Linear rail 842 may support a carriage block 844 for sliding upward and downward sliding vertical movement relative to support frame 840. It should be noted that in some of the Figures depicting system 800, for simplicity or clarity, support frame 840 and linear rail 842, and/or some other components, have been omitted.

Figure 70:
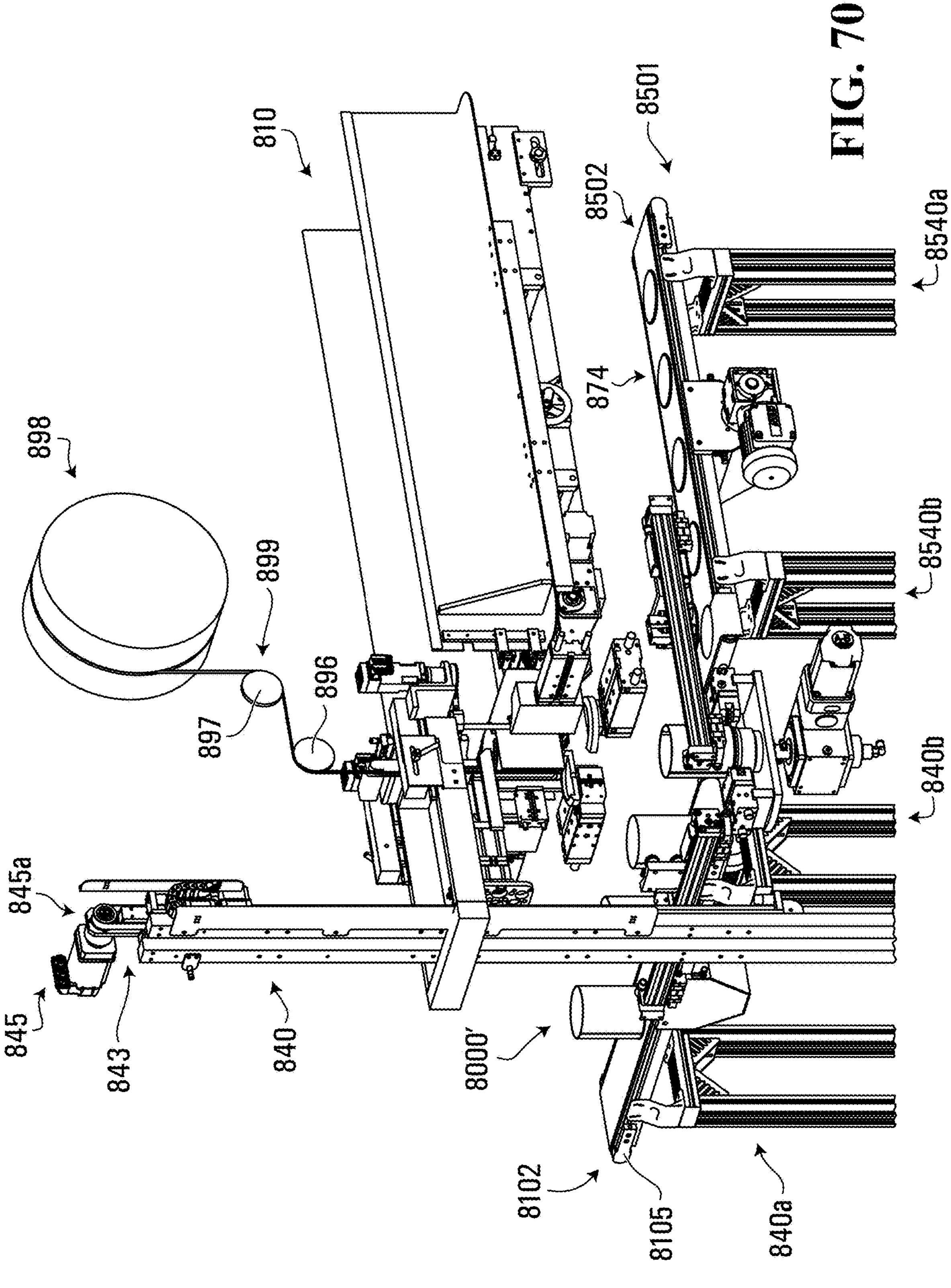
FIG. 70 is a blank retention and delivery apparatus.

In a manner similar to systems 100 and 300 as described above, the movement of carriage block 844 on linear rail 842 may be driven by a continuous drive belt 843 interconnected to carriage block 844 supported on vertical support frame 840. Drive belt 843 may be interconnected to and driven by a drive wheel 845*a* of servo drive motor 845 which may be mounted at an upper end portion of vertical support frame 840 (see FIG. 70). An encoder (not shown) may be associated with servo drive motor 845, and the encoder and servo drive motor 845 may be in communication with PLC 832. In this way PLC 832, upon receiving signals from the encoder, may be able to monitor and control the vertical position of carriage block 844 (and the components interconnected thereto) by appropriately controlling and operating servo drive motor 845.

Carriage block 844 may support and be rigidly connected to a carriage support arm 846 (see FIG. 54) that may be generally oriented horizontally and longitudinally. The outer end of carriage support arm 846 may be rigidly connected to a mandrel support apparatus generally designated 848 (see FIG. 57). Mandrel support apparatus 848 may generally support mandrel 837 (see FIGS. 54, 55 and 57).

First and second portion rotating apparatuses 824*a*, 824*b* may be one of numerous types of robotic systems or alternatively may be an apparatus that includes servo driven motors controlled by PLC 832 which includes a generally vertically oriented drive shaft with rotatable members attached thereto. First and second portion rotating apparatuses 824*a*, 824*b* may be capable of intermittent motion to rotate the rotatable members. The rotatable members may carry portion engagement devices.

With reference to FIGS. 54, 56, 58*a*, 58*b* and 58*c*, first portion rotating apparatus 824*a* may be generally laterally spaced apart from second portion rotating apparatus 824*b* and both may be mounted to a fixed, transversely oriented support member 856. Transverse support member 856 may be fixedly supported at opposed ends by, and at first ends of, a pair of transversely spaced, longitudinally oriented tubular robot support members 855*a*, 855*b*. Tubular robot support members 855*a*, 855*b* may each be held by respective longitudinal support brackets 857*a*, 857*b*. Tubular robot support members 855*a*, 855*b* may be operable for longitudinal sliding movement (together and with support member 856 and the robots supported thereon relative to longitudinal support brackets 857*a*, 857*b*. Longitudinal support brackets 857*a*, 857*b* may be fixedly secured to end regions of respective longitudinal frame support members 858*a*, 858*b*. The opposite ends of transversely spaced, longitudinally oriented frame support members 858*a*, 858*b* may be fixedly mounted to vertical support frame 840. The relative longitudinal positions of tubular robot support members 855*a*, 855*b* may be adjusted by longitudinal sliding movement (together and with support member 856 and the robots supported thereon) relative to longitudinal support brackets 857*a*, 857*b* and may be releasably secured in a particular desired longitudinal position relative to the main support frame by use of key slot devices 859*a*, 859*b* fixedly to side walls of support members 855*a*, 855*b* and with shafts receivable through slots 861*a*, 861*b*, in respective brackets 857*a*, 857*b*.

Figure 58A:
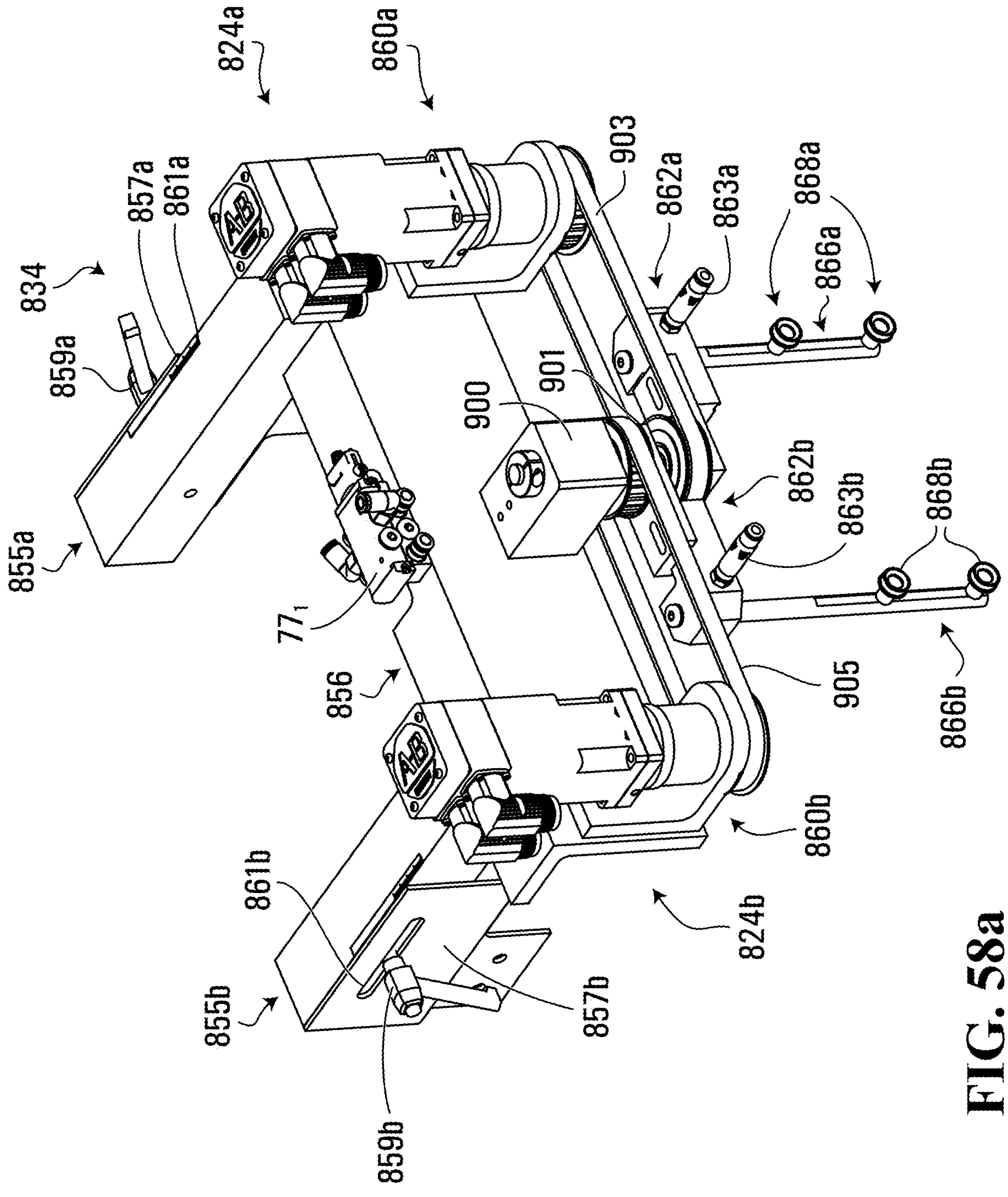
FIGS. 58*a*, 58*b*, and 58*c* are top, front, and rear views of a rotating subsystem used in part of a can forming system.
Figure 58B:
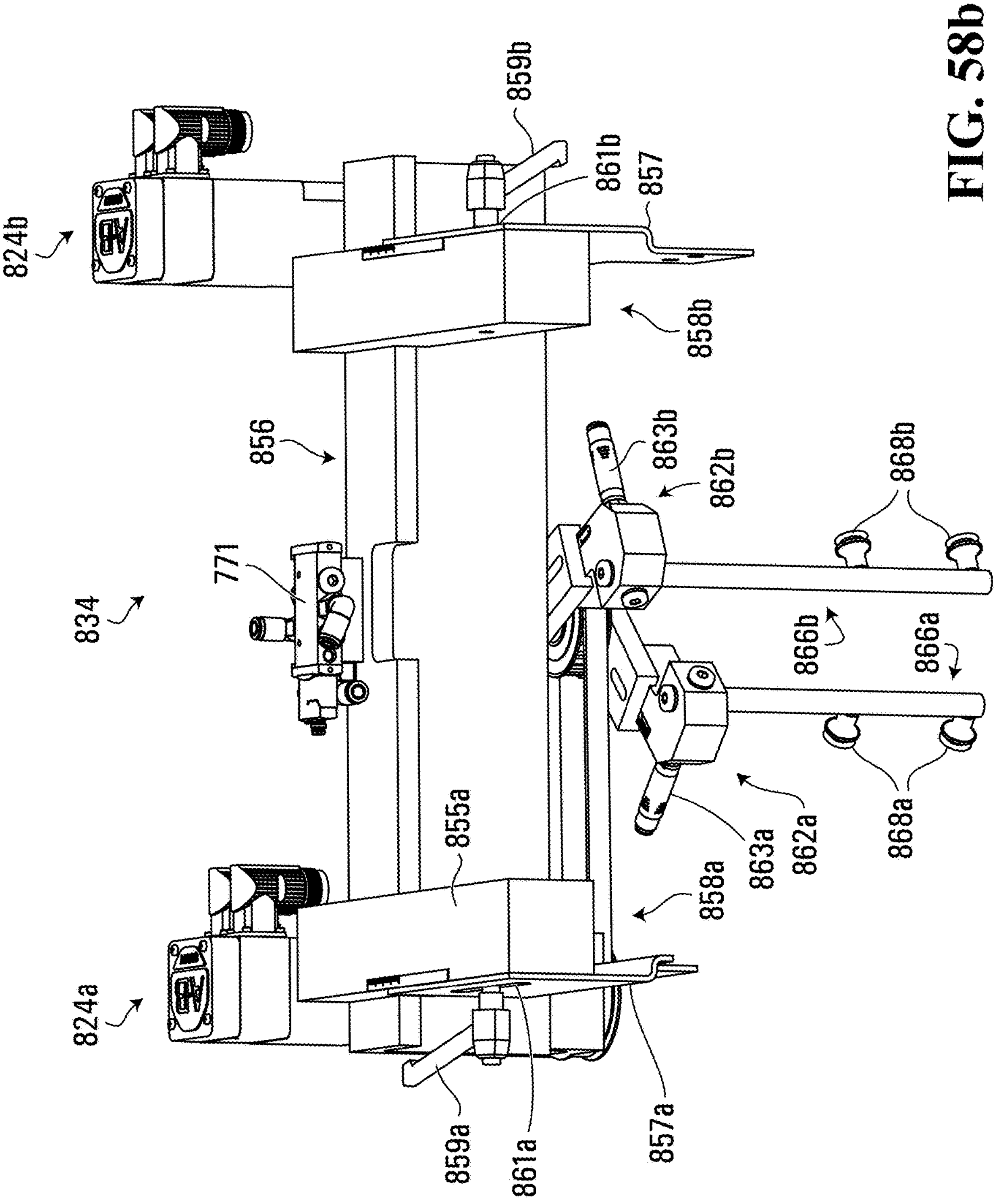
Figure 58C:
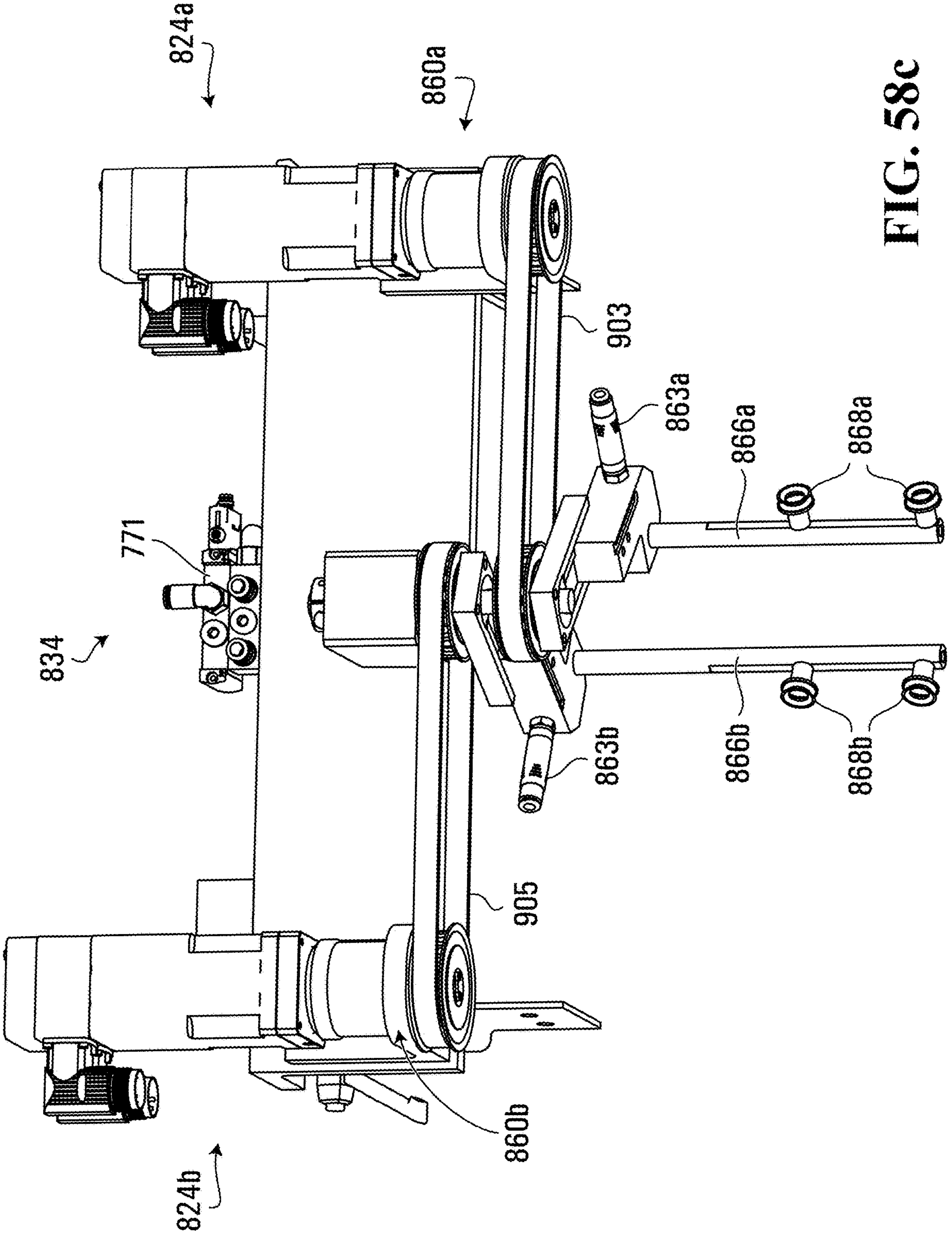

With particular reference to FIGS. 58*a*, 58*b*, first portion rotating apparatus 824*a* may include a first rotational drive unit 860*a* having one upper end fixedly mounted to longitudinal support member 858*a*. Extending from an opposite lower end of first rotation drive unit 860*a* is a first rotational drive that may comprise a drive shaft (not shown) that is operable for intermittent rotation clockwise and counter clockwise about a first vertical axis of rotation. Mounted to the end of the drive shaft of first rotation drive unit 860*a* is a drive wheel.

Similarly, second portion rotating apparatus 824*b* may include a first rotational drive unit 860*b* having one upper end fixedly mounted to longitudinal support member 858*b*. Extending from an opposite lower end of first rotation drive unit 860*b* is a first rotational drive that may comprise a drive shaft (not shown) that is operable for intermittent rotation clockwise and counter-clockwise about a second vertical axis of rotation.

A mounting block 900 may be centrally and fixedly secured to transversely oriented support member 856. Mounting block 900 supports a central fixed vertical shaft 901 about a third vertical axis. Mounted to shaft 901 for rotation about the shaft 901 and its vertical axis of rotation are a first articulating arm 862*a* and a second articulating arm 862*b*. A drive belt 903 interconnects the drive wheel of rotation drive unit 860*b* and a first pulley that is mounted to and about shaft 901 and fixedly connects with first articulating arm 862*a*. Accordingly, when the drive wheel of first rotation drive unit 860*a* is rotated, the first pulley that is mounted to shaft 901 also rotates causing a rotation of first articulating arm 862*a*.

Similarly, a drive belt 905 interconnects the drive wheel of second rotation drive unit 860*b* and a second pulley that is mounted to and about shaft 901 and fixedly connects with second articulating arm 862*b*. Thus, when the drive wheel of second rotation drive unit 860*b* is rotated, the second pulley that is mounted to shaft 901 also rotates causing a rotation of second articulating arm 862*b*.

Thus, when rotational drive unit 860*a*, under the control of PLC 832, causes the drive shaft of first rotation drive unit 860*a* to rotate, first articulating arm 862*a* is able to pivot clockwise or counter clockwise relative to the drive shaft about a vertical axis of shaft 901, depending upon the direction of rotation of the drive shaft. Similarly, when rotational drive unit 860*b*, under the control of PLC 832, causes the drive shaft of second rotation drive unit 860*b* to rotate, second articulating arm 862*b* is able to pivot clockwise or counter clockwise relative to the drive shaft about a vertical axis of shaft 901, depending upon the direction of rotation of the drive shaft.

Mounted to the outer end of articulating arm 862*a* of first rotational drive 860*a* is a vertically oriented end effector rod 866*a* formed in a generally tubular cylinder and having one or more air suction cups 868*a*.

Air suction cups 868*a* may be interconnected through cavities in end effector 866*a*, and in articulating arm 862*a* to a fitting 863*a* in articulating arm 862*a*. Fitting 863*a* may have a connector (like a hose quick-connect) that links to a hose (not shown) that communicates to a valve assembly 771. Valve assembly 771 may be part of pressurized air distribution unit 427 which is controlled by PLC 132. Fitting 863*a* may include a vacuum generator that may transform pressurized air selectively supplied through valve assembly 771 into vacuum which can be communicated to the air suction cups 868*a*. The supply of vacuum supplied to suction cups 868*a* can be turned on or off under the control of PLC 832. A source of pressurized air may be provided to valve assembly 771 under the control of PLC 832. Fitting 863*a* may thus be used to selectively provide air suction to air suction cups 868*a* through valve assembly 771. Thus, air distribution unit 427 may include a plurality of valves or solenoids that may be operated by PLC 832. In other embodiments, local vacuum generator apparatuses that may be integrated as part of, air suction cups 868*a*. In other embodiments, a vacuum pump mounted externally may generate a vacuum externally and then a vacuum can be supplied through the aforementioned air channels. If local vacuum generators are utilized, pressurized air may be delivered from an external source through air distribution unit 427 to the vacuum generators. The local vacuum generators may then convert the pressurized air to a vacuum that can then be delivered to air suction cups 868*a*.

Figure 59:
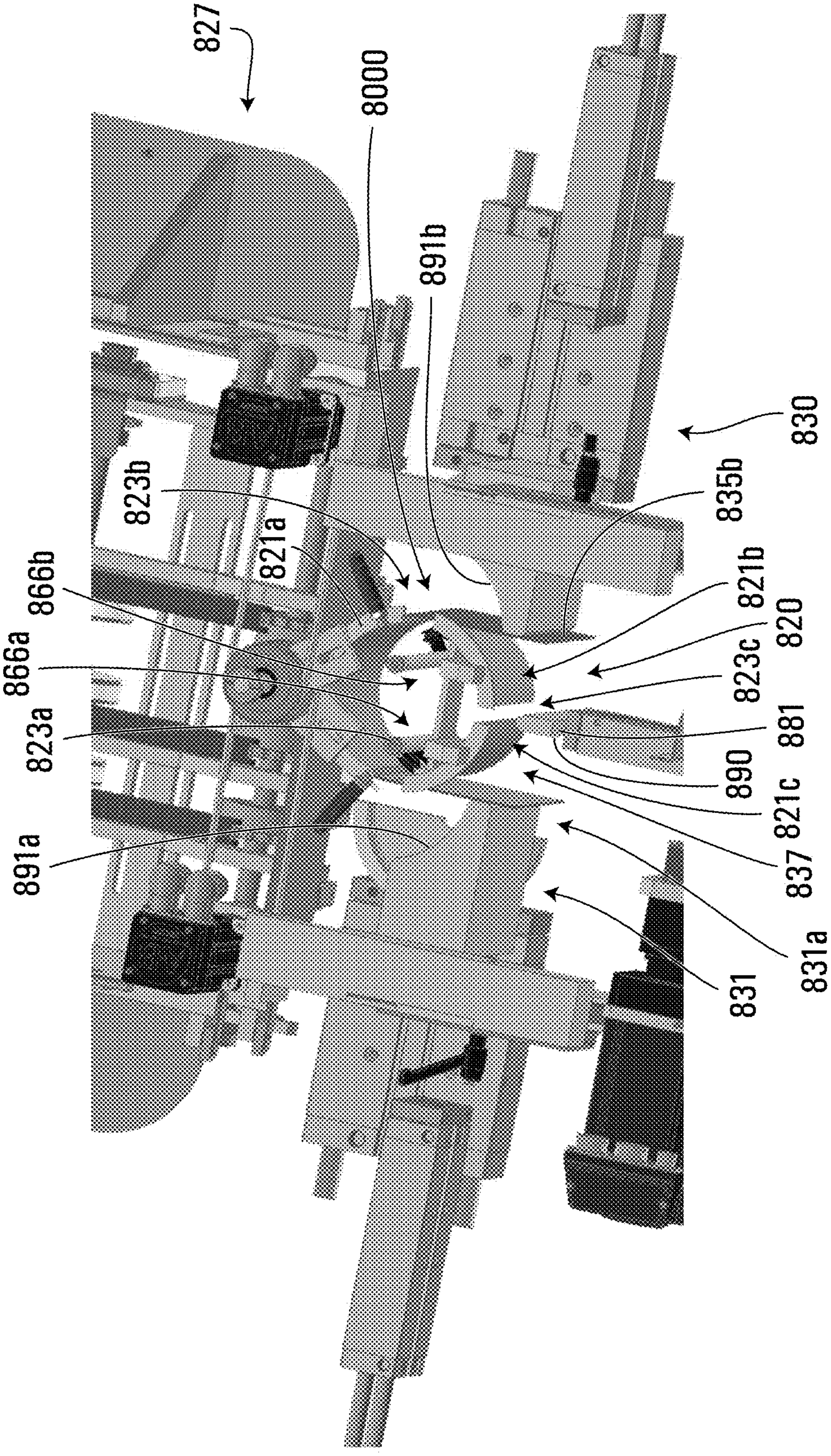
FIG. 59 is a mandrel and forming apparatus used in part of a can forming system in a second operational position.
Figure 60:
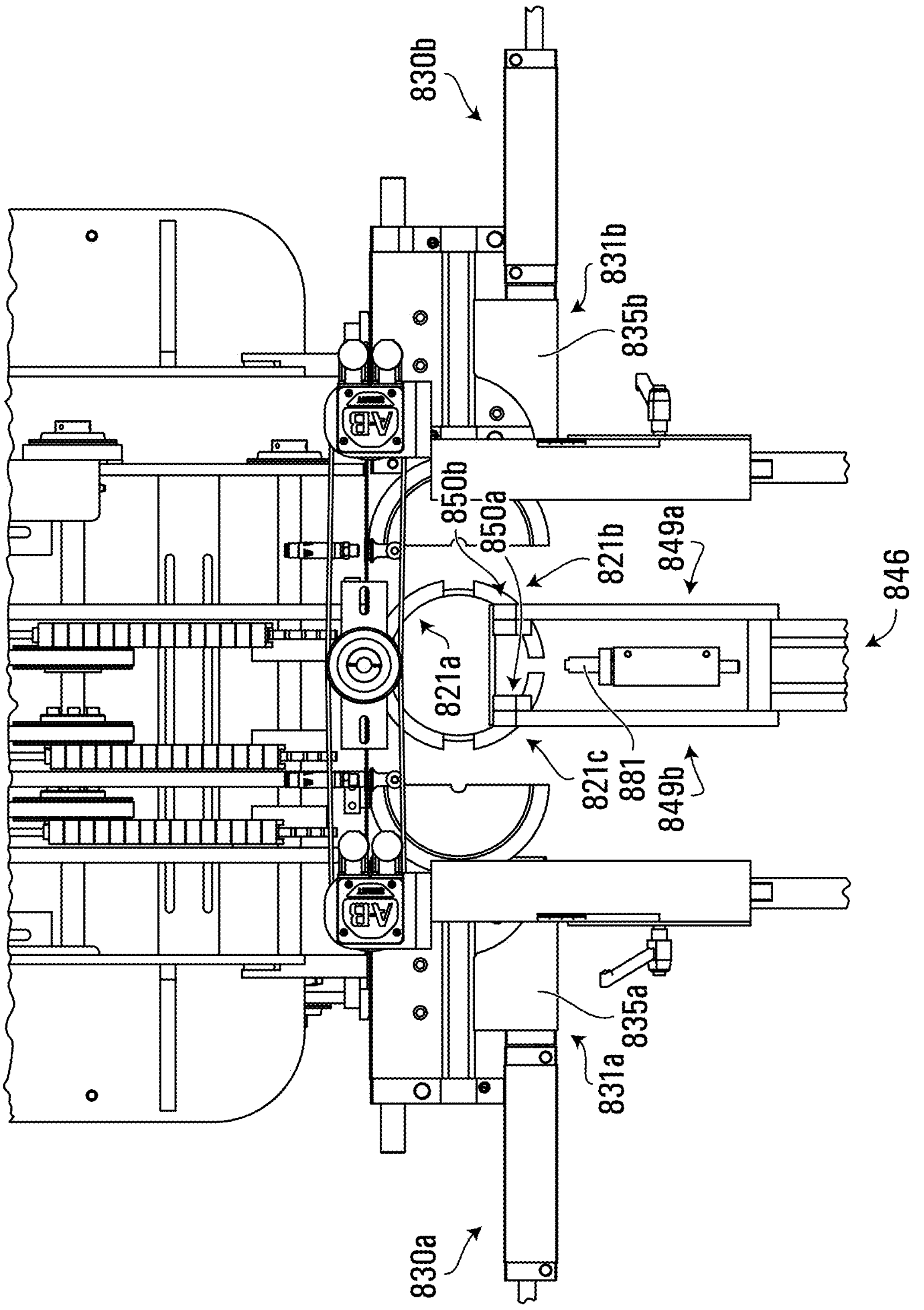
FIG. 60 is a top view of the mandrel and forming apparatus as shown in FIG. 59.

The air suction force that may be developed at the outer surfaces of air suction cups 868*a* will be sufficient such that, when activated by PLC 832, they can engage and hold the internal surface of blank 8000, namely portion B, and rotate portion B (along with portion A) of case blank 8000 from (i) the position shown in FIG. 56 to (ii) the position shown in FIG. 59, and then (iii) after releasing a first engaged case blank 8000, eventually return to the position shown in FIG. 56 to engage a portion B of the next case blank 8000 positioned at the pick-up position in magazine 810. The vacuum generated at air suctions cups 868*a* can be activated and de-activated by PLC 832 through operation of air distribution unit 427.

Second portion rotating apparatus 824*b* may be constructed and configured in generally the same manner as first portion rotating apparatus 824*a*. Second portion rotating apparatus 824*b* may operate in opposite rotational directions to first portion rotating apparatus 824*a* when engaging and rotating other portions of blank 8000 than the portions engaged and rotated by first portion rotating apparatus 824*a*.

Mounted to the opposite end of articulating arm 862*b* of rotational drive 860*b* is a vertically oriented end effector rod 866*b* formed in a generally tubular cylinder and having one or more air suction cups 868*b*.

Air suction cups 868*b* may, like air suction cups 868*a*, may be interconnected for air communication through cavities in end effector 866*b*, and in articulating arm 862*b* to a fitting 863*b* in articulating arm 862*b*. Fitting 863*a* may have a connector (like a hose quick-connect) that links to a hose (not shown) that communicates to the same valve assembly 771. Fitting 863*b* may also include a vacuum generator that may transform pressurized air selectively supplied through valve assembly 771 into vacuum which can be communicated to the air suction cups 868*b*. Thus, the supply of vacuum supplied to suction cups 868*b* can be turned on and off. A source of pressurized air may be provided to valve assembly 771 under the control of PLC 132. Fitting 863*b* may thus be used to selectively provide air suction to air suction cups 868*b* through valve assembly 771. Air distribution unit 427 may include a plurality of valves that may be operated by PLC 832. In other embodiments, local vacuum generator apparatuses that may be integrated as part of, air suction cups 868*a*. In other embodiments, a vacuum pump mounted externally may generate vacuum externally and then a vacuum can be supplied through the aforementioned air channels. If local vacuum generators are utilized, pressurized air may be delivered from an external source through air distribution unit 427 to the vacuum generators. The local vacuum generators may then convert the pressurized air to a vacuum that can then be delivered to air suction cups 868*b*.

Figure 80:
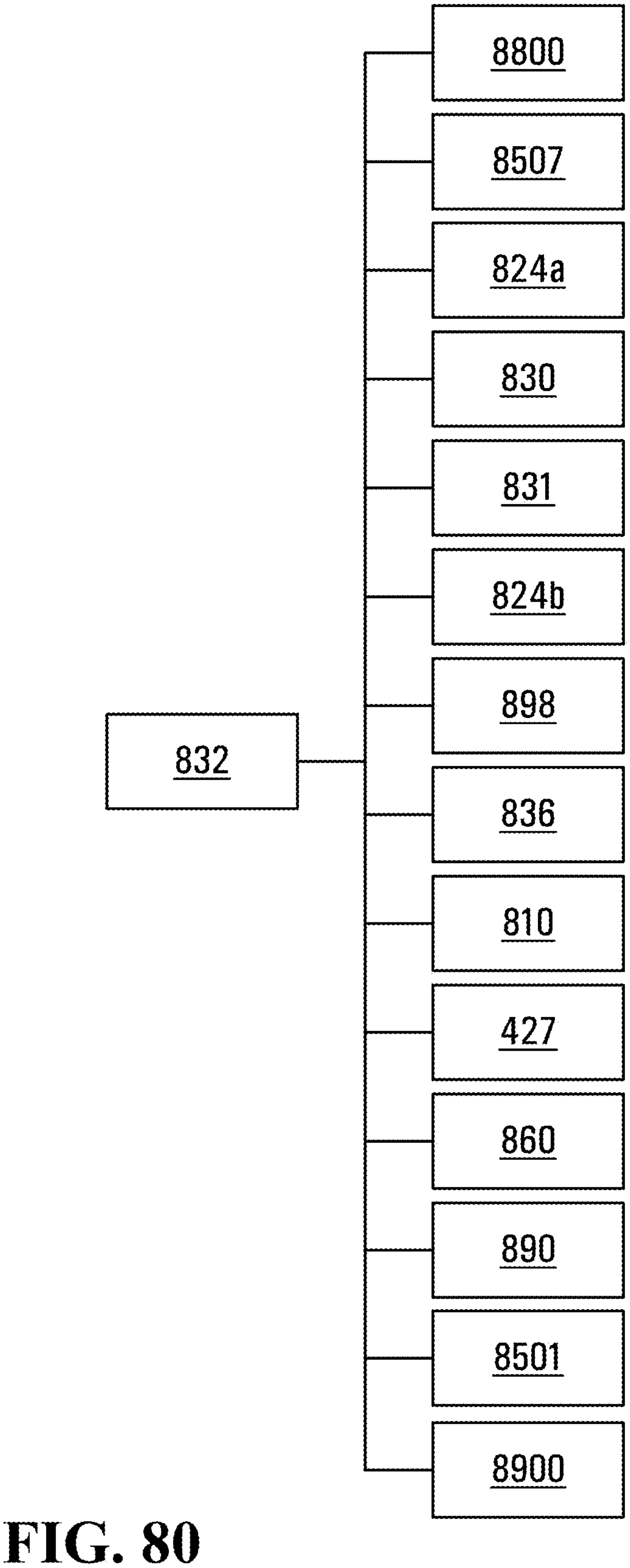
FIG. 80 is a schematic diagram of a control system for the can forming system of FIGS. 52-79.

The air suction force that may be developed at the outer surfaces of air suction cups 868*b* will be sufficient, so that when activated, they can engage and hold portion D and rotate portion D (along with portion E) of a case blank 3000 from (i) the position shown in FIG. 56 to (ii) the position shown in FIG. 59, and then (iii) after releasing a first engaged blank 8000, eventually return to the position shown in FIG. 56 to engage the next case blank 8000 positioned at the pick-up position in magazine 810. The vacuum generated at air suctions cups 868*b*, like air suction cups 868*a*, can be activated and de-activated by PLC 832 through operation of air distribution unit 427 including valve assembly 771 (FIG. 80).

Can forming apparatus 800 including first rotating apparatus 824*a* and second rotating apparatus 824*b* may be configured to be readily adjustable for different types/configurations/sizes of mandrel apparatus 820, including in particular mandrel 837, for forming different types/configurations/sizes of blanks such as blanks 8000 into tubular side wall of composite cans, including by suitable programming of PLC 832 appropriately to provide for appropriate movements of air suctions cups 868*a*, 868*b*, through movement of the first and second rotational drives 860*a*, 860*b* respectively and by adjustment of first and second rotating apparatuses 824*a*, 824*b*. For example, the articulating arms 862*a*, 862*b* may be interchanged to provide for arms of different lengths. Similarly, the lengths of end effectors 866*a*, 866*b* (which may be detachably coupled at end portions of articulating arms 862*a*, 862) and/or the vertical position of suctions cups 868*a*, 868 on end effectors 866*a*, 866*b* may be varied. Thus, by an interchange of mandrel 837 to provide for alternate sized and/or configurations of the mandrel side wall, PLC 832 and its operation (and the configuration/size) of first rotating apparatus 824*a* and second rotating apparatus 824*b* may be appropriately modified and programmed and thus different sized and configurations of blanks may be processed.

The can forming apparatus 800 may be configured such that the blank's initial position (i.e. the position for pick-up of a blank from the magazine) including its magazine 810, can move following the arm rotation centre again as a function of the blank tube diameter and corresponding mandrel diameter. That may be achieved in part by having the entire carton magazine assembly adjustable longitudinally—in and out—on a rail slide mechanism as described above. The relative different longitudinal and transverse positions of the carton magazine, portion rotating apparatuses 824*a*, 824*b*, and mandrel 837 can be appreciated in FIGS. 81A and 81B.

With reference now to FIGS. 81A-D, the dimensional configuration relationship of the blanks 8000, mandrel 837 and first and second portion rotating apparatuses 824*a*, 824*b* is illustrated. The rotating apparatuses 824*a*, 824*b* are configured to attach to blank 8000 at suction cup pick points P, transport the engaged portions B and D of blank 8000 to near mandrel point A and rotate and release the portions B and D of blank 8000 at suction arm forming/release positions F. It can be seen that distance CP between center of picking rotation C and suction cup pick point P is the same as distance CF between center of picking rotation C and suction arm forming/release position F (i.e. the pick arm radius $R_1$). Further, the distance between center of picking rotation C and near mandrel point A represents an adjustable region for space in rotation apparatuses 824*a*, 824*b* operability. According to some embodiments, there may be a single, common centre of rotation C for the two articulating arms 862*a*, 862*b*. That centre of rotation accords with the vertical axis of central shaft 901 in the illustrated embodiment.

To ensure minimal overlap in a cylindrical formed blank, the pick arm radius $R_1$ may be optimized in relation to the mandrel radius $R_2$ in concert with distance to mandrel CA. The total pick arm radius $R_1$ suction cup rotating arm dimension is related to the involute of a quarter of the mandrel circumference by the relationship $R_1=\frac{1}{4}(2\pi R_2)$. In other words, the pick arm radius $R_1$ is defined such allow the blank 8000 to wrap around ¼ the circumference of the mandrel on each side of the mandrel, and thus the end-points of the rotation of the articulating arms will be at 90 degrees on the mandrel (ie. at 3 o'clock and 9 o'clock as shown in FIGS. 81A-D). Based on this relationship and the Pythagorean equation, one can determine the appropriate distance (i.e. CA) to position blanks 8000, wherein $R_1^2=R_2^2+(R_2+CA)^2$. Therefore the theoretical final square and solvable equation for the adjustment, being the function of tube dimension, is: $CA^2+2*R_2*CA+(2*R_2^2-R_1^2)=0$.

Accordingly, to alter the diameter of a tubular blank 8000 to be formed, some adjustments to can forming system 800 can be made. First, blanks 8000 of different transverse widths (such as W1, W2) can be exchanged and held in magazine 810. To change the corresponding diameter (and thus circumference) of a circular cylindrical mandrel 837, one size diameter mandrel can be exchanged for a different size diameter mandrel. When substituting the different sized mandrels, the circle centre datum point T of the mandrels may be in the same longitudinal and transverse position in relation to the external frame of reference (ie. T is the constant datum). In order to adjust the distance $R_1$ one may substitute different length articulating arms 862*a*, 862 in portion rotating apparatuses 824*a*, 824*b*, or otherwise adjust the relative position of end effectors 866*a*, 866*b* along arms 862*a*, 862*b*, relative to centre shaft 901.

Figure 81A:
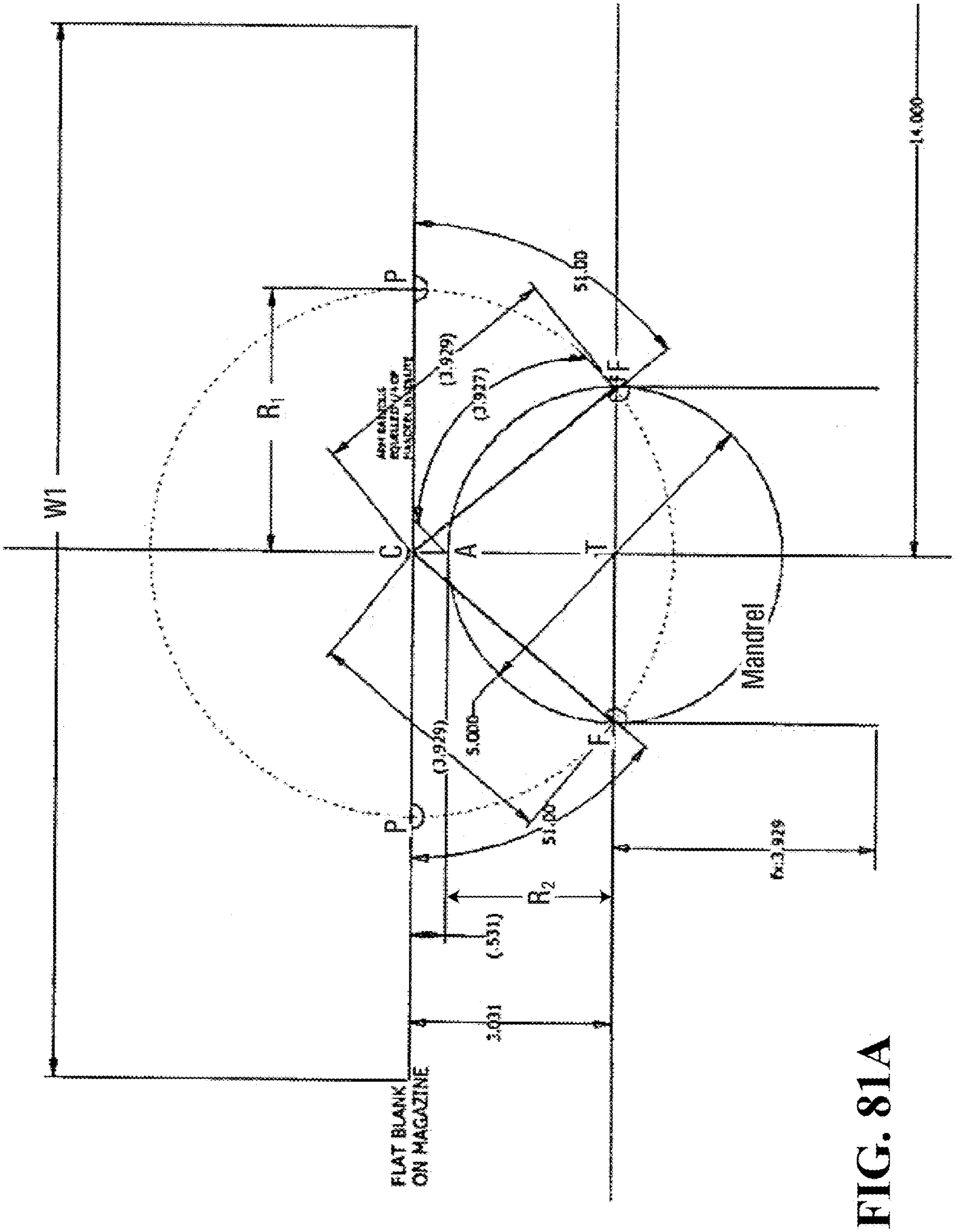
FIGS. 81*a*, 81*b*, 81*c*, and 81*d* are illustrated representations of relationships between the position of some components of the can forming system of FIGS. 52-79.
Figure 81B:
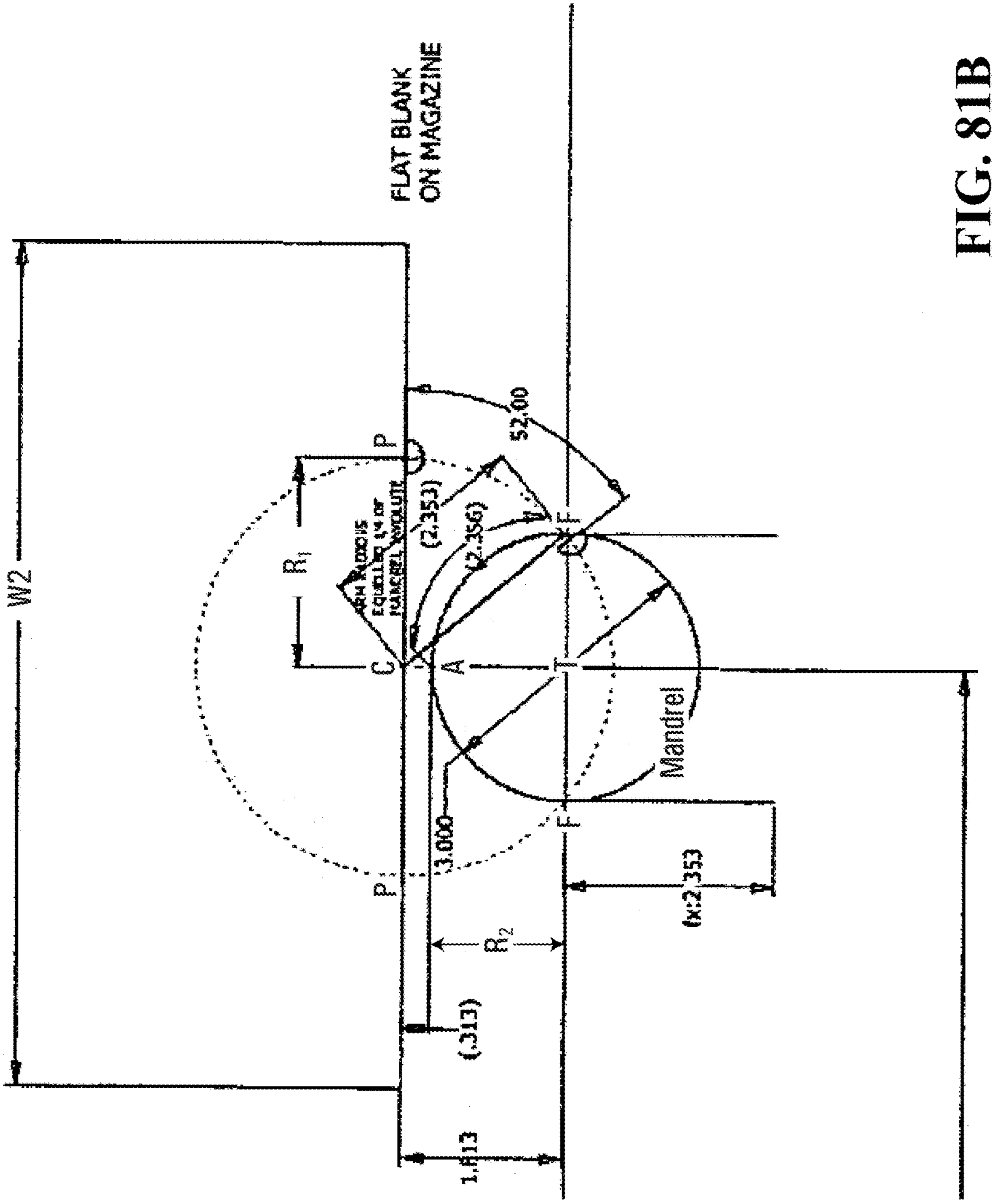
Figure 81D:
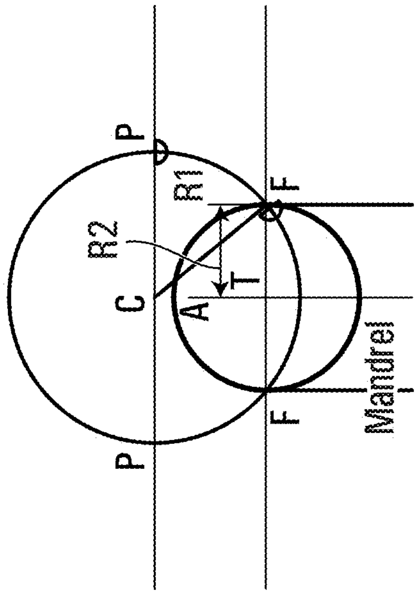
Figure 81C:
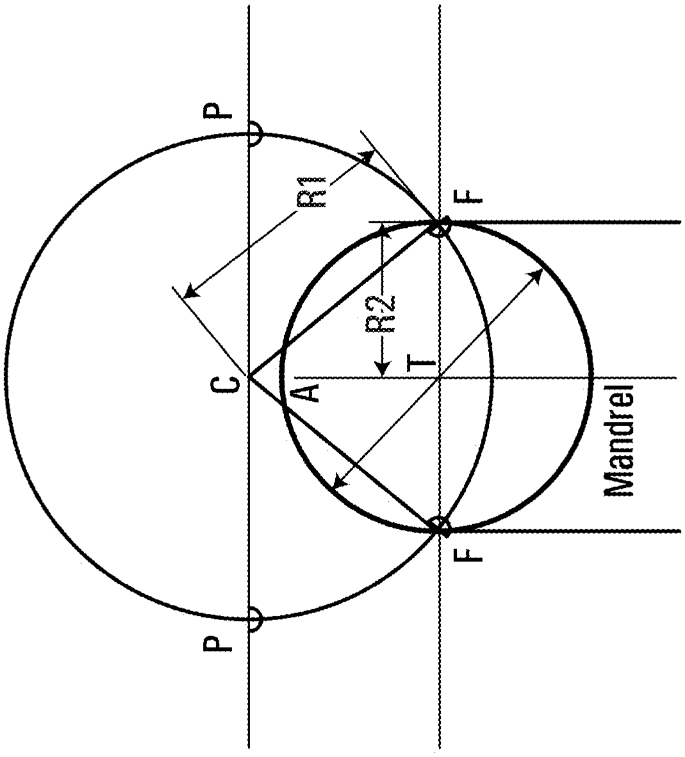

To vary the distance CA, the position of the centre of rotation C relative to the frame of the apparatus (and thus relative to the position on the frame where the mandrel 837 is secured—as described below) may be made adjustable on slide mechanisms such that the centre of rotation C can be adjusted dependent upon the tube diameter (ie. the width of the blank 8000). For example, the positioning of center of arms rotation C relative to the support frame may be adjusted by adjusting the longitudinal positions of support tubes 855*a*, 855*b* relative to the main support frame, as described above. By way of example the positioning of the center of rotation C, associated with one relatively larger tube diameter is shown in FIGS. 81A and 81C, and the positioning associated with a relatively smaller tube diameter is shown in FIGS. 81B and 81D.

Additionally, it may be in some embodiments also be appropriate to make a corresponding longitudinal adjustment in the position of the blank magazine which is holding the blanks 8000 in their pick-up positions. This may be done by using an electromechanical means (such as an articulatable and adjustable stopper controlled by a controller such as the programmable logic controller 832 or using a purely physical means such as a stopper device). However, in some embodiments, it may not be necessary to also move the longitudinal pick up position of a blank 8000 held in the magazine. For example, it may be that the suction cups 868*a*, 868*b* on respective end effectors 866*a*, 866*b* can still engage a blank held at the front of the blank magazine, if there is not a significant separation between the end effectors 866*a*, 866*b* and the surface of the blank, if the blank is longitudinally a relatively small further distance away from the suction cups 868*a*, 868*b* at the pick-up position.

Figure 57:
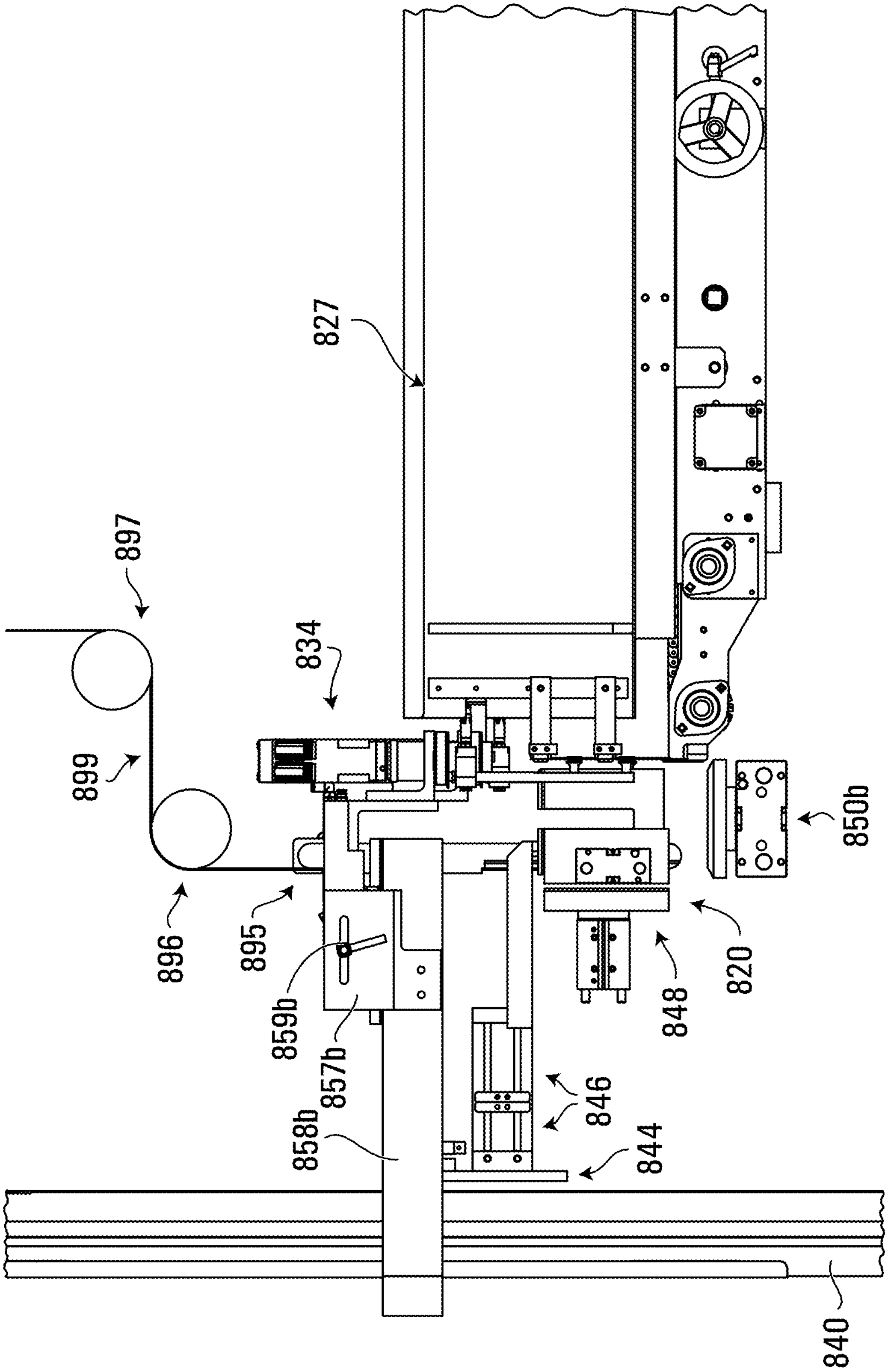
FIG. 57 is a side view of part of a can forming system in an operational position.

Mandrel apparatus 820 may have several components including mandrel 837 (see FIGS. 56 and 59) and mandrel support apparatus 848 (see FIG. 57). Mandrel 837 may be easily removable/releasable (eg. such as with threaded bolt type releasable connectors) from fixed connection to mandrel support apparatus 848 so that a mandrel of one size/configuration may be easily replaced with a mandrel of another size/configuration. It may also be necessary to modify components of mandrel support apparatus 848 (eg. the lengths of members 849*a*, 849*b*, to ensure that the center of each mandrel remains in the datum position T).

With particular reference to FIGS. 59-65, mandrel 837 may comprise a generally arcuate and semi-circular, vertically oriented side wall 821*a* that is fixedly interconnected or integrally formed, with a pair of opposed, generally arcuate, quarter-circular, spaced, vertically and longitudinally oriented, spaced, side walls 821*b*, 821*c*. Side walls 821*a*, 821*b* and 821*c* may be connected/integrally formed to provide a generally circular or oval, open top and bottom, can shape support mandrel 837. Side walls 821*a*, 821*b*, 821*b* of mandrel 437 may have an intermittent, circumferential, upper, flared-out, ridge 821*d* (FIG. 55) which will prevent a blank 8000 from sliding upwards relative to mandrel 837 is moved downwards when a blank is formed/wrapped around it, as described hereinafter. Alternatively, substitutable mandrels 837 may be generally configured in a variety of different sizes and shapes, each selected for the particular type of case blank 8000 to be formed into a composite can. For example, side walls 821*a*, 821*b* and 821*c* and an additional side wall 821 (not shown) may be connected/integrally formed to provide a generally rectangular or square, open top and bottom can shape (similar to the mandrels of other embodiments described above).

In some embodiments, the dimensions of the outer surfaces of mandrel 837 may be selected so that the specific can blank 8000 that is desired to be formed has, during the folding/bending/wrapping process, vertical fold lines that are located substantially along the surface of mandrel 837. In other embodiments, the can blank 8000 may not have fold lines but may be sufficiently bendable to simply be wrapped/bent around the arcuate outer surfaces of side walls 821*a*, 821*b* and 821*c*. Mandrel 837, and surrounding components in system 800, may be configured to permit for the easy interchange of mandrel 837 so that can forming system 800 can be readily adapted to form differently sized/shaped composite cans from differently sized/configured case blanks 8000.

Figure 61:
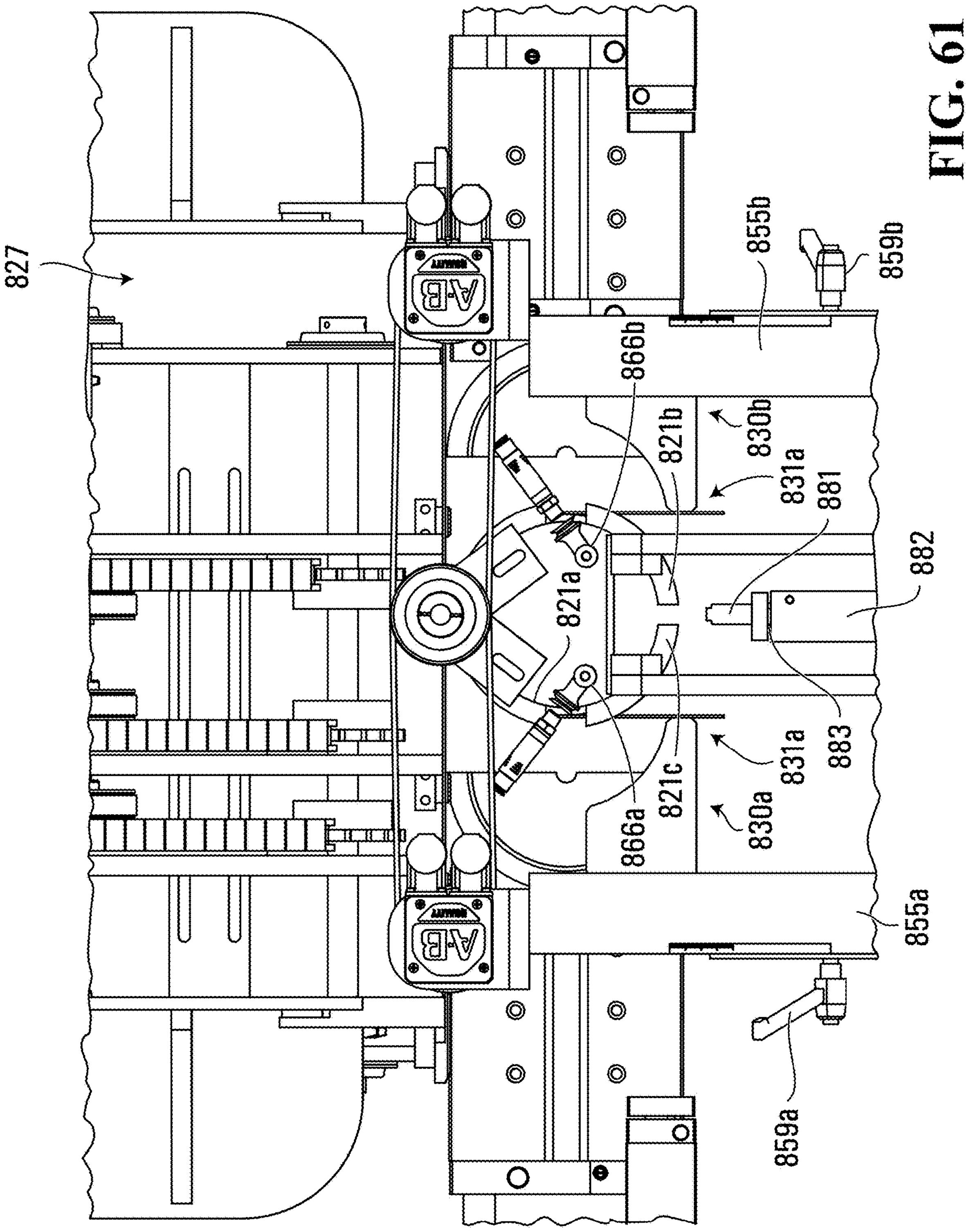
FIG. 61 is a top view of the mandrel and forming apparatus as shown in FIG. 59 in the second operational position.

With particular reference now to FIGS. 55, 56, 59 and 61, a vertical slot 823*a* may be provided between an end of side wall 821*a* and an end of side wall 821*c*, and may be configured to permit a lower portion of end effector 866*a* and air suction cups 868*a* thereon to move from the position shown in FIG. 56 and pass through slot 823*a* to the position shown in FIGS. 59 and 61. By allowing the end effector 866*a* to pass through vertical slot 823*a*, end effector 866*a*, and in particular air suction cups 868*a*, may engage the outer surface of portion B of blank 8000 when it is held in magazine 810 and bring portion B into face-to-face relation with the outward facing surface of mandrel side wall 821*c*. The surface of portion B, being held by air suction cups 868*a*, becomes an inner surface of the tubular shaped blank and side portion B may be held against the outside surface of side wall 821*c* of mandrel 837 as shown.

Similarly, with reference to FIGS. 56, 59 and 61, a vertical slot 823*b* may be provided between a side end of side wall 821*a* and a side end of side wall 821*b* and may be configured to permit a lower portion of end effector 866*b*, and air suction cups 868*b* thereon, to move from the position shown in FIG. 56 and pass through slot 823*b* to the position shown in FIGS. 59 and 61. By allowing the end effector 866*b* to pass through vertical slot 823*b*, end effector 866*b*, and in particular air suction cups 868*b*, may engage the outer surface of the side portion D of blank 8000 when it is held in magazine 810 and bring portion D into face to face relation with the outward facing surface of side wall 821*b*. The surface of portion D, being held by air suction cups 868*b*, becomes an inner surface of the tubular shaped blank and side portion D may be held substantially flat against the outside surface of side wall 821*b* of mandrel 837 as shown.

Similar to mandrel 337 described above, mandrel 837 may have one or more laterally extending tabs (not shown) at the upper perimeter edge. This ensures that when mandrel 837 moves vertically downward with blank 8000 wrapped around it and formed into a tubular side wall configuration, the upper edge of the tubular shaped blank, with its side wall formed from portions A-E, will move vertically downwards with mandrel 837 as the upper edge of the sidewall engages the downward facing surfaces of the tabs of mandrel 837.

Mandrel side walls 821*a*, 821*b* and 821*c* may be configured to facilitate the support of mandrel 837 on mandrel support apparatus 848. In particular, side walls 821*b* and 821*c* may be connected to a generally U-shaped support frame with side support arms 849*a*, 849*b* which may be supported at, and fixedly connected to, an outer end of carriage support arm 846 (See FIG. 60). Mandrel side wall 821*a* may be integrally connected to side wall 821*b*, and 821*c* as shown for example in FIG. 55. A vertical slot 823*c* is provided between the sidewall portion 821*b* and 821*c* of mandrel 837. Support arm 849*a* may have secured to a distal end thereof vertical attachment member 850*a*. Similarly, support arm 849*b* may have secured to a distal end thereof vertical attachment member 850*b* (see FIG. 60). Mandrel 837 may be connected to lower portions of vertical attachments members 850*a*, 850*b* with releasable nuts/bolts to permit relatively easy interchange of differently sized/configured mandrels that are suitable for processing differently sized/configured blanks.

With reference to FIGS. 54, 55 and 57, as noted above, mandrel support apparatus 848 is fixedly attached to a first end portion of longitudinally oriented and extending carriage arm 846. The opposite end portion of longitudinally oriented and extending carriage arm 846 is fixedly connected to carriage block 844. Carriage block 844 is attached for sliding vertical upward and downward movement on vertically oriented linear rail 842. Linear rail 842 may be, for example, a linear rail device of many types made, for example, by Bosch Rexroth AG and provides a vertical movement apparatus 836 for mandrel 837 and the mandrel support apparatus 848.

Linear rail 842 may be mounted to vertical support frame 840. As indicated above, linear rail 842 may have a carriage drive mechanism which is operable under the control of PLC 832 to move the carriage 844, and thus also mandrel 837, vertically upwards and downwards within a range of movement as required for completing the can forming operations described herein.

It will also be appreciated that in first portion rotation apparatus 824*a* and second portion rotating apparatus 824*b*, air suction cups 868*a*, 868*b*, respectively, are used to apply a force to engage and move portions of a blank 8000. However alternative engagement mechanisms to suction cups could be employed in other embodiments to engage and rotate portions of blanks 8000.

Figure 62:
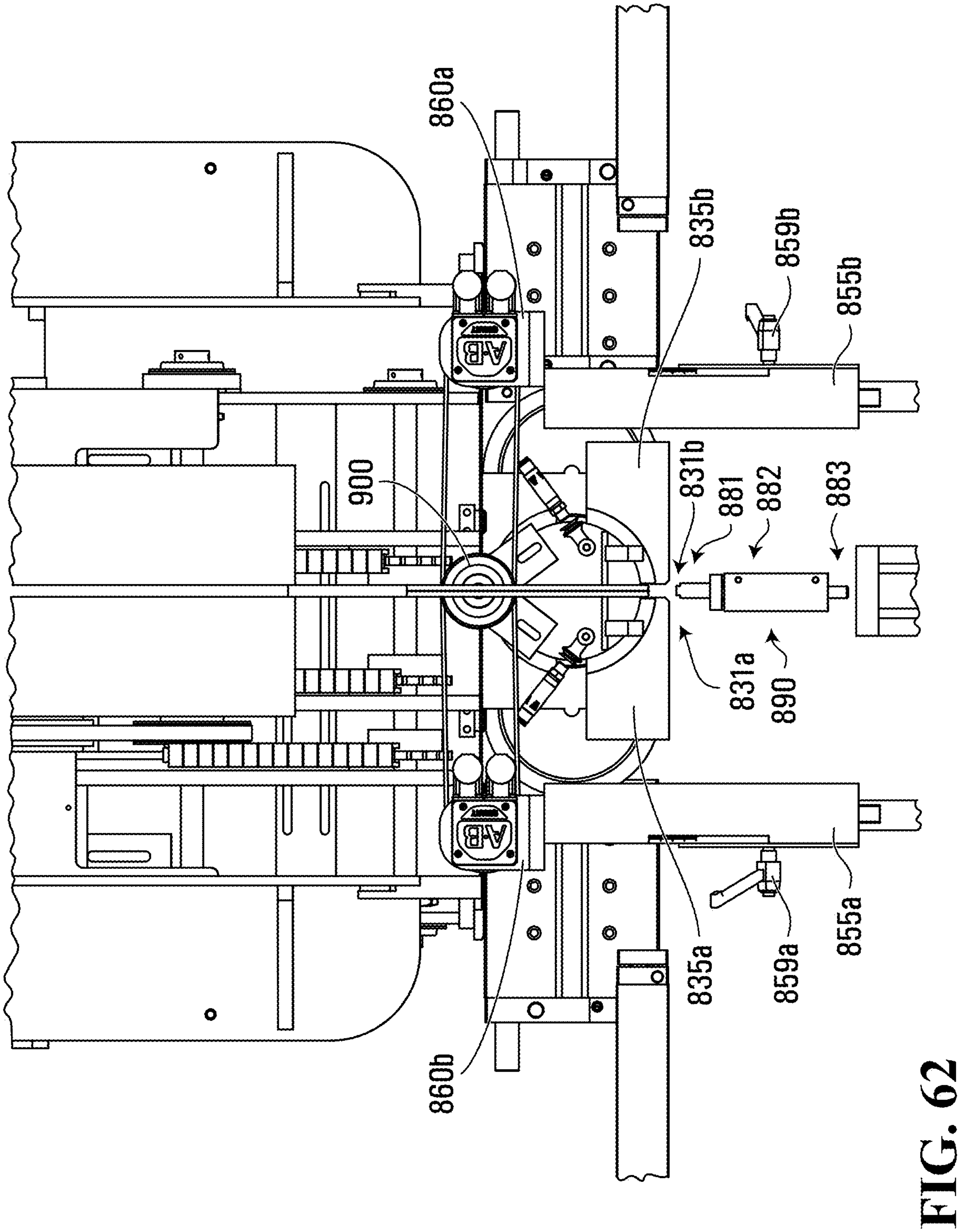
FIG. 62 is a top view of the mandrel and forming apparatus as shown in FIG. 59 in a third operational position.
Figure 63:
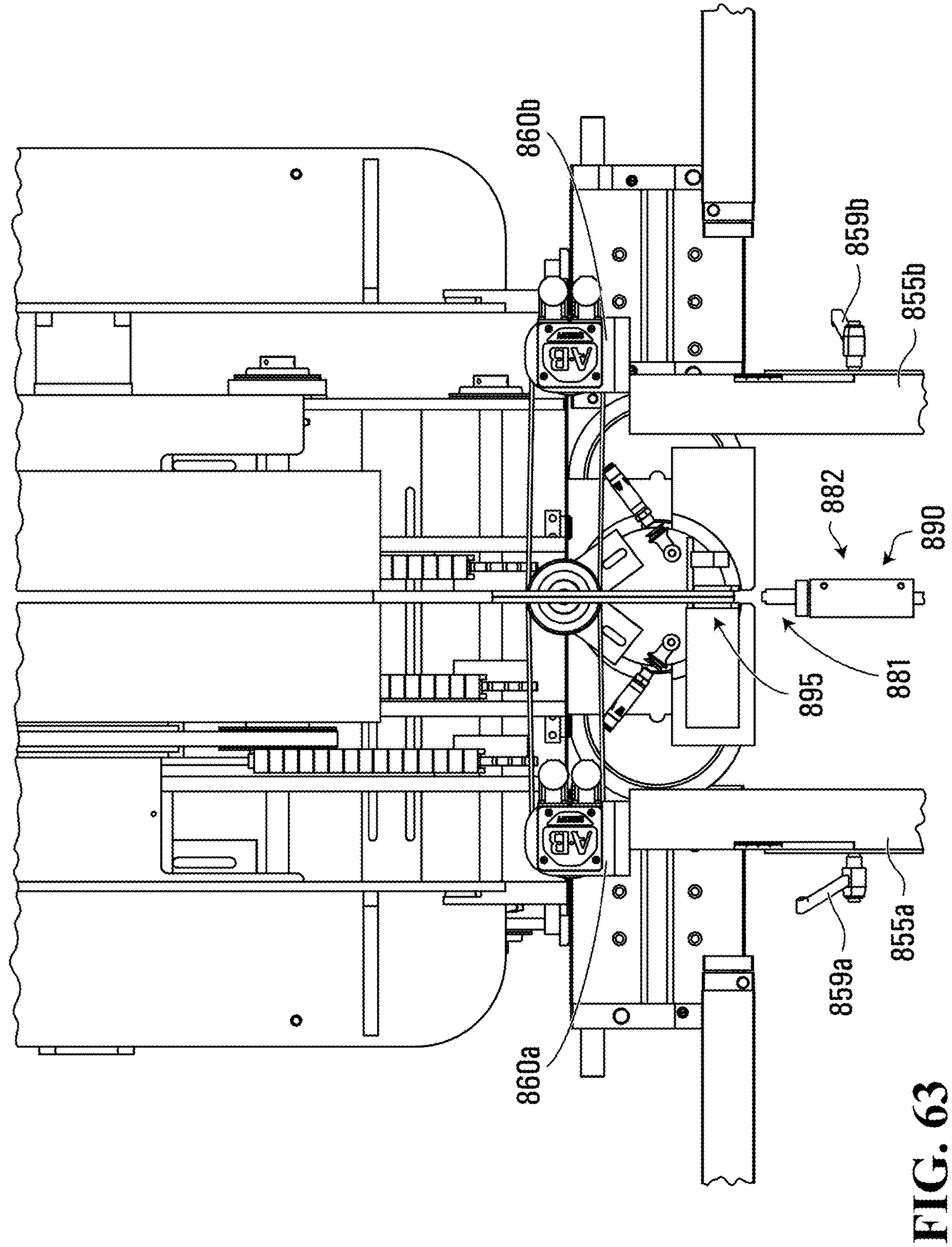
FIG. 63 is a top view of the mandrel and forming apparatus as shown in FIG. 59 in a third operational position.
Figure 64:
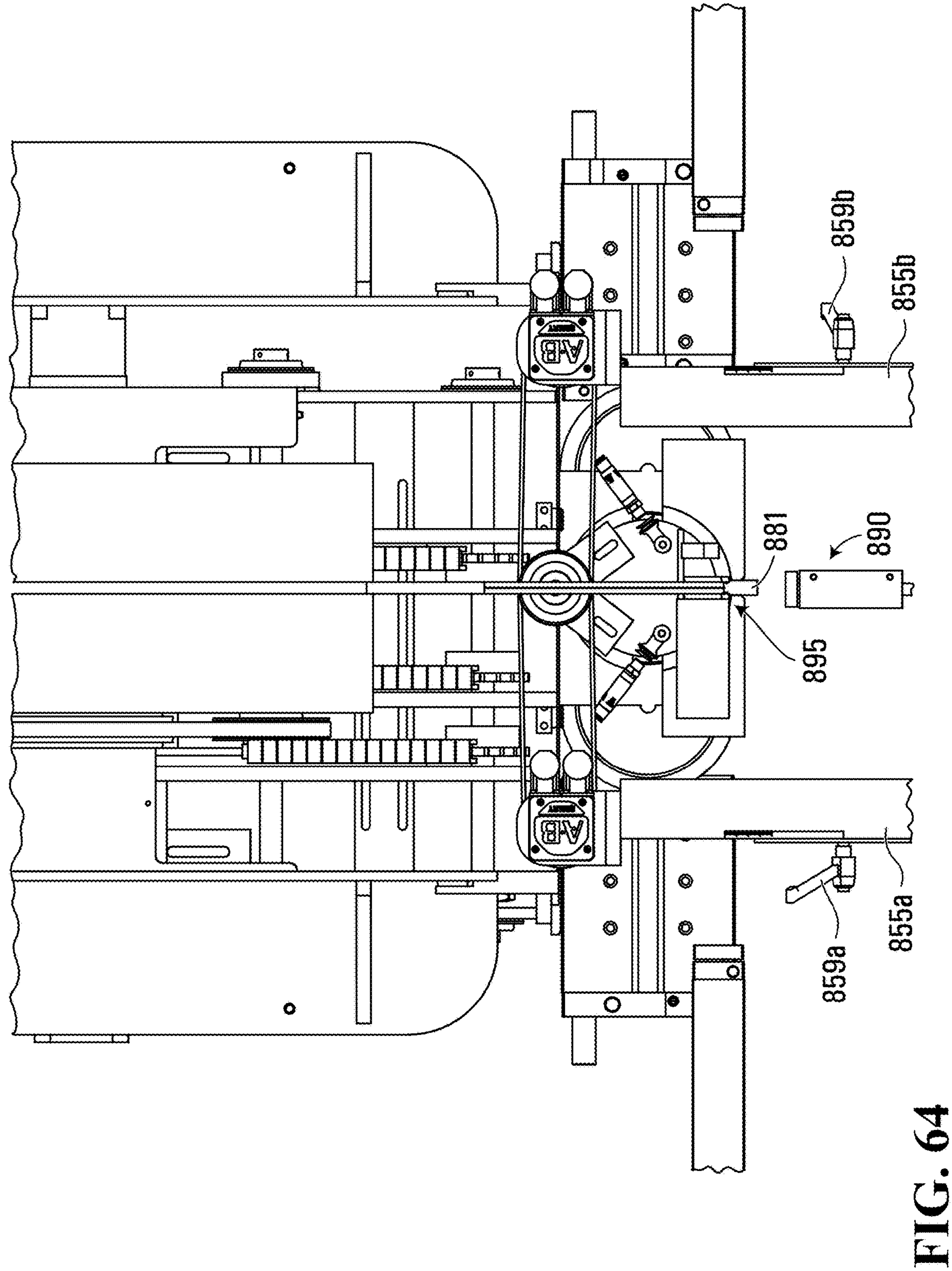
FIG. 64 is a top view of the mandrel and forming apparatus as shown in FIG. 59 in a fourth operational position.

The next components of system 800 to be described in detail are third portion rotating apparatus 830*a* and fourth portion rotating apparatus 830*b* (see FIGS. 59 and 61) which are respectively configured to cause portions A and E to be folded/bent relative to portions B and D respectively to complete the wrapping of the portions A-E around the outward facing surfaces of mandrel 837 and form a generally circular/cylindrical or oval tubular shape as shown in FIG. 62. In particular, third portion rotating apparatus 830*a* is operable to rotate portion E clockwise with at least part of portion D while fourth portion rotating apparatus 830*b* is operable to rotate portion A counter-clockwise with at least a part of portion B. When portions A and E are so rotated, portion C may be released from being held in the magazine and become configured in an arcuate shape around the outward facing surface of mandrel 837. In other implementations, portion C may be released during the initial rotation by first and second rotating apparatuses 824*a*, 824*b*. The vertical longitudinal side edges of the portions A and E are positioned proximate to and may come into abutment with each other. Third and fourth portion rotating apparatuses 830*a*, 830*b* may each be a reciprocating plough device as described further below.

Between the vertical longitudinal side edges and inner surface of the portions A and E (when they are rotated relative to portions B and D respectively, and have their vertical edges in close proximity to or in close abutment with each other) is provided a vertical sealing strip 894 of sealing material 899 (see FIGS. 55, 57 and 62). Sealing material 899 may be, for example, a metalized foil ribbon material such as the same material that is used in the intermediate metallic foil layer in the blank. In some embodiments, sealing material (which may be in the form of an elongated ribbon) 899 may be the same or a similar material to that used in the inner layer of blank 8000, such as a polyolefin layer, which will bond to the polyolefin layer on the inner surface of the blank when appropriately heated, or it may be a material comprising a combination of these two materials from blank 8000. In other embodiments, a plastic type material bearing a cold seal adhesive may be employed for the sealing material 899. In still other embodiments, the sealing material 899 may be a thermoplastic material which can melt upon application of heat or high frequency vibration. In some implementations, sealing material may have a thickness in the range of about 0.008 mm (0.3 mils) mm to 0.016 mm (0.63 mils).

Figure 82:
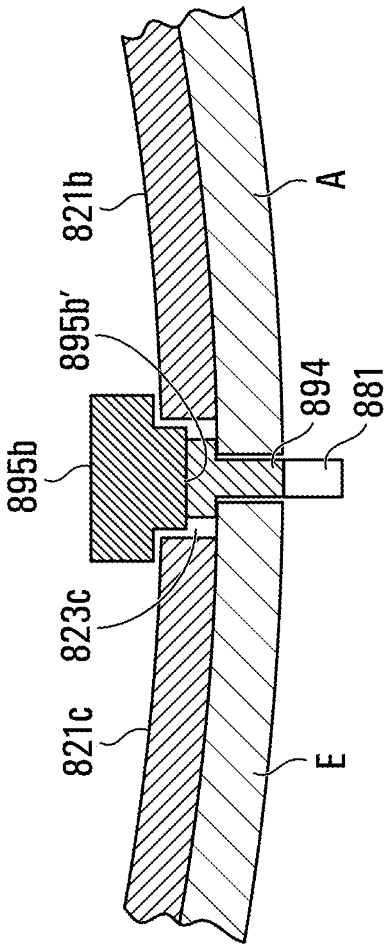
FIG. 82 is a cross-sectional view of a blank on the mandrel and forming apparatus in the fifth operational position.

Sealing material 899 may be wound around in a coil and delivered in a continuous string from a reel/spool 898 (FIG. 70) which feeds sealing material 899 over wheels 897 and 896 and to a sealing support bracket guide device 895 (see FIGS. 57, 63, 64,65, and 66*a*). Bracket guide device 895 may be mounted to transverse support member 893 that is interconnected to the main frame (FIG. 65) and bracket guide device 895 may include a vertically oriented guide channel which allows for sealing material 899 to provide a vertical sealing strip 894 at and across the vertical longitudinal edges and between inner facing surfaces of portions A and E of blank 8000. Bracket guide device 895 may have an upper portion 895*a*, and a lower portion 895*b*. Upper portion 895*a* may be generally T-shaped in cross section and lower portion 895*b* may have a generally flat outward vertical and transverse surface 895*b*' (FIG. 82). Bracket guide device 895 may made of any suitable material, such as a thermoplastic or polyurethane material.

In some implementations, sealing material 899 may be a flat string or ribbon-like material that can be applied to the inward surfaces of the blanks 8000, across the vertical and longitudinal butt joint. In other implementations, sealing material 899 may have a cross-sectional T-shape corresponding in size and shape to be accommodated within the guide channel of upper bracket guide portion 895*a*. Sealing material 899 may thus have a base (i.e. 1, or trunk portion) and a top portion (i.e. the —, or branch portion). The sealing material 899 may according to some embodiments be inverted into a ⊥ shape. Such an orientation enables sealing strip 894 of such T-shaped configuration of sealing material 899, once activated to provide both a vertical and longitudinal seal between outer edges 642 and a horizontal seal across the inner surfaces of the blank at the vertical joint, and providing improved structural strength. The top portion of the T strip (ie. the top of the T) will seal on and vertically and across the interior surface of the sidewall of the tubular blank. An inner sealant layer inside the tubular side wall of the bank may be made from 50 micron LDPE metalized or non-metalized film. This provides a suitable bonding material for the top of the T portion of sealing material 899 to form a transverse seal portion of sealing strip 894.

The base of the T-strip (the vertical portion of the T) will provide an internal end butt joint seal/connection extending vertically between the vertically extending facing end edge surfaces of substantially abutting end portions A and E. When heated and compressed, the base portion of the T of heating strip 894 may also form an outer ridge/bulge at the outside surface of the blank 8000, over the vertical butt seal, to help rigidize the seal and help protect the butt seal from failing and delamination.

The result is that by including a T-strip as a bonding element, the T-strip acts as a spine component providing strength to the connection and acts as a vertical column. The top of the T bond provides enhanced resistance to shearing forces by securing the horizontal edge to the internal end butt joint seal. The internal vertical end butt joint seal adds additional reinforcement by providing internal structure in lateral and transverse directions using its own structural integrity and shape in direct contact with the tubular shaped blank's walls.

As the sealing material 899 is fed from wheel 896 and enters upper guide portion 895*a*, the configuration of the T-shaped channel is such that it ensures that the material 899 will be re-configured from a flattened configuration, to an upright T-shaped configuration. During movement of the mandrel 837 downwards (as described further below) the T-shaped sealing material 899 is further pulled, fed downward along the lower guide portion 895*b*. The rigidity of sealing material 899, along with the nature of the movement being of the mandrel 837 during this downward movement, being unidirectional, maintain the cross sectional T-shape (i.e. limiting any axial twisting that may change the cross-sectional T-shape or positioning) before a new blank is wrapped around the mandrel. After sealing, the sealing material 899 remains connected to both the blank 8000 and the string/ribbon of sealing material 899. As the mandrel moves downward to the discharge position, the uncut ribbon/string is pulled down and into the sealing position for the next tubular blank to be formed and sealed. Once the next tubular blank 8000 is sealed, the ribbon is then cut at the top of the tubular blank allowing that lower tubular blank to be discharged. Throughout, the sealing material remains in its T-shape and position until and while the mandrel returns to the tubular blank forming position.

Figure 65:
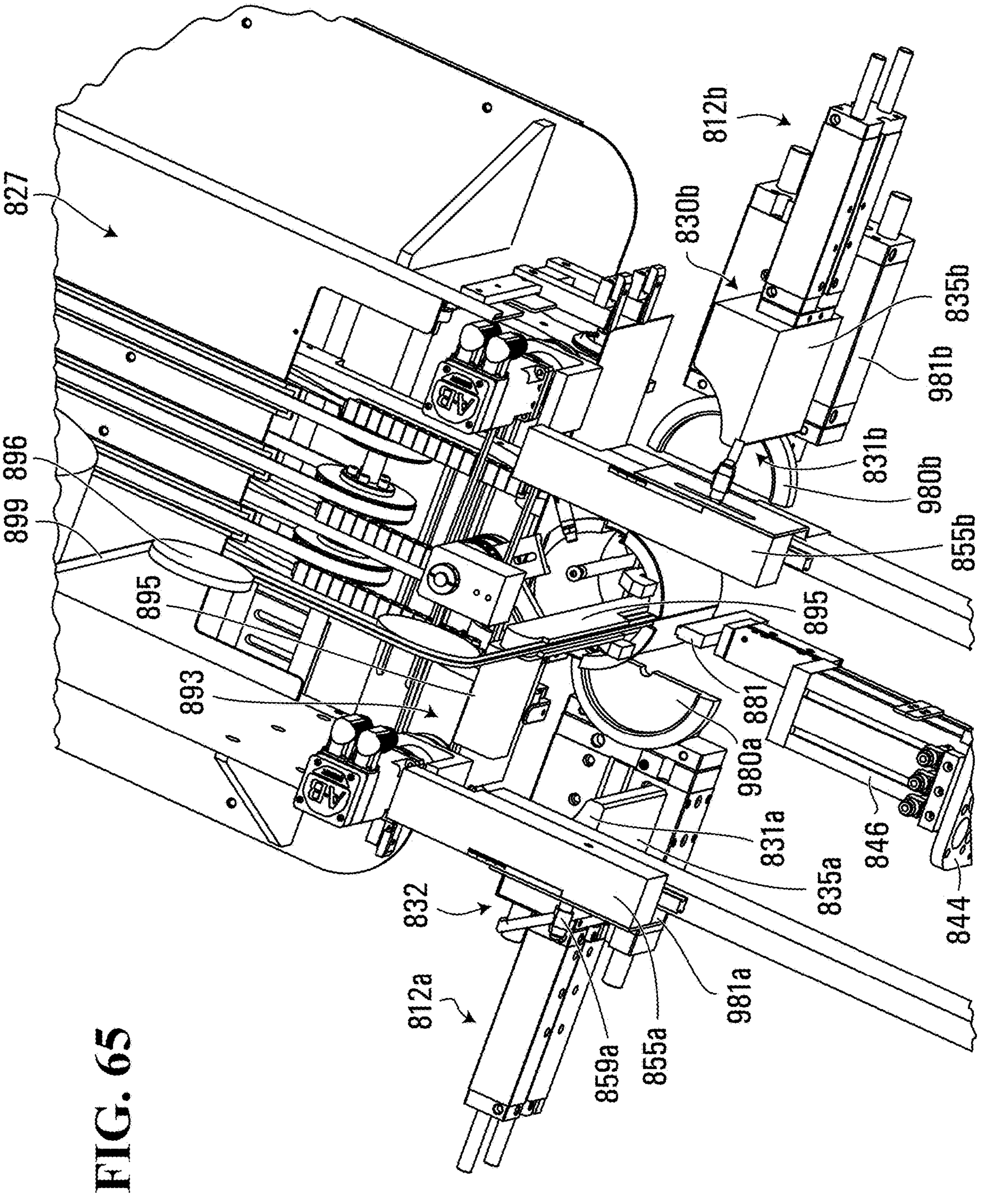
FIG. 65 is a top left view of the mandrel and forming apparatus as shown in FIG. 59 in a fifth operational position.
Figure 66A:
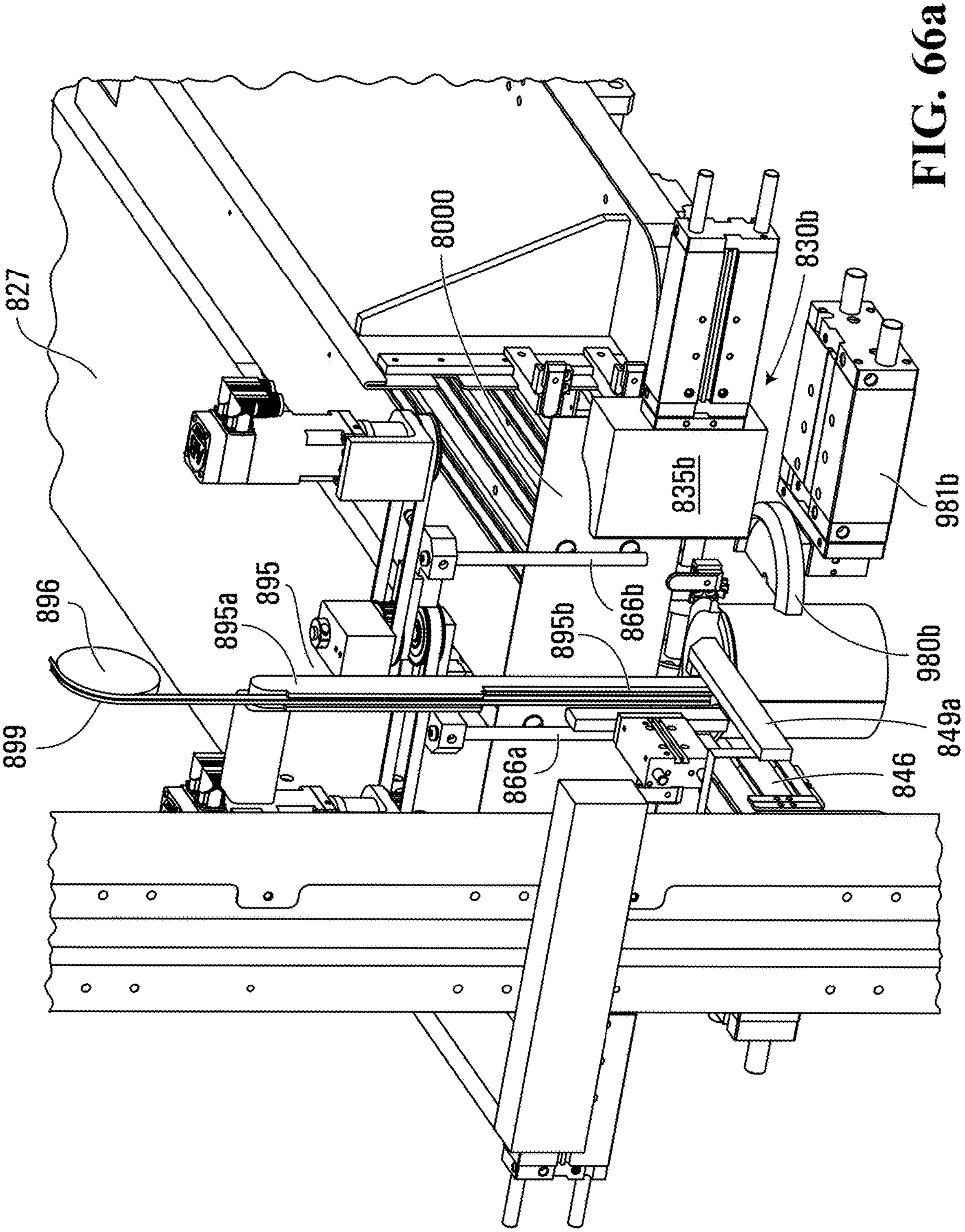
FIG. 66*a* is a top left view of the flaring apparatus.
Figure 66B:
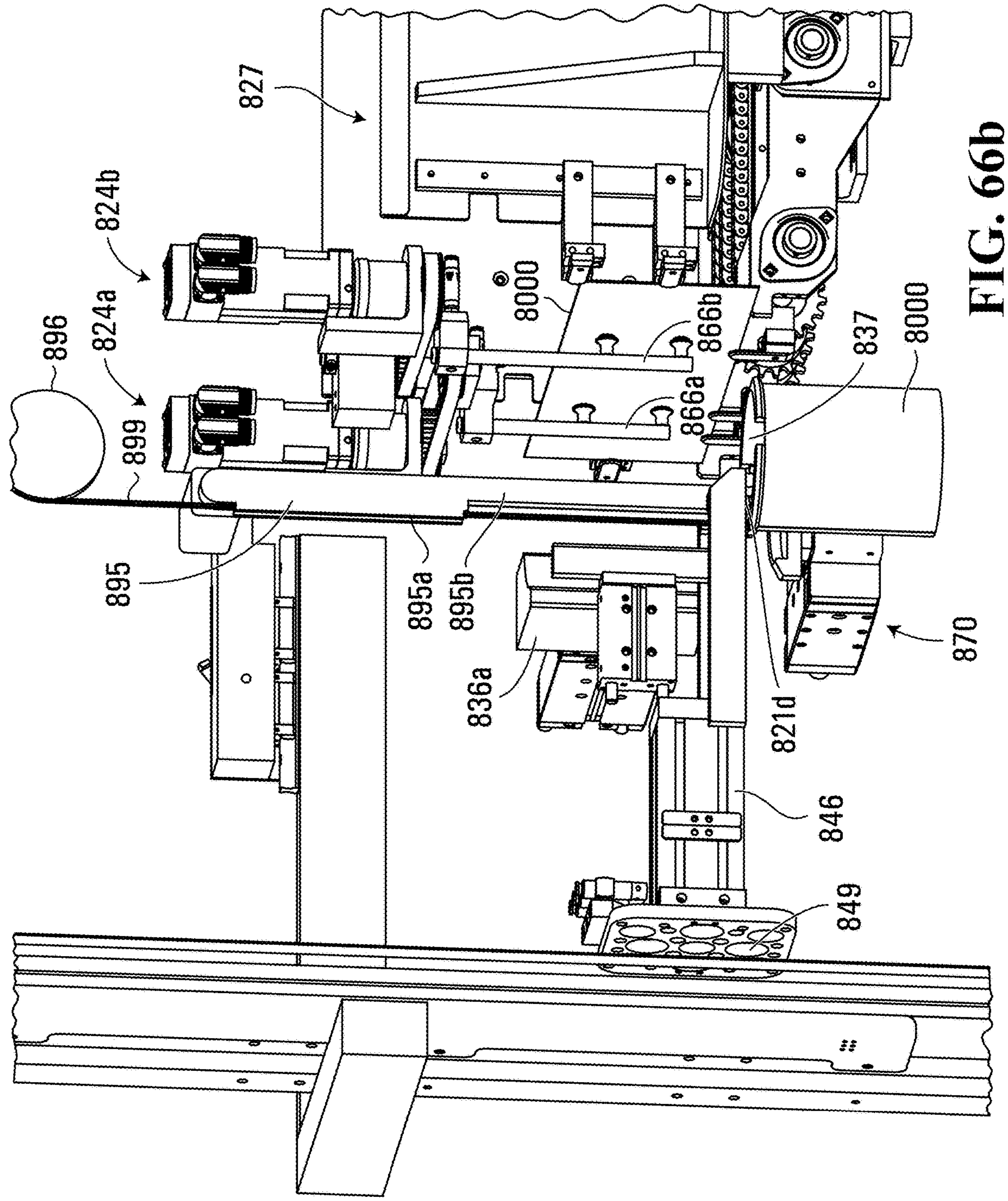
FIGS. 66*b* and 66*c* are top and side views of the flaring apparatus in a sixth operational position.
Figure 66C:
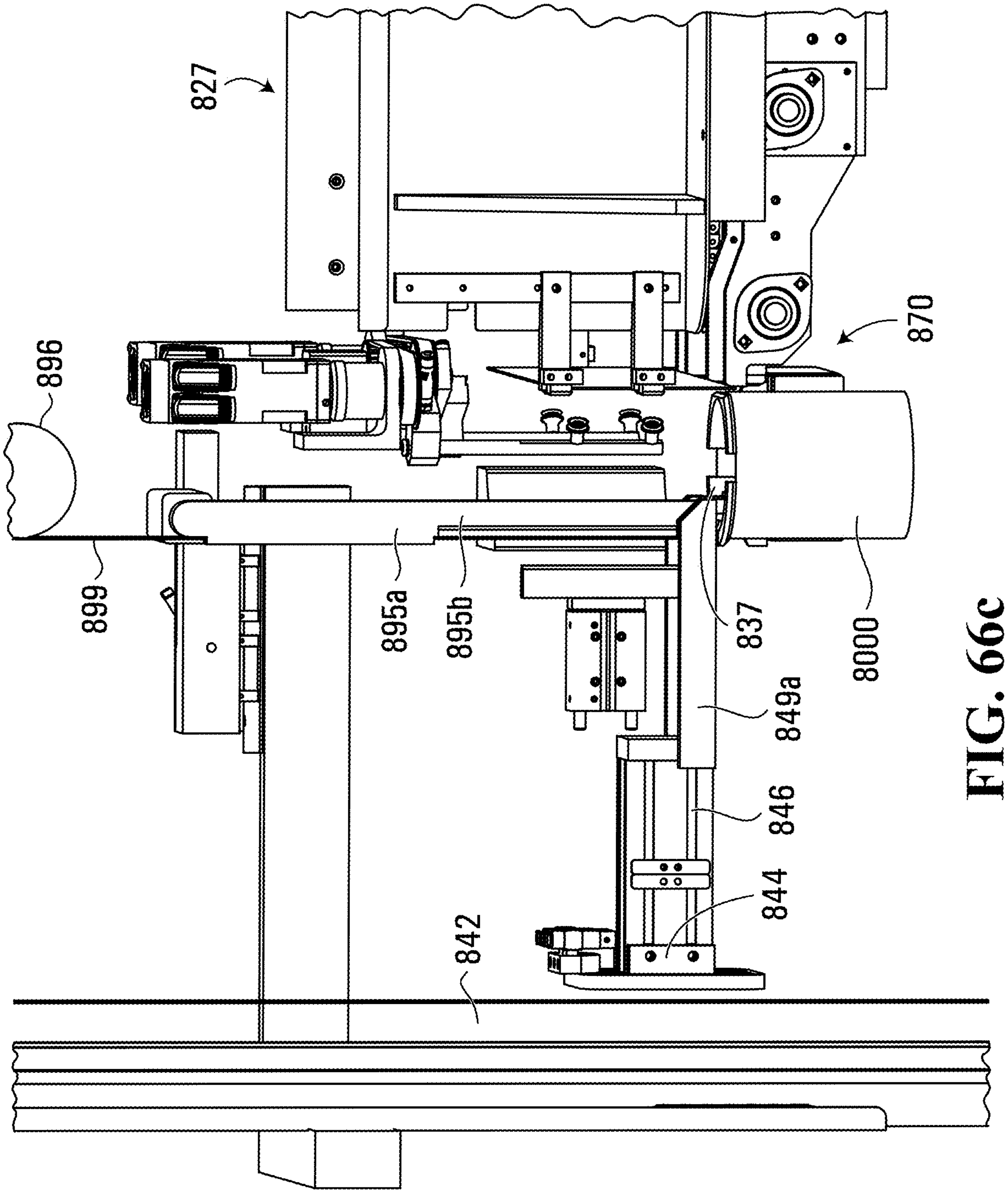

As illustrated in FIG. 65, third portion rotating apparatus 830*a* and fourth portion rotating apparatus 830*b* may each include a respective transversely oriented plough device, 831*a*, 831*a*, each plough device having a generally arcuate plough plate 835*a*, 835*b* that may be moved transversely in intermittent, reciprocating transverse movement outwards and inwards a desired amount by corresponding actuating double acting pneumatic cylinders 812*a*, 812*b* and movable piston arms connected to plough devices 831*a*, 831*b*. The transverse movement of plough devices 831*a*, 831*b* may be controlled by valves in an air distribution unit 427 (FIG. 80) that selectively deliver pressurized air through hoses (not shown) to respective double acting pneumatic cylinders 812*a*, 812*b* under the control of PLC 832. The plough plates 835*a*, 835*b* of plough devices 831*a*, 831*b* may be configured with curved surfaces 891*a*, 891*b* such that the movement of the plough plates of plough devices 831*a*, 831*b* may engage and push on portions E and A respectively causing rotation of portions E and A relative to portions D and B respectively, such that the portions E and A can be wrapped around the outer surfaces of side wall portions 821*b*, 821*c* respectively to complete the generally round or oval tubular shape. Plough devices 831*a*, 831*b* may be configured for releasable engagement with respective piston arms of double acting pneumatic cylinders 812*a*, 812*b* such that if a mandrel of a different radius is substituted for an existing mandrel, then a corresponding change can be made to plough devices 831*a*, 831*b* to ensure the appropriate size and positioning of the curved surfaces 891*a*, 891*b* to ensure it can perform the functions described herein.

Can system 800 may also include a sealing device 890 (FIGS. 59, 62 and 63) which may include a vertically oriented sealing jaw (aka sealing bar) 881 that may be moved longitudinally in intermittent, reciprocating movement by double acting pneumatic cylinder 882 with movable piston arm 883 (see FIG. 62) within a desired outwards and inwards range. The transverse reciprocating intermittent movement of sealing jaw 881 may be controlled by valves (not shown) that selectively deliver pressurized air through hoses (not shown) to pneumatic cylinder 882 that may be supplied by pressurized air controlled by valves in the air distribution unit 427 under the control of PLC 832. With reference to FIGS. 62 and 82, when piston arm 883 is extended, sealing jaw 881 will be received into a vertical longitudinal gap between the extended vertical edges of plough devices 831*a*, 831*b* (not shown in FIG. 82) and be able to engage the outward facing edges surfaces of abutting portions A and E and push the edges into engagement with the base portion of T shaped sealing strip 894, and push against the outward facing vertical and transverse surface 895*b*' of lower guide portion 895*b* (FIG. 82).

Welding or gluing or other activation of sealing strip 894 to abutting portions A and E can be accomplished by known means, such as by using one or more of heat, induction, a high frequency (for e.g. ultrasonic) electromagnetic field and/or pressure. For example, heating may be provided by sealing jaw 881 which may contain therein electrical heating elements, such as induction heating components that may be powered by electrical current supplied to sealing device 890.

Once sealing strip 894 of sealing material 899 has bonded to the vertical longitudinal edges and inner facing surfaces of portions A and E, the tubular sidewall shape for a composite can has been formed and fixed. Thereafter, as mandrel 837 is moved vertically downwards by mandrel movement apparatus 836, the sealing strip 894 of sealing material 899 that has bonded to the longitudinal/vertical edges and inner facing surfaces of portions A/E will also be moved downwards with mandrel 837 and the tubular shaped blank 8000. This downward movement will pull down an additional sealing strip 894 portion of sealing material 899 from reel 898 that will be retained in the guide channel defined by upper and lower portions 895*a*, 895*b* of bracket device 895 and be available for use to seal the longitudinal edge and inner facing surfaces of portions A/E on the next blank 8000 that will be processed by can forming system 800.

When one sealing strip 894, welded to portions A and E of blank 8000, has been moved down sufficiently to provide for the next portion of sealing strip 894 to be appropriately positioned in guide device 895, a cutting device (not shown) can be employed to cut the sealing strip 894 to the appropriate height for the can. The cutting device may be a scissor style cutting device and its operation may be controlled by PLC 832. The cutting device may also be configured to trim any excess sealing material at the top and bottom ends of the tubular blank.

It should be noted that when the mandrel returns upwards to the forming station where the next blank 8000 is to be formed around it, the sealing material will be received in an appropriate position within the vertical gap/slot 823*c* between mandrel wall portions 821*b*, 821*c*.

The aforementioned components of third portion rotating apparatus 830*a*, fourth portion rotating apparatus 830*b*, and sealing device 890 may be mounted to frame members (not shown for simplicity) of support frame 840. In some embodiments, the horizontal longitudinal/transverse positions, and also their vertical positions, may be adjustable on the frame to enable the components thereof to accommodate/substitute different sized/configured mandrel apparatuses 820 and corresponding different size and configuration of blanks. The adjustment may be made by hand and/or by servo motors operating moving support components under control of PLC 832.

Pneumatic cylinders 812*a*, 812*b* and 822 may each be a conventional double/two way acting pneumatic reciprocating cylinder with piston arms that are operable to move in a reciprocal movement between fully extended positions and fully retracted positions. Compressed air may be delivered to pneumatic cylinders 812*a*, 812*b*, 822, by hoses (not shown) in communication with a source of pressurized air through the air distribution unit 427. To channel the compressed air appropriately, valves (not shown) in distribution unit 427 can be driven between open and closed positions by solenoids responsive to signals from PLC 832. The valves could be located proximate the pneumatic cylinders or be disposed elsewhere. Electrical communication lines carrying signals to and from PLC 832 could also be provided to operate the valves.

It should also be noted that during downward vertical movement of case blank 8000 secured to mandrel 837, one or more compression rails (not shown) supported on part of vertical support frame 840 may be configured and positioned to apply pressure to the portions A and E and push against the outward surface of side walls 821*b*, 821*c* of mandrel 837 to ensure appropriate sealing of portions A and E to sealing strip 894.

With reference now to FIGS. 65, 66*a*, 71, 72, 74, 75 and 76, a bottom end flaring apparatus may be provided to flare outwardly the bottom edge of the tubular formed blank 8000. Flaring the bottom edge of the tubular formed blank 8000 may assist in forming a structured seal between tubular formed blank 8000 and the bottom cup 874 Flaring apparatus may include a pair of spaced flaring mandrels 980*a*, 980*b* which may be moved in reciprocating transverse movement to engage the lower edge of the blank 8000. The flaring mandrels 980*a*, 908*b* may be moved by respective piston arms of double acting piston devices 981*a*, 981*b*. Compressed air may be delivered to pneumatic devices 981*a*, 981*b*, by hoses (not shown) in communication with a source of pressurized air through the air distribution unit 427. To channel the compressed air appropriately, valves (not shown) in distribution unit 427 can be driven between open and closed positions by solenoids responsive to signals from PLC 832. The valves could be located proximate the pneumatic cylinders or be disposed elsewhere. Electrical communication lines carrying signals to and from PLC 832 could also be provided to operate the valves.

With particular reference now to FIGS. 70, 77, 78 and 79, a can discharge conveyor 8102 (for simplicity not shown in the other Figures) may be provided with a continuous conveyor belt 8105 driven in a conventional manner by a drive motor and drive wheel under control of PLC 832. Conveyor belt 8105 may be configured with a top run to support and move open topped cans 8000' formed from blanks 8000 by case forming system 800. Can discharge conveyor 8102 may be supported on frame support leg components 840*a*, 840*b* which may be part of frame 840.

With particular reference now to FIGS. 70, 77, 78 and 79, a bottom cup delivery conveyor 8501, which may be under control of PLC 832 that may be provided with inputs from appropriately positioned sensors, may be provided with a continuous conveyor belt 8502 driven in a conventional manner by a drive motor and a drive wheel under control of PLC 832 and configured to support and deliver a plurality of bottom cups 874 in series to a bottom forming station generally designated 8506. Bottom cup delivery conveyor 8501 may be supported on frame support leg components 8540*a*, 8540*b*.

A linear transfer robot generally designated 8900 under control of PLC 832 (that may be provided with inputs from appropriately positioned sensors) may include a moveable suction cup block 8901 with a plurality of suction cups 8902. Linear transfer robot may be constructed and operate in a manner similar to the construction and operation of blank retention and delivery apparatus 8800 as described below. Suction cup block 8901 may repeatedly move backward and forward along a linear rail between a pick-up location at the end of bottom cup delivery conveyor 8501 and a mandrel drop off location above an upper surface of a seaming mandrel 872. Suction cup block 8901 may pick up a bottom cup 874 at the pick-up location at the end of bottom cup delivery conveyor 8501 and move the bottom cup 874 to the mandrel drop off location above mandrel 872 where the bottom cup 874 is released onto the upper surface of seaming mandrel 872. This movement can be repeated whenever it is required to place a bottom cup 874 so it can be secured to a tubular blank as described hereinafter.

With reference to FIGS. 66*b*, 66*c*, 67-69*b* and 77, can forming apparatus 870 may be provided with a seaming mandrel 872 (or seaming chuck) mounted on a top end of a rotating shaft 871 and a plurality of seaming heads 876, 877. The can forming apparatus 870 may use seaming heads 876, 877, which have seaming rollers 876*a*, 876*b*, 877*a*, 877*b* attached thereto, for performing the seaming function. According to some embodiments, seaming occurs by rotating the mandrel 872. According to some embodiments, in the can seaming process, the tubular blank body 8000 and bottom cup 874 may rotate together to complete the seam between the bottom circumferential edge portion of the sidewall of tubular blank 8000, and a circumferential edge portion of bottom cup 874, through seaming rollers 876*a*, 876*b*, 877*a*, 877*b* (as will be described hereinafter). In other alternative embodiments, the seaming mandrel 874, tubular blank 8000 and bottom cup 874 may remain stationary, and mechanical drives may rotate the seaming rollers 876*a*, 876*b*, 877*a*, 877*b* around the tubular blank 8000 and bottom cup 874.

Figure 68:
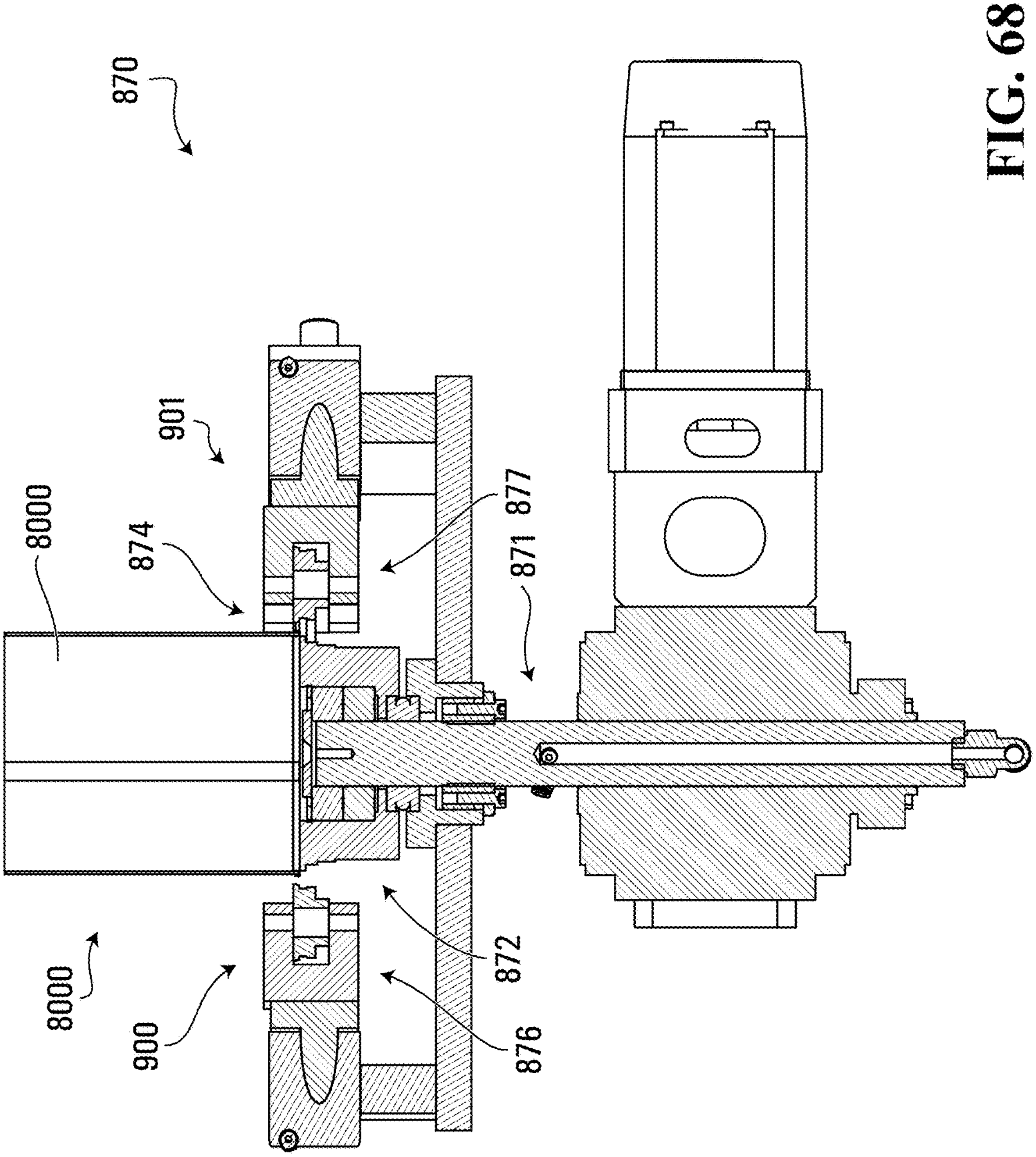
FIG. 68 is a sectional view of a seaming assembly mandrel in an operational position.

The can seaming apparatus 870 may be adapted and configured such that seaming mandrel 872 can hold bottom cup 874 firmly against the bottom end of can blank 8000 so that bottom cup 874 is held in contact with the bottom end of blank 8000 (FIG. 68). The outside circumferential edge portion of the bottom cup 874 may be generally formed in a U-shape in order to facilitate the receiving of the bottom edge portion of the sidewall of tubular shaped blank 8000 (see FIG. 69*a*). A first mechanical drive and second mechanical drive can be provided to position the plurality of seaming rollers 876*a*, 876*b*, 877*a*, 877*b* with respect to a circumferential flared edge of tubular blank 8000. A third mechanical drive can be provided to rotate seaming mandrel 872 which in turn rotates tubular blank 8000 and bottom cup 874.

Figure 69A:
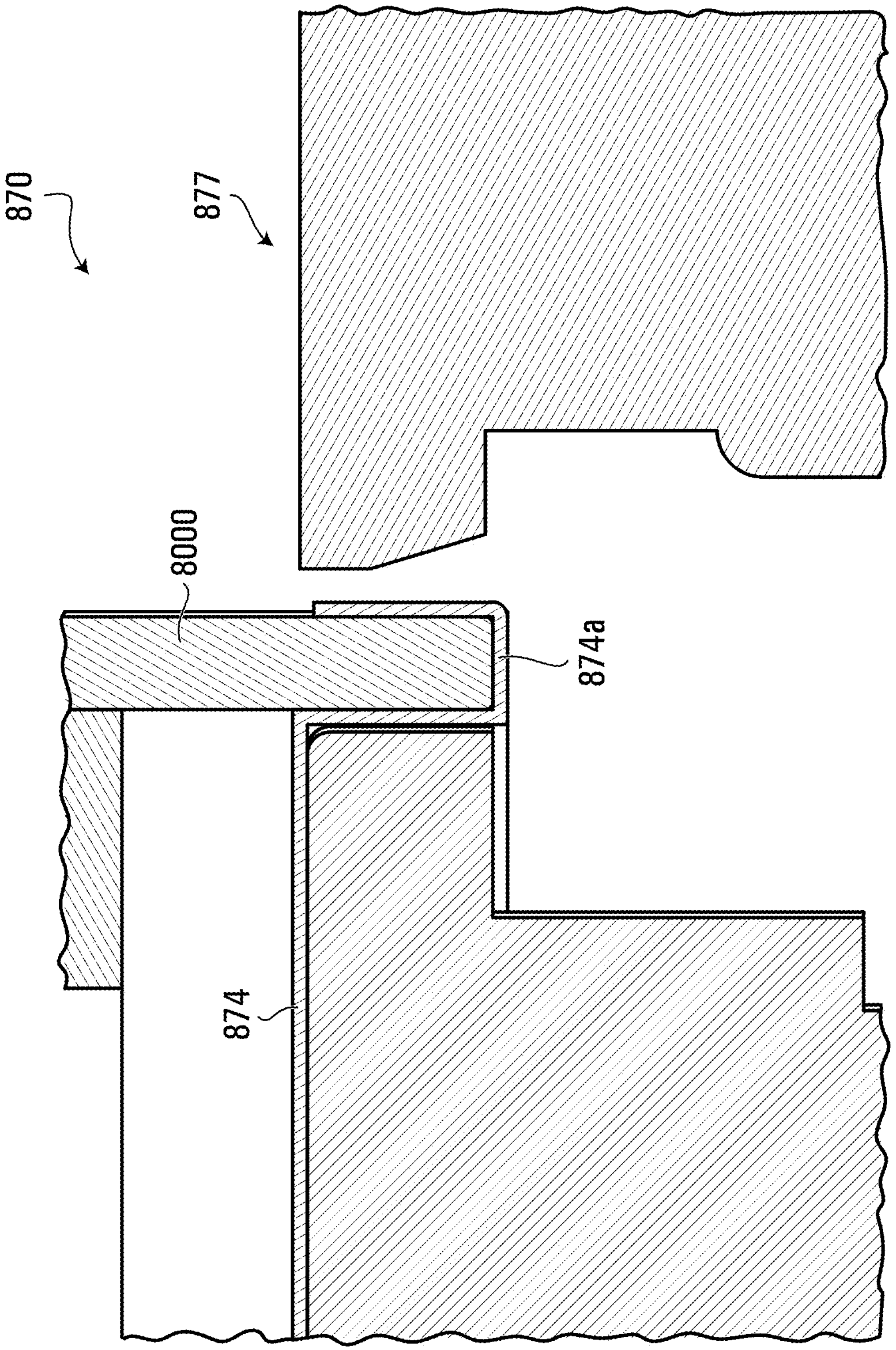
FIG. 69*a* is an enlarged cross-sectional view of part of the seaming assembly of FIGS. 67 and 68 in a first operational position.
Figure 69B:
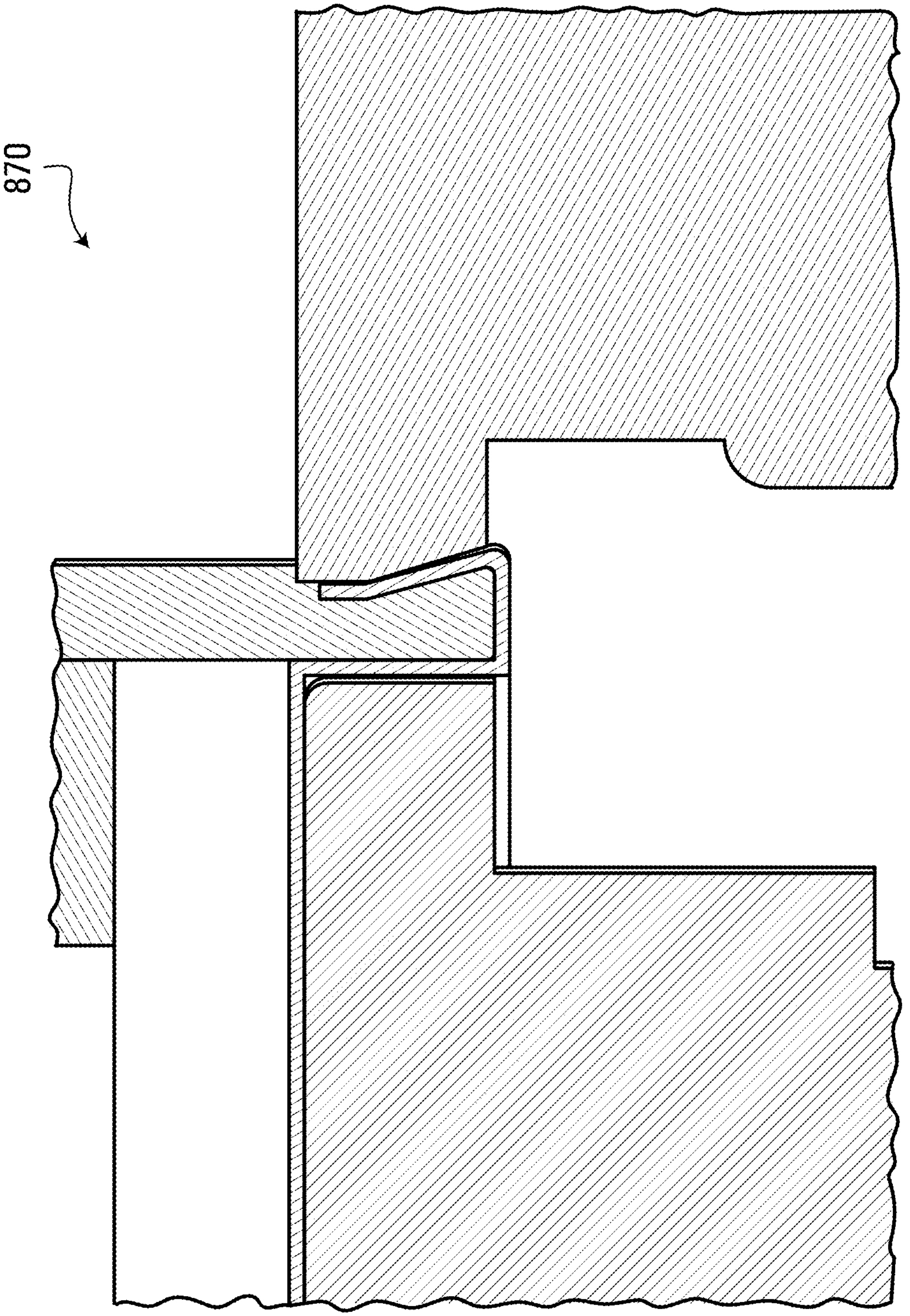
FIG. 69*b* is an enlarged cross-sectional view of part of the seaming assembly of FIG. 69*a* in a second operational position.

Seaming rollers 876*a*, 876*b*, 877*a*, 877*b* are adapted to form a sanitary, mechanical seal and seam between case blank 8000 and bottom cup 874. The first seaming rollers (i.e. seaming rollers 876*a*, 876*b*) may be operable to begin to roll bottom cup 874 and case blank 8000 forming a first operation roll seam, and the second seaming rollers (i.e. seaming rollers 877*a*, 877*b*) may be operable to complete the seam forming the second operation roll seam, in a conventional type of can seam such as for example where two end regions of material are overlapped/folded to form a hook type configuration and are thereafter compressed together In other embodiments, seaming rollers 876*a*, 876*b*, 877*a*, 877*b* may be operable to each simply pinch a preformed U-shaped channel 874*a* (FIG. 69*a*) of a bottom cup 874 containing the lower circumferential edge of the tubular body of blank 8000, trapping and securing that lower circumferential edge of the tubular body of blank 8000 in the channel 874*a*. In all such embodiments, the resultant seam, such as for example as shown in FIG. 69*b*, may be airtight and may also prevent liquid from escaping from the interior of the can, once filled. At least in part, the sealing integrity of this seal may be due to the vertical seal strip 894 that is used to form the single vertical seal in the body of the sidewall of the tubular shaped blank 8000. By having a single vertical seal formed in the tubular blank wall with seal strip 894, and having a bottom edge of the tubular sidewall of blank 8000 which is continuous and uniform (eg. not formed from spiral, connected layers of materials) an airtight and liquid-tight seam and seal is more likely to be formed between the lower edge of the sidewall of the blank 8000 and the bottom cup 874.

Seaming rollers 876*a*, 876*b*, 877*a*, 877*b* may be generally of a conventional type of design used in providing a seam between a can side wall and a bottom or top lid. While can forming apparatus depicts four seaming rollers, some embodiments of a can seaming apparatus 870 may have only two seaming rollers.

The first mechanical drive and second mechanical drive for positioning seaming rollers 876*a* 876*b*, 877*a*, 877*b* may be coordinated with the third mechanical drive that rotates seaming mandrel 874 with respect to a circumferential edge of tubular blank 8000 to be seamed to bottom cup 874. In the present disclosure, this coordination may be performed by PLC 832.

Figure 67:
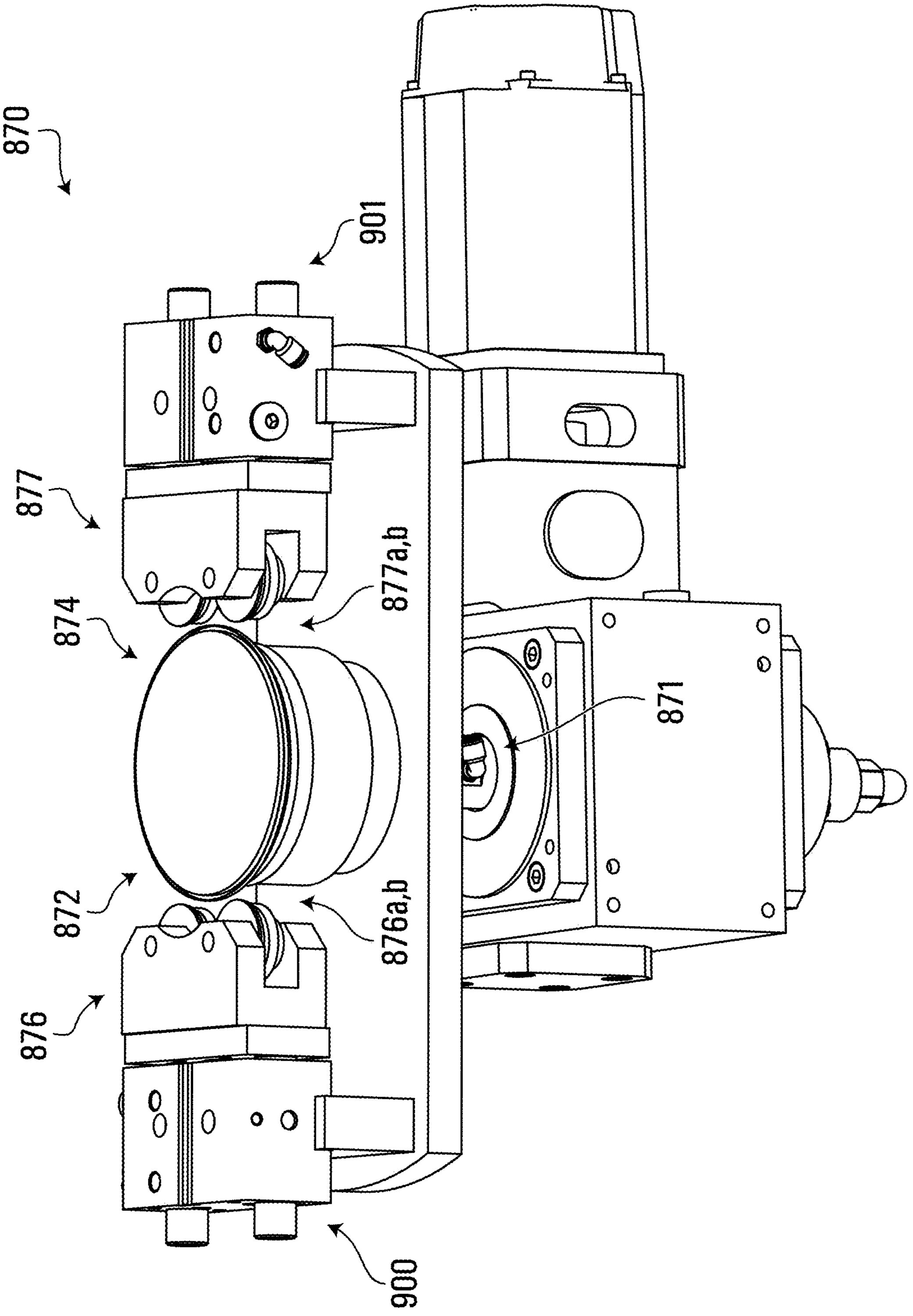
FIG. 67 is a top view of a seaming mandrel.

With reference to FIGS. 67 and 68, the first mechanical drive may include a first positioning roller drive 900. First positioning roller drive 900 may be linked via a roll shaft (not pictured) to seaming head 876. Similarly, second mechanical drive may include a second positioning roller drive 901. Second positioning roller drive 901 may be linked via a roll shaft (not pictured) to seaming head 877. First and second mechanical drives may include pneumatic cylinders 905, 906 and movable piston rods (not shown) for moving/translating seaming rollers 876*a*, 876*b*, 877*a*, 877*b* in a horizontal direction. Pneumatic cylinders 905, 906 may operate similar to, and include the same components as pneumatic cylinders 812*a*, 812*b* and 822 as described above. Thus, first and second mechanical drives are configured and adapted to adjustably position the circumferential edge of the respective seaming rollers 876*a*, 876*b*, 877*a*, 877*b* toward and away from a center axis of the tubular blank 8000 thereby positioning seaming rollers 876*a*, 876*b*, 877*a*, 877*b*, with respect to the circumferential edge of bottom cup 874, in a position to perform the seaming operation.

The third mechanical drive may include a servo motor (with appropriate drive shaft and gear mechanism) operable to rotate shaft 871, which is connected to seaming mandrel 872, around a vertical axis of rotation at a sufficient speed to accomplish a selected number of complete revolutions in a given time frame as required for the fabrication of an acceptable seam.

Thus, can seaming apparatus 870 may be of the type where the seaming mandrel 872 holds bottom cup 874 firmly against the bottom end of case blank 8000 during the seaming operation, and a servo motor rotates the seaming mandrel 872, thereby causing rotation of the tubular blank 8000 and bottom cup 874 (and seaming mandrel 872) in unison. Alternatively, can seaming apparatus 870 may be of the type where a seaming mandrel 872 holds bottom cup 874 firmly against the bottom end of tubular blank 8000 during the seaming operation, and mechanical drives rotate the seaming rollers 876*a*, 876*b*, 877*a*, 877*b* around tubular blank 8000 and bottom cup 874.

In use, an unattached bottom cup 874 is positioned on seaming mandrel 872. Case blank 8000 is moved vertically downward by mandrel movement apparatus 836 toward seaming mandrel 872 a predetermined vertical distance until the bottom end of tubular blank 8000 and bottom cup 874 are held firmly against the seaming mandrel 872. Thus, the bottom end of case blank 8000 and bottom cup 874 exert a force against each other which is determined by the final position of case blank 8000 as determined by the action of mandrel movement apparatus 836. Case blank 8000, bottom cup 874 and seaming mandrel 872 may remain in this position during the seaming operation. After the seaming operation is completed, the mandrel movement apparatus 836 moves the bottom lidded case blank 8000 upward to allow the lidded case blank 8000 to be released and to allow a new bottom cup 874 to be positioned on seaming mandrel 872.

Seaming rollers 876*a*, 876*b*, 877*a*, 877*b* may typically not move vertically during seaming. Accordingly, when a tubular blank 8000 is properly positioned on seaming mandrel 872, it is only necessary to move the seaming rollers 876*a*, 876*b*, 877*a*, 877*b* toward the center axis of case blank 8000 to properly position the seaming rollers 876*a*, 876*b*, 877*a*, 877*b* to perform a seaming operation.

With reference again to FIGS. 69*a* and 69*b*, cross-sections of a bottom cup 874, tubular blank 8000, seaming mandrel 872 and seaming roller 876*a* show the features of the bottom edge of tubular blank 8000 and bottom cup 874 during a seaming operation. Case blank 8000 is placed over bottom cup 874 and the bottom edge is received in channel 874*a*. Seaming roller 876*a* is moved laterally into engagement with the bottom edge of case blank 8000 and forms a seam.

Seaming roller 876 applies pressure between tubular blank 8000 and bottom cup 874, such that there is a pinching or crimping of materials between bottom cup 874 and blank 8000 to form a seal as shown in FIG. 69. The lateral movement of seaming roller 876 traverses the lower edge of the entire tubular blank 8000, generating a lower crimped seam that will contact entire bottom edge of the tubular blank 8000. The other seaming rollers may also perform substantially the same function in some implementations.

With reference now to FIGS. 70 and 77-79, a blank retention and delivery apparatus 8800 (FIG. 78) under control of PLC 832 may also be provided at bottom forming station 8506. Blank retention and delivery apparatus 8800 may include delivery movement apparatus 8536 that may include a generally horizontally oriented linear rail 8542. Linear rail 8542 may support a carriage block 8544 for sliding horizontal movement relative to support frame 840.

The movement of carriage block 8544 on linear rail 8542 may be driven by a continuous drive belt 8543 interconnected to carriage block 8544. Drive belt 8543 may be interconnected to, and driven by, a drive wheel (not shown) of servo drive motor 8545. An encoder (not shown) may be associated with servo drive motor 8545, and the encoder and servo drive motor may be in communication with PLC 832. In this way, PLC 832, on receiving signals from the encoder, may be able to monitor and control the horizontal position of carriage block 8544 (and the components interconnected thereto) by appropriately controlling and operating servo drive motor 8545.

Carriage block 8544 may support and be rigidly connected to a pneumatic cylinders 8546*a*, 8546*b* having one or more moveable piston arms (not shown). The outer ends of pneumatically cylinders 8546*a*, 8546*b* may be connected to an air suction cup block 8588 which may have mounted thereto a plurality of air suction cups 8587. Pneumatic cylinder 8546*a*, 8546*b* and piston arms may move air suction cup block 8588 in reciprocating transverse horizontal movement, and may also be activated by valves controlled by PLC 832 between a blank engagement position, a blank delivery position and a disengaged position. In the engagement position, air suction cups 8588 have a suction force that engages a facing surface of blank 8000. This may assist in holding the blank 8000 in a fixed position while a bottom cup 874 is being installed in the blank 8000. In the engaged position, air suction cups 8588 may also hold the blank in a fixed position when mandrel 837 is moved to a vertical position as it is being disengaged from blank 8000, after bottom cup 874 has been seamed into the bottom end of blank 8000.

In the delivery position, air suction cups 8588 may be moved by piston arms and suction cup block 8588 in a transverse direction toward discharge conveyor 8102 so that case blank 8000, which is now formed into an open top can 8000' with bottom cup 874 installed, is moved to a delivery transfer position. At the delivery transfer position air suction cups 8588 can be deactivated allowing composite can 8000' to be deposited onto conveyor belt 8105 such that composite can 8000' can be moved for further processing. That further processing will typically include filling the interior space of composite can 8000' with one or more items/products and then closing the top, including creating a top seal.

With particular reference to FIGS. 70-79, in operation, can forming system 800 is operable to perform the sequence of steps 8000(1) to 8000(6) illustrated in FIG. 53 of folding and sealing a bottom end of case blank 8000 to form an open top composite can 8000'. At the beginning of a cycle of operation, magazine 810 which has a plurality of blanks 8000 held therein has a blank 8000 at the front of the magazine in a pick-up position (see FIG. 71).

Figure 71:
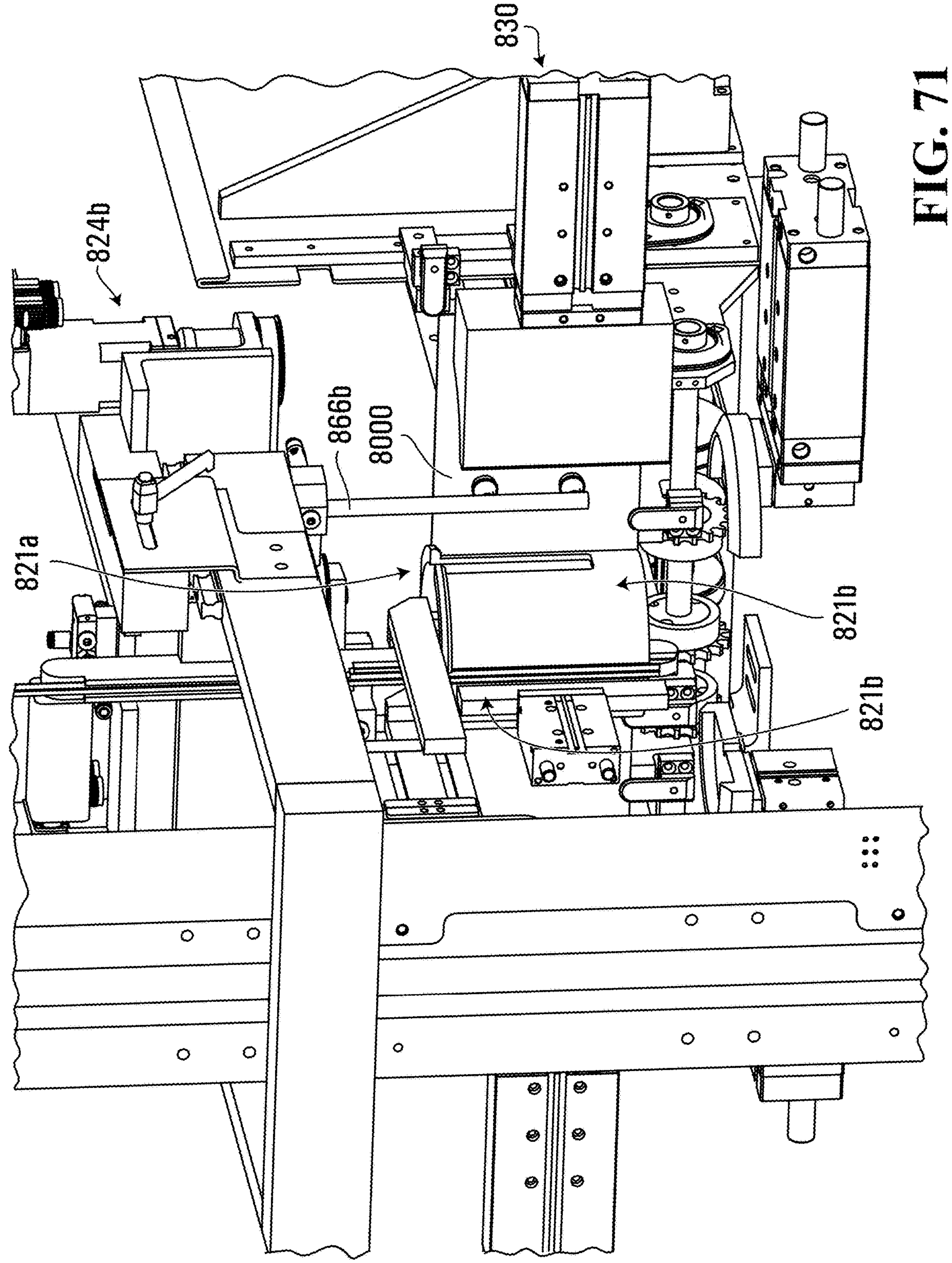
FIG. 71 is a rear view of the mandrel and forming apparatus as shown in FIG. 59 in the first operational position.
Figure 72:
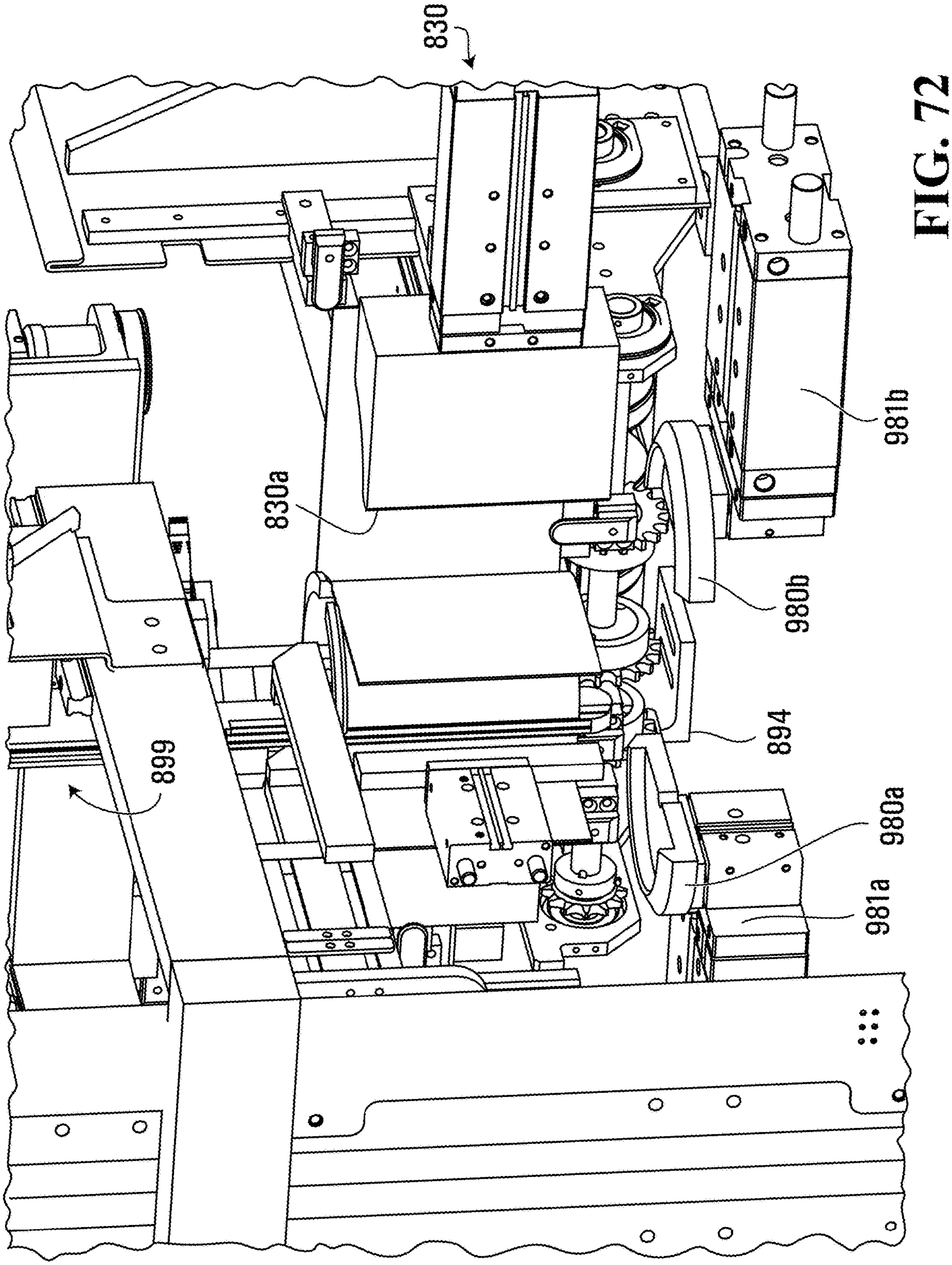
FIG. 72 is a rear view of the mandrel and forming apparatus as shown in FIG. 59 in the second operational position.

First portion rotating apparatus 824*a* may then be operated by PLC 832 to engage with the facing surface of portion D of the front blank 8000 held in magazine 810 and releasing portions D and E from being held by magazine 810, rotate portions D and E in a counter clockwise direction such that they are in engagement with a surface of side wall 821*b* of mandrel 837 (see FIGS. 71 and 72). Second portion rotating apparatus 824*b* may also be operated to engage with a facing surface of a portion B of a blank held in magazine 810 and releasing them portions D and E from being held by magazine 810, rotate portions A and B such that they are in engagement with a surface of side wall 821*c* of mandrel 837. Vertical slot 823*a* of mandrel 837 permits a lower portion of end effector rod 866*a* and air suction cups 868*a* thereon to move from the position shown in FIG. 71 and pass through slot 823*a* to the position shown in FIG. 72. By allowing the end effector rod 866*a* to pass through vertical slot 823*a*, end effector rod 866*a*, and in particular air suction cups 868*a*, may engage the outer surface of the portion D of blank 8000 when it is held in magazine 810 and bring portion D into face to face relation with the outward facing surface of mandrel side wall 821*b*. The surface of portion D being held by suction cups 868*a* becomes an inner surface of the tubular formed blank and side portion D may be held substantially flat against the outside surface of side wall 821*a* of mandrel 837, as shown.

Similarly, vertical slot 823*b*, transversely opposite of vertical slot 821*a*, of mandrel 837 permits a lower portion of end effector rod 866*b*, and suction cups 868*b* thereon, to move from the position shown in FIG. 71 to pass through slot 823*b* to the position shown in FIG. 72. By allowing the end effector rod 866*b* to pass through vertical slot 823*b*, end effector 866*b*, and in particular air suction cups 868*b*, may engage the outer surface of the major side portion B of blank 8000 when it is held in magazine 810 and bring portion B into face to face relation with the outward facing surface of side wall 821*c*. The surface of portion B being held by air suction cups 868*b* becomes an inner surface of the tubular formed blank and side portion B may be held substantially flat against the outside surface of side wall 821*b* of mandrel 837, as shown. During the rotation of blank portions D/E and B/A, blank portion C may be also released from being held by magazine 810 and become drawn into the facing surface of mandrel portion 821*a*.

Figure 73:
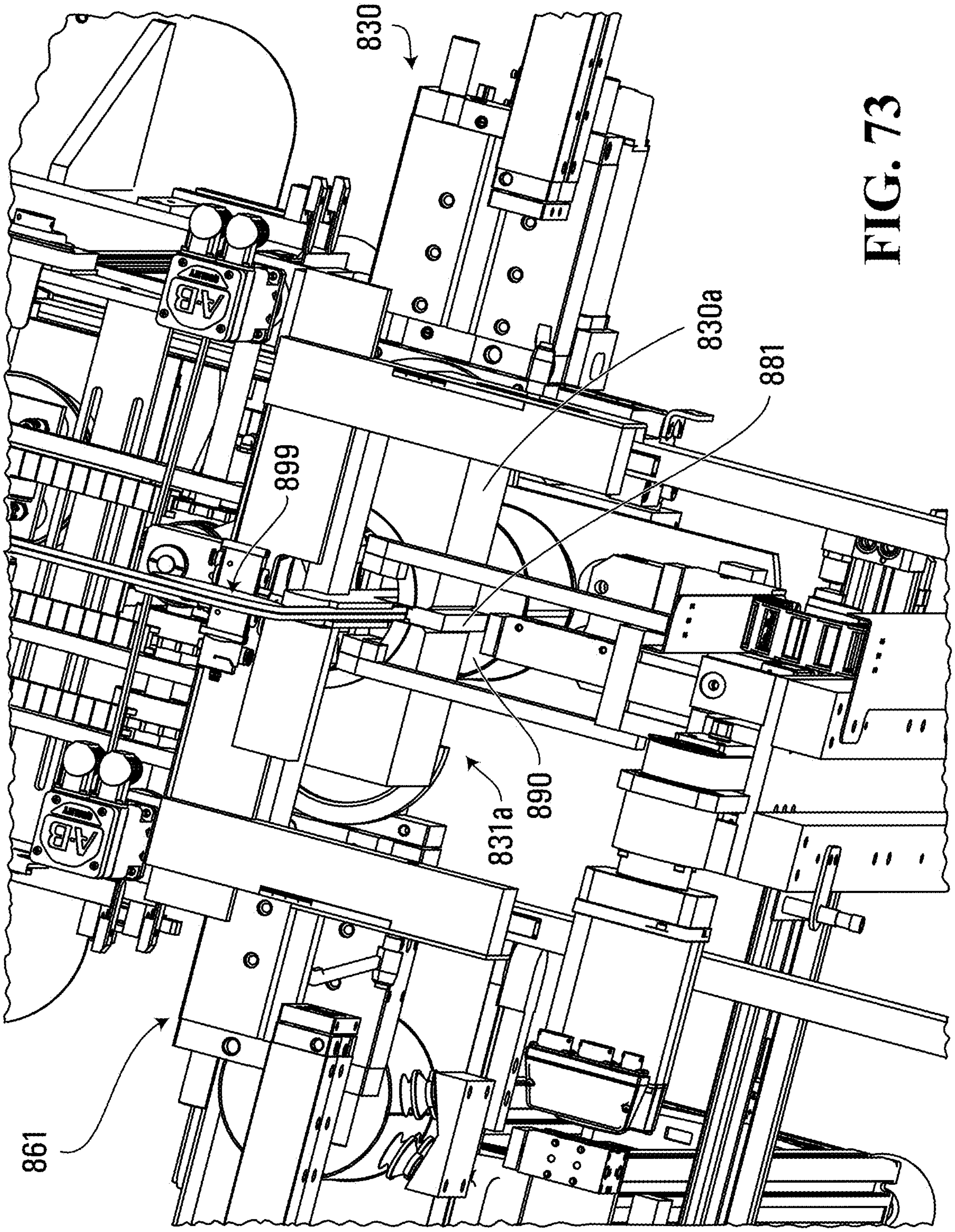
FIG. 73 is a top rear view of the mandrel and forming apparatus as shown in FIG. 59 in the third operational position.

Next, with reference to FIGS. 72 and 73, third portion rotating apparatus 830*a* may be operated to rotate portion E and possibly part of portion D around the mandrel portion 821*c*, in a counter clockwise direction Similarly, fourth portion rotating apparatus 830*b* may be operated to rotate portion A and possibly part of portion B in a clockwise direction. Central portion C may also as a result of the movement of portions A/B and D/E, also be formed into a generally arcuate shape. The result is a generally circular shaped tubular blank formed generally around the outer surfaces of mandrel 837. When portions A and E are so rotated, the vertical longitudinal edges of the portions are in close proximity to or in abutment with each other. But, in certain implementations, between the inner surface of the portions A and E (when they are rotated relative to portions B and D respectively, and have their vertical edges proximate to or in abutment with each other) and the outward facing surface of side walls 821*b* and 821*c* of mandrel 837, is sealing strip 894 of sealing material 899 (see FIGS. 72 and 73).

Next, sealing device 890 (see FIG. 73) may be operated such that vertically and longitudinally oriented sealing jaw 881 may be moved under control of PLC 832 in longitudinally inward direction by double acting pneumatic cylinder. With the piston arm extended, sealing jaw 881 can be received into the vertical longitudinal gap between the extended vertical edges of plough devices 831*a*, 831*b* and may engage the abutting outward faces of the edges of portions A and E (see FIG. 82).

Heat can be applied to the sealing strip 894 to thereby melt the sealing strip 894 in the proximate or abutting edge regions. The melted sealing strip 894 will then bond to the vertical edges of proximate or abutting portions A and E and the inner facing surfaces of portions A and E. Once the sealing strip 894 that extends down the entire vertical joint and a portion of the inner facing surfaces of the sealing strip has bonded to inner surface regions of portions A and E, the tubular sidewall for the composite can has been formed.

Figure 74:
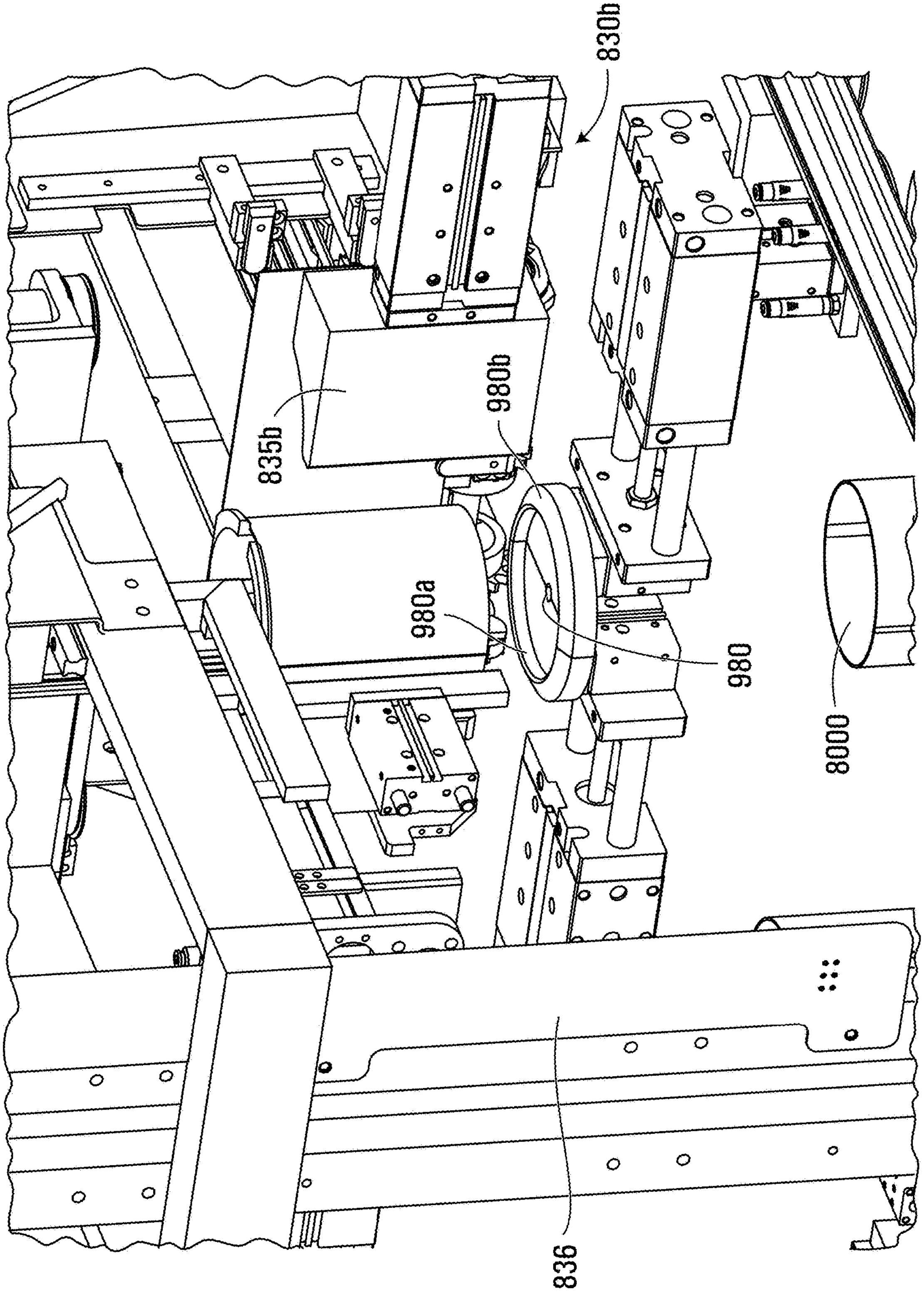
FIG. 74 is a rear view of the mandrel and forming apparatus as shown in FIG. 59 in the fourth operational position.
Figure 75:
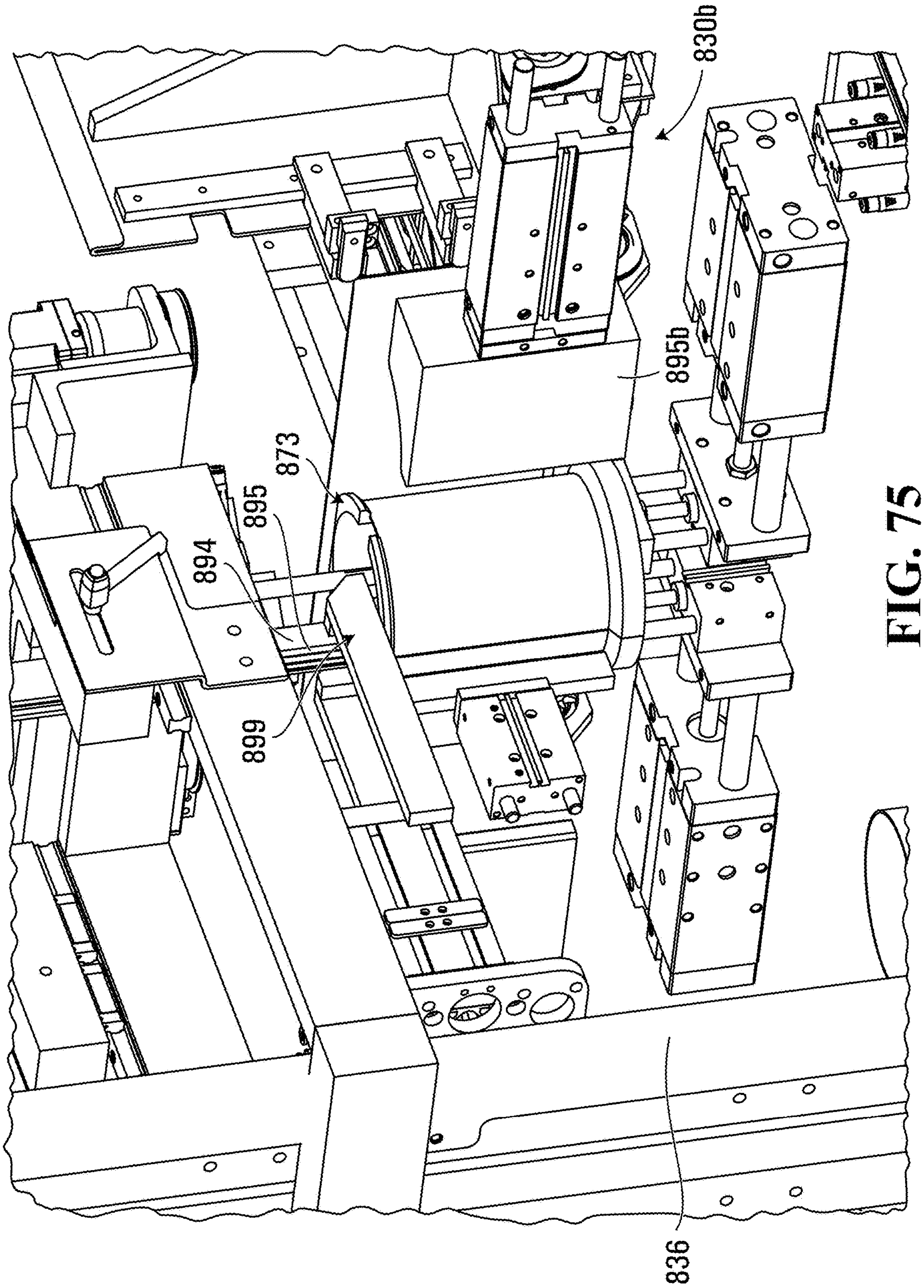
FIG. 75 is a rear view of the mandrel and forming apparatus as shown in FIG. 59 in the fifth operational position.
Figure 76:
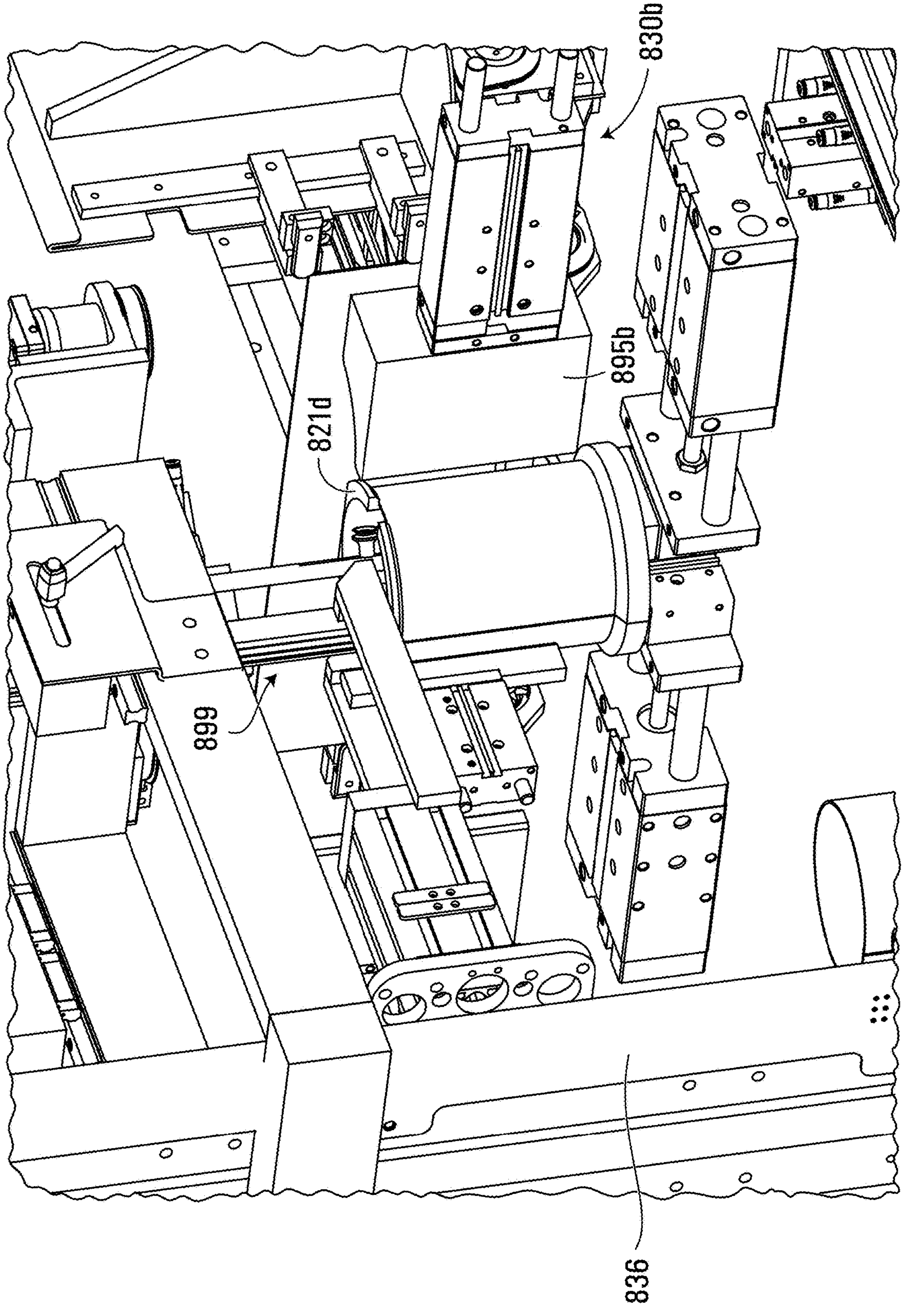
FIG. 76 is a rear view of the mandrel and forming apparatus as shown in FIG. 59 in the sixth operational position.
Figure 77:
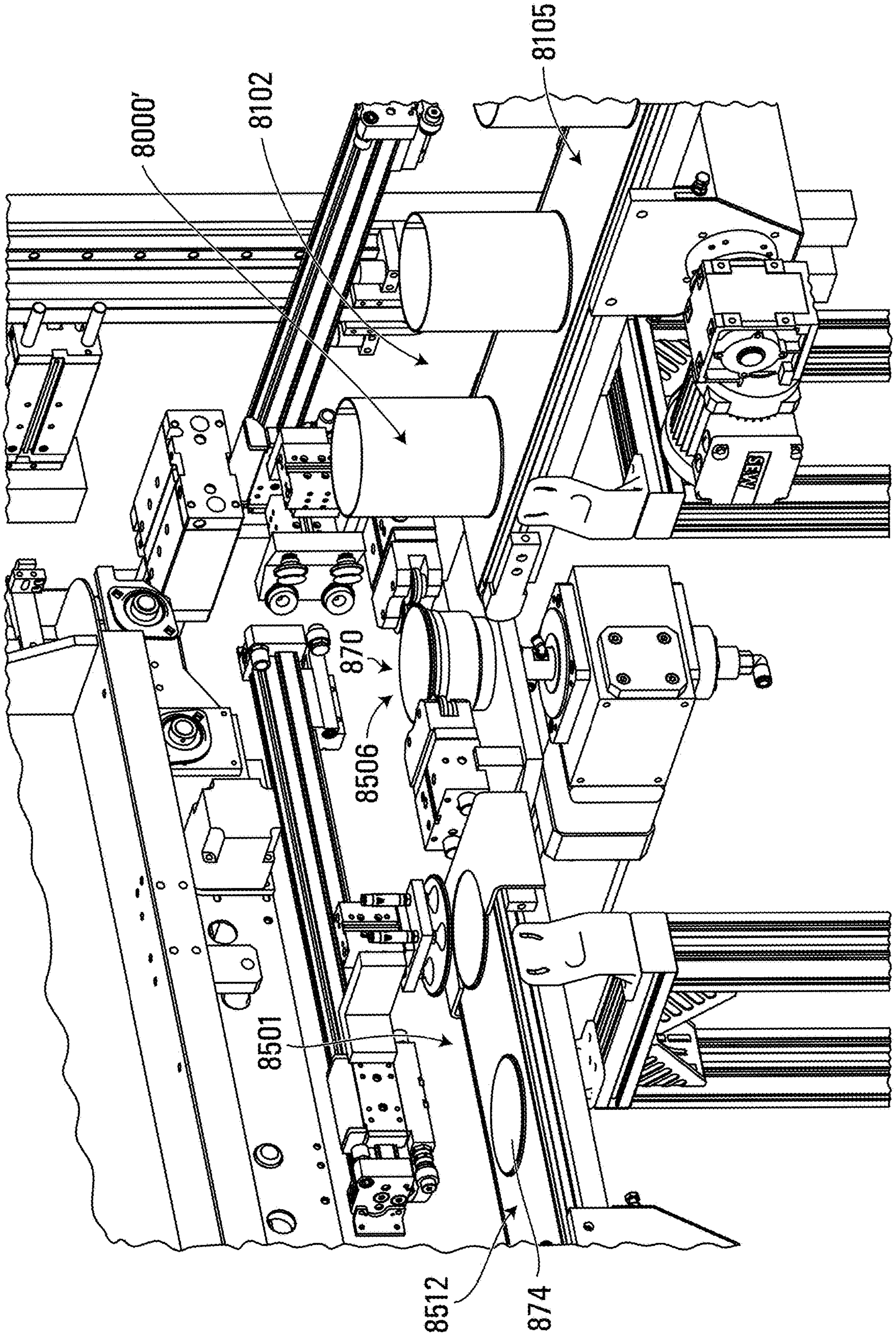
FIG. 77 is a front view of blank retention and delivery apparatus in a first operational position.

With reference now to FIGS. 74, 75 and 76, PLC 832 may operate mandrel movement apparatus 836 to move mandrel 837 vertically downwards, with the result that the sealing strip 894 of sealing material 899 which is bonded to portions A/E to also be pulled down with the mandrel 837 and case blank 8000. This downward movement will pull down an additional, next strip portion 894 of sealing material 899 that will be retained in the guide in bracket device portions 895*a* and 895*b*, and will be available to seal portions A/E on the next blank 8000 that will be processed by can forming system 800.

When next sealing strip 894 attached to a blank 8000 formed into a tubular shape on mandrel 837 has been pulled down sufficiently to provide for the next sealing strip 894, the cutting device (not shown) is employed to cut the sealing strip 894 that is attached to portions A/E of the tubular blank 8000 that has moved downward vertically, so that the sealing strip 894 attached to that tubular blank 8000 that has moved downward, is detached from the rest of the sealing material 899 being fed from the spool and any excess sealing material 899 at the upper and lower edges of the blank 8000 are trimmed away.

Now with reference to FIGS. 76-79, PLC 832 continues to operate vertical movement apparatus 836 to move mandrel 837 and the tubular shaped blank 8000 wrapped around it, to the bottom forming station 8506 where a bottom cup 874 may be installed using the apparatuses described above, including the seaming apparatuses.

Next, under control of PLC 332, air suction cups 8588 are moved in a transverse direction toward discharge conveyor 8102 and the can 8000' is moved to a delivery transfer position where the suction cups 8587 can be deactivated by PLC 832 thus allowing the blank to be deposited onto conveyor belt 8105 such that the can 8000' can be moved for further processing.

Mandrel 837 will in the meantime be moved upwards by mandrel movement apparatus 836 under the control of PLC 832 to the blank pick-up engagement position where the next blank 8000 held magazine 810 can be engaged and processed. As the mandrel 837 is moving vertically upwards to the blank pick-up engagement position where the next blank 8000 is to be formed around it, the sealing material 899 will be received in an appropriate position within the vertical gap/slot 823*c* between mandrel wall portions 821*b*, 821*c* and a in a position such that the next blank 8000 can be formed into the position shown in FIG. 82.

The foregoing process can be performed on multiple blanks 8000 in series. It is expected that in the range of approximately 20-40 blanks 8000 may be processed per minute with such a can forming system 800, depending upon the configuration and construction of the blank to be processed.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The invention claimed is:

1. A system for forming a container from a re-configurable blank, said system comprising:

(a) a blank support device having a generally cylindrical outward facing surface, said blank support device being positioned such that during operation, said outward facing surface of said blank support device is located proximate said blank while said blank is in a first configuration;

(b) a rotating sub-system operable to rotate said blank around the outward facing surface of said blank support device to form a generally cylindrical tubular side wall configuration around said outward surface of said blank support device;

(c) a bottom forming subsystem and a blank support movement subsystem;

wherein in operation, after said blank is formed into said generally cylindrical tubular side wall configuration by said rotating sub-system, said blank support movement subsystem is operable to move said blank on said case blank support device to a bottom forming station, where said bottom forming subsystem is located, and said bottom forming sub-system is operable for forming a bottom portion of said container by installing a circular bottom cup in a circular bottom opening of said tubular side wall configuration of said blank.

2. A system as claimed in claim 1 wherein said bottom forming subsystem comprises a seaming apparatus, and wherein in operation, said bottom cup is installed in said bottom opening by said seaming apparatus that is operable to perform a seaming process to create a seam between a bottom circumferential edge of said tubular side wall configuration of said blank and a circumferential edge region of said bottom cup.

3. A system as claimed in claim 1 wherein during said movement of said blank with said case blank support device to said bottom forming station, said sealing strip is moved therewith and said supply of sealing material delivers another sealing strip for use with a subsequent blank to be formed.

4. A system as claimed in claim 3 wherein said rotating subsystem is further operable to interconnect the first and second portions of the blank to secure said blank in said generally cylindrical tubular side wall configuration; wherein in operation, said rotating subsystem brings a free edge of the first portion and a free edge of the second portion of said blank into close proximity with each other and interconnecting the free edges of the first and second portions of the blank to thereby form said blank to provide a generally tubular cylindrical side wall configuration around said outward facing surface of said blank support device.

5. A system as claimed in claim 4, wherein said free edges of said first and second portions of said blank are interconnected by a sealing strip that is interconnected to both said first and second portions.

6. A system as claimed in claim 5 wherein said sealing strip has a generally T-shape in cross section and comprises a first top portion that bonds to inner surfaces of first and second portions of said blank and across a joint between the first and second portions of the blank, and said sealing strip comprises a base portion that is received between and bonds opposing edge faces of said first and second portions of said blank.

7. A system as claimed in claim 6 wherein said top of said sealing strip is positioned against inner surface regions of said first and second portions of said blank.

8. A system as claimed in claim 7 wherein in operation, during the rotation of said blank around the outward facing surface of said blank support device to form a generally cylindrical tubular side wall configuration, said top of said sealing strip is positioned within a slot of said blank support device.

9. A system as claimed in claim 1, wherein said container is a composite can.

* * * * *